United States Patent
Morioka et al.

(10) Patent No.: US 9,494,743 B2
(45) Date of Patent: Nov. 15, 2016

(54) OPTICAL FIBER SPLICING UNIT, OPTICAL FIBER SPLICING METHOD, AND HOLDING MEMBER FOR OPTICAL FIBER SPLICING UNIT

(71) Applicants: FUJIKURA LTD., Koto-ku, Tokyo (JP); NIPPON TELEGRAPH AND TELEPHONE CORPORATION, Chiyoda-ku, Tokyo (JP)

(72) Inventors: Hiroyuki Morioka, Sakura (JP); Takashi Yamaguchi, Sakura (JP); Kazuhiro Takizawa, Sakura (JP); Kazutoshi Takamizawa, Tsukuba (JP); Atsushi Daido, Tsukuba (JP); Masahiro Ida, Tsukuba (JP)

(73) Assignees: FUJIKURA LTD., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 340 days.

(21) Appl. No.: 14/201,352

(22) Filed: Mar. 7, 2014

(65) Prior Publication Data
US 2016/0139341 A1  May 19, 2016

Related U.S. Application Data

(63) Continuation of application No. PCT/JP2012/072993, filed on Sep. 7, 2012.

(30) Foreign Application Priority Data

| Sep. 8, 2011 | (JP) | 2011-196353 |
| Oct. 14, 2011 | (JP) | 2011-227447 |
| Oct. 14, 2011 | (JP) | 2011-227448 |
| Nov. 17, 2011 | (JP) | 2011-251566 |

(51) Int. Cl.
G02B 6/36  (2006.01)
G02B 6/255  (2006.01)
G02B 6/38  (2006.01)

(52) U.S. Cl.
CPC .......... *G02B 6/3803* (2013.01); *G02B 6/3802* (2013.01); *G02B 6/3806* (2013.01); *G02B 6/3809* (2013.01)

(58) Field of Classification Search
CPC  G02B 6/2555; G02B 6/2556; G02B 6/3803; G02B 6/3806; G02B 6/3802
See application file for complete search history.

(56) References Cited

U.S. PATENT DOCUMENTS

| 2005/0129378 A1 | 6/2005 | Yamaguchi et al. |
| 2007/0211997 A1 | 9/2007 | Saito et al. |

(Continued)

FOREIGN PATENT DOCUMENTS

| CN | 101300511 A | 11/2008 |
| JP | 2005-099706 A | 4/2005 |

(Continued)

OTHER PUBLICATIONS

Communication dated May 6, 2015, issued by the European Patent Office in corresponding European Application No. 12830014.2.

(Continued)

*Primary Examiner* — Omar R Rojas
(74) *Attorney, Agent, or Firm* — Sughrue Mion, PLLC

(57) ABSTRACT

An optical fiber splicing unit includes: a mechanical splice which aligns optical fibers and puts the optical fibers between half-split elements to splice the optical fibers to each other; a splice holder portion which holds the mechanical splice; fixing member guide portions which respectively guide anchoring fixation members that are respectively fixed to the optical fibers at two sides of the held mechanical splice; anchoring portions which respectively anchor the anchoring fixation members, the anchoring fixation members being respectively guided by the fixing member guide portions and advancing; and a first spacer which abuts one anchoring fixation member and is disposed to be retracted to restrict the advancement of said one anchoring fixation member, said one anchoring fixation member being guided by one fixing member guide portion and advancing.

14 Claims, 63 Drawing Sheets

(56) References Cited

U.S. PATENT DOCUMENTS

2008/0310797 A1    12/2008    Yazaki et al.
2010/0215323 A1    8/2010    Yazaki et al.

FOREIGN PATENT DOCUMENTS

| | | |
|---|---|---|
| JP | 2006-178289 A | 7/2006 |
| JP | 2007-121764 A | 5/2007 |
| JP | 2007-121886 A | 5/2007 |
| JP | 2008-256867 A | 10/2008 |
| JP | 2008-262245 A | 10/2008 |
| JP | 2009-139891 A | 6/2009 |
| JP | 2010-026166 A | 2/2010 |
| JP | 2010-145951 A | 7/2010 |
| JP | 2011-002646 A | 1/2011 |
| JP | 2011-002670 A | 1/2011 |
| JP | 2011-059139 A | 3/2011 |
| TW | 200741273 A | 11/2007 |

OTHER PUBLICATIONS

Communication dated Sep. 15, 2015 from the Japanese Patent Office issued in corresponding Japanese application No. 2013-532688.
Communication dated Oct. 2, 2014 from the Taiwanese Patent Office in counterpart application No. 101132907.
International Search Report of PCT/JP2012/072993 dated Dec. 18, 2012.
Machine translation of JP 2006-178289A filed Mar. 7, 2014.
Machine translation of JP 2007-121764A filed Mar. 7, 2014.
Machine translation of JP 2011-002670A filed Mar. 7, 2014.
Machine translation of JP 2008-256867A filed Mar. 7, 2014.
Machine translation of JP 2007-121886A filed Mar. 7, 2014.
Communication dated Mar. 10, 2015 from the Japanese Patent Office in counterpart application No. 2013-532688.

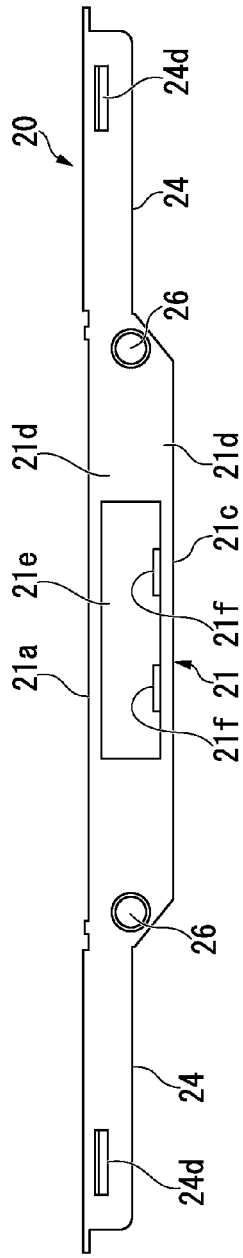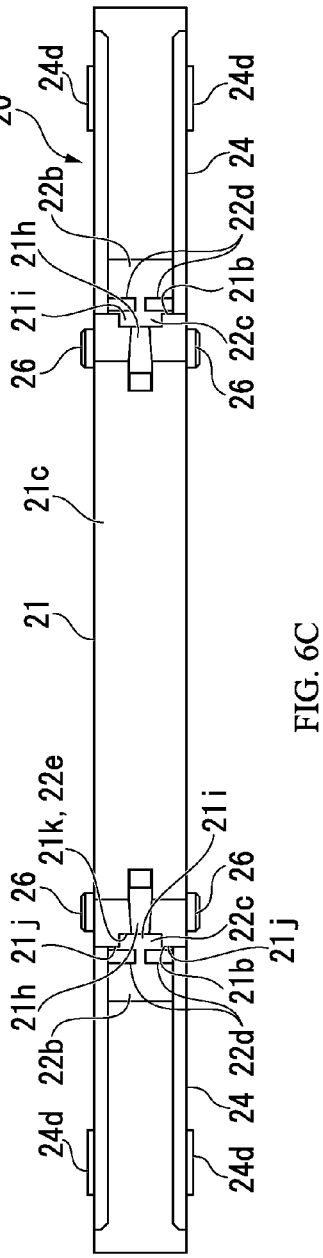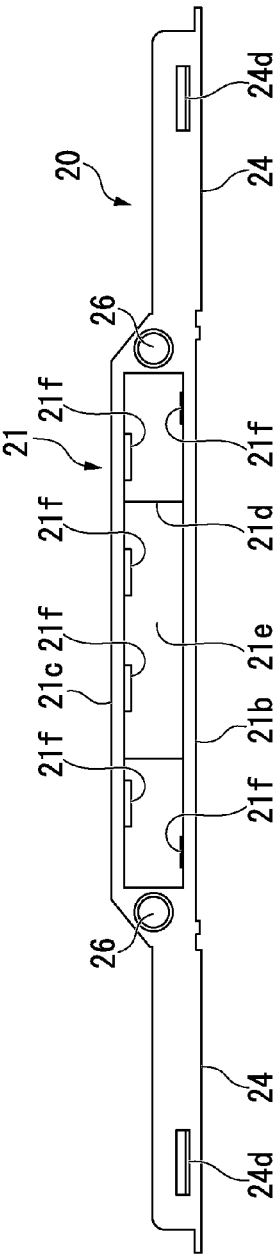

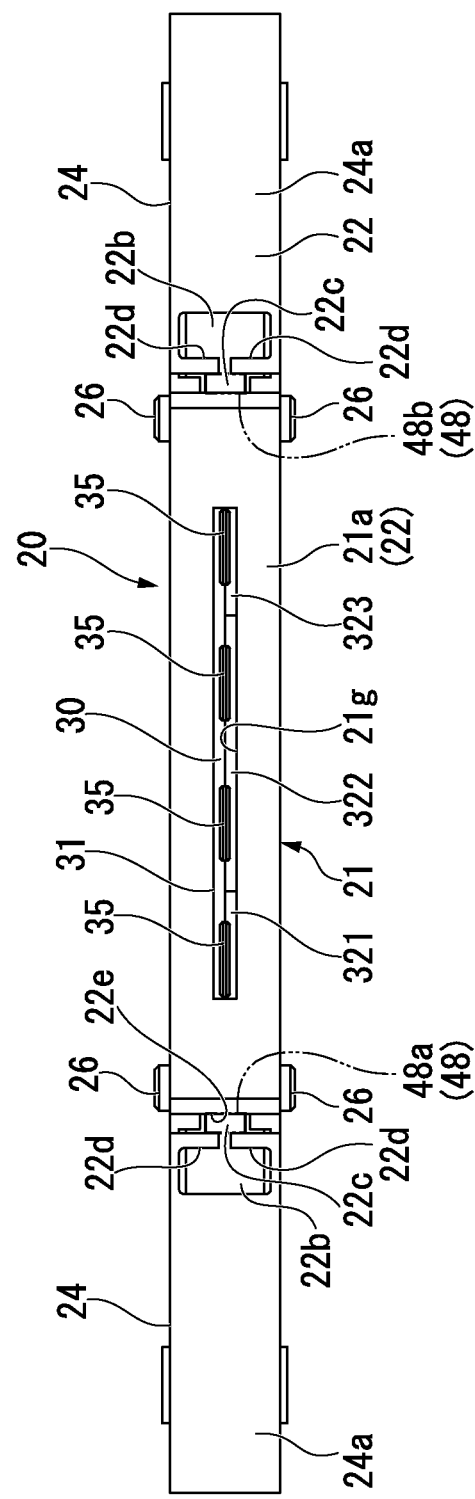

OPTICAL FIBER SPLICING UNIT, OPTICAL FIBER SPLICING METHOD, AND HOLDING MEMBER FOR OPTICAL FIBER SPLICING UNIT

CROSS REFERENCE TO RELATED APPLICATIONS

This application is a continuation application based on a PCT Patent Application No. PCT/JP2012/072993, filed Sep. 7, 2012, whose priority is claimed on Japanese Patent Application No. 2011-196353, filed on Sep. 8, 2011, Japanese Patent Application No. 2011-227447, filed on Oct. 14, 2011, Japanese Patent Application No. 2011-227448, filed on Oct. 14, 2011, and Japanese Patent Application No. 2011-251566, filed on Nov. 17, 2011, the entire content of which are hereby incorporated by reference.

BACKGROUND OF THE INVENTION

1. Field of the Invention

The present invention relates to an optical fiber splicing unit which can be used to splice optical fibers, an optical fiber splicing method using the same, and a holding member for an optical fiber splicing unit.

2. Description of the Related Art

Japanese Unexamined Patent Application, First Publication No. 2010-26166 discloses an optical fiber splicing unit which includes a mechanical splice (optical fiber splicer) which splices optical fibers exposed from terminals of optical fiber cables (optical cables), and an optical fiber splicing tool which assembles each optical fiber cable spliced using the mechanical splice to both ends of the mechanical splice.

Moreover, with respect to an operation for butt-jointing the optical fibers, which are exposed from the optical fiber cable terminals, using the mechanical splice, a technology is known which adjusts a protrusion length of each of mutually butted optical fibers from the optical fiber cable terminal and an insertion length of each optical fiber with respect to the mechanical splice so that a bend is formed in the optical fiber between the optical fiber cable terminal and the mechanical splice when optical fibers abut each other.

In this technology, abutting between the optical fibers is secured by bend formation of the optical fiber between the optical fiber cable terminal and the mechanical splice.

In addition, various methods of splicing the optical fibers exposed from terminals of the optical fiber cables (optical cables) using the mechanical splice (optical fiber splicer) are suggested (for example, refer to Japanese Unexamined Patent Application, First Publication No. 2010-26166).

As one of splicing methods of the optical fibers, in order to more reliably perform the butting of the optical fibers, there is a splicing method which confirms whether or not a uniform bend is realized by pressing the bend generated at both sides of the mechanical splice using a finger.

Moreover, in the conventional art, an optical fiber splicing unit is known which includes a mechanical splice (optical fiber splicer) used to splice optical fibers exposed from terminals of optical fiber cables (optical cables), and grip portions which grip the optical fiber cables spliced by the mechanical splice at both ends of the mechanical splice (for example, refer to Japanese Unexamined Patent Application, First Publication No. 2010-145951 and Japanese Unexamined Patent Application, First Publication No. 2011-2646).

When a large grip force is required with respect to the optical fiber cable, a structure can be adopted in which the optical fiber splicing unit is accommodated in a case body such as a closure or a cabinet, and the optical fiber cables are fixed to the case body by a fixing tool provided in the inner portion.

Japanese Unexamined Patent Application, First Publication No. 2005-99706 discloses a tool (optical fiber splicing tool) which includes a plate-shaped insertion member which is inserted between elements of a clamping portion (mechanical splice) and opens the portion between the elements to such an extent that insertion and detachment of the optical fiber can be easily performed.

The optical fiber splicing tool includes a ring-shaped insertion member driving portion which moves the insertion member inserted between the elements in a direction which is pulled out from the portion between the elements.

The insertion member is attached to a portion (movable end portion) facing an insertion member window in the insertion member driving portion through the insertion member window which is formed on the insertion member driving portion.

A tip portion of the insertion member passing through the insertion member window protrudes outside the insertion member driving portion, and is inserted between elements of the clamping portion.

Moreover, in the optical fiber splicing tool, the insertion member driving portion is deformed by a lateral pressure operated from both sides of the insertion member driving portion, a separation distance between the insertion member window and the movable end portion is increased, and thus, the tip portion of the insertion member inserted between the elements of the clamping portion can be pulled out of the portion between the elements.

The present invention is to more reliably perform abutting between optical fibers at a splicing operation between the optical fibers using a mechanical splice.

Moreover, in the splicing method of the optical fibers of the related art which presses the bending generated at both sides of the mechanical splice using a finger and confirms whether or not the uniform bending is realized, in order to obtain the uniform bending, a slightly complicated operation such as adjustment by pressing the bending using a finger is required.

The present invention is made in consideration of the above-described problems, and an object thereof is to provide an optical fiber splicing method and an optical fiber splicing unit capable of obtaining a uniform bending by a simpler operation when optical fibers are spliced using a mechanical splice.

In addition, in the structure in which the optical fiber splicing unit is accommodated in the case body such as the closure or the cabinet and the optical fiber cable is fixed to the case body by the fixing tool provided in the inner portion, there is a problem that a large installation space is required in the closure or the like which accommodate the optical fiber splicing unit.

In addition, there is a problem that since the structure of the closure or the like is complicated, the manufacturing costs are increased.

The present invention is made in consideration of the above-described problems, and an object thereof is to provide a holding member for an optical fiber splicing unit capable of increasing a gripping force of an optical fiber cable, saving a space, and reducing costs.

Moreover, an object of the present invention is to provide a mechanical splice tool and a tool attached mechanical splice capable of easily decreasing the sizes, and particularly, further decreasing the protrusion dimension of the tool in a pull-out direction of an insertion piece.

SUMMARY

In order to achieve the above-described objects, the present invention provides the following configurations.

According to a first aspect of the present invention, an optical fiber splicing unit, includes: a mechanical splice which aligns optical fibers and puts the optical fibers between half-split elements to splice the optical fibers to each other; a splice holder portion which holds the mechanical splice; fixing member guide portions which respectively guide anchoring fixation members that are respectively fixed to the optical fibers at two sides of the held mechanical splice; anchoring portions which respectively anchor the anchoring fixation members, the anchoring fixation members being respectively guided by the fixing member guide portions and advancing; and a first spacer which abuts one anchoring fixation member and is disposed to be retracted to restrict the advancement of said one anchoring fixation member, said one anchoring fixation member being guided by one fixing member guide portion and advancing.

In the optical fiber splicing unit according to the first aspect of the present invention, the optical fiber splicing unit may further include: a first splice tool which includes an insertion pieces inserted between the half-split elements at a side in which one optical fiber is put; and a second splice tool which includes an insertion pieces inserted between the half-split elements at a side in which the other optical fiber is put, in which the first splice tool may further include the first spacer as a protrusion which protrudes from the first splice tool.

In the optical fiber splicing unit according to the first aspect of the present invention, the first spacer may be capable of being inserted into a window hole which is opened to a wall portion and the first spacer abuts said one anchoring fixation member and restricts the advancement of said one anchoring fixation member, the wall portion including said one fixing member guide portion and accommodating and guiding said one anchoring fixing member, the first spacer being inserted from the window hole and protruding inside the wall portion.

In the optical fiber splicing unit according to the first aspect of the present invention, said one fixing member guide portion may include a pressing portion which presses the spacer toward an inner wall of the mechanical splice side of the window hole, the spacer being inserted into the window hole.

In the optical fiber splicing unit according to the first aspect of the present invention, the optical fiber splicing unit may further include a second spacer which abuts an other anchoring fixation member and is disposed to be retracted to restrict the advancement of the other anchoring fixation member, the other anchoring fixation member being guided by an other fixing member guide portion and advancing.

In the optical fiber splicing unit according to the first aspect of the present invention, said one anchoring portion may be a lever member which is rotatably provided around an axis along a width direction of the unit base, and may be capable of being switched between a retraction restriction position at which the lever member engages with said one anchoring fixation member, which is provided in said one fixing member guide portion, from the rear side of said one anchoring fixation member and at which retraction of said one anchoring fixation member is restricted, and a waiting position at which contact between the lever member and said one anchoring fixation member is prevented, by rotation of the lever member, and the lever member may include a fixing member pressing and advancing portion which abuts a rear end of said one anchoring fixation member and advances said one anchoring fixation member toward the mechanical splice when the lever member moves from the waiting position to the retraction restriction position by the rotation of the lever member.

In the optical fiber splicing unit according to the first aspect of the present invention, said one anchoring portion may be a lever member which is rotatably provided around an axis along a width direction of the unit base, and may be capable of being switched between a retraction restriction position at which the lever member engages with said one anchoring fixation member, which is provided in said one fixing member guide portion, from the rear side of said one anchoring fixation member and at which retraction of said one anchoring fixation member is restricted, and a waiting position at which a contact between the lever member and said one anchoring fixation member is prevented, by rotation of the lever member, and a rotation restricting abutment portion, which abuts the first splice tool and maintains the lever member at the waiting position, may be provided on the lever member of one end portion in a longitudinal direction of the unit base.

According to a second aspect of the present invention, there is provided an optical fiber splicing method, including: opening a portion between half-split elements of a mechanical splice, which aligns optical fibers and puts the optical fibers between the half-split elements to splice the optical fibers to each other, by inserting an insertion piece between the half-split elements of the mechanical splice, inserting a first optical fiber between the half-split elements from one end side of the mechanical splice, pulling-out the insertion piece from the portion between the half-split elements of one end portion of the mechanical splice in a state where a first anchoring fixation member, which is fixed to the first optical fiber, abuts a first spacer which restricts advancement of the first anchoring fixation member, and gripping and fixing the first optical fiber between the half-split elements; retracting the first spacer from the position, at which the first spacer is capable of abutting the first anchoring fixation member, concurrently with or after the gripping and fixing of the first optical fiber, thereafter, advancing the first anchoring fixation member toward the mechanical splice, and restricting retraction of the first anchoring fixation member with respect to the mechanical splice using an anchoring portion, in a state where a bending is formed in the first optical fiber between the mechanical splice and the first anchoring fixation member; and subsequently, inserting a second optical fiber between the half-split elements from an other end side of the mechanical splice and butting a tip of the second optical fiber to a tip of the first optical fiber, pulling-out the insertion piece from the portion between half-split elements of an other end portion of the mechanical splice in a state where the butting is maintained, and gripping and fixing the second optical fiber between the half-split elements.

In the optical fiber splicing method according to the second aspect of the present invention, the optical fiber splicing method may further include: in the process of inserting the second optical fiber between the half-split elements of the mechanical splice and butting the tip of the second optical fiber to the tip of the first optical fiber, abutting the second anchoring fixation member, which is fixed to the second optical fiber, to a second spacer restricting advancement of the second anchoring fixation member, stopping the advancement of the second anchoring fixation member with respect to the mechanical splice at a position at which the second optical fiber is to butt to the tip of the first optical fiber, subsequently, gripping and fixing the second optical fiber between the half-split elements by pulling-out the insertion piece from the portion between the half-split elements of the other end portion of the mechanical splice in a state where the butting between the first and second optical fibers is maintained, retracting the second spacer from a position at which the second spacer is capable of abutting the second anchoring fixation member, concurrently with or after the gripping and fixing of the second optical fiber, thereafter, advancing the second anchoring fixation member toward the mechanical splice, and restricting retraction of the second anchoring fixation member with respect to the mechanical splice using an anchoring portion, in a state where a bending is formed in the second optical fiber between the mechanical splice and the second anchoring fixation member.

According to a third aspect of the present invention, there is provided a holding member for optical fiber splicing unit, including: a unit holding portion which holds the optical fiber splicing unit according to the first aspect of the present invention which butt-joints optical fibers which are drawn from terminals of a pair of optical fiber cables; and a holding member side cable fixing portion which is integrally formed with the unit holding portion on each of two ends in a longitudinal direction of the unit holding portion, in which the optical fiber splicing unit includes a splice holder portion which holds a mechanical splice in which the optical fibers are put in a state where the optical fibers are butt-jointed, and a unit side cable fixing portion which is fixed to each of terminals of the pair of optical fiber cables, and in which the holding member side cable fixing portion includes a cable fitting groove which fits the optical fiber cable extending from the optical fiber splicing unit, and grips and fixes the optical fiber cable in the cable fitting groove.

In the holding member for an optical fiber splicing unit according to the third aspect of the present invention, the holding member side cable fixing portion may include one or a plurality of gripping protrusions which are formed on mutually facing inner surfaces of the cable fitting groove to press the optical fiber cable, and to grip and fix the optical fiber cable.

In the holding member for an optical fiber splicing unit according to the third aspect of the present invention, the plurality of gripping protrusion may be formed at an interval in an insertion direction of the optical fiber cable.

In the holding member for an optical fiber splicing unit according to the third aspect of the present invention, the unit holding portion may include an elongated plate-shaped bottom plate portion and side plate portions erected on both edges of the bottom plate portion, and a unit accommodation space, which accommodates the optical fiber splicing unit, may be formed between the side plate portions, and a restricting convex portion, which restricts the width direction movement of the optical fiber splicing unit, may be formed on at least one of the side plate portions.

In the holding member for an optical fiber splicing unit according to the third aspect of the present invention, the holding member side cable fixing portion may include a stopper wall portion which restricts a longitudinal direction movement of the optical fiber splicing unit held in the unit holding portion.

According to the present invention, in the splicing method in which after one (first optical fiber) of two optical fibers, which are objects to be spliced, is inserted between elements of the mechanical splice, and is gripped and fixed between the elements, the other optical (second optical fiber) is inserted between the elements of the mechanical splice to be butt-jointed, by abutting the anchoring fixation member, which is fixed to the initially inserted first optical fiber, to the first space, the tip of the first optical fiber can be disposed in advance at the position at which the first optical fiber butts the second optical fiber which is inserted subsequently.

Accordingly, by only inserting the second optical fiber between the elements of the mechanical splice, since the second optical fiber can butt the tip of the first optical fiber at a desired position between the elements, the but-joint operation can be simplified.

Therefore, even when an operation is performed at a dark place or in a narrow operation space, the but-joint operation of the optical fibers can be easily and reliably performed.

Moreover, according to the present invention, after the first optical fiber is gripped and fixed between the elements of the mechanical splice, the first spacer moves to be retracted from the position at which the first space abuts the anchoring fixation member, the anchoring fixation member advances toward the mechanical splice, and a bend of the optical fiber can be formed between the anchoring fixation member and the mechanical splice.

In the present invention, according to the bend formation, it is possible to prevent an excessive tensile force from applying to the optical fiber (the portion which is gripped and fixed between the elements) which is gripped and fixed to the mechanical splice, and the butt-joint state of the optical fibers can be stably maintained.

In addition, according to the present invention, even when the first spacer is retracted from the position at which the first space abuts the anchoring fixation member, and the anchoring fixation member advances toward the mechanical splice to form the bend in the first optical fiber, since an insertion length with respect to the mechanical splice is very accurately maintained in the first optical fiber, the optical fibers can be butt-jointed at a desired position between elements of the mechanical splice.

BRIEF DESCRIPTION OF DRAWINGS

FIG. 6A is a rear view showing the unit base of the optical fiber splicing unit of FIG. 1.

FIG. 6B is a plan view showing the unit base of the optical fiber splicing unit of FIG. 1.

FIG. 6C is a front view showing the unit base of the optical fiber splicing unit of FIG. 1.

FIG. 7 is a bottom view showing the unit base of the optical fiber splicing unit of FIG. 1.

DETAILED DESCRIPTION OF THE PREFERRED EMBODIMENTS

First Embodiment

Optical Fiber Splicing Unit

Hereinafter, a first embodiment of the present invention will be described with reference to the drawings.

Moreover, with respect to an optical fiber splicing unit 10, in FIGS. 1, 2, 4, and 5, an upper side is defined as the upper portion, and a lower side is defined as the lower portion.

Figure 1:
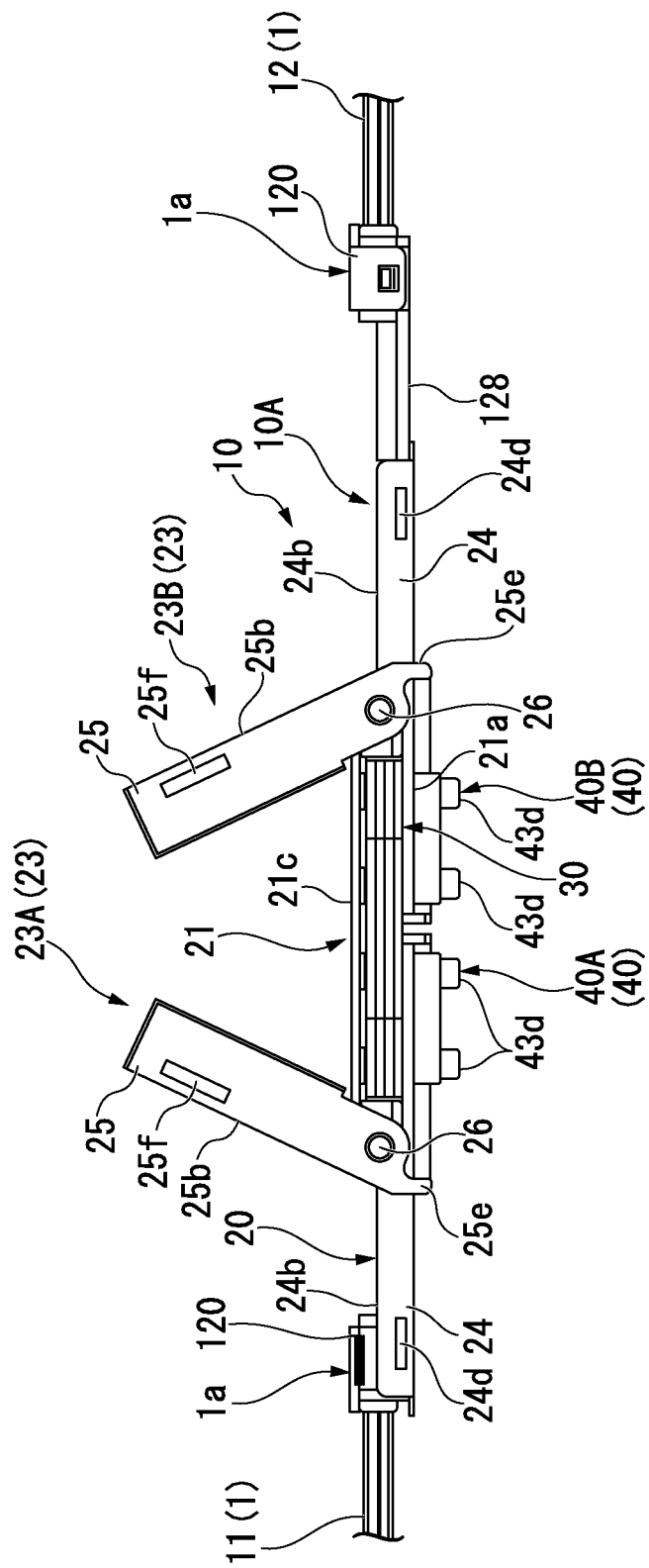
FIG. 1 is a front view of an overall optical fiber splicing unit according to a first embodiment of the present invention.
Figure 2:
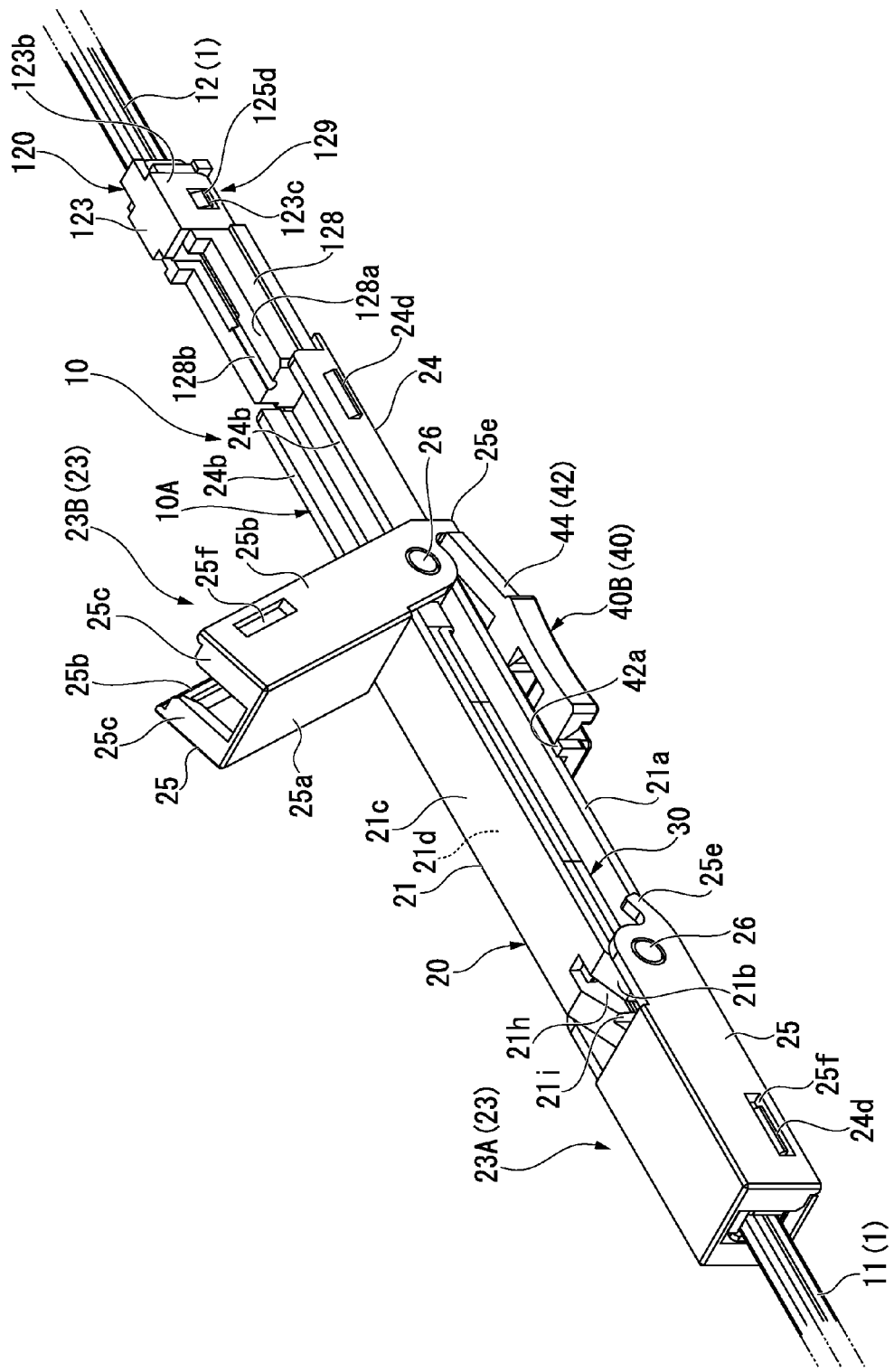
FIG. 2 is a perspective view showing a state where an operation to anchor an optical fiber cable in one of both cable anchors of the optical fiber splicing unit of FIG. 1 is completed.
Figure 3:
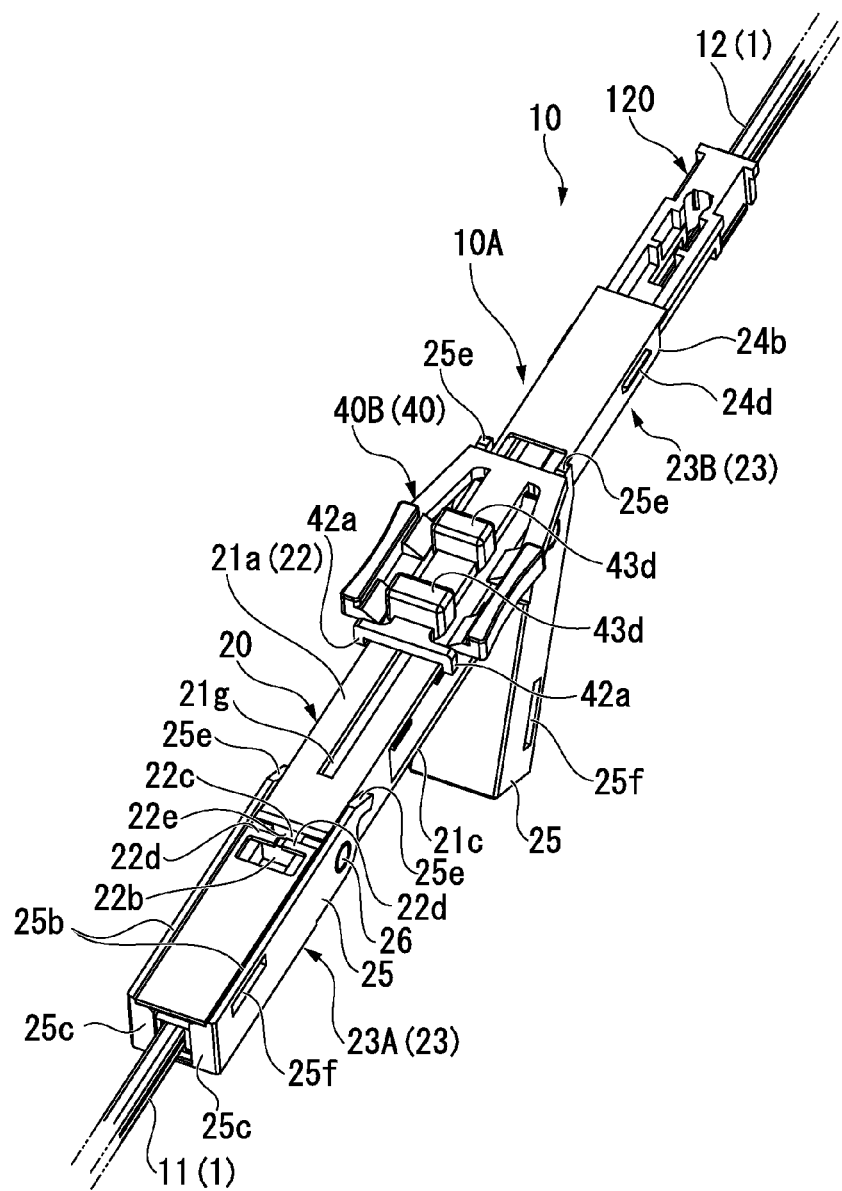
FIG. 3 is a perspective view when the optical fiber splicing unit of FIG. 2 is viewed from the lower surface side.

As shown in FIGS. 1 to 3, the optical fiber splicing unit 10 described here is schematically configured to include a mechanical splice 30 (hereinafter, also referred to as a splice), an elongated unit base 20 having a splice holder portion 21 which holds the splice 30, lever members 25 which are attached to both ends in a longitudinal direction of the unit base 20, and a splice tool 40 which is assembled to the splice 30.

As shown in FIGS. 1 to 3, the optical fiber splicing unit 10 of the shown example can be applied to a splice (optical splice) between optical fiber cables.

A reference numeral 11 is assigned to one (first optical fiber cable) of the optical fiber cables 1 spliced to each other by the optical fiber splicing unit 10, and a reference numeral 12 is assigned to the other one (second optical fiber cable).

Figure 20:
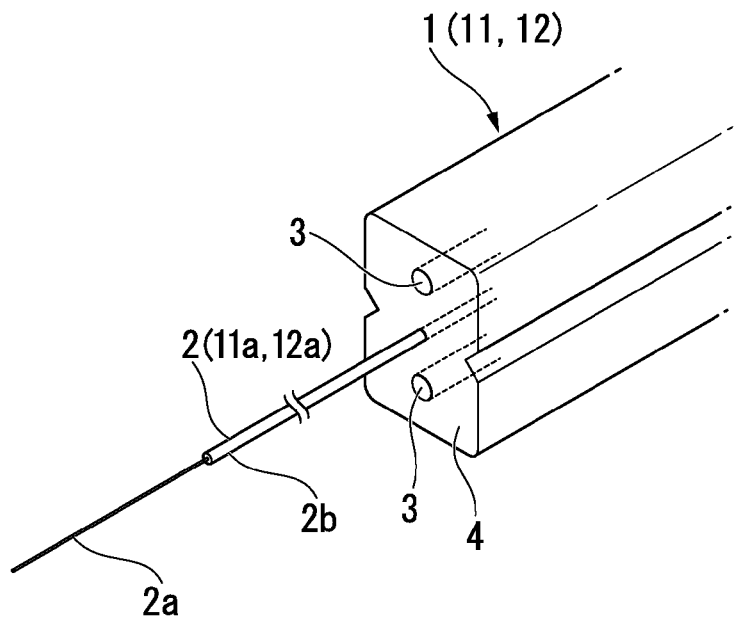
FIG. 20 is a perspective view showing an example of the optical fiber cable used in an optical fiber splicing method according to the present invention.

As shown in FIG. 20, the optical fiber cable 1 (optical fiber cables 11 and 12) is configured by collectively coating a sheath 4 made of a synthetic resin so that an optical fiber 2 and linear tensile strength bodies 3 having flexibility are in parallel with one another.

As the tensile strength bodies 3, for example, a body formed of tensile strength fibers such as aramid fibers, a steel wire, or the like may be used.

The optical fiber 2 is a coated optical fiber which is configured by covering an outer circumference surface (side surface) of a bare optical fiber 2a with a coating 2b, and for example, as the optical fiber, an optical fiber core wire, an optical fiber element wire, or the like may be used.

For example, the bare optical fiber 2a is a quartz optical fiber.

Moreover, for example, the coating 2b is a resin coating in which a single layer or a plurality of layers formed of an ultraviolet curing resin, a polyamide resin, or the like are substantially concentrically coated.

As the optical fiber cable 1, an indoor cable, a drop cable, or the like may be used.

In addition, in the drawings, a reference numeral 11a is assigned to the optical fiber 2 of the first optical fiber cable 11, and a reference numeral 12a is assigned to optical fiber 2 of the second optical fiber cable 12.

The optical fiber splicing unit 10 is used for splicing the optical fiber cables 11 and 12 to each other by but-jointing optical fibers 11a and 12a which are exposed (protruded) from terminals of the optical fiber cables 11 and 12.

The optical fiber splicing unit 10 includes cable anchors 23, which accommodate and anchor anchoring fixation members 120 fixed to the terminals of the optical fiber cable 1, on both end portions in the longitudinal direction (coincides with the longitudinal direction of the unit base 20) of the optical fiber splicing unit.

Figure 4:
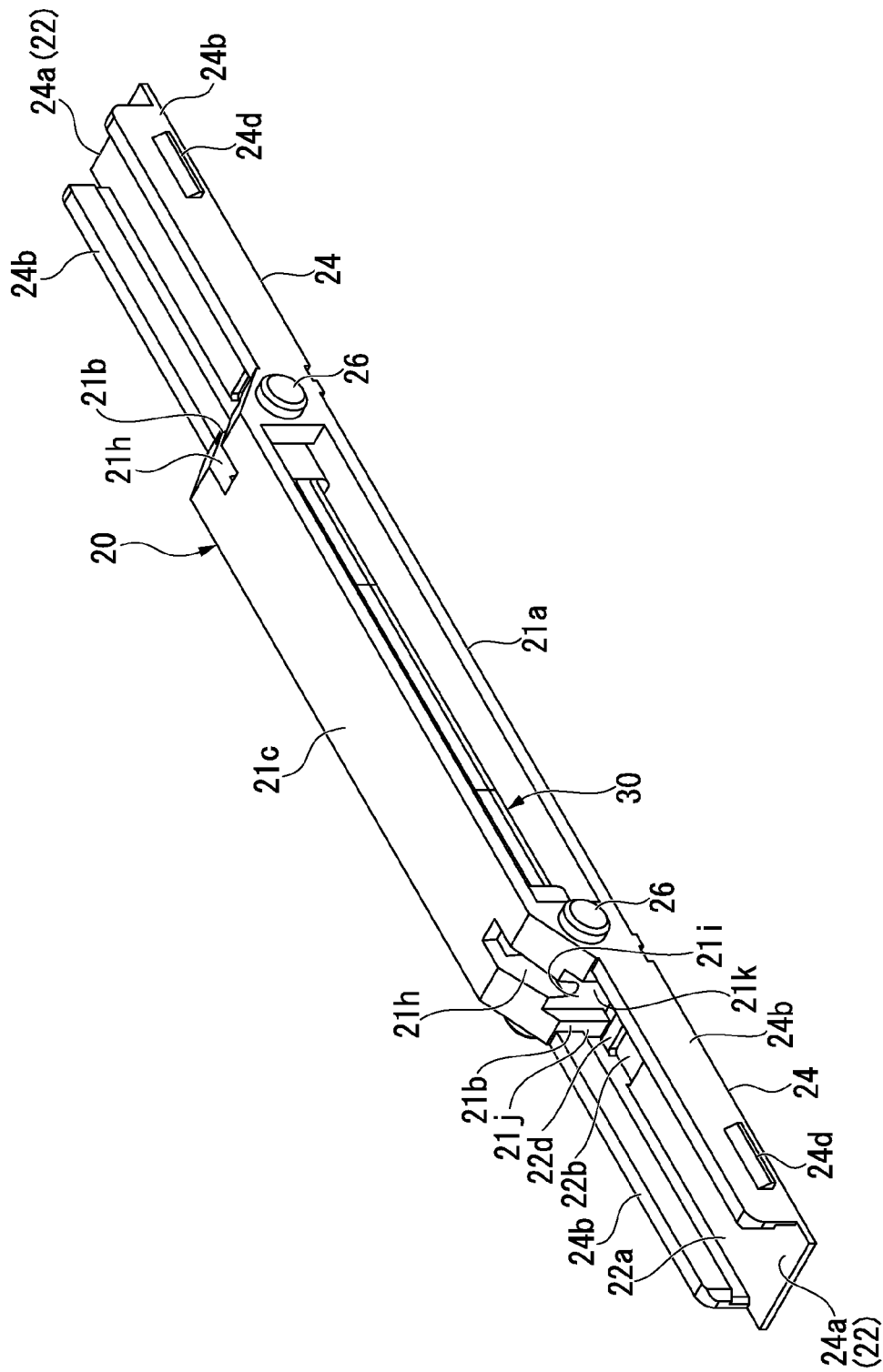
FIG. 4 is a perspective view showing a unit base of the optical fiber splicing unit of FIG. 1.
Figure 5:
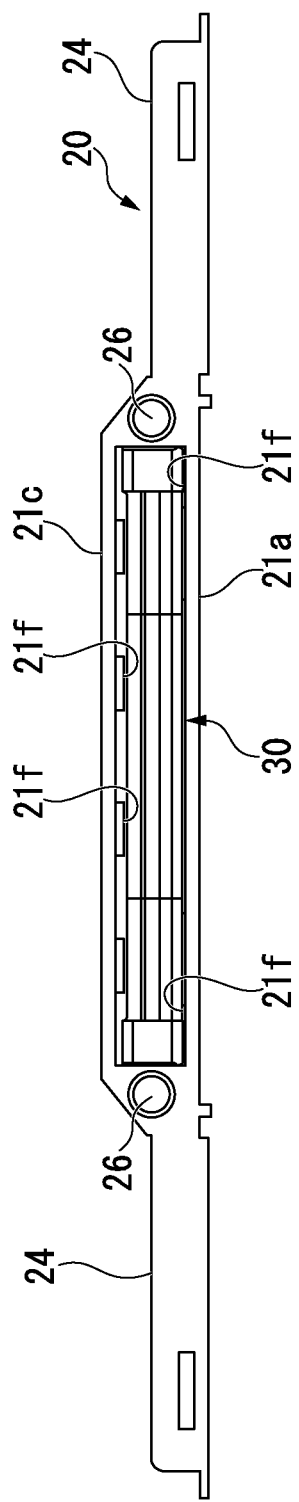
FIG. 5 is a front view showing a structure of the unit base of the optical fiber splicing unit of FIG. 1 and an accommodation state of a mechanical splice in a splice holder portion.

In addition, as shown in FIGS. 4 and 5, in the optical fiber splicing unit 10, the splice 30 is accommodated in the splice holder portion 21 which is provided at a center portion in the longitudinal direction of the unit base 20.

The but-joint of the optical fibers 11a and 12a of the optical fiber cables 11 and 12 is realized by the splice 30 positioned in the splice holder portion 21.

Hereinafter, the terminal of the optical fiber cable 1, to which the anchoring fixation member 120 is fixed, is also referred to as a fixing member attached cable terminal 1a.

The unit base 20 includes fixing member guide portions 24, into which the fixing member attached cable terminals 1a are inserted, at both ends in the longitudinal direction.

The cable anchors 23 include the fixing member guide portions 24, and lever portions 25 which are rotatably attached to the unit base 20 about axes in a width direction of the lever portions.

As shown in FIG. 4, each of the fixing member guide portions 24 of the unit base 20 of the shown example is a wall portion having a U-shaped cross-section which can accommodate the fixing member attached cable terminal 1a inside the wall portion.

In each of the fixing member guide portions 24, the fixing member attached cable terminal 1a is inserted from a side opposite to the splice holder portion 21 of the center portion in the longitudinal direction of the unit base 20.

Moreover, each of the fixing member guide portions 24 has a function which advances and retracts the fixing member attached cable terminals 1a inserted into the fixing member guide portion with respect to the splice 30, that is, has a function which guides the movement in the longitudinal direction of the anchoring fixation member 120 with respect to the unit base 20.

Each of the lever portions 25 engage with the fixing member attached cable terminal 1a inserted into the fixing member guide portion 24, and thus, restricts the retraction (movement in a direction separated from the splice 30) of the fixing member attached cable terminal 1a with respect to the splice 30 accommodated in the splice holder portion 21.

The lever portions 25 restrict the retraction of the fixing member attached cable terminals 1a, and thus, function as anchoring means used to anchor the optical fiber cable 1 to the unit base 20.

The splice 30 has a structure which collectively holds half-split elements (a base member 31 and a pressing cover 32 described below) inside an elongated clamp spring 33 which extends to have a U-shaped cross-section or a C-shaped cross-section (U-shaped cross-section in the shown example).

The entire splice 30 is formed in an elongated shape (an elongated bar shape in an appearance).

The splice 30 can put the optical fiber between the half-split elements 31 and 32 by elasticity of the clamp spring 33.

Moreover, the optical fiber splicing unit 10 includes the splice tool 40 on which the insertion piece 41 inserted between the half-split elements 31 and 32 of the splice 30 protrudes.

Hereinafter, the splice 30, in which the insertion piece is inserted between the half-split elements 31 and 32, is also referred to as an insertion piece attached splice (an insertion piece attached mechanical splice).

Since an insertion piece attached splice 30A of the shown example has the configuration in which the insertion piece 41 of the splice tool 40 is inserted between the half-split elements 31 and 32 of the splice 30, hereinafter, the insertion piece attached splice may be referred to as a tool attached splice (a tool attached mechanical splice).

Figure 16:
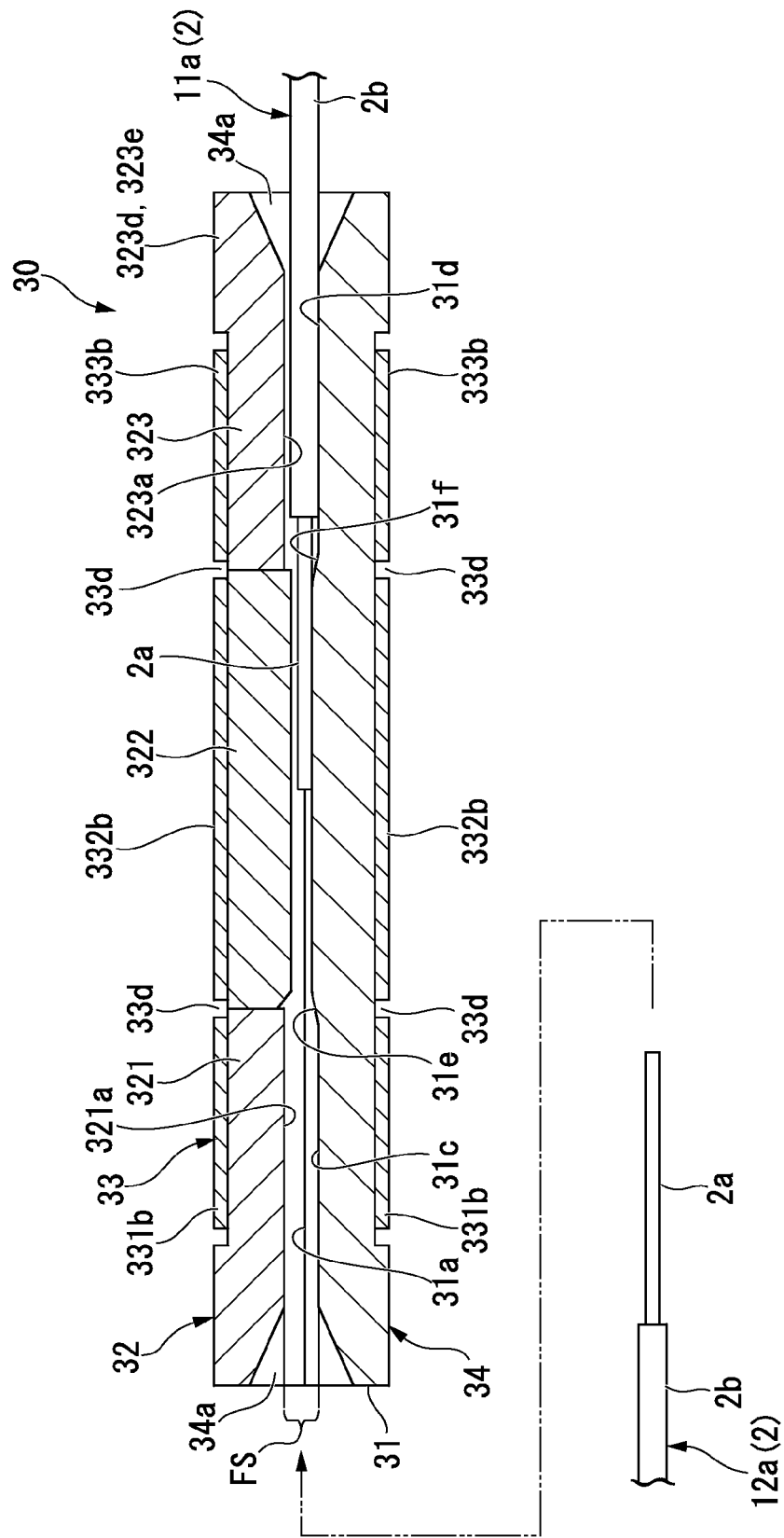
FIG. 16 is a cross-sectional view showing the structure of the mechanical splice of FIG. 14.
Figure 17:
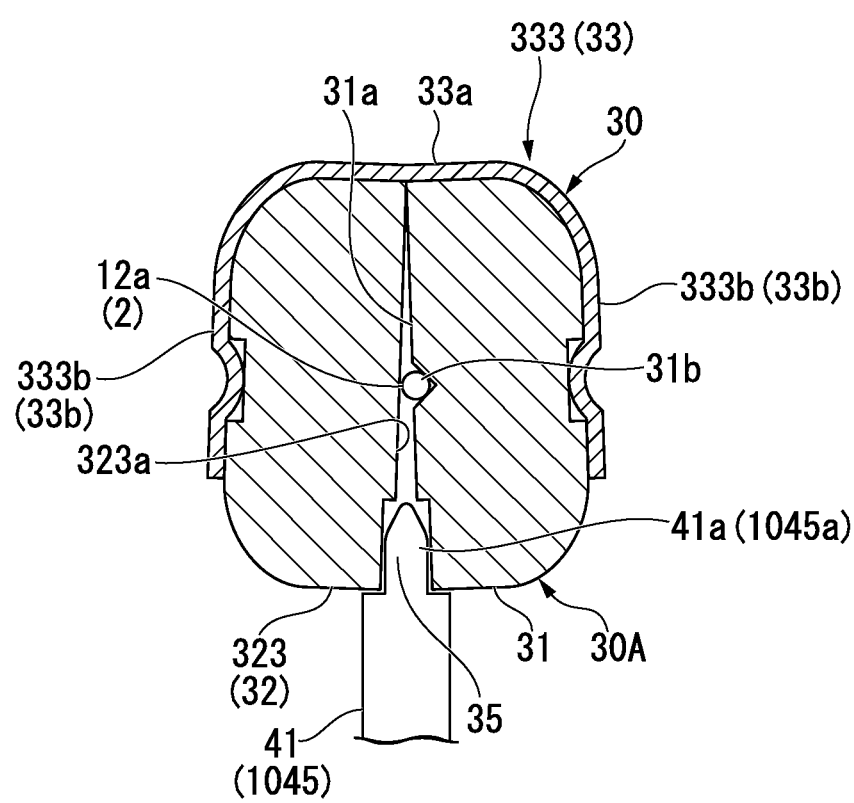
FIG. 17 is a cross-sectional view showing a relationship between half-split elements of the mechanical splice of FIG. 14 and the insertion piece (the insertion piece of the splice tool in the shown example).

As shown in FIG. 17, in the insertion piece attached splice 30A, the insertion piece 41 is pushed to open the portion between the half-split elements 31 and 32 against the elasticity of the clamp spring 33 to such an extent that the optical fibers 11a and 12a can be inserted between the elements 31 and 32 (refer to FIG. 16).

The optical fibers 11a and 12a, which protrude from the terminals of the optical fiber cables 11 and 12 inserted into the fixing member guide portions 24 of the unit base 20, can be inserted between the half-split elements 31 and 32 of the splice 30 from both sides in the longitudinal direction of the unit base 20.

The optical fibers 11a and 12a, which are inserted between the elements 31 and 32 from both sides, can be but-jointed between the elements 31 and 32.

In the splice 30, after the optical fibers 11a and 12a are butted, by pulling out the insertion piece 41 from the portion between the elements 31 and 32, the optical fibers 11a and 12a are gripped and fixed between the elements 31 and 32 by the elasticity of the clamp spring 33.

As a result, the splice 30 holds the but-joint states of the optical fibers 11a and 12a.

Figure 14:
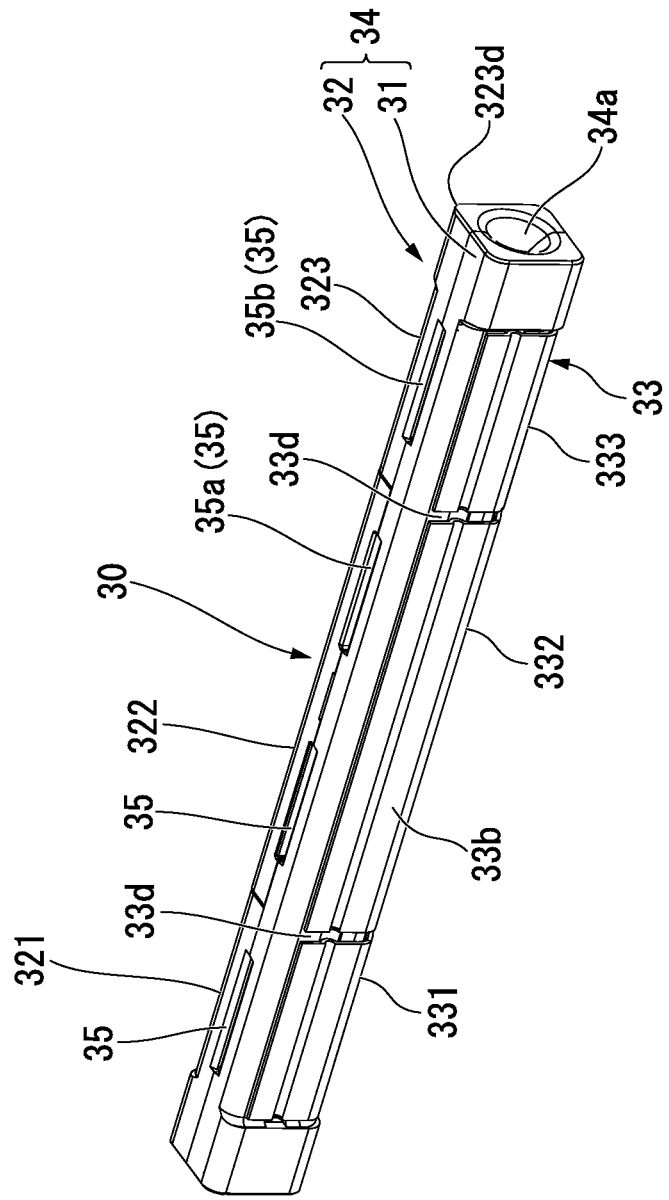
FIG. 14 is a perspective view showing an example of the mechanical splice used in the optical fiber splicing unit of FIG. 1.
Figure 15:
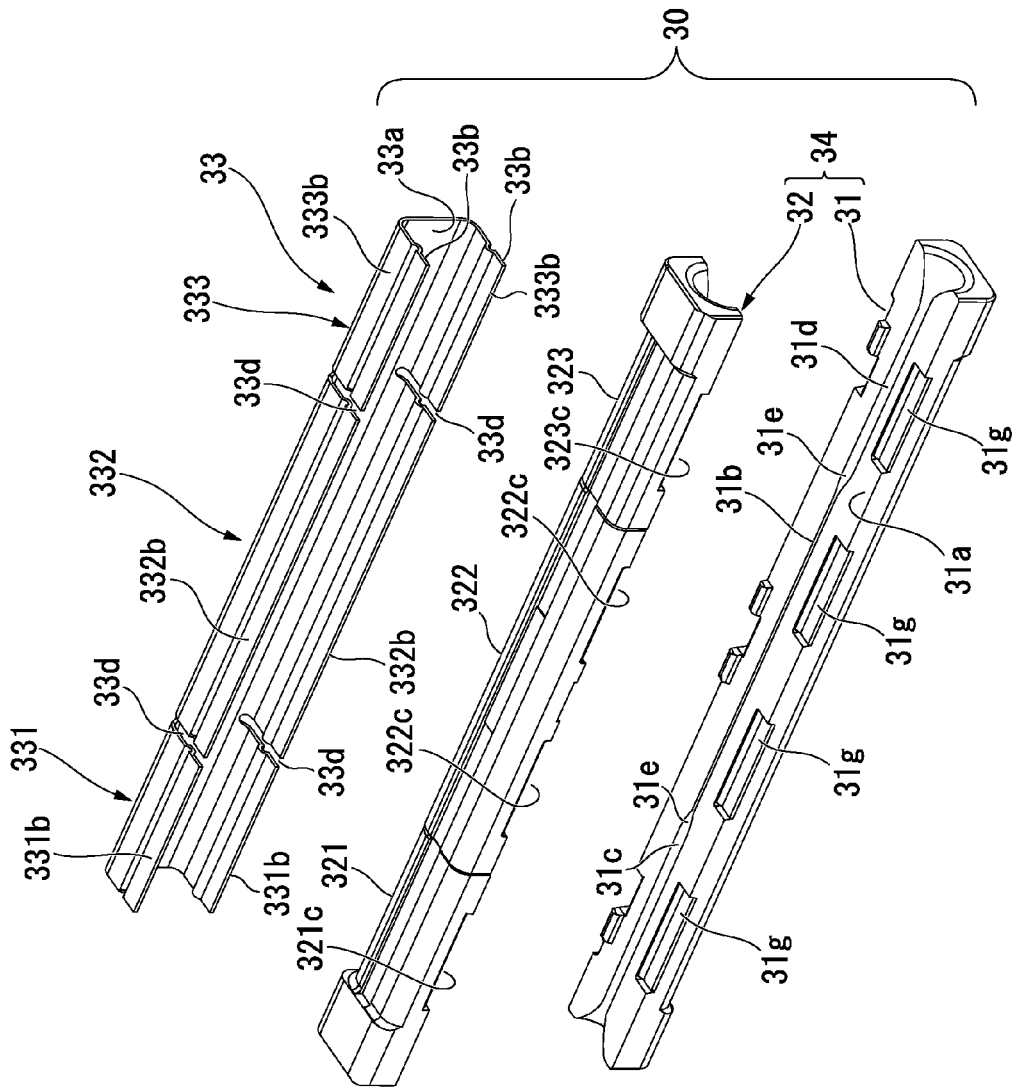
FIG. 15 is an exploded perspective view showing the structure of the mechanical splice of FIG. 14.

As shown in FIGS. 14 to 16, in the splice 30, the elongated plate-shaped base member 31 and the pressing cover 32 including three cover members 321, 322, and 323 installed to be arranged along the longitudinal direction of the base member 31 are configured to be collectively held inside the elongated clamp spring 33 which extends to have a U-shaped cross-section and a C shaped cross-section (U-shaped cross-section in the shown example).

The entire splice 30 is formed in an elongated shape which has the direction along the longitudinal direction of the base member 31 as the longitudinal direction.

The splice 30 includes a half-split grip member 34 configured of the base member 31 (base side element) and the cover members 321, 322, and 323 (cover side element).

The base member 31 and the cover members 321, 322, and 323 are elastically biased to a direction, which is closed to each other, by the elasticity of the clamp spring 33.

Hereinafter, the cover member, which is positioned at the center and indicated by the reference numeral 322 among three cover members 321, 322, and 323 installed to be arranged along the longitudinal direction of the base member 31, is also referred to as a center cover, and the cover members 321 and 323, which are provided on both sides of the center cover 322, are also referred to as side covers.

In addition, in the side covers, hereinafter, the cover member indicated by the reference numeral 321 is also referred to as a first side cover, and the cover member indicated by the reference numeral 323 is also referred to as a second side cover.

The clamp spring 33 having a U-shaped cross-section exemplified by FIGS. 14 to 16 is formed in a sheet of metal plate.

In the clamp spring 33, side plate portions 33b extends to be perpendicular to an elongated plate-shaped back plate portion 33a over the entire length in the longitudinal direction of the back plate portion 33a from both sides of the back plate portion 33a.

One of the pair of side plate portions 33b abuts the rear surface opposite to a facing surface 31a of the base member 31 facing the cover members 321, 322, and 323, and the other side plate portion 33b abuts the rear surface opposite to the facing surfaces 321a, 322a, and 323a of the cover members 321, 322, and 323 facing the base member 31.

The clamp spring 33 elastically biases the base member 30 and the cover members 321, 322, and 323 in the direction in which the facing surfaces 31a, 321a, 322a, and 323a facing each other are closed.

As shown in FIGS. 15 and 16, the facing surface 31a of the base member 31 of the splice 30 is formed to extend over the entire length in the longitudinal direction of the base member 31.

In the center portion in the longitudinal direction (extension direction) of the facing surface 31a of the base member 31, an aligning groove 31b for very accurately positioning and aligning to but-joint (optically splice) the bare optical fibers 2a which are led-out from the tips of the optical fibers 11a and 12a of the optical fiber cables 11 and 12 is formed.

The aligning groove 31b is a V-groove which is formed to extend along the longitudinal direction of the base member 31.

However, the aligning groove 31b is not limited to the V-groove, and for example, may also adopt a groove having a semicircular cross-section, a U-groove, or the like.

The aligning groove 31b is formed on a portion of the facing surface 31a of the base member 31 facing the center cover 323.

In portions of the facing surface 31a of the base member 31 facing the first and second side covers 321 and 323, coating portion insertion grooves 31c and 31d having large groove widths than the aligning groove 31b are formed.

The coating portion insertion grooves 31c and 31d are formed to extend on the extension of the aligning groove 31b in the longitudinal direction of the base member 31.

Taper grooves 31e and 31f having tapered shapes, in which the groove widths are gradually decreased from the coating portion insertion grooves 31c and 31d to the aligning groove 31b side, are formed between the coating portion insertion grooves 31c and 31d and the aligning groove 31b.

The coating portion insertion grooves 31c and 31d communicate with the aligning groove 31b via the taper grooves 31e and 31f, respectively.

The coating portion insertion grooves 31c and 31d position the coating attached portions (coating portions), in which the coatings 2b of the optical fibers 11a and 12a of the optical fiber cables 11 and 12 are not removed, to be coaxial with the bare optical fiber 2a when the bare optical fiber is positioned by the aligning groove 31b.

In the splice 30 of the shown example, the coating portion insertion grooves 31c and 31d are V-grooves having larger groove widths than the aligning groove 31b.

However, each of the coating portion insertion grooves 31c and 31d is not limited to the V-groove, and for example, may also adopt a groove having a semicircular cross-section, a U-groove, or the like.

Portions of the facing surfaces 321a and 323a of the first and second side covers 321 and 323 facing the coating portion insertion grooves 31c and 31d of the base member 31 are formed in flat fiber pressing surfaces which press the coating portions of the optical fiber 11a and 12a to the coating portion insertion grooves 31c and 31d.

Moreover, in consideration of an outer diameter of the coating portion of the optical fiber 2, in the coating portion insertion grooves 31c and 31d, shapes and dimensions of the cross-sections perpendicular to the extension direction of the grooves 31c and 31d are adjusted so that only a portion of the cross-section perpendicular to the axis of the coating portion of the optical fiber 2 is stored in the grooves 31c and 31d, and portions of the coating portion, which are not stored in the coating portion insertion grooves 31c and 31d, protrude from the facing surface 31a of the base member 31 to the side covers 321 and 323 sides.

Accordingly, when the insertion piece 41 is pulled out from the splice 30 of the insertion piece attached splice 30A, the coating portions of the optical fibers 11a and 12a can be tightly gripped and fixed between the side covers 321 and 323 and the base member 31 by the elasticity of the claim spring 33.

The portion of the facing surface 322a of the center cover 322 facing the aligning groove 31b of the base member 31 is formed in a flat fiber pressing surface which press the bare optical fibers 2a of the optical fiber 11a and 12a to the aligning groove 31b.

Moreover, in consideration of the outer diameter of the bare optical fiber 2a of the optical fiber 2, in the aligning groove 31b, the shape and dimension of the cross-section perpendicular to the extension direction of the aligning groove 31b are adjusted so that only a portion of the cross-section perpendicular to the axis of the bare optical fiber 2a is stored in the aligning groove 31b, and portions of the bare optical fiber 2a, which are not stored in the aligning groove 31b, protrude from the facing surface 31a of the base member 31 to the center cover 322 side.

Accordingly, when the insertion piece 41 is pulled out from the splice 30 of the insertion piece attached splice 30A, the bare optical fiber 2a can be tightly gripped and fixed between the center cover 322 and the base member 31 by the elasticity of the claim spring 33.

Moreover, the splice may adopt a configuration in which the coating portion insertion groove is formed on one or both of the facing surfaces facing each other of the base member 31 and the first side cover 321, or the coating portion insertion groove is formed on one or both of the facing surfaces facing each other of the base member 31 and the second side cover 323.

When the coating portion insertion grooves are formed on both of the facing surfaces facing each other of the base member 31 and the first side cover 321, the shape and the dimension of the cross-section in the extension direction of each coating portion insertion groove are adjusted so that the portion of the coating portion of the optical fiber 2, which are not stored in the coating portion insertion grooves, exists between the base member 31 and the first side cover 321.

This is similarly applied to the case where the coating portion insertion grooves are formed on both the facing surfaces of the base member 31 and the facing surfaces of the second side cover 323, the facing surfaces of the base member 31 and the facing surfaces of the second side cover 323 opposing to each other.

The diameters of the optical fibers 11a and 12a, which are spliced to each other using the optical fiber splicing unit 10, are the same as the diameters (outer diameters) of the bare optical fibers 2a.

Moreover, here, the optical fiber cables 11 and 12 having configurations similar to each other are used.

However, the optical fiber cables 11 and 12, which have configurations different from the bare optical fibers 2a except for the diameters of the bare optical fibers 2a, may be used.

Moreover, the diameters of the coating portions of the optical fibers 11a and 12a may be different from each other.

In this case, the coating portion insertion grooves of both sides in the longitudinal direction of the splice correspond to the coating portions of the optical fibers 11a and 12a, and may have configurations different from each other.

As shown in FIGS. 15 and 16, each of the pair of side plate portions 33b of the clamp spring 33 is divided into three portions corresponding to three cover members 321, 322, and 323 of the pressing cover 32 of the splice 30.

The side plate portion 33b (the upper side plate portion 33b in FIGS. 15 and 16) abutting the pressing cover 32 is divided into three portions corresponding to three cover members 321, 322, and 323 by slit-like notch portions 33d which are each formed at positions corresponding to a boundary between the first side cover 321 and the center cover 322 and a boundary between the center cover 322 and the second side cover 323.

The side plate portion 33b abutting the base member 31 is divided into three portions corresponding to three cover members 321, 322, and 323 by notch portions 33d which are formed at positions corresponding to the notch portions 33d of the side plate portion 33b abutting the cover members 321, 322, and 323.

The clamp spring 33 includes a first clamp spring portion 331 which holds the first side cover 321 and the base member 31, a second clamp spring portion 332 which holds the center cover 322 and the base member 31, and a third clamp spring portion 333 which holds the second side cover 323 and the base member 31.

The first to third clamp spring portions 331 to 333 function as clamp springs independent of one another.

In addition, in FIGS. 15 and 16 or the like, a reference numeral 331b is assigned to the pair of side plate portions of the first clamp spring portion 331, a reference numeral 332b is assigned to the pair of side plate portions of the second clamp spring portion 332, and a reference numeral 333b is assigned to the pair of side plate portions of the third clamp spring portion 333.

The splice 30 includes three clamping portions corresponding to three clamp spring portions.

That is, the splice 30 includes a first clamping portion which holds the first side cover 321 and the base member 31 inside the first clamp spring portion 331, a second clamping portion which holds the center cover 322 and the base member 31 inside the second clamp spring portion 332, and a third clamping portion which holds the second side cover 323 and the base member 31 inside the third clamp spring portion 333.

Each of three clamping portions can grip and fix the optical fibers between half-split elements (base member 31 (base side element) and cover member (cover side element)) by elasticity of the clamp spring portion corresponding to each clamping portion.

With respect to the splice 30, an interval direction between both side plate portions 33b of the clamp spring 33, that is, a up-down direction in FIGS. 14, 15, 16 is also referred to as a width direction.

Both side plate portions 33b of the clamp spring 33 are disposed at both sides in the width direction via the half-split grip member 34.

As shown in FIGS. 1 to 6C, the unit base 20 of the optical fiber splicing unit 10 of the shown example is an integrally molded plastic part.

The unit base 20 of the shown example includes an elongated plate-shaped base plate portion 22.

As shown in FIGS. 4 and 5, the splice holder portion 21 includes a frame-shaped portion configured of an elongated plate-shaped holder lower plate portion 21a which is the center portion in the longitudinal direction of the base plate portion 22, a pair of holder end plate portions 21b which are erected from both ends in the longitudinal direction of the holder lower plate portion 21a, and a holder upper plate portion 21c which is formed to extend in parallel with the holder lower plate portion 21a on the holder lower plate portion 21a.

The frame-shaped portion is formed in an elongated shape along the longitudinal direction of the unit base 20.

The holder upper plate portion 21c is bridged between upper ends of the pair of holder end plate portion 21b.

With respect to the optical fiber splicing unit 10, a direction orthogonal to the longitudinal direction on the upper surface 22a of the base plate portion 22 of the unit base 20 is defined as the width direction.

As shown in FIGS. 6A to 6C, the splice holder portion 21 of the unit base 20 of the shown example includes a side plate portion 21d (hereinafter, referred to as a holder side plate portion) at one side in the width direction.

The holder side plate portion 21d is provided inside one end in the width direction of the frame-shaped portion of the splice holder portion 21.

A window hole 21e is formed at a center portion of the holder side plate portion 21d.

The holder side plate portion 21d is provided at only one side in the width direction of the splice holder portion 21, the holder side plate portion 21d does not exist at the other side in the width direction of the splice holder 21, and the other side is formed in an opening portion having a size corresponding to an inner circumference of the frame-shaped portion.

The splice 30 can be inserted into and detached from the splice holder portion 21 through the other side in the width direction of the splice holder portion 21.

As shown in FIGS. 5 and 6C, the splice 30 inserted inside the splice holder portion 21 abuts protrusions 21f which protrude at a plurality locations of inner surfaces inside the frame-shaped portion of the holder lower plate portion 21a and the holder upper plate portion 21c, and thus, the splice 30 is positioned inside the splice holder portion 21, and is stably accommodated without rattling.

The splice 30 is accommodated inside the frame-shaped portion so that the longitudinal direction of the splice 30 is arranged (coincides with the longitudinal direction of the unit base 20) in the longitudinal direction of the base plate portion 22.

Moreover, the width direction of the splice 30 coincides with the width direction of the unit base 20, and the splice 30 is accommodated in the splice holder portion 21 via the half-split grip member 34 so that the side (open side) opposite to the back plate portion 33a of the clamp spring 33 is positioned toward the lower side, that is, is accommodated in the direction facing the holder lower plate portion 21a.

As shown in FIG. 7, an insertion piece through hole 21g through which the insertion piece 41 of the splice tool 40 passes is formed on the holder lower plate portion 21a of the splice holder portion 21 of the unit base 20.

The insertion piece 41 of the splice tool 40 passes through the insertion piece through hole 21g of the holder lower plate portion 21a.

Figure 8:
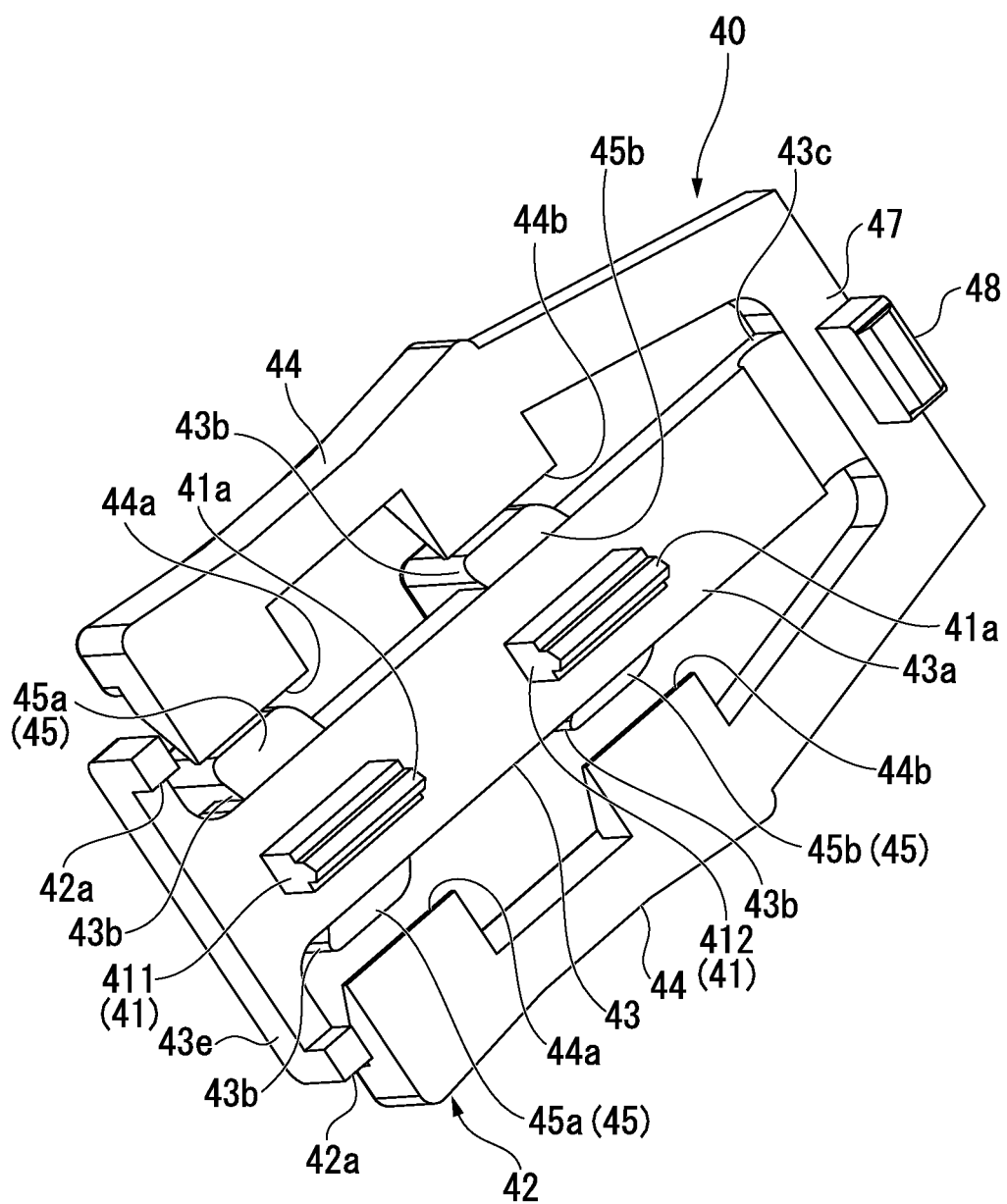
FIG. 8 is a view showing a splice tool of the optical fiber splicing unit of FIG. 1, and a perspective view showing a structure when a pull-out operating and driving portion having a flat structure is viewed from a protrusion side of an insertion piece.
Figure 9:
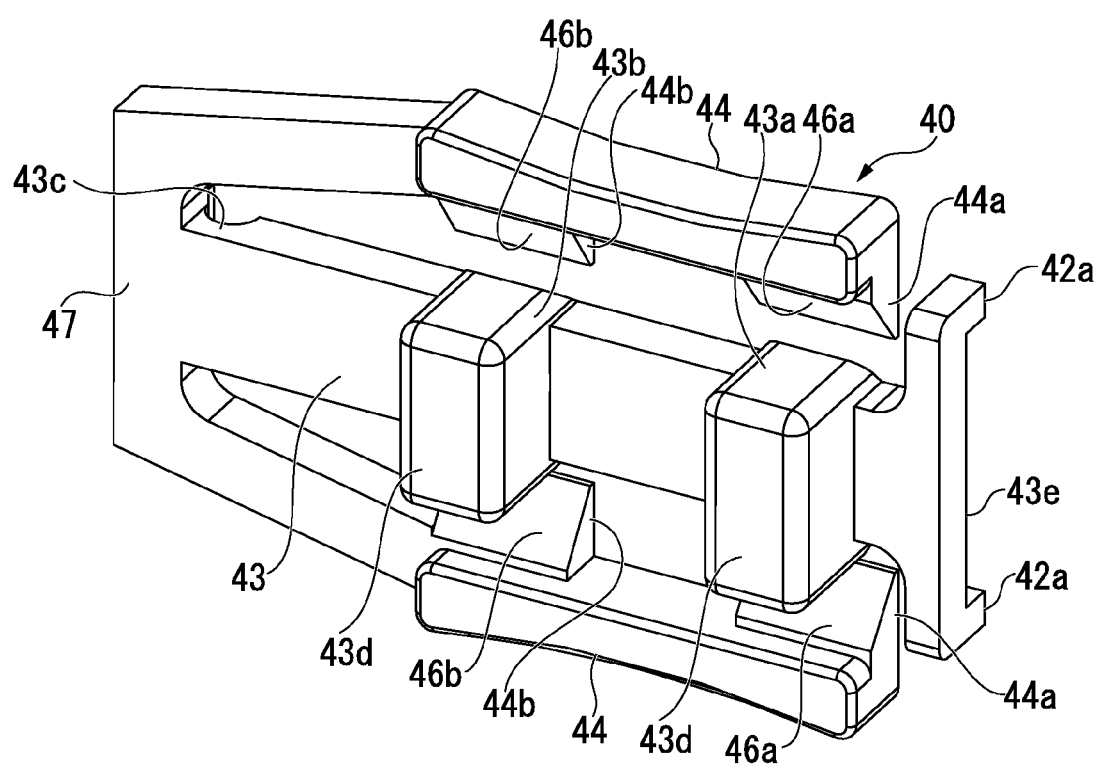
FIG. 9 is a view showing the splice tool of the optical fiber splicing unit of FIG. 1, and a perspective view showing a structure when the pull-out operating and driving portion having a flat structure is viewed from the rear surface side.

As shown in FIGS. 8 and 9, the splice tool 40 of the optical fiber splicing unit 10 of the present embodiment includes an elongated plate-shaped insertion piece support plate portion 43, and the insertion piece 41 protrudes from one surface side of the insertion piece support plate portion 43.

In addition, the splice tool 40 includes a pair of elastic operation pieces 44 which extend from a tool base 47 which is integrated at one end in the longitudinal direction of the insertion piece support plate portion 43.

The pair of elastic operation pieces 44 extend along the longitudinal direction from the tool base 47 at both sides in the width direction of the insertion piece support plate portion 43.

The splice tool 40 is configured so that the insertion piece support plate portion 43 and the pair of elastic operation pieces 44 extend from the tool base 47.

The splice tool 40 of the shown example is an integrally molded plastic part.

However, the splice tool is not limited to the integrally molded plastic part, and may be configured by assembling a plurality of members.

The splice tool 40 is disposed so that a pull-out operation and driving portion 42 having a flat structure, which includes the insertion piece support plate portion 43 and the elastic operation pieces 44 of both sides in the width direction, overlaps with the outer surface side (the side opposite to the splice 30) of the holder lower plate portion 21a of the splice holder portion 21 of the unit base 20.

Moreover, the tip of the insertion piece 41 passing through the insertion piece through hole 21g of the holder lower plate portion 21a is put between the elements 31 and 32 by the elasticity of the clamp spring 33 of the splice 30, and thus, the splice tool 40 is attached to the splice 30.

Hereinafter, with respect to the pull-out operating and driving portion 42, the side to which the insertion piece 41 protrudes is referred to as an insertion piece protrusion side, and the side opposite to the insertion piece protrusion side is also referred to as a rear surface side.

Figure 10:
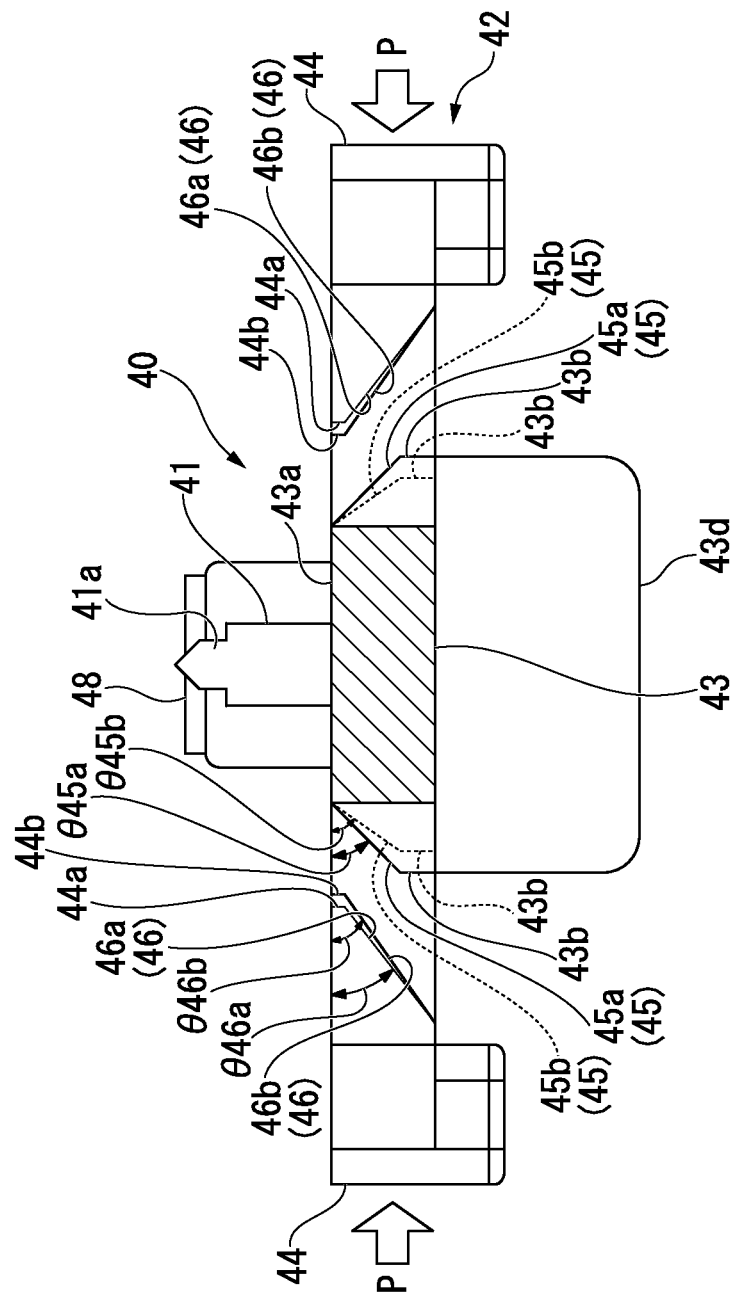
FIG. 10 is a cross-sectional view showing the structure of the splice tool of the optical fiber splicing unit of FIG. 1.
Figure 11:
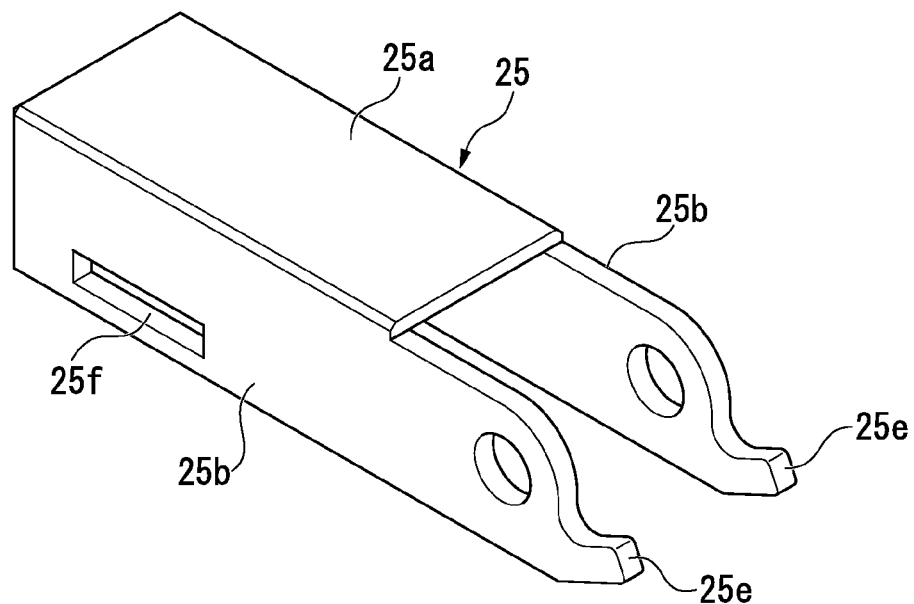
FIG. 11 is a perspective view showing a lever member of the optical fiber splicing unit of FIG. 1.

As shown in FIGS. 8 and 10, the insertion piece protrusion sides (however, a spacer protrusion 48 described below is not included) of the pair of elastic operation pieces 44 and the tool base 47 forms a flat surface which is positioned on a virtual extension of an insertion piece protrusion surface 43a which is a surface of the insertion piece protrusion side of the insertion piece support plate portion 43.

The insertion piece protrusion surface 43a of the insertion piece support plate portion 43 is a surface of a portion except for the insertion piece 41 and position deviation prevention protrusions 42a described below.

The splice tool 40 is provided by abutting the insertion piece protrusion surface 43a of the insertion piece support plate portion 43 to the holder lower plate portion 21a of the splice holder portion 21 of the unit base 20.

Moreover, the optical fiber splicing unit 10 may be configured so that a slight gap is secured between the insertion piece protrusion surface 43a of the insertion piece support plate portion 43 of the splice tool 40 and the holder lower plate portion 21a of the splice holder portion 21.

However, in this case, as described below, in an operation in which the splice tool 40 is removed from a unit main body 10A including the splice 30, the unit base 20, and the lever members 25, the gap is set to a size at which the insertion piece support plate portion 43 can abut the holder lower plate portion 21a by an operation which causes the pair of elastic operation pieces 44 to approach each other and the insertion piece 41 can be pulled out from the splice 30.

As shown in FIGS. 8 and 9, portions except for the base portions of the elastic operation pieces 44 connected to the tool base 47, are disposed to extend along the longitudinal direction of the insertion piece support plate portion 43 via a slight gap from the insertion piece support plate portion 43.

The splice tool 40 is gripped by fingers of one hand, and thus, the pair of elastic operation pieces 44 can approach the insertion piece support plate portion 43 by elastic deformation of the elastic operation pieces 44.

Moreover, in the splice tool 40, by applying a pressing force P (refer to FIG. 10), which causes the pair of elastic operation pieces 44 approach to each other, to the pair of elastic operation pieces 44 from both sides in a tool width direction (hereinafter, simply referred to as a width direction) which is the interval direction, the insertion piece 41 inserted between the elements 31 and 32 of the splice 30 can be simply pulled out from the splice 30.

In the insertion piece support plate portion 43 side of each elastic operation piece 44, protrusions 44a and 44b are formed, which abut inclined surfaces 45 formed on end portions in the width direction of the insertion piece support plate portion 43 by moving the elastic operation pieces 44 to be close to the insertion piece support plate portion 43.

The inclined surfaces 45 (support plate side inclined surfaces) are formed on both sides in the width direction of the insertion piece support plate portion 43.

Moreover, the inclined surfaces 45 of the insertion piece support plate portion 43 of the splice tool 40 in the shown example are formed on extension portions 43b (protrusions) which protrude from both sides in the width direction of the insertion piece support plate portion 43.

However, the splice tool 40 is not limited to the configuration which adopts the insertion piece support plate portion 43 including the extension portions 43b, and the splice tool 40 may also adopt a configuration in which the extension portions 43b are not provided and the support plate side inclined surface 45 are formed on both sides in the width direction of the elongated plated-shaped insertion piece support plate portion.

As shown in FIGS. 8 to 10, the inclined surfaces 45 of the insertion piece support plate portion 43 are formed so that a separation distance from the center in the width direction of the insertion piece support plate portion 43 is gradually increased from the insertion piece protrusion surface 43a of the insertion piece support plate portion 43 toward the rear surface side opposite to the insertion piece protrusion surface 43a.

Meanwhile, in the protrusions 44a and 44b of the elastic operation pieces 44, inclined surfaces 46 (operation piece side inclined surfaces) are formed, in which distances from the elastic operation pieces 44 are gradually decreased from the insertion piece protrusion side to the rear surface side.

The operation piece side inclined surfaces 46 of the protrusions 44a and 44b face the inclined surfaces 45 of the insertion piece support plate portion 43 side via gaps, respectively.

In the splice tool 40, the pair of elastic operation pieces 44 are elastically deformed to approach each other by the pressing force from both sides in the tool width direction, and thus, the operation piece side inclined surfaces 46 can slide with respect to the support plate side inclined surfaces 45.

As a result, in the splice tool 40, the insertion piece support plate portion 43 can be displaced toward the rear surface side of the pull-out operating and driving portion 42 with respect to the elastic operation pieces 44, and accordingly, the insertion piece 41 can be pulled out from the portion between the elements 31 and 32 of the splice 30.

Specifically, the displacement of the insertion piece support plate portion 43 to the rear surface side of the pull-out operating and driving portion 42 means a rotation (tilting with respect to the elastic operation piece 44) of the insertion piece support plate portion 43 with the end portion of the tool base 47 side as the center.

By removing the insertion piece 41 from the portion between the elements 31 and 32 of the splice 30, the splice tool 40 can be removed from the unit main body 10A.

In the splice tool 40, the insertion pieces 41 protrude at two locations in the longitudinal direction of the insertion piece support plate portion 43.

As shown in FIG. 14, the half-split grip member 34 of the splice 30 includes a side surface (open side surface) which is exposed to a side (an open side) opposite to the back plate portion 33a of the clamp spring 33.

Insertion piece through holes 35 for inserting the insertion pieces 41 are opened to the open side surface.

As shown in FIG. 15, the insertion piece through holes 35 are secured between the base member 31 and the cover members 321, 322, and 323 by insertion piece through grooves 31g, 321c, 322c, and 323c which are formed at mutually corresponding positions of the facing surfaces 31a, 321a, 322a, and 323a of the base member 31 and three cover members 321, 322, and 323.

Moreover, the insertion piece through holes 35 are formed by depths which do not reach the aligning groove 31b and the coating portion insertion grooves 31c, 31d, 321b, and 323b from the open side surface of the half-split grip member 34.

Moreover, as the insertion piece through holes 35, a configuration may be adopted in which the insertion piece through holes 35 are secured by the insertion piece through grooves formed on only one side of the base member 31 and the cover members 321, 322, and 323.

As shown in FIG. 14, in the splice 30 of the shown example, the insertion piece through holes 35 are formed at total four locations, which includes two locations corresponding to both sides via the center portion in the direction along the longitudinal direction of the base member 31 in the center cover 322, and two locations corresponding to the center portions in the direction along the longitudinal direction of the base member 31 of the first side cover 321 and the second side cover 323.

In the optical fiber splicing unit 10 of the shown example, the insertion piece attached splice 30A having the configuration in which two splice tools 40 are attached to the splice 30 is adopted.

One of two splice tools 40 is provided to insert the insertion pieces 41 into total two insertion piece through holes 35 including one insertion piece through hole 35 corresponding to the first side cover 321 of the splice 30, and one insertion piece through hole 35 positioned at the first side cover 321 side in the center cover 322.

Hereinafter, this splice tool 40 is also referred to as a first splice tool 40A.

The other of two splice tools 40 is provided to insert the insertion pieces 41 into total two insertion piece through holes 35 including one insertion piece through hole 35 positioned at the second side cover 323 side in the center cover 322 of the splice 30, and one insertion piece through hole 35 corresponding to the second side cover 323.

Hereinafter, this splice tool 40 is also referred to as a second splice tool 40B.

In the insertion piece 41 of the splice tool 40, the thickness protrudes to the insertion piece support plate portion 43 in a direction which coincides with the tool width direction.

As shown in FIG. 17, in the insertion piece 41 of the splice tool 40 of the optical fiber splicing unit 10, a tip portion 41a (hereinafter, also referred to as a tip insertion portion) formed in a plate shape is inserted between the base member 31 and the pressing cover 32 of the splice 30.

Moreover, as the splice, a configuration may be adopted in which the insertion piece through holes 35 are not formed in the half-split grip member 34.

As shown in FIG. 8, in the tip insertion portions 41a of the plate-shaped insertion pieces 41 of the splice tool 40, the tips are formed in tapered shapes.

After the insertion pieces 41 are pulled out from the half-split grip member 34 of the splice 30, the tip insertion portions 41a can be pushed to be inserted between the base member 31 and the pressing cover 32 (can assemble the insertion piece attached splice).

In addition, the optical fiber splicing unit 10 in a state where the insertion pieces are removed from the splice 30 is supplied to the field, and in the field, the insertion pieces may be inserted between the elements 31 and 32 of the splice 30 to assemble the insertion piece attached splice.

As shown in FIG. 9 or the like, the splice tool 40 of the shown example includes pressing protrusions 43d protruding to the rear surface side of the insertion piece support plate portion 43.

The pressing protrusions 43d are formed on the side opposite to the insertion pieces 41 via the insertion piece support plate portion 43 to correspond to the protrusion positions of the insertion pieces 41.

In the splice tool 40, by pressing the pressing protrusions 43d from the pull-out operating and driving portion 42, the insertion pieces 41 can be easily pushed to be inserted between the elements 31 and 32 of the splice 30.

As shown in FIGS. 8 and 9, in the tip side (the side opposite to the base end side which is the tool base 47 side) of the insertion piece support plate portion 43 of the splice tool 40, position deviation prevention protrusions 42a with respect to the unit base 20 protrude.

The position deviation prevention protrusions 42a each protrude to insertion piece protrusion sides of a tip side extension portion 43e extending in the width direction from the tip portion of the insertion piece support plate portion 43, and are provided at two locations separated from each other in the tool width direction.

As shown in FIGS. 1 to 3, the pair of position deviation prevention protrusions 42a abut both side surfaces in the width direction of the unit base 20, and thus, the splice tool 40 is attached to the unit base 20.

The pair of position deviation prevention protrusions 42a effectively contribute to the position deviation prevention of the splice tool 40 in the width direction with respect to the unit base 20.

Moreover, spacer protrusions 48 protruding to the insertion piece protrusion side of the tool base 47 are inserted into window holes 22b (hereinafter, referred to as spacer window hole s) which are formed and opened to portions extending to both sides of the splice holder portion 21 of the base plate portion 22 of the unit base 20, and thus, the splice tools 40 are attached to the unit base 20.

The portions extending to both sides of the splice holder portion 21 of the base plate portion 22 configure the bottom plate portions 24a of the fixing member guide portions 24 having a U-shaped cross-section in the unit base 20.

Each fixing member guide portion 24 has a configuration in which the guide side plate portions 24b are erected on both sides in the width direction of the bottom plate portion 24a.

The bottom plate portion 24a and the guide side plate portions 24b function as a portion of wall portions configuring the fixing member guide portion 24.

The guide side plate portions 24b of both sides in the width direction of the bottom plate portion 24a extend to be parallel to each other along the longitudinal direction of the elongated plate-shaped bottom plate portion 24a.

The spacer window holes 22b is formed on the end portion of the splice holder portion 21 side of the bottom plate portion 24a of the fixing member guide portion 24.

The spacer protrusion 48 of the splice tool 40, which is attached to the unit base 20, protrudes to an upper surface of the base plate portion 22 via the spacer window hole 22b, that is, protrude inside the fixing member guide portion 24.

In addition, the spacer protrusion 48 can be inserted to and detached from the spacer window hole 22b.

The spacer protrusion 48 is a movable piece which is inserted into the spacer window hole 22b to be movable in the axial direction of the protrusion.

When the splice tool 40 is removed from the unit main body 10A, the spacer protrusion 48 is pulled from the spacer window hole 22b of the unit base 20.

Accordingly, the spacer protrusion 48 moves (retracts) from a position during use to a position (a position at which the protrusion does not abut the anchoring fixation member 120) at which the protrusion can prevent from abutting the anchoring fixation member 120.

In the state where the spacer protrusion 48 does not protrude inside the fixing member guide portion 24, the unit base 20 can advance (move) the fixing member attached cable terminal 1a inserted into the fixing member guide portion 24 to the position at which the front end of the anchoring fixation member 120 abuts the holder end plate portion 21b of the splice holder portion 21 (specifically, a surface 21j (hereinafter, also referred to as a fixing member abutting surface) of the fixing member guide portion 24 side of the holder end plate portion 21b), with respect to the splice 30 in the splice holder portion 21.

In the unit main body 10A, the position at which the front end of the anchoring fixation member 120 abut the holder end plate portion 21b of the splice holder portion 21 becomes an advancement limit position of the fixing member attached cable terminal 1a with respect to the splice 30 of the unit main body 10A.

The portion of the spacer protrusion 48 protruding inside the fixing member guide portion 24 is positioned at a position which is slightly separated to the side opposite to the splice 30 from the holder end plate portion 21b of the splice holder portion 21.

Hereinafter, the position of the spacer protrusion 48 at this time is also referred to as the position during use.

The front end of the anchoring fixation member 120 of the fixing member attached cable terminal 1a, which is inserted into the fixing member guide portion 24, can abut the spacer protrusion 48 (the spacer protrusion which is positioned at the position during use) which protrude inside the fixing member guide portion 24.

The spacer protrusion 48 protruding inside the fixing member guide portion 24 stops the advancement of the fixing member attached cable terminal 1a inserted into the fixing member guide portion 24, at a position further separated from the splice 30 than the advancement limit position.

The anchoring fixation member 120 is provided to enclose the outer circumference of the terminal of the optical fiber cable 1, and is fixed to be integrated with the terminal.

Figure 18:
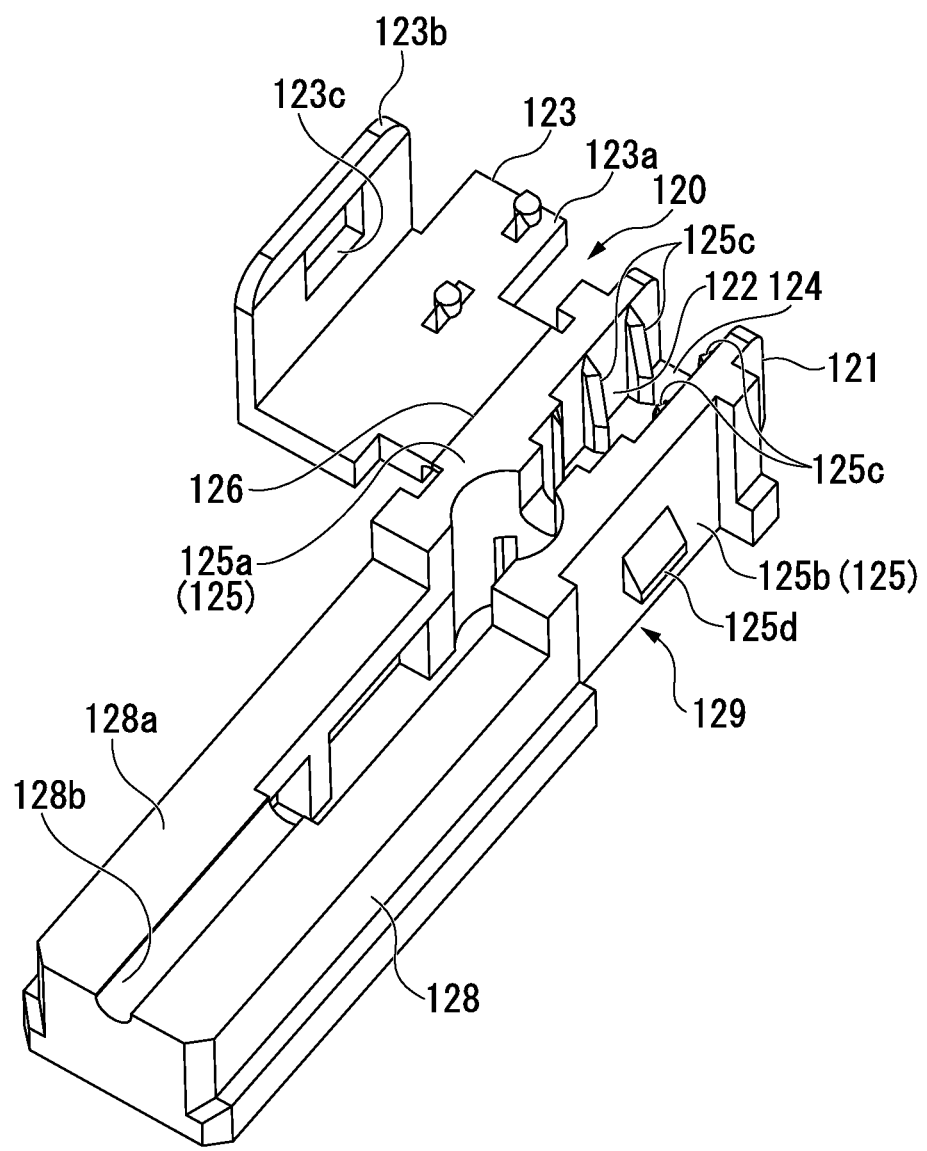
FIG. 18 is a perspective view showing an example of the anchoring fixation member which is fixed to the optical fiber cable terminal.
Figure 19:
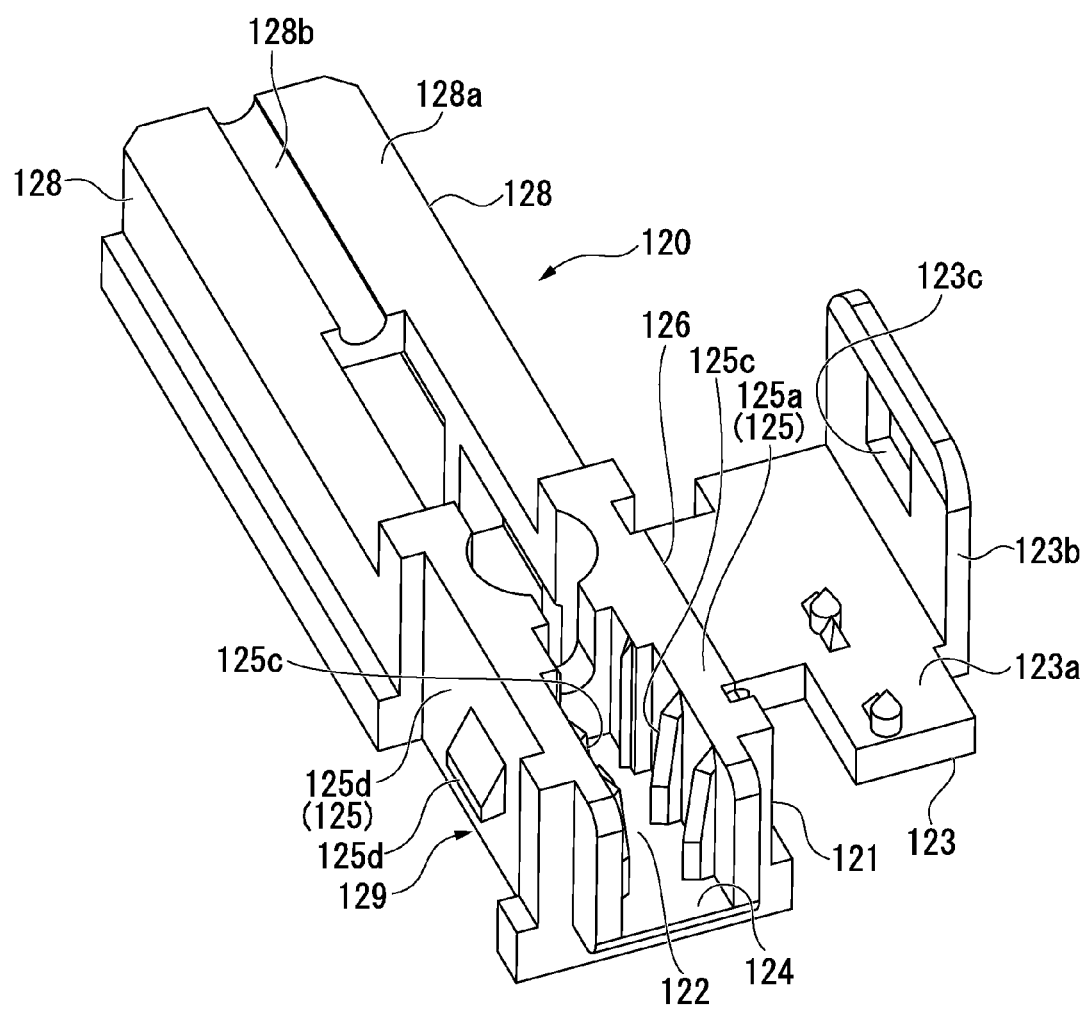
FIG. 19 is a perspective view showing a structure when the anchoring fixation member of FIG. 18 is viewed from a direction different from FIG. 18.

FIGS. 18 and 19 show a specific example of the anchoring fixation member 120.

Here, as the anchoring fixation member 120, a sheath grip member is used which grips the terminal of the optical fiber cable 1 from both sides and is attached to be fixed to the terminal of the optical fiber cable 1.

Hereinafter, when the anchoring fixation member 120 indicates the sheath grip member, the anchoring fixation member 120 is also referred to as the sheath grip member.

By gripping a sheath of the optical fiber cable terminal and fixing the sheath to the optical fiber cable terminal, the sheath grip member is fixed to the optical fiber of the optical fiber cable via the sheath of the optical fiber cable.

As shown in FIGS. 18 and 19, the sheath grip member 120 includes a cable fixing portion 129 for gripping and fixing the optical fiber cable 1 behind an elongated plate-shaped front plate portion 128.

The cable fixing portion 129 includes a grip base 121 having a U-shaped cross-section in which a cable fitting groove 122, to which the optical fiber cable 1 is fitted, is formed, and a pressing cover 123 which is pivoted at one of both side wall portions 125 in a groove width direction of the cable fitting groove 122 of the grip base 121.

In the sheath grip member 120, a plurality of gripping protrusions 125c, which protrude from mutually facing surfaces of the pair of side wall portions 125 of the grip base 121, are bitten into the sheath 3 of the optical fiber cable 1 fitted to the cable fitting groove 122, and thus, the optical fiber cable 1 can be gripped and fixed between the pair of side wall portions 125.

The grip base 121 is a member having a U-shaped cross-section in which the cable fitting groove 122 is secured between the pair of side wall portions 125 protruding from one surface side of the bottom wall portion 124.

The groove width direction of the cable fitting groove 122 indicates the interval direction of both side wall portions 125 via the cable fitting groove 122.

Moreover, the gripping protrusions 125c of the sheath grip member 120 of the shown example are formed in protrusions having triangular cross-sections extending in a depth direction of the cable fitting groove 122.

Moreover, after the grip base 121 is externally fitted and fixed to the terminal of the optical fiber cable 1 in an open state in which the pressing cover 123 is separated from the other side wall portion 125, the pressing cover 123 is rotated to a closed position in which the opening portion of the cable fitting groove 122 is closed between ends portions opposite to the bottom wall portion 124 of the pair of side wall portions 125 of the grip base 121, the pressing cover 123 is locked to the other side wall portion 125, and thus, the sheath grip member 120 is attached to the terminal of the optical fiber cable 1.

The sheath grip member 120 of the shown example is an integrally molded plastic part.

The pressing cover 123 is connected to a protruding end of one (hereinafter, also referred to as a first side wall portion and assigned by a reference numeral 125a) of the pair of side wall portions 125, via a thin portion 126 which functions as a hinge portion.

The pressing cover 123 is rotatably pivoted to the first side wall portion 125a of the grip base 121 by the thin portion 126 around the axis along the extension direction of the cable fitting groove 122.

Moreover, hereinafter, the other of the pair of side wall portions 125 of the grip base 121 is also referred to as a second side wall portion 125b.

The pressing cover 123 of the sheath grip member 120 of the shown example is formed in an L-shaped plate.

The pressing cover 123 includes a top plate portion 123a which is pivoted to the first side wall portion 125a of the grip base 121 via the thin portion 126, and a locking plate portion 123b which is formed to be perpendicular to the top plate portion 123a from an end portion opposite to the thin portion 126 of the top plate portion 123a.

When the pressing cover 123 is positioned at the closed position in which the top plate portion 123a abuts the protruding ends of the pair of side wall portions 125 of the grip base 121 and the opening portion of the cable fitting groove 122 is closed, the locking plate portion 123b can overlap with the outer surface of the second side wall portion 125b of the grip base 121 opposite to the cable fitting groove 122.

Moreover, by inserting a locking claw 125d protruding from the outer surface of the second side wall portion 125b of the grip base 121 into a locking window hole 123c formed on the locking plate portion 123b, the pressing cover 123 is locked to the grip base 121, and thus, a closed state with respect to the grip base 121 can be stably maintained.

The lower surface of the front plate portion 128 of the sheath grip member 120 (anchoring fixation member) is flush with the lower surface (the surface opposite to the cable fitting groove 122) of the bottom wall portion 124 of the grip base 121 of the cable fixing portion 129.

The pair of side wall portions 125 of the cable fixing portion 129 further protrude upward than an upper surface 128a of the front plate portion 128.

A fiber groove 128b is formed to extend in a front-rear direction on the upper surface 128a of the front plate portion 128, and the fiber groove supports the optical fiber 2 protruding from the terminal of the optical fiber cable 1, which is fitted to the cable fitting groove 122 and fixed to the cable fixing portion 129, to straightly extend from the terminal of the optical fiber cable 1.

In addition, the sheath grip member is not limited to the configuration of the shown example.

For example, the sheath grip member may adopt a configuration in which the pressing cover is changed to a pressing cover having a structure in which the locking plate portion 123b is omitted and an engagement portion engaging with the protruding end of the second side wall portion 125b of the grip base 121 is provided on the top plate portion 123a.

In addition, the sheath grip member may adopt a configuration in which only the grip base is provided.

Moreover, the sheath grip member is not limited to an integrally molded plastic part, and may also adopt a configuration in which a plurality of members are assembled.

The anchoring fixation member is not limited to the sheath grip member, and for example, may be a member which is fixed to adhere the outer circumference of the terminal of the optical fiber cable 1 by an adhesive agent, a member which is fixed to the outer circumference of the terminal by thermal welding, or the like.

<Optical Fiber Splicing Method>

Next, an example of an operation (an optical fiber splicing method) of splicing optical fiber cables 11 and 12 to each other using the optical fiber splicing unit 10 of the first embodiment of the present invention will be described.

In the optical fiber splicing method described here, first, after a first fiber inserting and anchoring process is performed in which one optical fiber 2 of the optical fiber cables 11 and 12 to be spliced to each other is inserted into the splice 30 and the fixing member attached cable terminal 1a assembled to the optical fiber cable terminal is fixed to the unit main body 10A, a second fiber inserting and anchoring process is performed in which the optical fiber of the other optical fiber cable is inserted into the splice, and the fixing member attached cable terminal 1a assembled to the optical fiber cable terminal is fixed to the unit main body 10A.

In the optical fiber splicing method, the tip portion of the optical fiber 11a of the optical fiber cable 11 (hereinafter, also referred to as a first optical fiber cable 11) in the first fiber inserting and anchoring process is inserted into and fixed to the splice 30.

FIGS. 2 and 3 show a state where the first fiber inserting and anchoring process is completed.

In the second fiber inserting and anchoring process, the tip portion of the optical fiber 12a of the other optical fiber cable 12 (hereinafter, also referred to as a second optical fiber cable) is inserted into the splice 30, and is fixed to the splice 30 in a state where the tip portion abuts the optical fiber 11a (hereinafter, also referred to as a first optical fiber) of the first optical fiber cable 11.

In the fixing member attached cable terminals 1a of the optical fiber cables 11 and 12, the anchoring fixation members 120 are fixed and assembled to the terminals of the optical fiber cables 11 and 12.

In the optical fiber cables 11 and 12 in which the fixing member attached cable terminals 1a are assembled, the optical fibers 2 exposed from the terminals protrude from the front ends of the anchoring fixation member 120.

That is, exposure lengths of the optical fibers 2 from the terminals of the optical fiber cables 11 and 12 are secured by lengths capable of protruding the optical fibers 2 from the front ends of the anchoring fixation members 120.

Here, the protrusion length from the front end of the anchoring fixation member 120 of the optical fiber 2 is set to a length in which the tip of the optical fiber 2 is positioned at the center portion in the longitudinal direction of the splice 30 when the front end of the anchoring fixation member 120 of the fixing member attached cable terminal 1a inserted into the fixing member guide portion 24 of the unit base 20 of the optical fiber splicing unit 10 abuts the spacer protrusion 48 at the position during use.

When the front end of the anchoring fixation member 120 of the fixing member attached cable terminal 1a abuts the spacer protrusion 48 at the position during use, the optical fiber 2 protruding from the anchoring fixation member 120 is inserted into the splice 30 by a predetermined length, and the tip of the optical fiber 2 is disposed at the center portion in the longitudinal direction of the splice 30.

Hereinafter, the position of the fixing member attached cable terminal 1a when the front end of the anchoring fixation member 120 abuts the spacer protrusion 48 at the position during use is also referred to as a fiber insertion completion position.

In addition, the fixing member attached cable terminal 1a is inserted into the fixing member guide portion 24 in a state where the coating of the tip portion of the protrusion length portion of the optical fiber 2 is removed and the bare optical fiber 2a is led-out.

An opening amount between the base member 31 and each of the cover members 321, 322, and 323 in the tool attached splice 30A can be set according to the thickness of the plate-shaped tip insertion portion 41a of the insertion piece 41 of the splice tool 40.

For example, as shown in FIG. 17, the opening amount according to the insertion of the insertion piece 41 between the base member 31 and the side cover (the second side cover 323 in the shown example) is set to a range in which the optical fiber 2 does not come off from a region (a fiber storage region; refer to a reference numeral FS in FIG. 16) between the coating portion insertion groove 31d and the facing surface 323a of the side cover 323 and the insertion state of the optical fiber into the fiber storage region is maintained.

The fiber storage region FS (refer to FIG. 16) is a region between the coating portion insertion groove, and a portion which faces the coating portion insertion groove of the element facing the coating portion insertion groove in a direction perpendicular to the facing surface of the element (the base member 31 in the shown example) on which the coating portion insertion groove is formed.

In addition, in FIG. 16, a clearance (refer to FIG. 17), which is secure in the vicinity of the bottom of the coating portion insertion groove into which the coating portion of the optical fiber 2 is inserted, is not shown.

The opening amount according to the insertion of the insertion piece 41 between the center cover 322 and the base member 31 is set to a range in which the bare optical fiber 2a led out from the tip of the optical fiber 2 does not come off from a region (a bare optical fiber storage region FS2) between the aligning groove 31b and the facing surface 322a of the center cover 322.

The bare optical fiber storage region FS2 (refer to FIG. 16) is a region between the aligning groove 31b, and a portion of the facing surface 322a of the center cover 322 which faces the aligning groove 31b in a direction perpendicular to the facing surface 31a of the element (the base member 31 in the shown example) on which the aligning groove 31b is formed.

By inserting the fixing member attached cable terminal 1a into the fixing member guide portion 24, the optical fiber 2 can be inserted into the fiber storage region FS of the splice 30 via a fiber introduction hole 21h which is formed on the end plate portion 21b of the splice holder portion 21 of the unit base 20.

According to the advancement of the fixing member attached cable terminal 1a with respect to the splice 30, the bare optical fiber 2a led out from the tip of the optical fiber 2 can be inserted into the bare optical fiber storage region via the fiber storage region FS (refer to FIG. 16) of the splice 30 from the fiber introduction hole 21h.

In the half-split grip member 34 of the splice 30, a tapered concave portion 34a is opened, which is recessed in a tapered shape from both end surfaces in the longitudinal direction to smoothly insert the optical fiber 2 into the fiber storage region FS.

As shown in FIG. 16, the inner end of the tapered concave portion 34a communicates with the fiber storage region FS.

The total protrusion length of the optical fibers 2 of the optical fiber cables 11 and 12 is secured to be the same as the separation distance between the anchoring fixation members 120 when the fixing member attached cable terminal 1a of each of the optical fiber cables 11 and 12 is positioned at the insertion completion position, or to be slightly longer (for example, 0.01 mm to 0.1 mm) than the separation distance.

In this optical fiber splicing method, confirmation of bend formation of the optical fibers 2 is not performed when the optical fibers 2 abut each other.

Accordingly, in the optical fiber splicing method, as the protrusion length of the optical fiber 2, it is not necessary to secure a length used to confirm the abutment by forming the bend having visually identifiable size.

(First Fiber Inserting and Anchoring Process)

In the first fiber inserting and anchoring process, first, the fixing member attached cable terminal 1a of the fiber optical fiber cable 11 is inserted into the fixing member guide portion 24 of one (hereinafter, also referred to as a first cable anchor 23A) of both cable anchors 23 of the optical fiber splicing unit 10, and abuts the spacer protrusion 48 (first spacer; assigned by a reference numeral 48a in FIG. 7) of the first splice tool 40A.

At this time, the spacer protrusion 48a is put between the holder end plate portion 21b of the splice holder portion 21 and the anchoring fixation member 120 (first anchoring fixation member).

Here, as shown in FIG. 1, the first cable anchor 23A indicates the cable anchor 23 close to the first splice tool 40A of two splice tools 40A and 40B of the optical fiber splicing unit 10.

Moreover, hereinafter, the cable anchor 23 close to the second splice tool 40B is also referred to as a second cable anchor 23B.

The configuration of the second cable anchor 23B is similar to that of the first cable anchor 23A.

Subsequently, by applying the pressing force P (refer to FIG. 10) which causes the pair of elastic operation pieces 44 of the first splice tool 40 to approach each other, the insertion piece 41 of the first splice tool 40 is pulled out from the splice 30, and the splice tool 40 is removed from the unit main body 10A.

Subsequently, the lever member 25 engages with the anchoring fixation member 120, and retraction of the fixing member attached cable terminal 1a with respect to the splice 30 is restricted (anchored).

As described above, the insertion pieces 41 of the first splice tool 40A are inserted into total two insertion piece through hole 35 including the one insertion piece through hole corresponding to the first side cover 321 of the splice 30 and the one insertion piece through hole of the first side cover 321 side in the center cover 322.

That is, the insertion pieces 41 of the first splice tool 40A are inserted between the first side cover 321 of the splice 30 and the base member 31, and between the portion of the first side cover 321 side from the center portion in the longitudinal direction of the elongated plate-shaped center cover 322 along the base member 31 and the base member 31.

If the insertion pieces 41 of the first splice tool 40A are pulled out from the splice 30, the first optical fiber 11a is gripped and fixed between the first side cover 321 and the base member 31 of the splice 30, and between the center cover 322 and the base member 31 by the elasticity of the clamp spring 33 of the splice 30.

As shown in FIGS. 8 and 9, the insertion piece support plate portion 43 of the splice tool 40 is supported by the tool base 47 in a cantilever manner.

Accordingly, in the splice tool 40, when the insertion pieces 41 are pulled out from the splice 30 by the operation which causes the pair of elastic operation pieces 44 to approach each other, the insertion piece support plate portion 43 rotates with respect to the tool base 47 with the base end portion as the center by elastic deformation of the base end portion of the tool base 47 side.

In the splice tool 40, by the operation which causes the pair of elastic operation pieces 44 to approach each other, among the insertion pieces 41 which protrude at the plurality of locations in the longitudinal direction of the insertion piece support plate portion 43, it is possible to pull out the insertion pieces 41 from the half-split grip member 34 of the splice 30 in descending order of the separation distance from the tool base 47.

As shown in FIGS. 8 and 9, in the insertion piece support plate portion 43 of the splice tool 40, the base end portion integrated with the tool base 47 becomes a thin portion 43c which is thinner than other portions of the insertion piece support plate portion 43.

Accordingly, in the splice tool 40, by the operation which causes the pair of elastic operation pieces 44 to approach each other, the insertion piece support plate portion 43 rotates with respect to the tool base 47 with the base end portion as the hinge portion.

In the insertion piece support plate portion 43 of the splice tool 40 of the shown example, the insertion pieces 41 protrude at two locations which are separated from each other in the longitudinal direction.

in the splice tool 40, by the operation which causes the pair of elastic operation pieces 44 to approach each other, after the pulling-out of the first insertion piece 411, which is positioned at the tip side of the insertion piece support plate portion 43, from the splice 30 is completed, the pulling-out of the second insertion piece 412, which is positioned to be closer to the tool base 47 side than the first insertion piece 411, from the splice 30 is completed.

As shown in FIG. 8, the support plate side inclined surfaces 45 of the insertion piece support plate portion 43 of the splice tool 40 in the shown example are formed at total four locations including both end portions in the tool width direction via the first insertion piece 411 in the insertion piece support plate portion 43, and both end portions in the tool width direction via the second insertion piece 412.

Hereinafter, both support plate side inclined surfaces 45 in the tool width direction via the first insertion piece 411 are also referred to as first inclined surfaces 45a of the support plate side, and both support plate side inclined surfaces 45 in the tool width direction via the second insertion piece 412 are also referred to as second inclined surfaces 45b of the support plate side.

The protrusions 44a and 44b of the elastic operation pieces 44 protrude at two locations separated from each other in the longitudinal direction of each of the elastic operation pieces 44 to correspond to the support plate side inclined surfaces 45 positioned at two locations in the longitudinal direction of the insertion piece support plate portion 43.

Hereinafter, when the elastic operation pieces 44 move toward the insertion piece support plate portion 43, the protrusions 44a abutting the first inclined surfaces 45a of the support plate side are also referred to as first protrusions, and the protrusions 44b abutting the second inclined surfaces 45b of the support plate side are also referred to as second protrusions.

In addition, as shown in FIGS. 9 and 10, hereinafter, the operation piece side inclined surfaces 46 formed on the first protrusions 44a are also referred to as first inclined surfaces 46a of the operation piece side, and the operation piece side inclined surfaces 46 formed on the second protrusions 44b are also referred to as second inclined surfaces 46b of the operation piece side.

As shown in FIG. 10, in the splice tool 40 of the shown example, an inclined angle θ45a of each of the first inclined surfaces 45a of the support plate side with respect to the insertion piece protrusion surface 43a is set to be smaller than an inclined angle θ45b of each of the second inclined surfaces 45b of the support plate side with respect to the insertion piece protrusion surface 43a.

In contrast, an inclined angle θ46a of each of the first inclined surfaces 46a of the operation piece side with respect to the insertion piece protrusion surface 43a (and the virtual extension) is set to be larger than an inclined angle θ46b of each of the second inclined surfaces 46b of the operation piece side with respect to the insertion piece protrusion surface 43a (and the virtual extension).

Moreover, in the splice tool 40 of the shown example, a difference between the inclined angle θ45a of each of the first inclined surfaces 45a of the support plate side and the inclined angle θ45b of each of the second inclined surfaces 45b of the support plate side is set to be larger than a difference between the inclined angle θ46a of the insertion piece protrusion surface 43a of each of the first inclined surfaces 46a of the operation piece side and the inclined angle θ46b of each of the second inclined surfaces 46b of the operation piece side.

In the splice tool 40 of the shown example, the separation distance in the tool width direction of each of the first inclined surfaces 45a of the support plate side from the edge of the rear surface side of the pull-out operating and driving portion 42 to each of the first inclined surfaces 46a of the operation piece side is set to be smaller than the separation distance in the tool width direction of each of the second inclined surfaces 45b of the support plate side from the edge of the insertion piece protrusion side to each of the second inclined surfaces 46b of the operation piece side.

Accordingly, in the splice tool 40 of the shown example, when the insertion pieces 41 are pulled out from the splice 30 by the operation which causes the pair of elastic operation pieces 44 approach each other, the pulling-out of the first insertion piece 411 from the splice 30 is realized prior to the pulling-out of the second insertion piece 412 from the splice 30.

The configuration, in which the pulling-out of the first insertion piece 411 from the splice 30 is realized prior to the pulling-out of the second insertion piece 412 from the splice 30, is common to the first and second splice tools 40A and 40B.

Moreover, the pulling-out (retract from the position during use) of the spacer protrusion 48 of the splice tool 40 from the spacer window hole 22b is realized by removing the splice tool 40 from the unit main body 10A.

The pulling-out of the spacer protrusion 48 from the spacer window hole 22b is realized after the pulling-out of all insertion pieces 41 of the splice tool 40 from the splice 30 are completed.

As shown in FIGS. 3 and 7, in the bottom plate portion 24a of the fixing member guide portion 24, elastic pressing pieces 22d (pressing portions) are formed, which protrude inside the spacer window hole 22b and elastically biases the spacer protrusion 48 in the spacer window hole 22b to the splice 30 side.

The elastic pressing pieces 22d are tongue-shaped protrusions which protrude to extend from portions, which are positioned on both sides in the width direction via the spacer window hole 22b, into the spacer window hole 22b, on the bottom plate portion 24a.

A clearance is secured between protruding ends of the elastic pressing pieces 22d which protrude from portions positioned on both sides in the width direction via the spacer window hole 22b of the bottom plate portion 24a.

The spacer protrusion 48 is inserted (pressed) from the elastic pressing pieces 22d into a region (hereinafter, referred to as a spacer insertion region 22c) of the splice holder portion 21 side, in the spacer window hole 22b.

Moreover, the spacer protrusion 48 is elastically biased to a portion (an inner wall; also referred to as a protrusion receiving portion 22e) positioned at the splice holder portion 21 side of the spacer window hole 22b in the base plate portion 22 of the unit base 20, by elastic pressing pieces 22d, and is pushed to the protrusion receiving portion 22e.

Accordingly, the spacer protrusion 48 is very accurately positioned in the spacer window hole 22b without rattling.

The configuration, in which the spacer protrusion 48 is elastically biased by the elastic pressing pieces 22d and pushed to the protrusion receiving portion 22e of the base plate portion 22 of the unit base 20, and the spacer protrusion 48 is very accurately positioned, effectively contributes to stable securement of positioning accuracy of the anchoring fixation member 120 which is inserted into the fixing member guide portion 24 and abuts the spacer protrusion 48.

This is advantageous for stable positioning the tip of the first optical fiber 11a, which is inserted between (specifically, bare optical fiber storage region FS2) elements 31 and 32 of the splice 30, in the longitudinal direction of the splice 30 with high accuracy.

As shown in FIGS. 2, 3, 11, and 12, the lever member 25 includes a flat plate-shaped top plate portion 25a, a pair of lever side plate portions 25b which are perpendicularly erected on both sides of the top plate portion 25a and are provided to be parallel to each other, and engagement piece portions 25c.

Each of the pair of lever side plate portions 25b has an elongated plate shape, and one end side in the longitudinal direction of the lever side plate portion has extension portions which extend from the top plate portion 25a.

In the lever member 25, the extension portions of the pair of lever side plate portions 25b are rotatably supported around the axis in the width direction of the unit base 20 by rotary shafts 26 which protrude to both sides in the width direction of the unit base 20.

The lever member 25 is rotatably attached about the rotary shafts 26 with respect to the unit base 20.

When the anchoring fixation member 120 is inserted into the fixing member guide portion 24, the lever member 25 is disposed at a waiting position where the lever member prevents from contacting with the anchoring fixation member 120.

In the lever member 25, according to the rotation with respect to the unit base 20, from the waiting position, the engagement piece portions 25c, which are provided on the other end sides in the longitudinal direction of the pair of lever side plate portions 25b, are positioned on the rear side of the anchoring fixation member 120 accommodated in the fixing member guide portion 24 and engage with the anchoring fixation member 120, and thus, the retraction of the anchoring fixation member 120 can be restricted.

At this time, the position of the lever member 25 is also referred to as a retraction restriction position.

When the lever member 25 is positioned at the retraction restriction position, the anchoring fixation member 120 is put between the end plate portions 21b of the splice holder portion 21 and is fixed to the unit base 20.

When the lever member 25 of the shown example is positioned at the retraction restriction position, the pair of guide side plate portions 24b of the fixing member guide portion 24 along with the anchoring fixation member 120 are accommodated in the inside which is surrounded by the top plate portion 25a, the pair of lever side plate portions 25b, and the engagement piece portions 25c.

Moreover, in the lever member 25, the engagement piece portions 25c, which are provided to be separated from each other on both sides in a lever width direction which is the interval direction of the pair of lever side plate portion 25b, are disposed on both sides of the optical fiber cable 1 extending from the anchoring fixation member 120 to the rear side.

The lever member 25 is provided on the unit base 20 so that the width direction is arranged in the width direction of the unit base 20.

The waiting position of the lever member 25 indicates a position which is separated from the retraction restriction position and the insertion of the fixing member attached cable terminal 1a to the fixing member guide portion 24 is not obstructed (the fixing member attached cable terminal 1a does not contact the anchoring fixation member 120), in the rotation range in which the lever member 25 is rotated about the rotary shafts 26.

In the first fiber inserting and anchoring process, after the first splice tool 40A is removed from the unit base 20 and the spacer protrusion 48a of the first splice tool 40A is pulled out from the spacer window hole 22b, the fixing member attached cable terminal 1a of the first optical fiber cable 11 is moved from the fiber insertion completion position the advancement limit position, and the retraction of the fixing member attached cable terminal 1a from the advancement limit position is restricted using an anchoring portion (anchoring means; here, the lever member 25).

Restricting the retraction of the fixing member attached cable terminal 1a from the advancement limit position using the lever member 25 is realized by moving the lever member 25 from the waiting position to the retraction restriction position.

Moreover, the retraction of the spacer protrusion 48 of the splice tool 40 of the shown example from the portion between the anchoring fixation member 120 and the holder end plate portion 21b is completed after the pulling-out of all insertion pieces 41 of the splice tool 40 from the splice 30 is completed.

However, the splice tool 40 may adopt a configuration in which the retraction of the spacer protrusion 48 from the portion between the anchoring fixation member 120 and the holder end plate portion 21b is completed concurrently with the completion of the pulling-out of all insertion pieces 41 of the splice tool 40 from the splice 30.

The movement (advancement) of the fixing member attached cable terminal 1a from the fiber insertion completion position to the advancement limit position is performed after the retraction of the spacer protrusion 48 from the portion between the anchoring fixation member 120 and the holder end plate portion 21b is completed and after the pulling-out of all insertion pieces 41 of the splice tool 40 from the splice 30 is completed.

Figure 12:
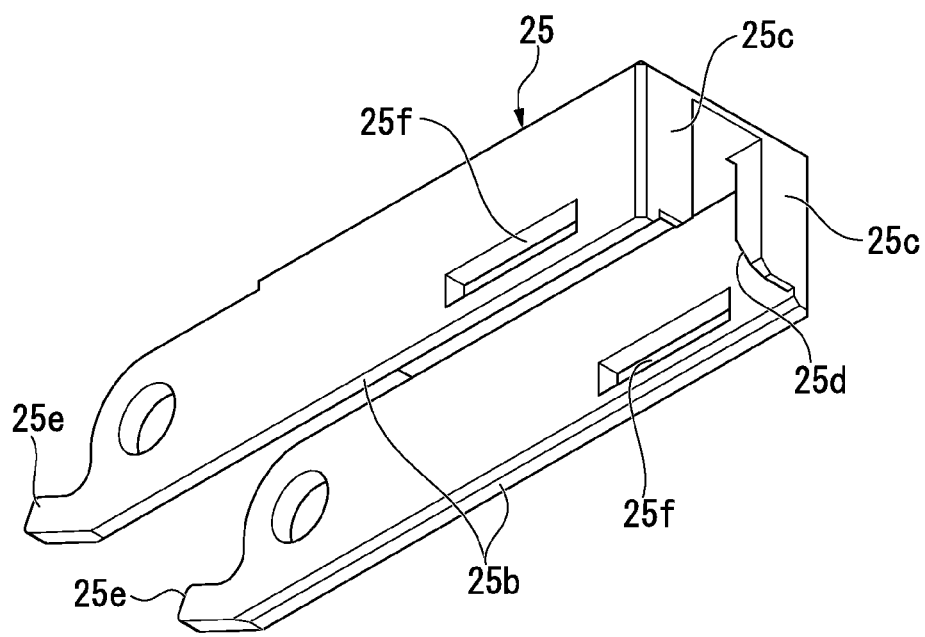
FIG. 12 is a perspective view showing a structure when the lever member of the optical fiber splicing unit of FIG. 1 is viewed from a direction different from FIG. 11.
Figure 13:
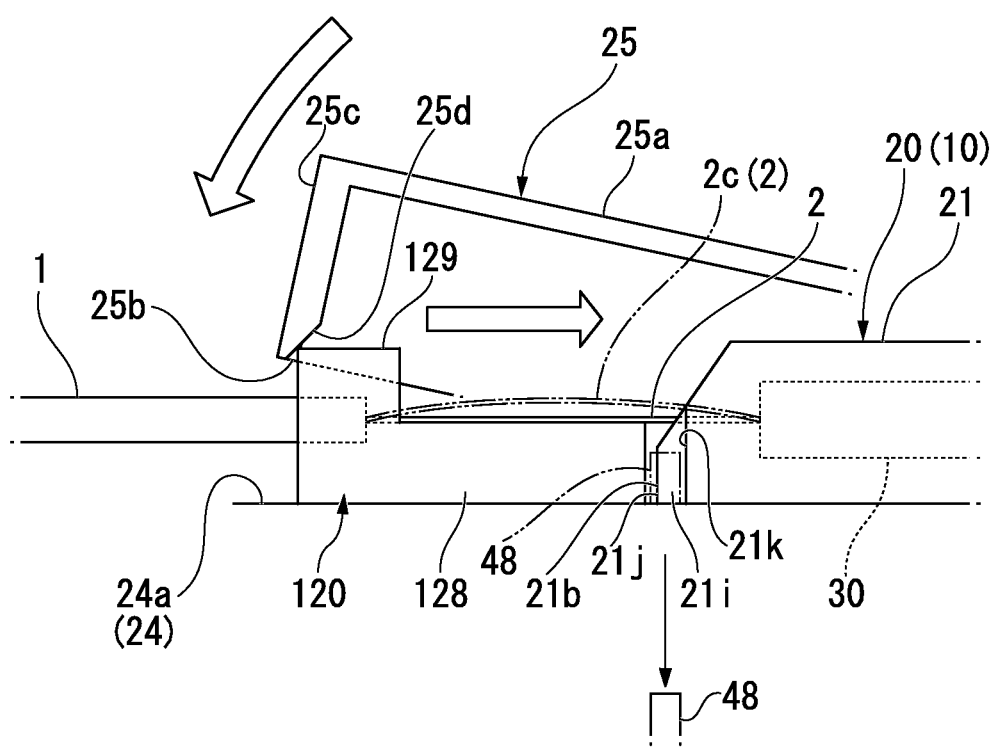
FIG. 13 is a model diagram showing a relationship between a fixing member pressing and advancing portion (fixing member abutting surface) of the lever member of the optical fiber splicing unit of FIG. 1 and an anchoring fixation member fixed to an optical fiber cable terminal.

As shown in FIGS. 12 and 13, the other end portion in the longitudinal direction of the pair of lever side plate portions 25b is integrated with the top plate portion 25a.

The engagement piece portions 25c of the lever member 25 protrude from the inner surface sides facing each other of the other end portion in the longitudinal direction of the pair of lever side plate portions 25b, and are formed in a protruding wall shape extending in the perpendicular direction with respect to the top plate portion 25a.

In the end portions of the engagement piece portion 25c opposite to the top plate portion 25a, inclined surfaces 25d are formed to be inclined with respect to the top plate portion 25a so that the distance from one end portion in the longitudinal direction of the lever side plate portion 25b is increased according to the separation from the top plate portion 25a.

When the lever member 25 is rotated from the waiting position and is positioned at the retraction restriction position, the inclined surfaces 25d abut the upper end of the rear end surface (the upper end of the left rear end surface of the anchoring fixation member 120 in FIG. 13) of the anchoring fixation member 120 which is positioned at the fiber insertion completion position.

When the anchoring fixation member 120 is positioned at the fiber insertion completion position, the rear end portion of the anchoring fixation member protrudes from both guide side plate portions 24b of the fixing member guide portion 24 to the side opposite to the splice 30.

Each of the inclined surfaces 25d function as a fixing member pressing and advancing portion which presses and advances the anchoring fixation member 120 toward the splice 30 according to the rotation of the lever member 25 from the waiting position to the retraction restriction position.

Accordingly, the anchoring fixation member 120 abuts the holder end plate portion 21b and can be fixed at the advancement limit position, and a bending 2c of the optical fiber 2 is formed to be secured between the terminal of the optical fiber cable 11 fixed to the cable fixing portion 129 of the anchoring fixation member 120 and the splice 30.

The formation of the bending 2c prevents an excessive tensile force due to influences of handling or a temperature cycle of the first optical fiber cable 11 or the like, for example, from applying to the first optical fiber 11a fixed to the splice 30 due to the removal of the first splice tool 40A.

Accordingly, the formation of the bending 2c is advantageous to avoid disconnection of the first optical fiber 11a due to the excessive tensile force, deviation of the fixation position with respect to the splice 30, or the like.

As shown in FIGS. 6B and 13, a portion (most of the spacer insertion region 22c in the shown example) of the spacer insertion region 22c of the spacer window hole 22b is formed on the extension of a concave portion 21i which is formed to be recessed from a surface 21j (fixing member abutting surface 21j) of the fixing member guide portion 24 side in the holder end plate portion 21b.

The concave portion 21i of the holder end plate portion 21b is formed in a groove shape which extends in the up-down direction in the fixing member guide portion 24 side of the holder end plate portion 21b.

Moreover, the concave portion 21i of the shown example is formed to penetrate the fixing member guide portion 22 side of the holder end plate portion 21b in up-down direction and to also penetrate the base plate portion 24.

The portion of the spacer insertion region 22c of the spacer window hole 22b which is positioned on the extension of the concave portion 21i is formed by the portion of the concave portion 21i which penetrates the base plate portion 22.

The spacer insertion region 22c of the spacer window hole 22b is formed to be cut from the fixing member guide portion 24 on the holder lower plate portion 21a of the splice holder portion 21.

In the spacer protrusion 48 (spacer) which is inserted into the spacer insertion region 22c, the side opposite to the elastic pressing pieces 22d is inserted into the concave portion 21i of the holder end plate portion 21b, and abuts the holder end plate portion 21b and the protrusion receiving portion 22e by the elastic biasing force of the elastic pressing pieces 22d.

Specifically, the concave portion 21i of the shown example is a corner groove which is formed to extend in the up-down direction of the holder end plate portion 21b perpendicular to the base plate portion 22 of the fixing member guide portion 24 side, and also penetrates the base plate portion 22.

The protrusion receiving portion 22e forms a groove bottom surface of the portion of the concave portion 21i penetrating the base plate portion 22.

Specifically, as shown in FIG. 7, the spacer protrusion 48 of the shown example is an insertion piece having a rectangular cross-section which includes three surfaces disposed along a groove bottom surface 21k and both inner side surfaces of the concave portion 21i which is a corner groove and one surface abutting the elastic pressing piece 22d provided to be slightly separated from the surface 21j of the fixing member guide portion 24 side of the holder end plate portion 21b, as four side surfaces.

The spacer protrusion 48, which is inserted into the spacer insertion region 22c and is elastically biased to the splice 30 side by the elastic biasing force of the elastic pressing piece 22d, is pushed to the groove bottom surface 21k of the concave portion 21i and is very accurately positioned.

The elastic pressing pieces 22d are provided to be separated from the holder end plate portion 21b via clearances to the side opposite to the splice 30.

The spacer protrusion 48 (spacer), which is inserted into the spacer insertion region 22c, has the dimension protruding from the holder end plate portion 21b in the longitudinal direction of the unit base 20 to the fixing member guide portion 24 side.

The position (fiber insertion completion position) of the anchoring fixation member 120 abutting the spacer protrusion 48 is a position at which the separation distance from the splice 30 is longer than the advancement limit position by the distance corresponding to the protrusion dimension of the spacer protrusion 48 from the holder end plate portion 21b to the fixing member guide portion 24 side.

As shown in FIG. 1, the lever members 25 of the first and second cable anchors 23A and 23B each include rotation restricting abutment portion 25e (rotation restricting abutment protrusions) which abut the splice tools and hold the lever members to the waiting positions.

As shown in FIGS. 1 and 2, each of the rotation restricting abutment portions 25e of each lever member 25 is a protrusion which protrudes from one end portion in the longitudinal direction of the lever side plate portion 25b attached to the rotary shaft 26 to the direction opposite to the other end in the longitudinal direction.

Moreover, the rotation restricting abutment portions 25e protrude from the end portions (hereinafter, referred to as a protruding end portion) opposite to the sides which integrate with the top plate portion 25a in the lever side plate portions 25b.

The pull-out operating and driving portion 42 of the splice tool 40 attached to the unit main body 10A is disposed on the lower surface side of the splice holder portion 21. In the lever member 25, from the fixing member guide portion 24 side, the rotation restricting abutment portions 25e can abut the pull-out operating and driving portion 42 (specifically, the tool base 47) of the splice tool 40 in which the spacer protrusion 48 is inserted into the spacer window hole 22b of the cable anchor 23 to which the lever member 25 is provided, in the splice tools 40 provided at two locations in the longitudinal direction of the unit main body 10A.

The lever member 25 is supported at the waiting position by abutting the rotation restricting abutment portions 25e to the pull-out operating and driving portion 42 (specifically, the tool base 47) of the splice tool 40, and thus, the rotation from the waiting position to the retraction restriction position and falling-down are restricted.

In the optical fiber splicing unit 10 exemplified in FIG. 1, each of the lever members 25 of the first and second cable anchors 23A and 23B is configured to be supported at the waiting position by abutting the rotation restricting abutment portions 25e to the pull-out operating and driving portion 42 (specifically, the tool base 47) of the splice tool 40.

In the lever member 25 which is supported at the waiting position by abutting the rotation restricting abutment portions 25e to the pull-out operating and driving portion 42 (specifically, the tool base 47) of the splice tool 40, the state where the lever member is supported at the waiting position is stably maintained as long as the abutment of the rotation restricting abutment portions 25e with respect to the pull-out operating and driving portion 42 of the splice tool 40 is not released.

In the lever member 25, by removing the splice tool 40 abutting the rotation restricting abutment portions 25e from the unit main body 10A, the abutment of the rotation restricting abutment portions 25e with respect to the splice tool 40 can be released.

Accordingly, the lever member 25 can rotate from the waiting position to the retraction restriction position.

In the lever member 25, the state where the lever member is supported at the waiting position is not released as long as the splice tool 40 abutting the rotation restricting abutment portions 25e of the lever member 25 is not removed from the unit main body 10A, and thus, the lever member 25 cannot be disposed at the retraction restriction position side.

As shown in FIG. 2 or the like, in the lever member 25 which is rotated from the waiting position to the retraction restriction position, locking claws 24d protruding from both guide side plate portions 24b of the fixing member guide portion 24 can be inserted to engage with locking window holes 25f formed at center portions of both lever side plate portions 25b.

Accordingly, in the lever member 25, the state where the lever member is disposed at the retraction restriction position can be stably maintained.

Moreover, the locking claws 24d of the fixing member guide portion 24 protrude from outer surface sides opposite to and facing inner surfaces of the pair of guide side plate portion 24b.

(Second Fiber Inserting and Anchoring Process)

In the second fiber inserting and anchoring process, first, the fixing member attached cable terminal 1a assembled to the second optical fiber cable 12 is inserted into the fixing member guide portion 24 of the second cable anchor 23, and the second optical fiber 12a protruding from the terminal of the optical fiber cable 12 is inserted into the fiber storage region FS of the splice 30 via the fiber introduction hole 21h of the holder end plate portion 21b of the splice holder portion 21.

Accordingly, the bare optical fiber 2a which is led-out in advance from the second optical fiber 12a is inserted into the bare optical fiber storage region FS2 via the fiber storage region FS of the splice 30.

In the above-described embodiment, the configuration is exemplified in which the advancement restricting stopper protrusion (specifically, the holder end plate portion 21b) also serves as the spacer receiving portion which puts the first spacer between the stopper protrusion and the anchoring fixation member 120. However, the optical fiber splicing unit of the embodiment according to the present invention is not limited thereto, and may also adopt a configuration in which the advancement restricting stopper protrusion and the spacer receiving portion are separately provided.

The fixing member attached cable terminal 1a inserted into the fixing member guide portion 24 of the second cable anchor 23B advances to decrease the distance from the splice 30, and thus, the front end of the anchoring fixation member 120 (second anchoring fixation member) abut the spacer protrusion 48 (second spacer; assigned by a reference numeral 48b in FIG. 7) of the second splice tool 40B.

If the front end of the anchoring fixation member 120 abuts the spacer protrusion 48b, in the bare optical fiber storage region FS2, the tip of the second optical fiber 12a protruding to the front side from the front end of the anchoring fixation member 120 abuts (butts) the tip of first optical fiber 11a fixed to the splice 30.

Specifically, the abutment between tips of the first and second optical fibers 11a and 12a is performed by butting the tip of the bare optical fiber 2a led-out to the tip portion of the second optical fiber 12a and the tip of the bare optical fiber 2a led-out to the tip portion of the first optical fiber 11a.

At this time, since the fixation of the first optical fiber 11a to the splice 30 is completed, when the second optical fiber 12a abuts (butts) the first optical fiber 11a, the position deviation in the longitudinal direction with respect to the splice 30 does not occur in the first optical fiber 11a.

Here, a case will be described in which total protrusion lengths of the optical fibers 2 of the optical fiber cables 11 and 12 are set to be 0.05 mm or more longer than a separation distance (hereinafter, also referred to as the distance between fixation member when insertion is completed) between the anchoring fixation members 120 when the fixing member attached cable terminals 1a of the optical fiber cables 11 and 12 are positioned at the fiber insertion completion positions.

In this case, in the second fiber inserting and anchoring process, when the anchoring fixation member 120 (second anchoring fixation member) fixed to the second optical fiber cable 12 reaches the fiber insertion completion position, in the second optical fiber 12a, the bending having a visible size can be formed between the second anchoring fixation member 120 and the half-split grip member 34 of the splice 30.

In this case, by visually confirming that the bending is formed in the second optical fiber 12a, confirmation of the abutment can be performed.

However, in the optical fiber splicing method, even when the difference between total protrusion lengths of the optical fibers 2 of the optical fiber cables 11 and 12 and the distance between fixation members when insertion is completed is less than 0.05 mm, the bending can be reliably formed in the second optical fiber 12a.

In the optical fiber splicing method, by forming the bending in the second optical fiber 12a, the second optical fiber 12a can reliably abut the first optical fiber 11a by the elastic force (a restoring force which cause the second optical fiber 12a to be returned to a linear shape).

Due to this, in the optical fiber splicing method, when the optical fibers 2 abut each other, confirmation of the bend formation of the optical fiber 2 can be omitted.

In the second fiber inserting and anchoring process, a configuration may be adopted in which the protrusion length of the second optical fiber 12a is set to a length which is not enough (a bending having a minute size, by which a visual confirmation is difficult, is formed) to realize the bend formation having a visible size for abutment confirmation in the second optical fiber 12a, when the second anchoring fixation member reaches the fiber insertion completion position.

Subsequently, the insertion pieces 41 is pulled out from the splice 30 by applying the pressing force P (refer to FIG. 10), which causes the pair of elastic operation pieces 44 to approach each other, to the second splice tool 40B, and thus, the second splice tool is removed from the unit main body 10A.

Subsequently, the lever member 25 is rotated from the waiting position to the retraction restriction position, the anchoring fixation member 120 engages with the lever member 25, and the retraction of the fixing member attached cable terminal 1a with respect to the splice 30 is restricted (anchored).

At this time, the anchoring fixation member 120 is pressed by the lever member 25 and advances, and thus, the bend formed in the second optical fiber 12a between the terminal of the optical fiber cable 12 and the splice 30 is increased.

Preferably, the size of the formed bend is the same as the bend formed in the first optical fiber 11a of the optical fiber cable 11.

Preferably, the bending has a size of an extent which does not influence optical characteristics of the second optical fiber 12a.

Accordingly, the fixing member attached cable terminal 1a of the second optical fiber cable 12 is anchored to the unit main body 10A, and the second fiber inserting and anchoring process is completed.

If the second fiber inserting and anchoring process is completed, the optical fiber cables 11 and 12 are anchored to the unit main body 10A, and thus, the fiber splice portion is assembled to have a configuration, in which the optical fibers led-out from the terminals of the optical fiber cables 11 and 12 are but-jointed at the splice 30 of the unit main body 10A.

This optical fiber splicing method is also referred to as a fiber splice portion assembling method by which the fiber splice portion is assembled.

The pulling-out of the insertion pieces 41 of the second splice tool 40B from the splice 30 is performed in the state where the abutment of the second optical fiber 12a with respect to the first optical fiber 11a is maintained.

Accordingly, if the pulling-out of the insertion pieces 41 of the second splice tool 40B from the splice 30 is completed, the second optical fiber 12a is gripped and fixed between the center cover member 322 and the base member 31 of the splice 30 and between the second side cover 323 and the base member 31 by the elasticity of the clamp spring 33 of the splice 30 in the state where the abutment of the second optical fiber with respect to the first optical fiber 11a is maintained.

As a result, the but-joint between the first optical fiber 11a and the second optical fiber 12a is stably maintained.

In the optical fiber splicing method of the embodiment according to the present invention, total protrusion lengths of the optical fibers 2 of the optical fiber cables 11 and 12 are set to be longer than the distance between fixation members when insertion is completed, the front end of the second anchoring fixation member abuts the spacer protrusion 48 (48b) of the second splice tool 40B in the second fiber inserting and anchoring process, and thus, the bend can be reliably formed in the second optical fiber 12a.

According to the optical fiber splicing method, even when the differences between the total protrusion lengths of the optical fibers 2 of the optical fiber cables 11 and 12 and the distance between fixation members when insertion is completed are small, the front end of the second anchoring fixation member abuts the spacer protrusion 48 (48b) of the second splice tool 40B in the second fiber inserting and anchoring process, and thus, the bend can be reliably formed in the second optical fiber 12a.

Accordingly, in the optical fiber splicing method, the visual confirmation of the abutment can be omitted.

As a result, in the optical fiber splicing method, the but-joint operation between the optical fibers can be reliably performed even when the operation is performed in a dark place or a narrow space.

In the optical fiber splicing method, the optical fibers can also be but-jointed without performing the bend formation of the optical fibers to confirm the abutment between the optical fibers.

The preferred embodiment of the present invention is described above. However, the present invention is not limited to the preferred embodiment of the present invention, and various modifications can be performed as long as there is no departure from the gist of the present invention.

The holder end plate portion 21b of the splice holder portion 21 of the optical fiber splicing unit 10 in the above described embodiment abuts the front end of the anchoring fixation member 120, and thus, since further advancement (shortening of the separation distance from the splice) of the anchoring fixation member 120 is restricted, the holder end plate portion 21b functions as the advancement restricting stopper protrusion protruding on the base plate portion 22 of the unit base 20.

However, since the advancement restricting stopper protrusion abuts the front end of the anchoring fixation member 120 and stops the advancement of the anchoring fixation member 120 at the position (advancement limit position) separated from the splice, the advancement restricting stopper protrusion may be any protrusion if the protrusion protrudes from the unit base 20 and is not limited to the holder end plate portion 21b.

For example, the advancement restricting stopper protrusion may include a protrusion protruding from the inner surface of the fixing member guide portion 24, or the like.

In the above-described embodiment, the configuration is exemplified where the advancement restricting stopper protrusion (specifically, the holder end plate portion 21b) also serves as the spacer receiving portion which puts the first spacer between the stopper protrusion and the anchoring fixation member 120. However, the optical fiber splicing unit of the embodiment according to the present invention is not limited thereto, and may also adopt a configuration in which the advancement restricting stopper protrusion and the spacer receiving portion are separately provided.

The splice holder portion of the optical fiber splicing unit may include any optical fiber splicing unit as long as it is capable of holding the splice at the center portion in the longitudinal direction of the elongated unit base, and the specific configuration of the splice holder portion is not particularly limited.

The splice holder portion may adopt a configuration in which the holder end plate portion is not provided.

For example, the splice holder portion may adopt a configuration which encloses and holds the splice from three directions by the center portion in the longitudinal direction of the base plate of the unit base and the side wall portions erected on both sides in the width direction.

In the above-described embodiment, the spacer protrusion 48 of the splice tool 40 of the optical fiber splicing unit 10 abuts the anchoring fixation member fixed to the optical fiber cable terminal, and functions as a spacer which positions the anchoring fixation member at the position (fiber insertion completion position) at which the separation distance of the anchoring fixation member from the splice is longer than the advancement limit position at which the anchoring fixation member abuts the advancement restricting stopper protrusion provided on the unit base 20.

However, the spacer of the optical fiber splicing unit of the embodiment according to the present invention is not limited to the spacer protrusion 48 of the splice tool 40, and may adopt a separate member from the splice tool 40.

In this case, the splice tool may not include the spacer protrusion 48.

The spacer may be any spacer as long as it can be disposed to restrict the movement of the anchoring fixation member in the direction approaching the splice at a predetermined position during use at which it abuts the anchoring fixation member and it can be provided on the unit base so as to move from the position during use to the position at which it does not abut the anchoring fixation member, and the specific shape, the attachment structure with respect to the unit base, or the like is not particularly limited.

In the optical fiber splicing method (fiber splice portion assembling method) of the above-described embodiment, the second fiber inserting and anchoring process includes the process (fiber insertion process) which advances the anchoring fixation member 120 fixed to the terminal of the second optical fiber cable 12 toward the splice 30 to the position at which the anchoring fixation member 120 abuts the spacer (spacer protrusion 48), and inserts the second optical fiber 12a into the splice 30.

However, the optical fiber splicing method according to the present invention may also adopt a method which realizes the positioning of the second optical fiber 12a with respect to the first optical fiber 11a by abutting the optical fiber 12a (second optical fiber) led-out from the terminal of the second optical fiber cable 12 to the tip of the first optical fiber 11a which is gripped and fixed to the splice 30, without using the spacer in the fiber insertion process of the second fiber inserting and anchoring process.

In the above-described embodiment, the configuration is exemplified where the sheath grip member is attached to the fiber cable terminal as the anchoring fixation member and the optical fibers of the optical fiber cables are spliced to each other using the optical fiber splicing unit. However, the present invention is not limited to the splice between the optical fibers of the optical fiber cables.

The present invention may be applied to a configuration in which the anchoring fixation member (for example, a so-called fiber holder) is directly fixed to the coated optical fiber such as the optical fiber core wire or the optical fiber element wire and the coated optical fibers are spliced to each other.

In the above-described embodiment, the optical fiber splicing unit 10 includes the splice tool. However, the optical fiber splicing unit of the embodiment according to the present invention may not include the splice tool.

For example, in the optical fiber splicing unit of the above-described embodiment, since the unit portion body 10A can function as the optical fiber splicing unit according to the present invention, the unit main body itself may be used as the optical fiber splicing unit.

When the unit main body itself is used as the optical fiber splicing unit, in the optical fiber splicing unit of the above-described embodiment, it can be understood that the splice tool is attached to the unit main body which functions as the optical fiber splicing unit (tool attached fiber splicing unit).

The splice tool is not limited to the tool which includes the pull-out operation and driving portion.

For example, the splice tool may adopt a configuration which includes a handle portion, which is gripped by fingers of an operator and pulls and operates the elements of the splice in the pulling-out direction opposite to the back plate portion 33a of the clamp spring 33, from the tip portion (tip insertion portion) of the insertion piece inserted between the elements of the splice to the base end side.

Moreover, this splice tool may adopt a configuration in which only one insertion piece protrudes from the handle portion in addition to a configuration in which a plurality of insertion pieces protrude from the handle portion.

Moreover, the insertion piece may be any insertion piece as long as it can be pushed to open the portion between the half-split elements 31 and 32 to the extent, in which the optical fiber 2 can be inserted, against the elasticity of the clamp spring 33 and it can be pulled out from the portion between the elements 31 and 32, and the insertion pieces are not limited to the plate shapes.

For example, each of the insertion pieces may adopt a soft sheet shape, a rod shape, or the like.

The anchoring portion (anchoring means) of the optical fiber splicing unit may be any anchoring portion as long as it restricts the retraction of the anchoring fixation member, which is provided on both fixing member guide portions in the longitudinal direction of the unit base, from the splice, and it is anchored to the unit base. That is, the anchoring portion is not limited to the lever member and may adopt various configurations.

Moreover, the anchoring portion is not limited to the configuration which is attached to the unit base, and may be a member which is installed later and is separate from the attached unit base.

The anchoring portion may also adopt a configuration which does not include the fixing member pressing and advancing portion (the inclined surface 25d for advancing the fixing member in FIG. 13 in the lever member 25 of the above-described embodiment).

For example, as the anchoring portion which does not include the fixing member pressing and advancing portion, an elastic engagement claw or the like may be also adopted, which protrudes from the fixing member guide portion, fixes the anchoring fixation member at the advancement limit position, at which the anchoring fixation member abuts the advancement restricting stopper protrusion, by the engagement with the anchoring fixation member, and restricts the retraction of the anchoring fixation member with respect to the splice.

When a configuration which does not include the fixing member pressing and advancing portion is adopted as the anchoring portion, in the optical fiber splicing method (fiber splice portion assembling method), for example, after the anchoring fixation member, which abuts the spacer and is positioned at the insertion setting position, moves to the position at which the spacer does not abut the anchoring fixation member, the anchoring fixation member advances by pressing with a finger of the operator or the like and is positioned at the advancement limit position at which the anchoring fixation member abuts the advancement restricting stopper protrusion, and the anchoring fixation member is anchored at the advancement limit position by the anchoring portion.

In the optical fiber splicing unit, a configuration may also be adopted in which the advancement restricting portion, which restricts the advancement of the advanced anchoring fixation member after the spacer is retracted from the position during use, is provided in addition to the advancement restricting stopper protrusion of the unit base.

Figure 21:
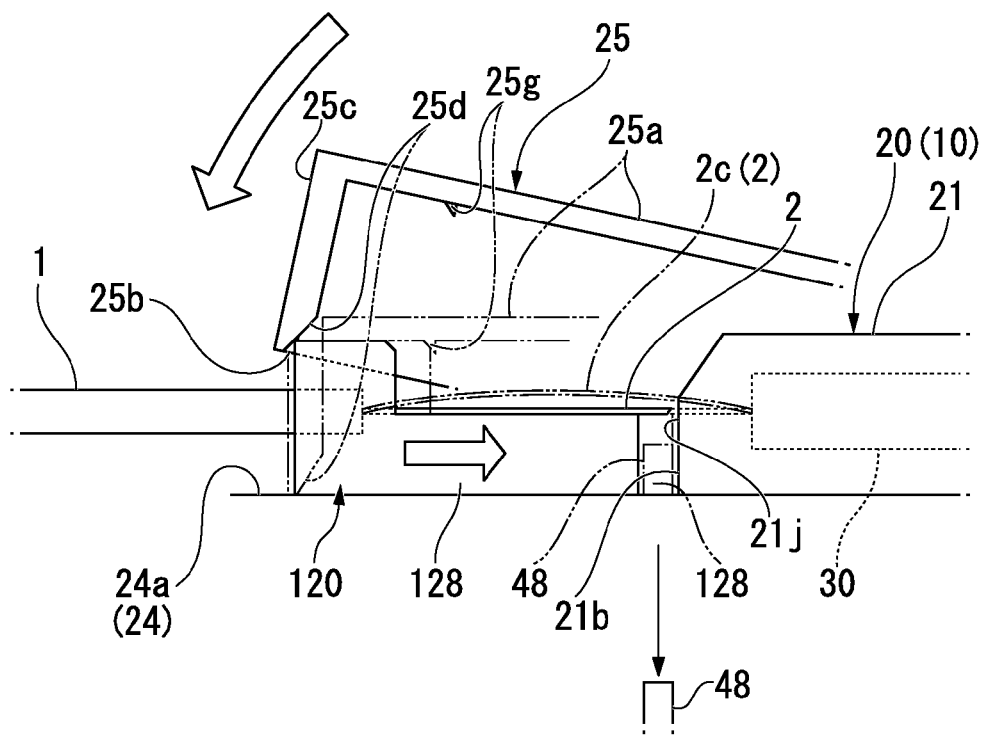
FIG. 21 is a model diagram showing another aspect of the lever member.

FIG. 21 exemplifies a configuration in which a protrusion 25g (advancement restricting protrusion) protrudes as an advancement restricting portion, and the protrusion 25g restricts advancement of the anchoring fixation member by abutting the anchoring fixation member to the top plate portion 25a of the lever member 25, the anchoring fixation member advancing after retracting from the position during use of the spacer.

In the configuration of FIG. 21, after the anchoring fixation member 120 is retracted from the position during use of the spacer, the anchoring fixation member 120 is put between the engagement piece portion 25c and the protrusion 25g of the lever member 25 which is rotated from the waiting position to the retraction restriction position, and is fixed to be held.

When the lever member 25 is positioned at the waiting position, if the spacer is positioned at the position at which the spacer does not abut the anchoring fixation member 120 which moves while being guided by the fixing member guide portion, the anchoring fixation member 120 can abut the advancement restricting stopper protrusion, and the position at which the anchoring fixation member 120 abuts the advancement restricting stopper protrusion becomes the advancement limit position.

Moreover, in FIG. 21, the configuration, in which the holder end plate portion 21b of the splice holder portion 21 is used as the advancement restricting stopper protrusion, is an exemplary example. The front end of the anchoring fixation member 120 of the holder end plate portion 21b of the shown example abuts the fixing member abutting surface 21j, the fixing member abutting surface 21j is positioned at a position which is deviated to the splice 30 side from the front end of the anchoring fixation member 120 which fixed to be held between the engagement piece portion 25c and the protrusion 25g of the lever member 25.

The anchoring fixation member 120, which fixed to be held between the engagement piece portion 25c and the protrusion 25g of the lever member 25, does not abut the holder end plate portion 21b.

Second Embodiment

Hereinafter, a second embodiment of the present invention will be described with reference to the drawings.

First, an outline of the second embodiment according to the present invention will be described with reference to FIGS. 39A to 39F, and thereafter, a more specific embodiment will be described with reference to FIGS. 20, and 22 to 38.

Moreover, in the present embodiment, the same reference numerals are assigned to the same components as the first embodiment.

<Optical Fiber Splicing Method>

An optical fiber splicing method of the present embodiment is a method in which the optical fiber 11a which is drawn from the terminal of the first optical fiber cable 11 to be exposed (protruded) and the optical fiber 12a which is drawn from the terminal of the second optical fiber cable 12 to be exposed (protruded) are but-jointed using the mechanical splice 30, and thus, the optical fiber cables 11 and 12 are spliced to each other.

The optical fibers 11a and 12a is a coated optical fiber which is configured by covering the outer circumference surface (side surface) of the bare optical fiber 2a with the coating 2b, and for example, as the optical fiber, an optical fiber core wire, an optical fiber element wire, or the like may be used.

The reference numeral 120 indicates each of the anchoring fixation members which is fixed to the terminal of each of the optical fiber cables 11 and 12.

The mechanical splice 30 (hereinafter, simply referred to as the splice) can put the optical fibers between the half-split elements 31 and 32.

The splice 30 has a structure which collectively holds the elements (base member 31 and pressing cover 32) inside the clamp sprig 33, and can put the optical fibers between the elements 31 and 32 by the elasticity of the clamp spring 33.

In one end side (the right end side in FIGS. 39A to 39F) in the longitudinal direction of the splice 30, an insertion member (not shown) of a third splice tool 1041 is pushed to open the portion between the elements 31 and 32 against the elasticity of the clamp spring 33 to such an extent that the optical fibers 11a and 12a can be inserted between the elements 31 and 32.

In the other end side (the left end side in FIGS. 39A to 39F) in the longitudinal direction of the splice 30, an insertion member (not shown) of a fourth splice tool 1042 is pushed to open the portion between the elements 31 and 32 to such an extent that the optical fibers 11a and 12a can be inserted.

Figure 39A:
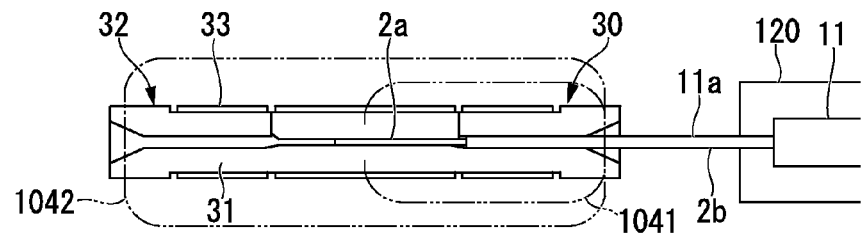
FIG. 39A is a view showing an outline of the splicing method of the optical fiber of the present invention.

As shown in FIG. 39A, the first optical fiber 11a is inserted between the elements 31 and 32 from one end side (the right end side in FIGS. 39A to 39F) of the splice 30.

Preferably, the tip portion of the first optical fiber 11a advances until the tip portion slightly reaches the other side (the left end side in FIGS. 39A to 39F) from the center position in the longitudinal direction of the splice 30.

Figure 39B:
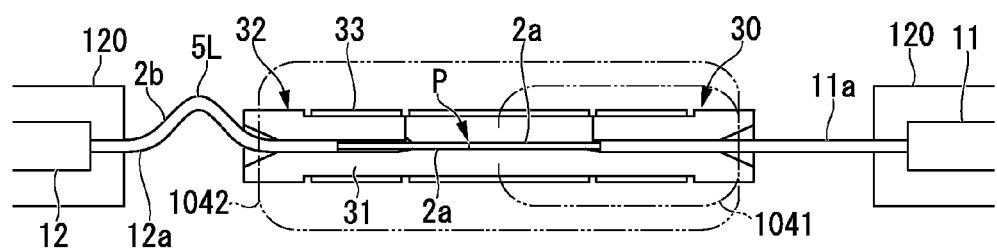
FIG. 39B is a view showing the outline of the splicing method of the optical fiber of the present invention.

As shown in FIG. 39B, the second optical fiber 12a is inserted between elements 31 and 32 from the other end side (the left end side in FIGS. 39A to 39F) of the splice 30 and butts the first optical fiber 11a, and a bent portion 5L is formed in the second optical fiber 12a by the abutment.

Figure 39C:
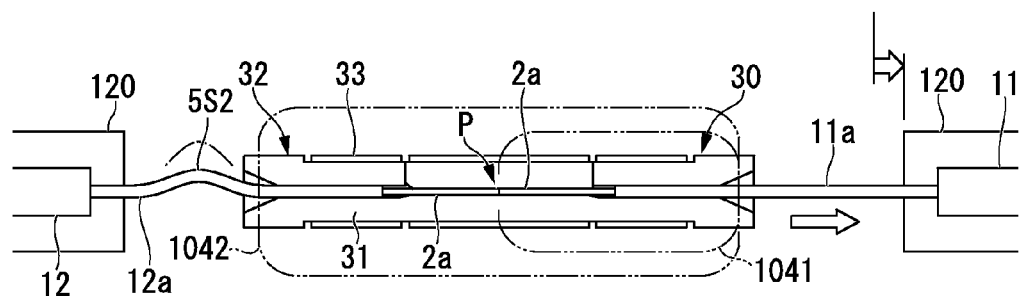
FIG. 39C is a view showing the outline of the splicing method of the optical fiber of the present invention.
Figure 39D:
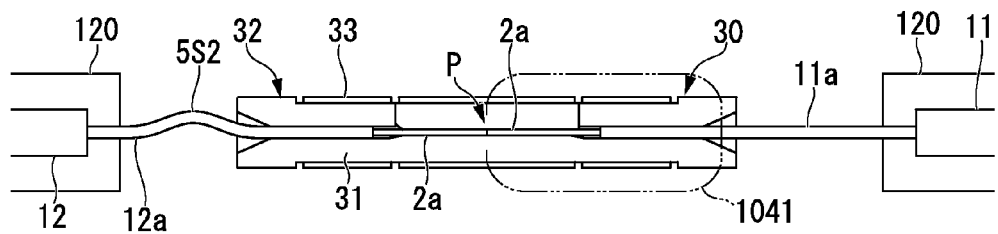
FIG. 39D is a view showing the outline of the splicing method of the optical fiber of the present invention.
Figure 39E:
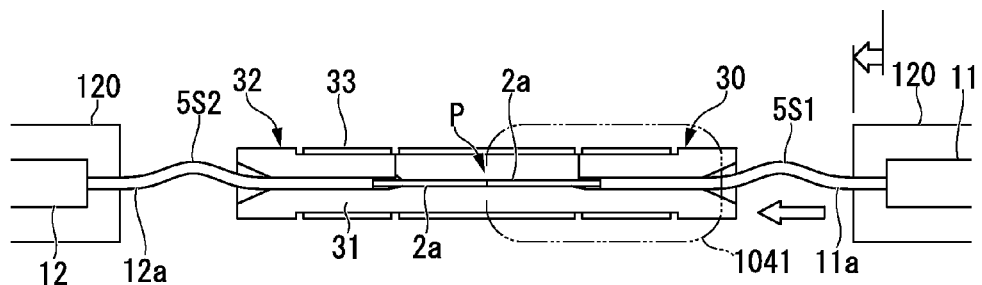
FIG. 39E is a view showing the outline of the splicing method of the optical fiber of the present invention.
Figure 39F:
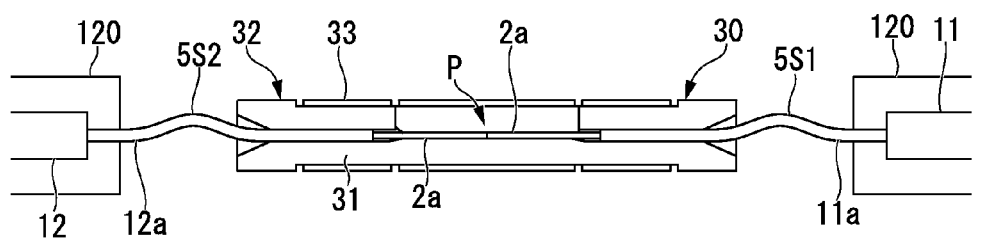
FIG. 39F is a view showing the outline of the splicing method of the optical fiber of the present invention.

At this time, a movement amount of the second optical fiber 12a is set so that the bent portion 5L formed in the second optical fiber 12a is larger than an assumed appropriate bent portion 5S2 (refer to FIG. 39F or the like).

A reference numeral P indicates a splice point between the optical fibers 11a and 12a.

The splice point P of the shown example is positioned at a position slightly close to the left-hand side from the center of the splice 30.

As shown in FIG. 39C, the first optical fiber 11a retracts, and thus, the second optical fiber 12a advances by elastic force of the bent portion 5L.

When the advancement of the second optical fiber 12a is not sufficient, the operator pushes the bent portion 5L using a finger to promote the advancement of the second optical fiber 12a.

According to the advancement of the second optical fiber 12a, the bent portion 5L becomes a smaller bent portion 5S2.

According to this, the splice point P between the optical fibers 11a and 12a also move to the one end (the right end side in FIGS. 39A to 39F).

In the shown example, the splice point P moves to the center of the splice 30.

As shown in FIG. 39D, by extracting the insertion member of the fourth splice tool 1042 from the elements 31 and 32, the second optical fiber 12a is put between the elements 31 and 32 by the elasticity of the clamp spring 33, and is gripped and fixed at the other end side (the left end side in FIGS. 39A to 39F) of the splice 30.

Accordingly, the second optical fiber 12a is gripped and fixed to the splice 30 in a state where the second optical fiber has the appropriate bent portion 5S2.

As shown in FIG. 39E, the first optical fiber 11a advances, and thus, a bent portion 5S1 is formed in the first optical fiber 11a by the abutment with respect to the second optical fiber 12a.

As shown in FIG. 39F, by extracting the insertion member of the second splice tool 1041 from the elements 31 and 32, the first optical fiber 11a is put between the elements 31 and 32 by the elasticity of the clamp spring 33, and is gripped and fixed at the one end side (the right end side in FIGS. 39A to 39F) of the splice 30.

Accordingly, the first optical fiber 11a is gripped and fixed to the splice 30 in a state where the first optical fiber has the appropriate bent portion 5S1.

Preferably, the size of the bent portion 5S1 is approximately the same as the size of the bent portion 5S2 of the second optical fiber 12a.

According to the above-described processes, the first optical fiber 11a and the second optical fiber 12a are spliced to each other in the state where the fibers 11a and 12a have appropriate bent portions 5S1 and 5S2 respectively.

Next, the present invention will be described in more details with reference to FIGS. 20, and 22 to 38.

An optical fiber splicing unit 1010 (hereinafter, referred to as an optical splicing unit 1010) shown in FIGS. 22 to 24 can be applied to the splice (optical splice) between optical fiber cables of the optical fiber splicing method of the present invention.

Moreover, similar to the optical fiber splicing unit of the first embodiment, the optical fiber cable 1 (optical fiber cables 11 and 12) is configured by collectively coating the sheath 4 made of a synthetic resin so that an optical fiber 2 and linear tensile strength bodies 3 having flexibility are in parallel with one another.

As the tensile strength bodies 3, for example, a body formed of tensile strength fibers such as aramid fibers, a steel wire, or the like may be used.

The optical fiber 2 is a coated optical fiber which is configured by covering the outer circumference surface (side surface) of the bare optical fiber 2a with the coating 2b, and for example, as the optical fiber, an optical fiber core wire, an optical fiber element wire, or the like may be used.

For example, the bare optical fiber 2a is a quartz optical fiber.

Moreover, for example, the coating 2b is a resin coating in which a single layer or a plurality of layers formed of an ultraviolet curing resin, a polyamide resin, or the like are substantially concentrically coated.

As the optical fiber cable 1, an indoor cable, a drop cable, or the like may be used.

Figure 22:
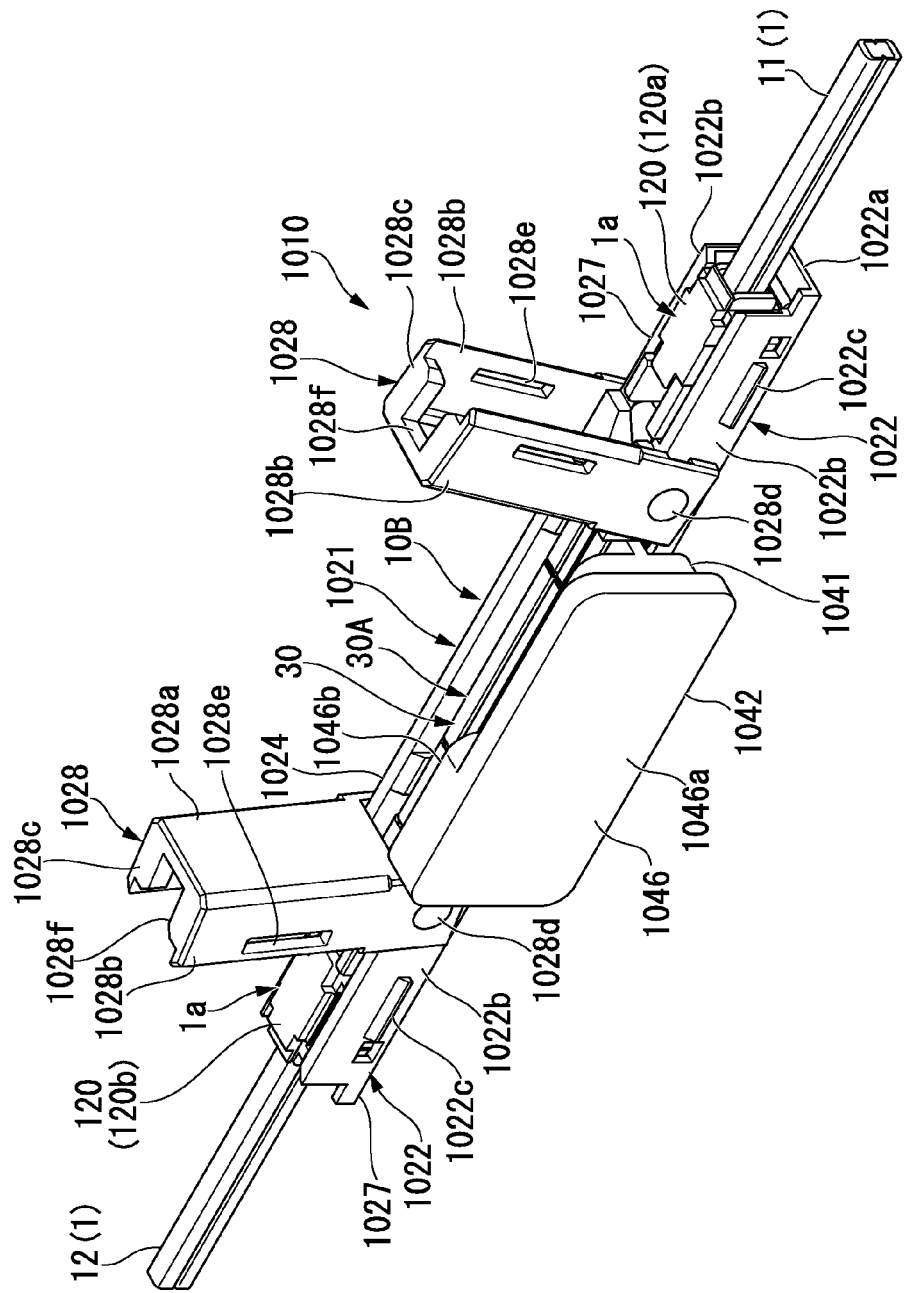
FIG. 22 is a perspective view showing an optical fiber splicing unit to which a splicing method of an optical fiber according to an embodiment of the present invention can be applied.
Figure 23:
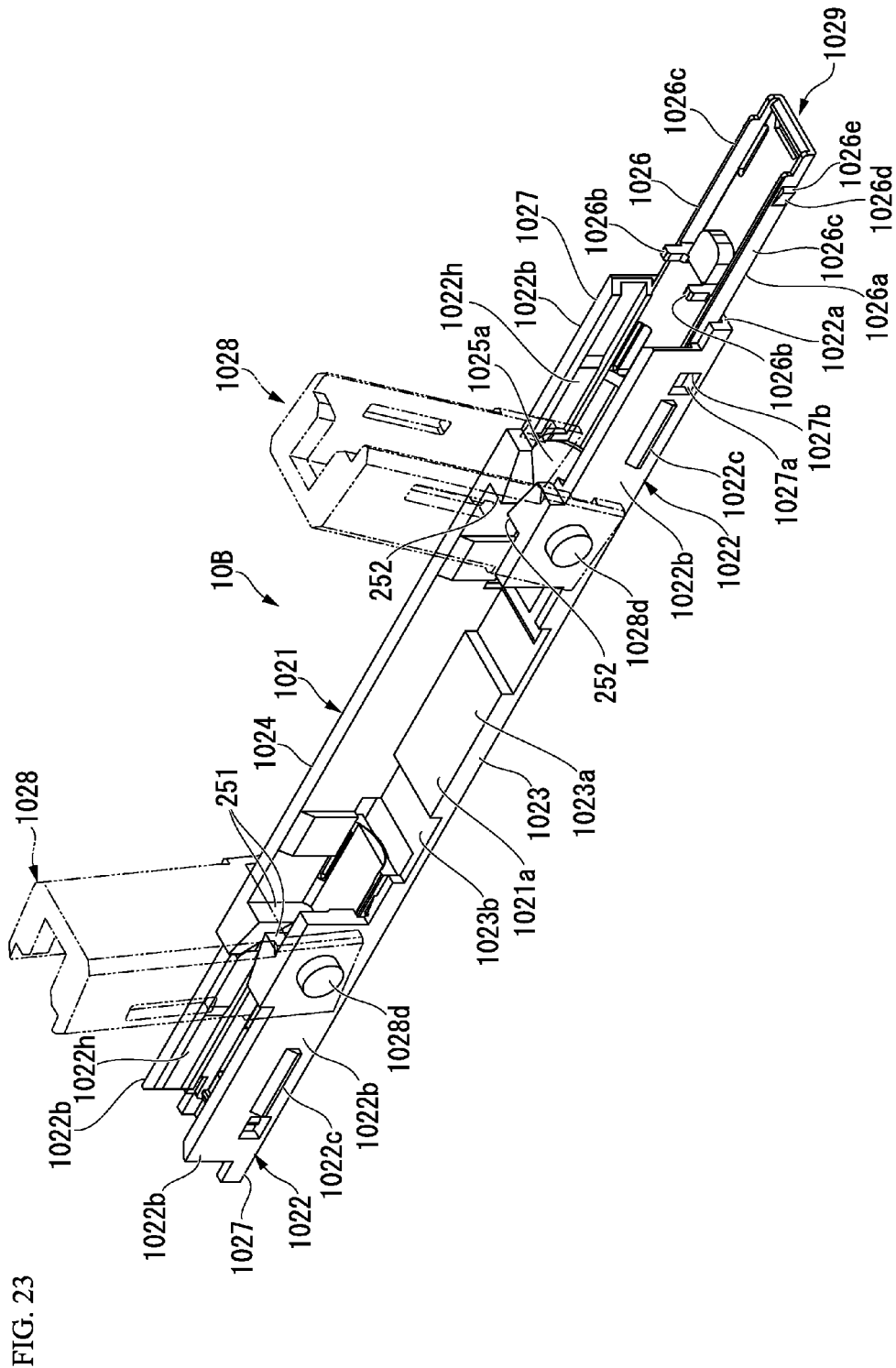
FIG. 23 is a perspective view showing a structure of a unit main body of the optical fiber splicing unit of FIG. 22.
Figure 24:
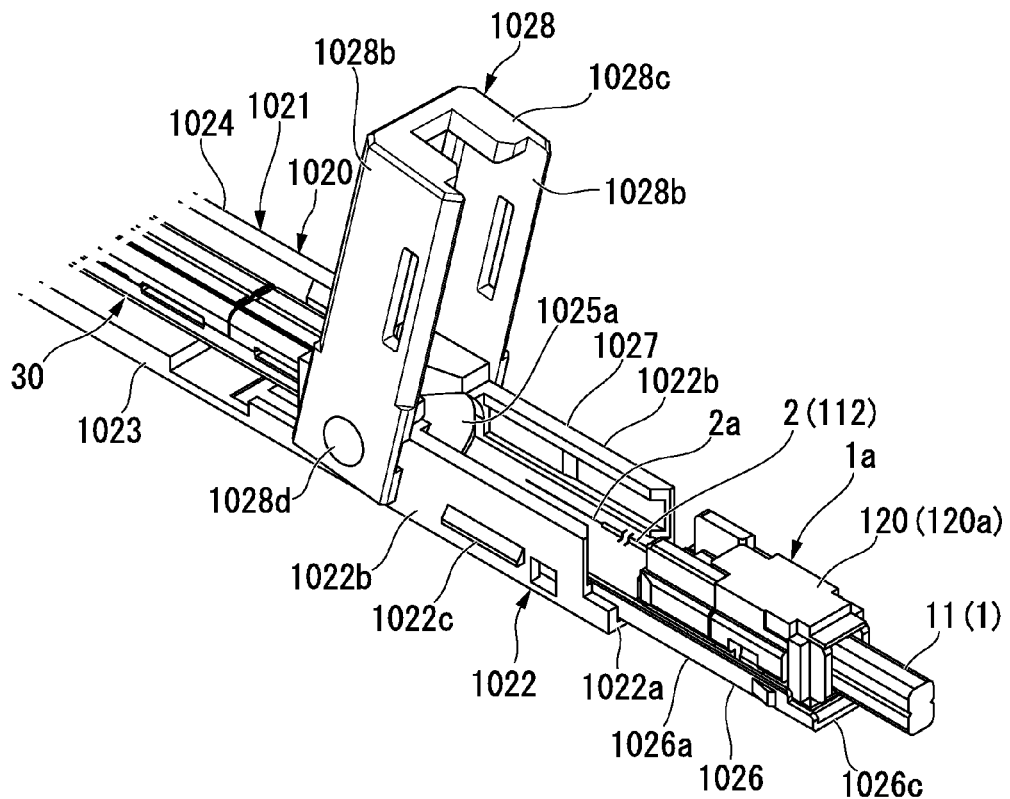
FIG. 24 is a perspective view showing the optical fiber splicing unit of FIG. 22.

As shown in FIGS. 22 to 24, the optical splicing unit 1010 of the second embodiment of the present invention is used for splicing the optical fiber cables 11 and 12 to each other by but-joint optical fibers 11a and 12a which are exposed (protruded) from terminals of the optical fiber cables 11 and 12.

The optical splicing unit 1010 includes the mechanical splice 30 (hereinafter, simply referred to as the splice) which puts the optical fibers between the half-split elements 31 and 32, and an elongated unit main body 10B which includes a splice holder portion 1021 holding the splice 30 at the center portion in the longitudinal direction.

The unit main body 10B includes a splice holder portion 1021 which accommodates the splice 30, and cable anchors 1022 which are provided on both ends in the longitudinal direction of the unit main body 10B, and accommodates and anchors the anchoring fixation members 120 fixed to terminals of the optical fiber cables 11 and 12.

The splice 30 has a structure which collectively holds half-split elements (base member 31 and pressing cover 32 described below) inside the elongated clamp spring 33 which extends to have a U-shaped cross-section or a C-shaped cross-section (U-shaped cross-section in the shown example).

The splice 30 can put the optical fiber between the half-split elements 31 and 32 by the elasticity of the clamp spring 33.

The optical splicing unit 1010 includes the third and fourth splice tools 1041 and 1042 which includes insertion pieces 1045 and 1048 (insertion members) (described below; refer to FIGS. 25 to 27) which can be inserted between the half-split elements 31 and 32 of the splice 30.

Hereinafter, the splice 30, in which the insertion pieces 1045 and 1048 are inserted between the half-split elements 31 and 32, is also referred to as the insertion member attached splice.

The insertion member attached splice 30A of the shown example has a configuration in which the insertion pieces 1045 and 1048 of the splice tools 1041 and 1042 are inserted between the half-split elements 31 and 32 of the splice 30.

Moreover, since the splice principle between the optical fibers according to the second embodiment of the present invention is similar to the first embodiment, detailed descriptions thereof are omitted here.

As shown in FIGS. 22 to 24, in the optical splicing unit of the present embodiment, the unit main body 10B of the optical splicing unit 1010 of the shown example may be an integrally molded plastic part.

The unit main body 10B includes elongated plate-shaped bottom wall portion 1023.

The splice holder portion 1021 of the unit main body 10B includes holder side wall portion 1024 which are erected at the center portion in the longitudinal direction of the bottom wall portion 1023.

The holder side wall portion 1024 is erected on one side edge in a width direction which is a direction perpendicular to the longitudinal direction on an upper surface 1023a from the bottom wall portion 1023, and is formed to extend in the longitudinal direction of the bottom wall portion 1023.

An engagement groove portion 1023b is formed on the upper surface 1023a of the bottom wall portion 1023 in a short direction of the bottom wall portion 1023.

The splice holder portion 1021 includes stopper wall portions 251 and 252 which are erected on the bottom wall portion 1023 at both end positions in the longitudinal direction of the bottom wall portion 1023.

Both end surfaces in the longitudinal direction of the splice 30 can abut the stopper wall portions 251 and 252, and the stopper wall portions can position the splice 30 in the longitudinal direction with respect to the unit main body 10B.

In the splice holder portion 1021, the splice 30 is stored to be positioned in a space which is configured of the bottom wall portion 1023, the holder side wall portion 1024, and the stopper wall portions 251 and 252.

The back plate portion 33a of the clamp spring 33 faces the holder side wall portion 1024, one of the pair of side plate portions 33b of the clamp spring 33 abuts the holder bottom wall portion 1021a, and the splice 30 is accommodated in the splice holder portion 1021.

That is, the splice 30 is accommodated in the splice holder portion 1021 so that a side (open side) opposite to the back plate portion 33a of the clamp spring 33 via the half-split grip member 34 is directed to the side at which the holder side wall portion 1024 is not formed.

Figure 25:
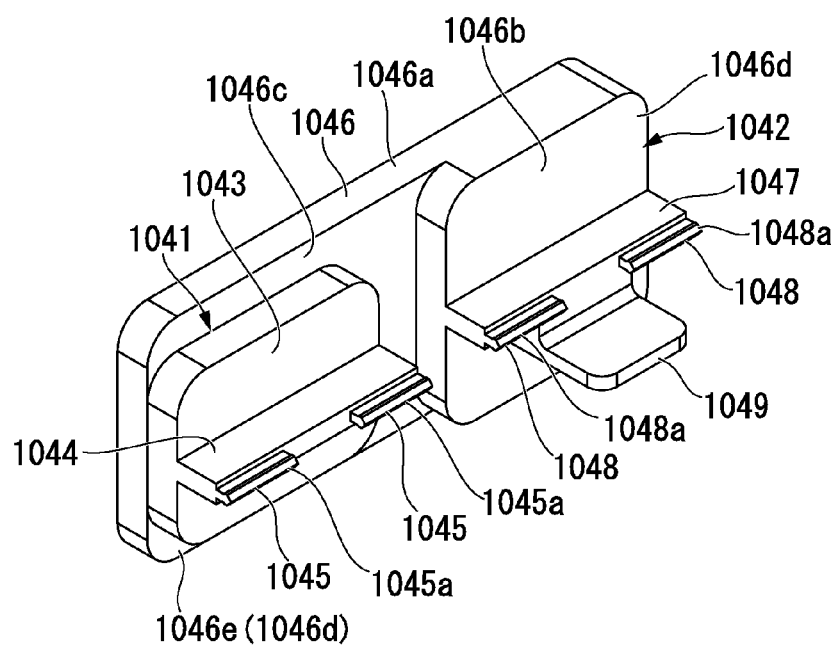
FIG. 25 is a perspective view showing first and second splice tools of the optical fiber splicing unit of FIG. 22.
Figure 26:
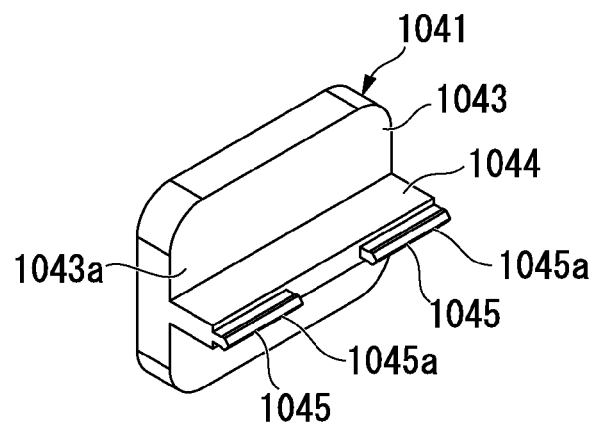
FIG. 26 is a perspective view showing the first splice tool of FIG. 25.

As shown in FIGS. 25 and 26, the first splice tool 1041 includes a substrate portion 1043 having an approximately rectangular shape, a plate-shaped protruding plate portion 1044 which is formed to protrude from one surface 1043a of the substrate portion 1043, and insertion pieces 1045 and 1045 which are formed to further protrude from the tip of the protruding plate portion 1044.

The first splice tool 1041 of the shown example is an integrally molded plastic part.

The protruding plate portion 1044 is formed to be perpendicular to the substrate portion 1043 along the longitudinal direction of the substrate portion 1043.

The insertion pieces 1045 and 1045 are formed to be inserted between the half-split elements 31 and 32 of the splice 30, and are formed in a plate shape extending along the protruding plate portion 1044.

In the shown example, two insertion pieces 1045 and 1045 are formed at an interval in the longitudinal direction of the protruding plate portion 1044.

Figure 27:
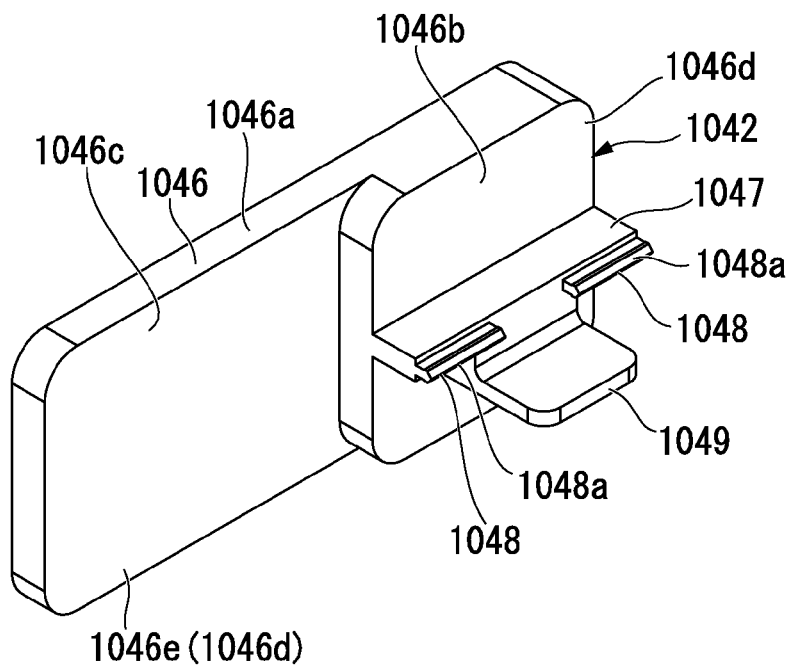
FIG. 27 is a perspective view showing the second splice tool of FIG. 26.

As shown in FIGS. 25 and 27, the fourth splice tool 1042 includes a substrate portion 1046 having an approximately rectangular shape, a plate-shaped protruding plate portion 1047 which is formed to protrude from one surface 1046d of the substrate portion 1046, and insertion pieces 1048 and 1048 which are formed to further protrude from the tip of the protruding plate portion 1047, and a positioning protruding piece 1049 which is formed to protrude from the one surface 1046d of the substrate portion 1046.

The fourth splice tool 1042 of the shown example is an integrally molded plastic part.

The substrate portion 1046 includes a plate-shaped base portion 1046a, and a table portion 1046b which is formed to thicken a portion including one end portion in the longitudinal direction of the base portion 1046a.

The table portion 1046b is formed to protrude from the base portion 1046a at one surface 1046e (one surface 1046d of the substrate portion 1046) side of the base portion 1046a, and preferably, the protrusion height of the table portion (the protrusion dimension in the thickness direction from the base portion 1046a) is substantially the same as that of the substrate portion 1043 of the first splice tool 1041.

The protruding plate portion 1047 is formed on the table portion 1046b to be perpendicular to the substrate portion 1046 along the longitudinal direction of the substrate portion 1046.

The insertion pieces 1048 and 1048 are formed to be inserted between the half-split elements 31 and 32 of the splice 30, and are formed in a plate shape extending along the protruding plate portion 1047.

In the shown example, two insertion pieces 1048 and 1048 are formed at an interval in the longitudinal direction of the protruding plate portion 1047.

The positioning protruding piece 1049 is formed on the table portion 1046b to be perpendicular to the substrate portion 1046 along the longitudinal direction of the substrate portion 1046.

The width dimension (the dimension in the longitudinal direction of the substrate portion 1046) of the positioning protruding piece 1049 is approximately the same as the width dimension (the dimension in the longitudinal direction of the bottom wall portion 1023) of the engagement groove portion 23b of the bottom wall portion 1023 of the splice holder portion 1021, or is slightly smaller than the width dimension of the engagement groove portion.

Accordingly, in the state where the positioning protruding piece 1049 is inserted into the engagement groove portion 1023b, the fourth splice tool 1042 restricts the movement in the longitudinal direction of the splice holder portion 1021 with respect to the splice holder portion 1021.

As shown in FIG. 25, the third splice tool 1041 is disposed on one surface 1046e (a portion in which the table portion 1046b is not present) of the base portion 1046a of the fourth splice tool 1042.

In this state, two insertion pieces 1045 and two insertion pieces 1048 are linearly arranged in the longitudinal direction of the substrate portion 1046 of the third splice tool 1042.

As shown in FIG. 14, in the half-split grip members 34 of the splice 30, the insertion member through holes 35 for inserting the insertion member are opened to the side surface which is exposed to the side (hereinafter, referred to as an open side) opposite to the back plate portion 33a of the clamp spring 33.

As shown in FIG. 15, the insertion member through holes 35 are secured between the base member 31 and the cover members 321, 322, and 323 by insertion member through grooves 31g, 321c, 322c, and 323c which are formed at mutually corresponding positions of the facing surfaces 31a, 321a, 322a, and 323a of the base member 31 and three cover members 321, 322, and 323.

Moreover, the insertion member through holes 35 are formed by depths which do not reach the aligning groove 31b and the coating portion insertion grooves 31c, 31d, 321b, and 323b from the open side surface of the half-split grip member 34.

Moreover, as the insertion member through holes 35, a configuration may be adopted in which the insertion piece through holes 35 are secured by the insertion member through grooves formed on only one side of the base member 31 and the cover members 321, 322, and 323.

As shown in FIG. 14, in the splice 30 of the shown example, the insertion piece through holes 35 are formed at total four locations, which includes two locations corresponding to both ends in the longitudinal direction of the base member 31 in the center cover 322, and two locations corresponding to the center portions in the direction along the longitudinal direction of the base member 31 of the first side cover 321 and the second side cover 323.

The positions of four insertion pieces 1045 and 1048 of the splice tools 1041 and 1042 correspond to four insertion member through holes 35 of the splice 30.

Figure 28:
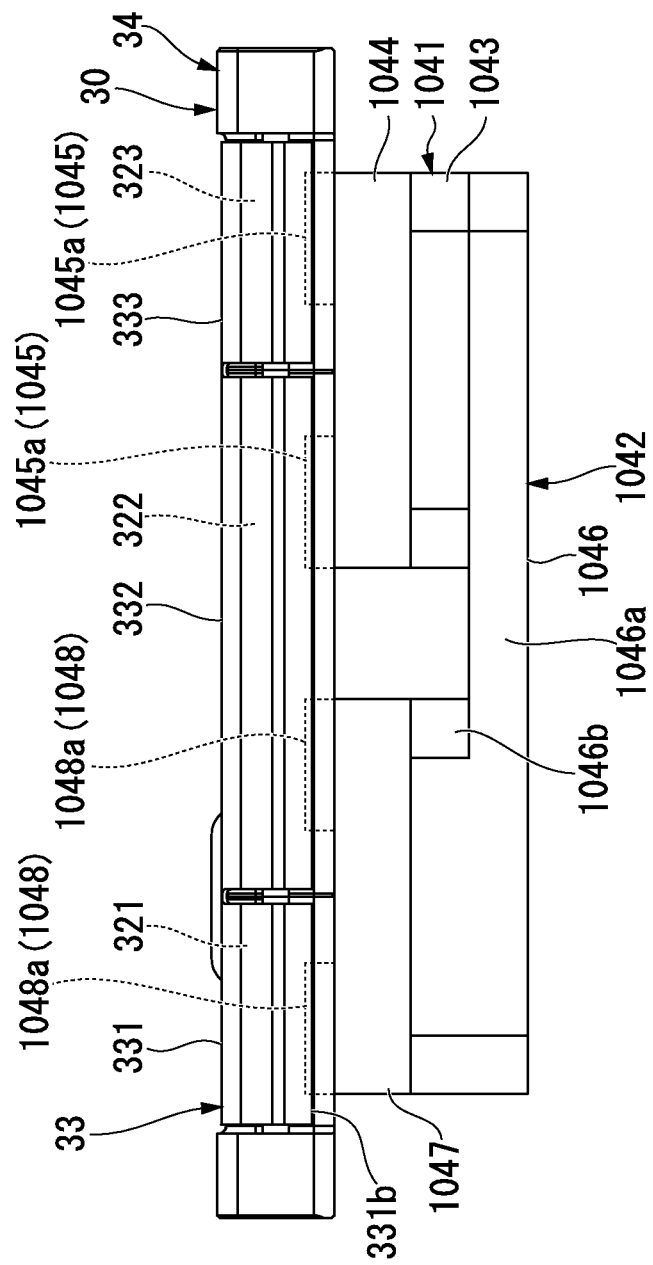
FIG. 28 is a view showing a relationship between an insertion member (insertion piece) of the splice tool and the mechanical splice.

As shown in FIG. 28, in the insertion pieces 1045 and 1048 of the splice tools 1041 and 1042, tip portions 1045a and 1048a, which are formed in a plate shape, are inserted between the base member 31 and the pressing cover 32 of the splice 30.

Accordingly, in the one end side (the right end side of FIG. 28) in the longitudinal direction of the splice 30, the insertion pieces 1045 and 1048 of the first splice tool 1041 is pushed to open the portion between the one end side (the right end side) of the cover member 322 and the cover member 323, and the base member 31 against the elasticity of the clamp spring 33 to such an extent that the optical fibers 11a and 12a can be inserted.

Moreover, in the other end side (the left end side of FIG. 28) in the longitudinal direction of the splice 30, the insertion pieces 1048 and 1048 of the fourth splice tool 1042 is pushed to open the portion between the other end side (the left end side) of the cover member 322 and the cover member 321, and the base member 31 against the elasticity of the clamp spring 33 to an extent such that the optical fibers 11a and 12a can be inserted.

As shown in FIG. 22, if the splice tools 1041 and 1042 are assembled to the splice 30 by inserting insertion pieces 1045 and 1048 between the elements 31 and 32, the first splice tool 1041 is covered by the base portion 1046a of the substrate portion 1046 of the fourth splice tool 1042.

Since the first splice tool 1041 cannot be extracted in this state, an incorrect operation such as extracting of the third splice tool 1041 prior to the fourth splice tool 1042 can be prevented.

Each of the insertion piece 1045 and 1048 may be any insertion piece as long as it can be pushed to open the portion between the half-split elements 31 and 32 to the extent, in which the optical fiber 2 can be inserted, against the elasticity of the clamp spring 33 and it can be pulled out from the portion between the elements 31 and 32, and the insertion pieces are not limited to the plate shapes.

For example, each of the insertion pieces may adopt a soft sheet shape, a rod shape, or the like.

Moreover, since each of the insertion pieces (insertion member) may be any insertion piece as long as it is pulled out from the portion between the half-split elements 31 and 32 from the state where it is inserted between the elements 31 and 32 of the splice 30, the insertion pieces may be also applied to the splice in which the insertion member through holes 35 are not formed on the half-split grip members 34.

As shown in FIG. 25, the tips of the plate-shaped insertion pieces 1045 and 1048 of the splice tools 1041 and 1042 are formed in tapered shapes.

After the insertion pieces 1045 and 1048 are pulled out from the half-split grip member 34 of the splice 30, the tip portions 1045a and 1048a can be pushed to be inserted between the base member 31 and the pressing cover 32 (can assemble the insertion member attached splice).

In addition, the optical fiber splicing unit 10 in a state where the insertion members are removed from the splice 30 is supplied to the field, and in the field, the insertion members may be inserted between the elements 31 and 32 of the splice 30 to assemble the insertion member attached splice.

As shown in FIGS. 22 to 24, each of the cable anchors 1022 of the unit main body 10B of the optical splicing unit 10 includes a main body portion 1027 which accommodates the anchoring fixation member 120, and an anchor cover 1028 which restricts the displacement of the anchoring fixation member 120 in the direction separated from the splice 30.

The anchor cover 1028 includes a top plate 1028a, side plates 1028b provided on both side portions of the top plate 1028a, and an end plate 1028c provided on one end portion of the top plate 1028a.

The anchor cover 1028 is rotatably attached to the main body portion 1027 at a shaft portion 1028d of the other end portion of both side plates 1028b.

The anchor cover 1028 is rotated to a closed position (refer to FIG. 37) with the shaft portion 1028d as a fulcrum to cover the main body portion 1027, and can restrict the displacement of the anchoring fixation member 120 in the direction separated from the splice 30 by the end plate 1028c.

A notch-shaped cable insertion portion 1028f, through which the optical fiber cable 1 is inserted, is formed in the end plate 1028c.

In the closed position of the anchor cover 1028, locking opening portions 1028e of the side plates 1028b are locked to the locking protrusions 1022c of the main body portion 1027, and thus, the closed state of the anchor cover is maintained.

The main body portion 1027 includes an anchoring portion bottom wall portion 1022a, and two anchoring portion side wall portions 1022b which are erected on both sides in the width direction of the anchoring portion bottom wall portion 1022a.

In the main body portion 1027, the anchoring fixation member 120 fixed to the terminal of the optical fiber cable 1 is accommodated in a groove-shaped space which is surrounded in three sides by the anchoring portion bottom wall portion 1022a and two anchoring portion side wall portions 1022b.

The anchoring fixation member 120 is provided to enclose the outer circumference of the terminal of the optical fiber cable 1, and is fixed to be integrated with the terminal.

Figure 38:
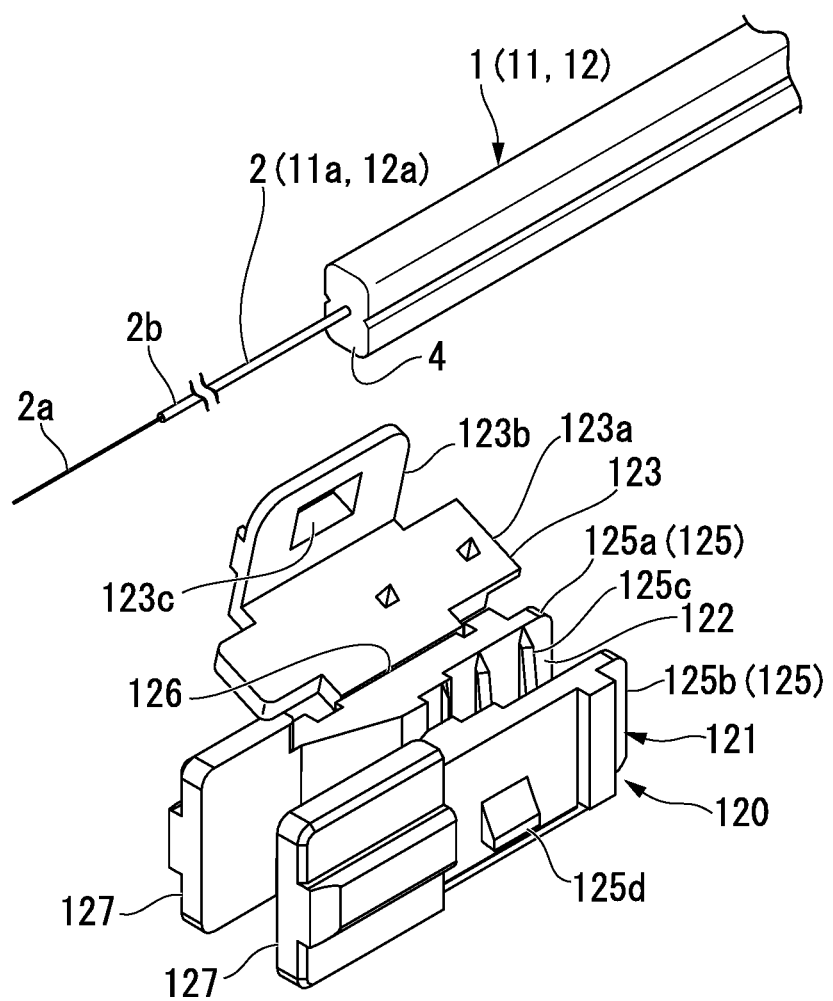
FIG. 38 is a perspective view showing an example of the anchoring fixation member inserted into the cable anchor of the optical fiber splicing unit of FIG. 22 in a state where the optical fiber cable terminal is fixed.

FIG. 38 shows the specific example of the anchoring fixation member 120.

Here, as the anchoring fixation member 120, a sheath grip member is used which grips the terminal of the optical fiber cable 1 from both sides and is attached to be fixed to the terminal of the optical fiber cable 1.

Hereinafter, when the anchoring fixation member 120 indicates the sheath grip member, the anchoring fixation member 120 is also referred to as the sheath grip member.

The sheath grip member 120 includes the grip base 121 having a U-shaped cross-section in which the cable fitting groove 122, to which the optical fiber cable 1 is fitted, is formed, and the pressing cover 123 which is pivoted at one of both side wall portions 125 in the groove width direction of the cable fitting groove 122 of the grip base 121.

In the sheath grip member 120, a plurality of gripping protrusions 125c, which protrude from mutually facing surfaces of the pair of side wall portions 125 of the grip base 121, are bitten into the sheath 3 of the optical fiber cable 1 fitted to the cable fitting groove 122, and thus, the optical fiber cable 1 can be gripped and fixed between the pair of side wall portions 125.

The grip base 121 is a member having a U-shaped cross-section in which the cable fitting groove 122 is secured between the pair of side wall portions 125 protruding from one surface side of the bottom wall portion 124.

The groove width direction of the cable fitting groove 122 indicates the interval direction of both side wall portions 125 via the cable fitting groove 122.

Moreover, the gripping protrusions 125c of the sheath grip member 120 of the shown example are formed in protrusions having triangular cross-sections extending in a depth direction of the cable fitting groove 122.

Moreover, after the grip base 121 is externally fitted and fixed to the terminal of the optical fiber cable 1 in an open state in which the pressing cover 123 is separated from the other side wall portion 125, the pressing cover 123 is rotated to a closed position in which the opening portion of the cable fitting groove 122 is closed between ends portions opposite to the bottom wall portion 124 of the pair of side wall portions 125 of the grip base 121, the pressing cover 123 is locked to the other side wall portion 125, and thus, the sheath grip member 120 is attached to the terminal of the optical fiber cable 1.

The sheath grip member 120 of the shown example is an integrally molded plastic part.

The pressing cover 123 is connected to the protruding end of one (hereinafter, also referred to as the first side wall portion and assigned by the reference numeral 125a) of the pair of side wall portions 125, via the thin portion 126 which functions as a hinge portion.

The pressing cover 123 is rotatably pivoted to the first side wall portion 125a of the grip base 121 by the thin portion 126 around the axis along the extension direction of the cable fitting groove 122.

Moreover, hereinafter, the other of the pair of side wall portions 125 of the grip base 121 is also referred to as the second side wall portion 125b.

The pressing cover 123 of the sheath grip member 120 of the shown example is formed in a L-shaped plate.

The pressing cover 123 includes the top plate portion 123a which is pivoted to the first side wall portion 125a of the grip base 121 via the thin portion 126, and the locking plate portion 123b which is formed to be perpendicular to the top plate portion 123a from an end portion opposite to the thin portion 126 of the top plate portion 123a.

When the pressing cover 123 is positioned at the closed position in which the top plate portion 123a abuts the protruding ends of the pair of side wall portions 125 of the grip base 121 and the opening portion of the cable fitting groove 122 is closed, the locking plate portion 123b can overlap with the outer surface of the second side wall portion 125b of the grip base 121 opposite to the cable fitting groove 122.

Moreover, by inserting the locking claw 125d protruding from the outer surface of the second side wall portion 125b of the grip base 121 into the locking window hole 123c formed on the locking plate portion 123b, the pressing cover 123 is locked to the grip base 121, and thus, the closed state with respect to the grip base 121 can be stably maintained.

The sheath grip member 120 (anchoring fixation member) of the shown example includes a pair of front protruding wall portions 127 protruding from one end in the front-rear direction along the extension direction of the cable fitting groove 122 of the grip base 121.

The pair of front protruding wall portions 127 is formed in a plate piece shape which protrudes to extend the side wall portions 125*a* and 125*b* along the front-rear direction of the grip base 121 from both side wall portions 125*a* and 125*b* of the grip base 121.

Hereinafter, the anchoring fixation member 120 fixed to the terminal of the first optical fiber cable 11 may be also referred to as a first anchoring fixation member 120*a*, and the anchoring fixation member 120 fixed to the terminal of the second optical fiber cable 11 may be also referred to as a second anchoring fixation member 120*b*.

Moreover, the sheath grip member is not limited to the configuration of the shown example.

For example, the sheath grip member may also adopt a configuration in which the pressing cover is changed to a pressing cover having the structure in which the locking plate portion 123*b* is omitted and the engagement portion engaging with the protruding end of the second side wall portion 125*b* of the grip base 121 is provided on the top plate portion 123*a*.

In addition, the sheath grip member may adopt a configuration in which only the grip base is provided.

Moreover, the sheath grip member is not limited to an integrally molded plastic part, and may also adopt a configuration in which a plurality of members are assembled.

The anchoring fixation member is not limited to the sheath grip member, and for example, may be a member which is fixed to adhere the outer circumference of the terminal of the optical fiber cable 1 by an adhesive agent, a member which is fixed to the outer circumference of the terminal by thermal welding, or the like.

As shown in FIG. 23, in each of the cable anchors 1022 of the shown example, an insertion assistance slider 1026 is provided, which smoothly inserts the terminal (hereinafter, referred to as the fixing member attached cable terminal 1*a*) of the optical fiber cable 1, to which the anchoring fixation member 120 is fixed, from the rear side of the cable anchor 1022.

The insertion assistance slider 1026 has a structure in which pressing force receiving protrusions 1026*b* protrude on an elongated plate-shaped slider main body 1026*a* which is provided to slidably move on the anchoring portion bottom wall portion 1022*a* in the front-rear direction of the cable anchor 1022.

In the insertion assistance slider 1026, the fixing member attached cable terminal 1*a* can be placed on the fixing member placement portions 1026*c* which are portions extending from the pressing force receiving protrusions 1026*b* of the slider main body 1026*a* to the rear side.

The insertion assistance slider 1026 can move the fixing member attached cable terminal 1*a* back and front.

In the stopper wall portions 251 and 252 of the splice holder portion 1021, notch-shaped first fiber insertion portions 1025*a*, through which the optical fibers 2 exposed from the optical fiber cable terminals are inserted, are formed.

The stopper wall portions 251 and 252 can be formed to restrict the advancement of the fixing member attached cable terminal 1*a*.

The position, at which the advancement of the fixing member attached cable terminal 1*a* is restricted, is referred to as the advancement limit position.

Next, a method of but-jointing the optical fibers 11*a* and 12*a* to each other using the mechanical splice 30 will be described.

First, the anchoring fixation members 120 are fixed to the terminals of the optical fiber cables 11 and 12 to assemble the fixing member attached cable terminals 1*a*, and the fixing member attached cable terminals 1*a* are placed on the fixing member placement portions 1026*c* of the insertion assistance sliders 1026 which move to positions deviated to the rear side from the advancement limit position with respect to the cable anchor 1022.

The bare optical fibers 2*a* are led-out in advance from the tips of the optical fibers 2 of the optical fiber cables which are inserted between the elements 31 and 32 of the splice 30.

The protrusion lengths from the anchoring fixation members 120 of the optical fibers 11*a* and 12*a* of the optical fiber cables 11 and 12 are set to lengths by which appropriate bent portions (bent portions 5S1 and 5S2 in FIGS. 39A to 39F) are formed, when the optical fibers 11*a* and 12*a* abut at the center portion in the longitudinal direction of the aligning groove 31*b* of the splice 30.

An opening amount between the base member 31 and each of the cover members 321, 322, and 323 in the insertion member attached splice 30A can be set according to the thicknesses of the plate-shaped tip portions 41*a* of the insertion pieces 1045 and 1048 of the splice tools 1041 and 1042.

For example, as shown in FIG. 17, the opening amount according to the insertion of each of the insertion piece 1045 and 1048 between the base member 31 and the side cover (the second side cover 323 in the shown example) is set to the range in which the optical fiber 2 does not come off from the region (the fiber storage region; refer to the reference numeral FS in FIG. 16) between the coating portion insertion groove 31*d* and the facing surface 323*a* of the side cover 323 and the insertion state of the optical fiber into the fiber storage region is maintained.

The opening amount according to the insertion of each of the insertion pieces 1045 and 1048 between the center cover 322 and the base member 31 is set to the range in which the bare optical fiber 2*a* led out from the tip of the optical fiber 2 does not come off from the region (a bare optical fiber storage region) between the aligning groove 31*b* and the facing surface 322*a* of the center cover 322.

Moreover, the bare optical fiber storage region is not shown in FIG. 16 or the like.

Figure 29:
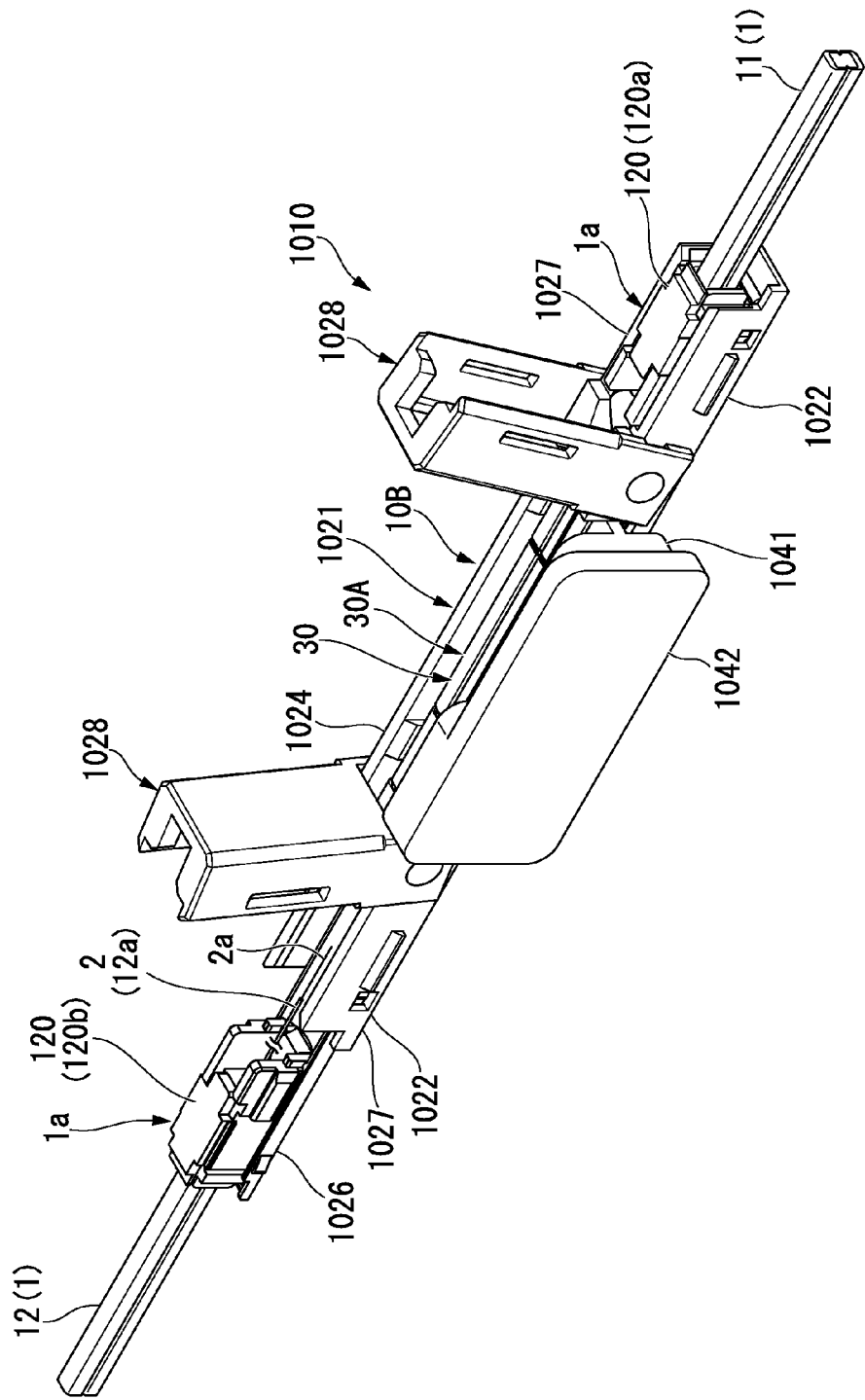
FIG. 29 is a process diagram showing the splicing method of the optical fiber according to an embodiment of the present invention, and a perspective view showing the optical fiber splicing unit of FIG. 22.

As shown in FIGS. 29 and 39A, the fixing member attached cable terminal 1*a* of the first optical fiber cable 11 advances toward the splice holder portion 1021 in the state where the terminal 1*a* is loaded on the insertion assistance slider 1026, and is inserted into the main body portion 1027 of the cable anchor 1022.

The fixing member attached cable terminal 1*a* advances while pressing the pressing force receiving protrusions 1026*b* of the insertion assistance slider 1026.

Therefore, according to the advancement of the fixing member attached cable terminal 1*a*, the insertion assistance slider 1026 integrally advances.

The fixing member attached cable terminal 1*a* can advance to the advancement limit position (for example, the position at which the advancement is restricted by each of the stopper wall portions 251 and 252).

The advancement limit position may be a position at which front ends of abutment protrusions 1026*d* are locked at front edges of abutment concave portions 1027*a*.

The bare optical fiber 2*a* led-out from the tip of the first optical fiber 11*a* is inserted between the elements 31 and 32 from one end side (the right end side in FIGS. 39A to 39F)

of the splice 30, and is inserted into the bare optical fiber storage region via the fiber storage region FS (refer to FIG. 16) of the splice 30.

As shown in FIG. 16, the optical fiber 11a (or the optical fiber 12a) can be inserted toward the fiber storage region FS and the bare optical fiber storage region from each of the tapered concave portions 34a formed on both ends of the half-split grip member 34.

Preferably, the tip portion of the first optical fiber 11a advances until the tip portion slightly reaches the other side (the left end side in FIGS. 39A to 39F) from the center position in the longitudinal direction of the splice 30.

Figure 30:
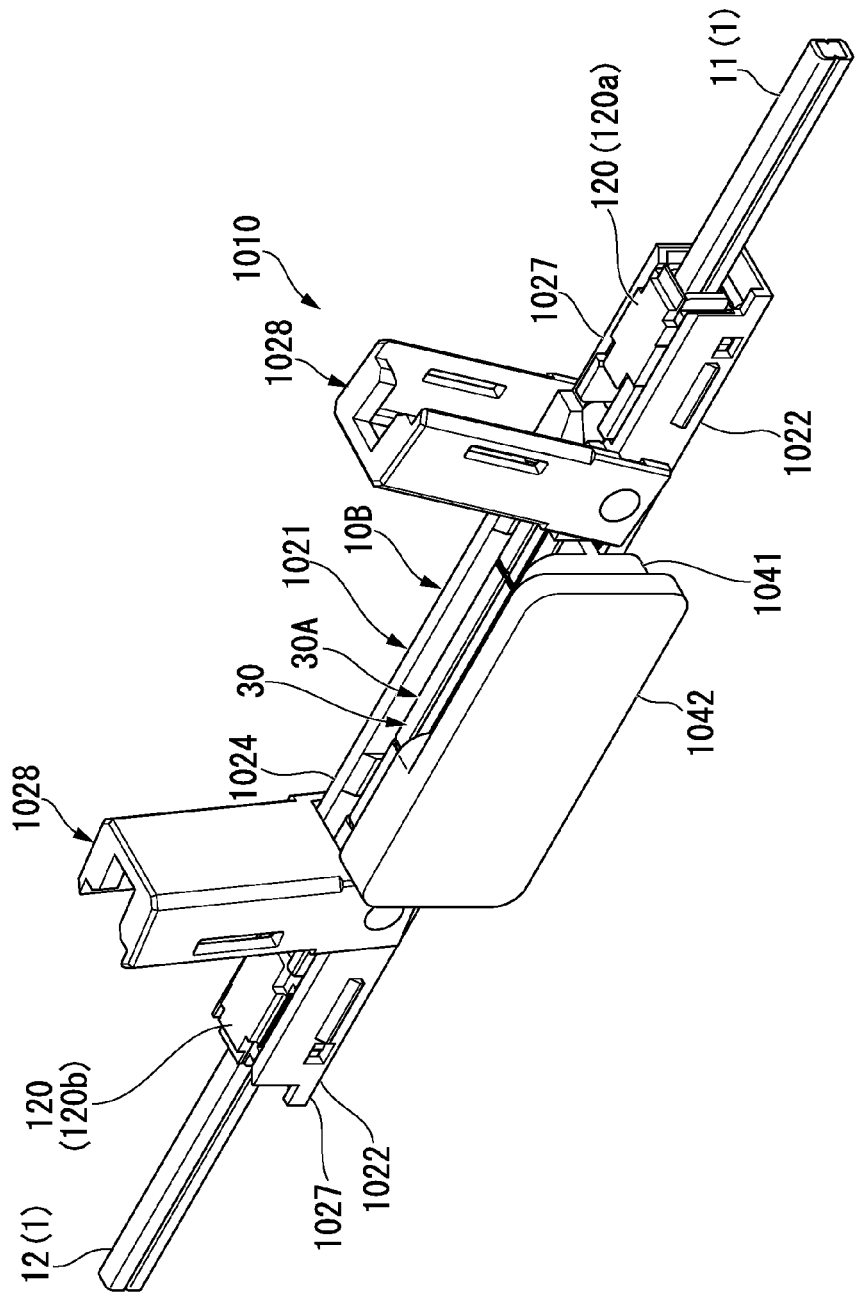
FIG. 30 is a view showing a process following the process shown in FIG. 29, and is a perspective view showing the optical fiber splicing unit of FIG. 1.
Figure 31:
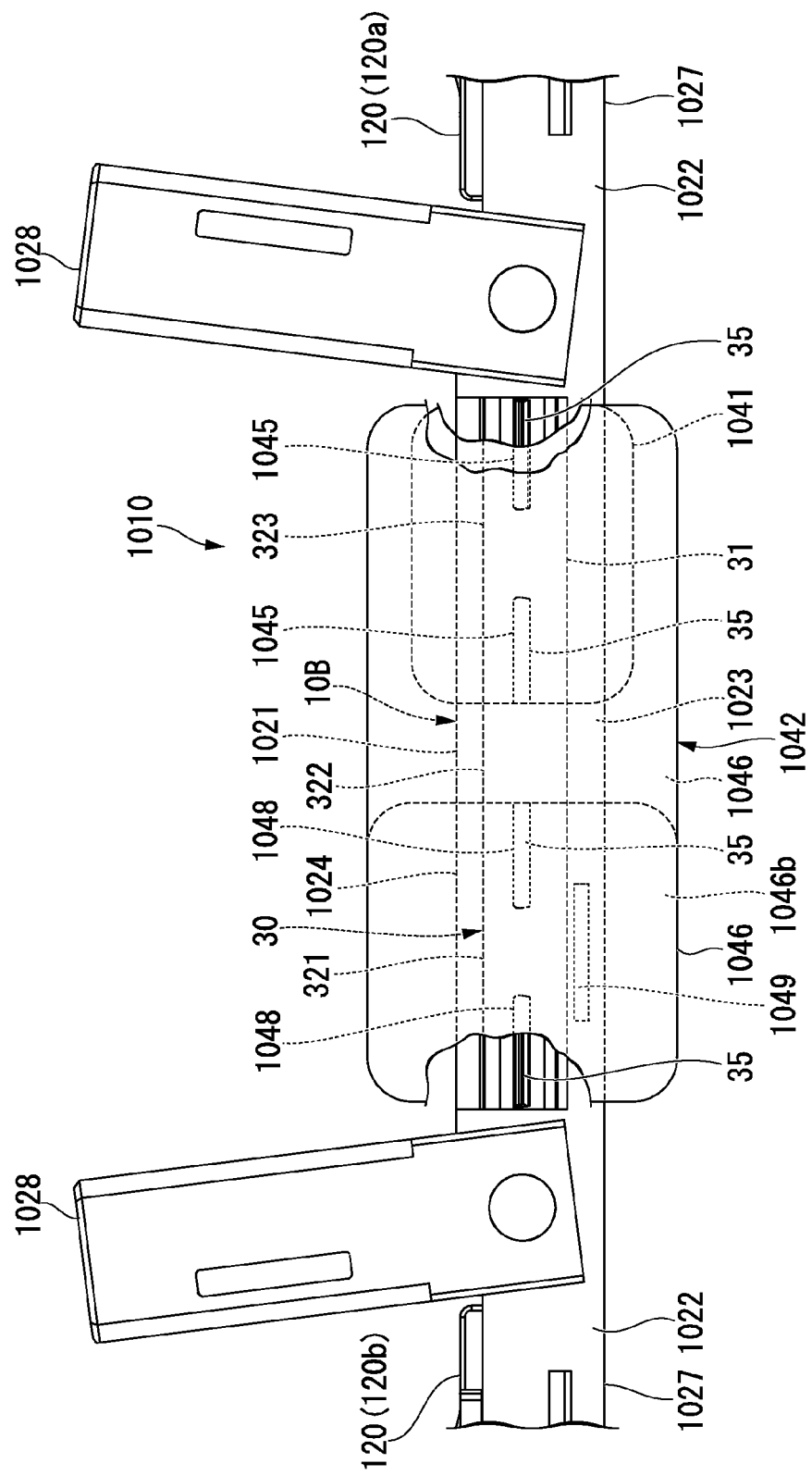
FIG. 31 is a front view showing the optical fiber splicing unit in the process shown in FIG. 29.

As shown in FIGS. 30, 31, and 39B, the fixing member attached cable terminal 1a of the second optical fiber cable 12 advances toward the splice holder portion 1021 in the state where the terminal 1a is loaded on the insertion assistance slider 1026, and is inserted into the main body portion 1027 of the cable anchor 1022.

The bare optical fiber 2a led-out from the tip of the second optical fiber 12a is inserted between the elements 31 and 32 from the other end side (the left end side in FIGS. 39A to 39F) of the splice 30, and is inserted into the bare optical fiber storage region via the fiber storage region FS (refer to FIG. 16) of the splice 30.

In general, if the other optical fiber (second optical fiber 12a) butts said one optical fiber (first optical fiber 11a) in the state where said one optical fiber stops and the other optical fiber further moves in the abutment direction, mainly, the bent portion is formed in the moving optical fiber (second optical fiber 12a).

Accordingly, as shown in FIG. 39B, if the second optical fiber 12a butts the first optical fiber 11a and further moves in the abutment direction, mainly, the bent portion 5L is formed in the second optical fiber 12a.

At this time, the movement amount of the fixing member attached cable terminal 1a is set so that the bent portion 5L formed in the second optical fiber 12a is larger than the assumed appropriate bent portion 5S2 (refer to FIG. 23F or the like).

The reference numeral P of FIG. 39B indicates the splice point between the optical fibers 11a and 12a.

The splice point P of the shown example is positioned at a position slightly close to the left side from the center of the splice 30.

As shown in FIGS. 30 and 39C, the fixing member attached cable terminal 1a of the first optical fiber cable 11 is retracted by a predetermined distance (for example, approximately 0.3 mm) along with the insertion assistance slider 1026 in the main body portion 1027 of the cable anchor 1022.

In the optical splicing unit 10, a position confirmation mechanism 1029 used to confirm the retraction position of the fixing member attached cable terminal 1a with respect to the unit main body 10B may be provided.

For example, the position confirmation mechanism 1029, which includes the abutment protrusions 1026d of the side surfaces of the insertion assistance slider 1026 shown in FIG. 23 and the abutment concave portions 1027a of the main body portion 1027, may be adopted.

In the position confirmation mechanism 1029, when the fixing member attached cable terminal 1a is positioned at the advancement limit position, rear ends 1026e of the abutment protrusions 1026d of the side surfaces of the insertion assistance slider 1026 shown in FIG. 23 are not locked to rear edges 1027b of the abutment concave portions 1027a of the main body portion 1027, and in the retraction position, the rear ends 1026e of the abutment protrusions 1026d can be locked to rear edges 1027b of the abutment concave portions 1027a.

The locking concave-convex structure of the position confirmation mechanism 1029 is not limited thereto, the abutment protrusions may be formed on the main body portion 1027, and the abutment concave portions, to which the abutment protrusions of the main body portion 1027 are locked, may be formed on the insertion assistance slider 1026.

Moreover, a configuration may be adopted in which a visible retraction position mark (display) is formed on one or both of the anchoring fixation member 120 and the main body portion 1027, and the retraction position can be confirmed by the position of the mark (for example, coincidence between the positions in the front-rear direction of the marks of the anchoring fixation member 120 and the main body portion 1027).

The mark may be formed by unevenness or coloring.

According to the configuration, the retraction position of the fixing member attached cable terminal 1a can be easily confirmed.

According to the retraction of the first optical fiber 11a, the second optical fiber 12a is advanced by the elasticity of the bent portion 5L.

When the advancement of the second optical fiber 12a is not sufficient, the operator pushes the bent portion 5L using a finger to promote the advancement of the second optical fiber 12a.

According to the advancement of the second optical fiber 12a, the bent portion 5L becomes the smaller bent portion 5S2.

According to this, the splice point P between the optical fibers 11a and 12a also move to the one end (the right end side in FIGS. 39A to 39F).

In the shown example, the splice point P moves to the center of the splice 30.

As shown in FIGS. 32 to 34, and 39D, the insertion pieces 45 and 45 of the fourth splice tool 42 are extracted from the elements 31 and 32.

Accordingly, in the other end side (the left end side in FIGS. 39A to 39F) in the longitudinal direction of the splice 30, by the elasticity of the clamp spring 33, the second optical fiber 12a is put between the pressing cover 32 and the base member 31 to be gripped and fixed.

Specifically, the second optical fiber 12a is put between the other end side (left end side) of the cover member 322 and the cover member 321, and the base member 31.

Accordingly, the second optical fiber 122 is gripped and fixed to the splice 30 in the state where the fiber has the bent portion 5S2.

Figure 32:
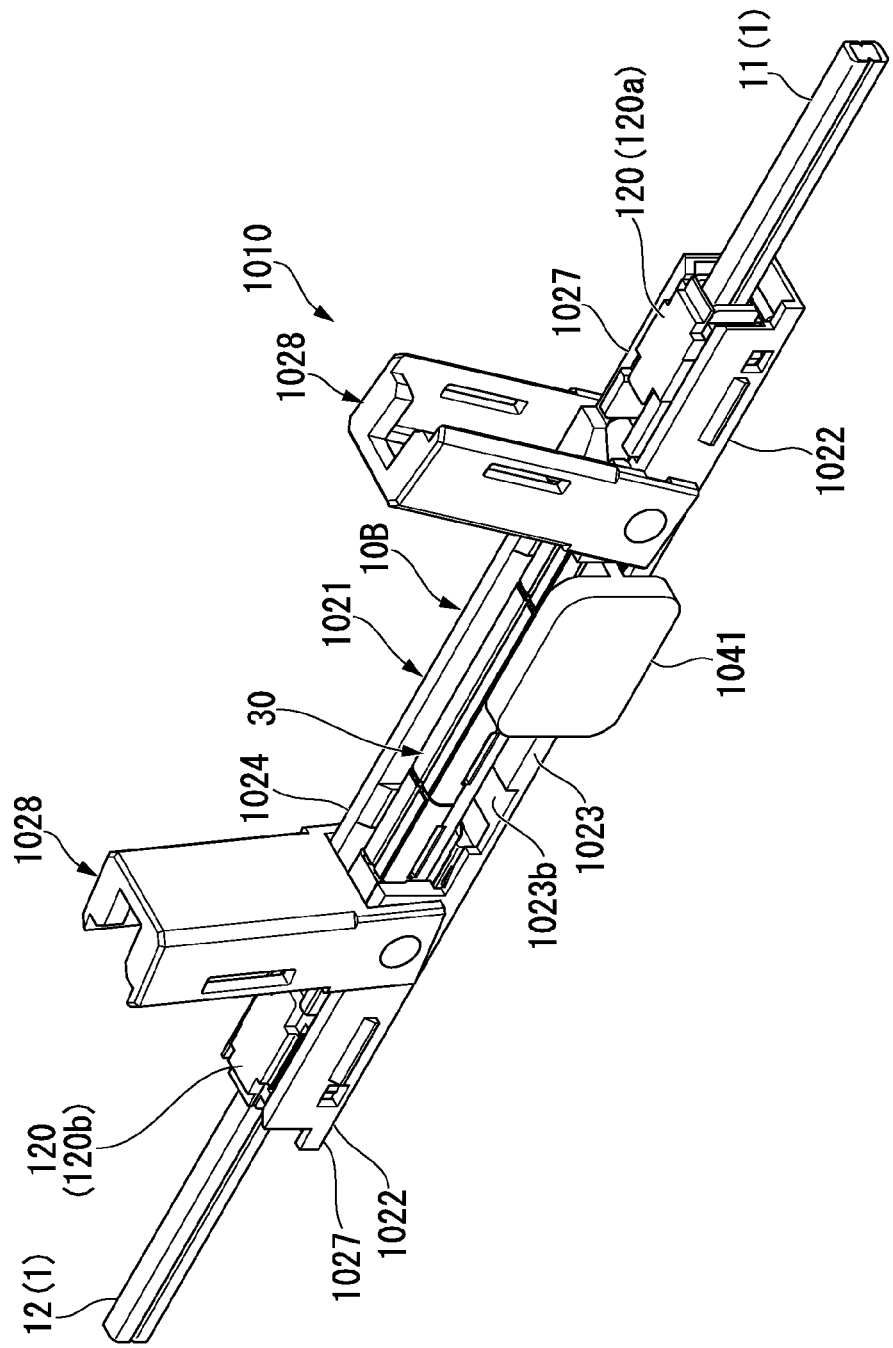
FIG. 32 is a view showing the process following the process shown in FIG. 29, and a perspective view showing the optical fiber splicing unit of FIG. 1.
Figure 33:
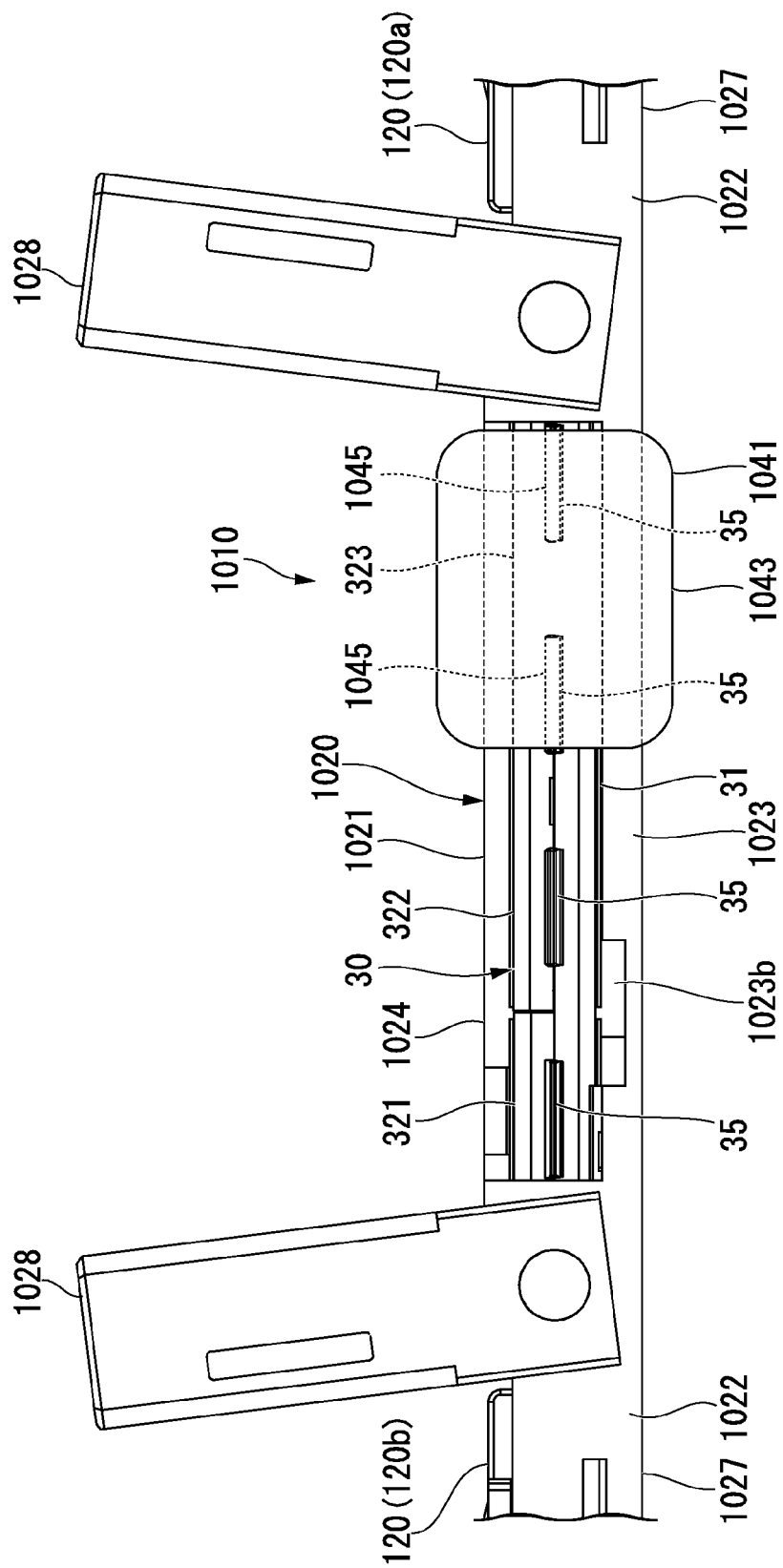
FIG. 33 is a front view showing the optical fiber splicing unit in the process shown in FIG. 32.
Figure 34:
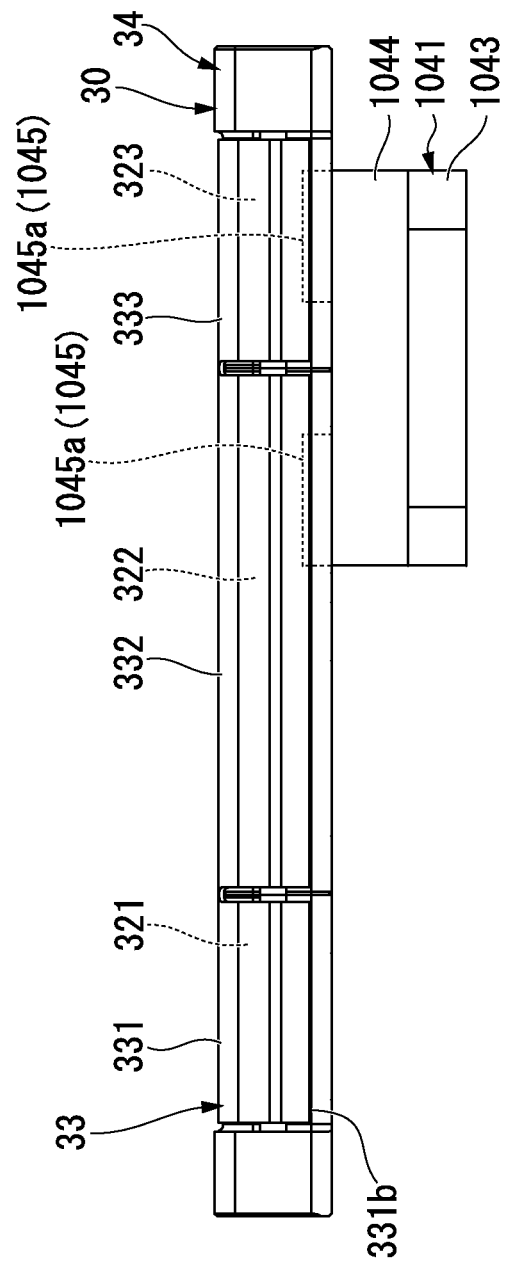
FIG. 34 is a view showing a relationship between an insertion member (insertion piece) of the splice tool and the mechanical splice in the process shown in FIG. 32.

As shown in FIGS. 32 and 39E, the fixing member attached cable terminal 1a of the retracted first optical fiber cable 11 advances by a predetermined distance (for example, approximately 0.3 mm) along with the insertion assistance slider 1026 in the main body portion 1027 of the cable anchor 1022.

The advancement position of the fixing member attached cable terminal 1a can be confirmed by the above-described position confirmation mechanism 1029.

For example, the abutment protrusions 1026d and the abutment concave portions 1027a can be configured so that the advancement of the predetermined distance is realized by advancing the fixing member attached cable terminal 1a, which is positioned at the position at which the rear ends 1026e of the abutment protrusions 1026d of the insertion assistance slider 1026 shown in FIG. 23 are locked to the rear edges 1027b of the abutment concave portions 1027a, to the advancement limit position.

Moreover, a configuration may be adopted, in which the advancement of the predetermined distance is realized by advancing the fixing member attached cable terminal 1a, which is positioned at the position at which the rear ends 1026e of the abutment protrusions 1026d are locked to the rear edges 1027b of the abutment concave portions 1027a, to the position at which the front ends of the abutment protrusions 1026d are locked to the front edges of the abutment concave portions 1027a.

In addition, a configuration may also be adopted, in which a visible advancement position mark is formed on one or both of the anchoring fixation member 120 and the main body portion 1027, and the advancement position can be confirmed by the position of the mark (for example, coincidence between the positions in the front-rear direction of the marks of the anchoring fixation member 120 and the main body portion 1027).

The mark may be formed by unevenness or coloring.

According to the configuration, the advancement position of the fixing member attached cable terminal 1a can be easily confirmed.

According to the advancement of the first optical fiber 11a, the bent portion 5S1 is formed in the first optical fiber 11a by the abutment with respect to the second optical fiber 12a.

Preferably, the size of the bent portion 5S1 is approximately the same as the size of the bent portion 5S2 of the second optical fiber 122.

Figure 35:
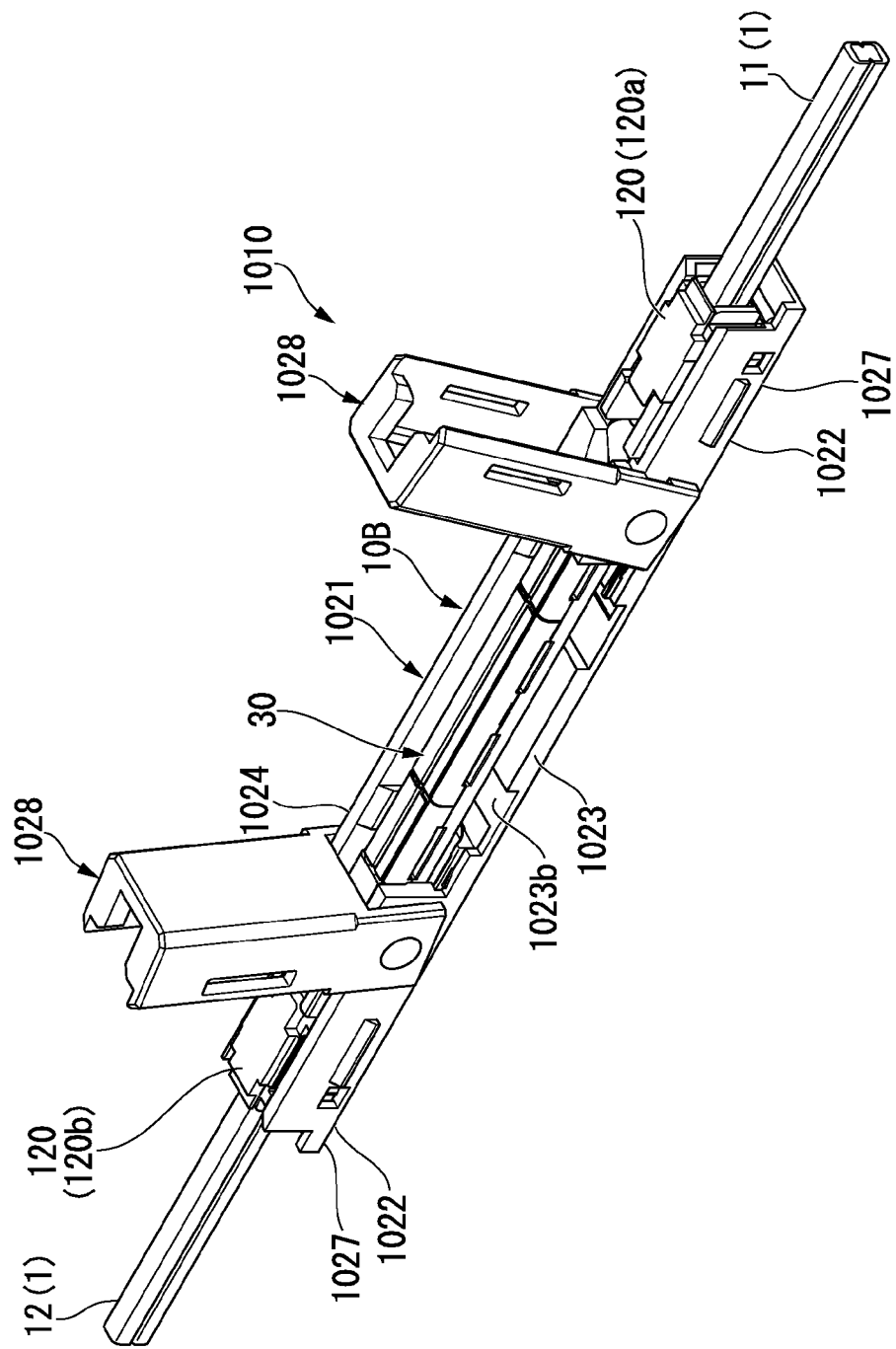
FIG. 35 is a view showing the process following the process shown in FIG. 32, and a perspective view showing the optical fiber splicing unit of FIG. 1.
Figure 36:
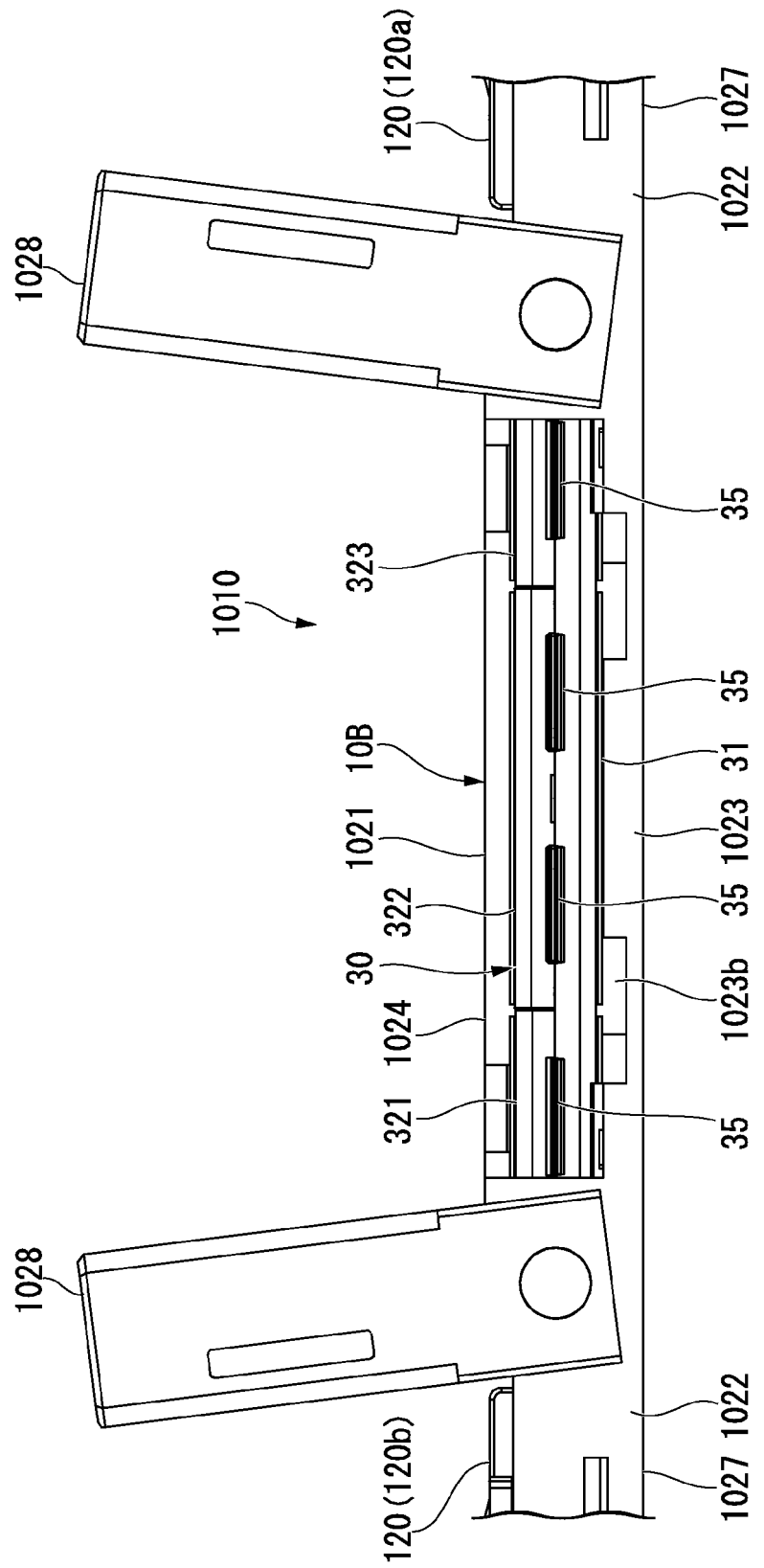
FIG. 36 is a front view showing the optical fiber splicing unit in the process shown in FIG. 35.

As shown in FIGS. 35, 36, and 39F, the insertion pieces 1045 and 1045 of the first splice tool 1041 are extracted from the elements 31 and 32.

Accordingly, in the one end side (the right end side in FIGS. 39A to 39F) in the longitudinal direction of the splice 30, by the elasticity of the clamp spring 33, the first optical fiber 11a is put between the pressing cover 32 and the base member 31 to be gripped and fixed.

Specifically, the first optical fiber 11a is put between the one end side (right end side) of the cover member 322 and the cover member 323, and the base member 31.

Accordingly, the first optical fiber 11a is gripped and fixed to the splice 30 in the state where the fiber has the bent portion 5S1.

According to the above-described processes, the first optical fiber 11a and the second optical fiber 12a are spliced to each other in the state where the fibers 11a and 12a have the bent portions 5S1 and 5S2 respectively.

Figure 37:
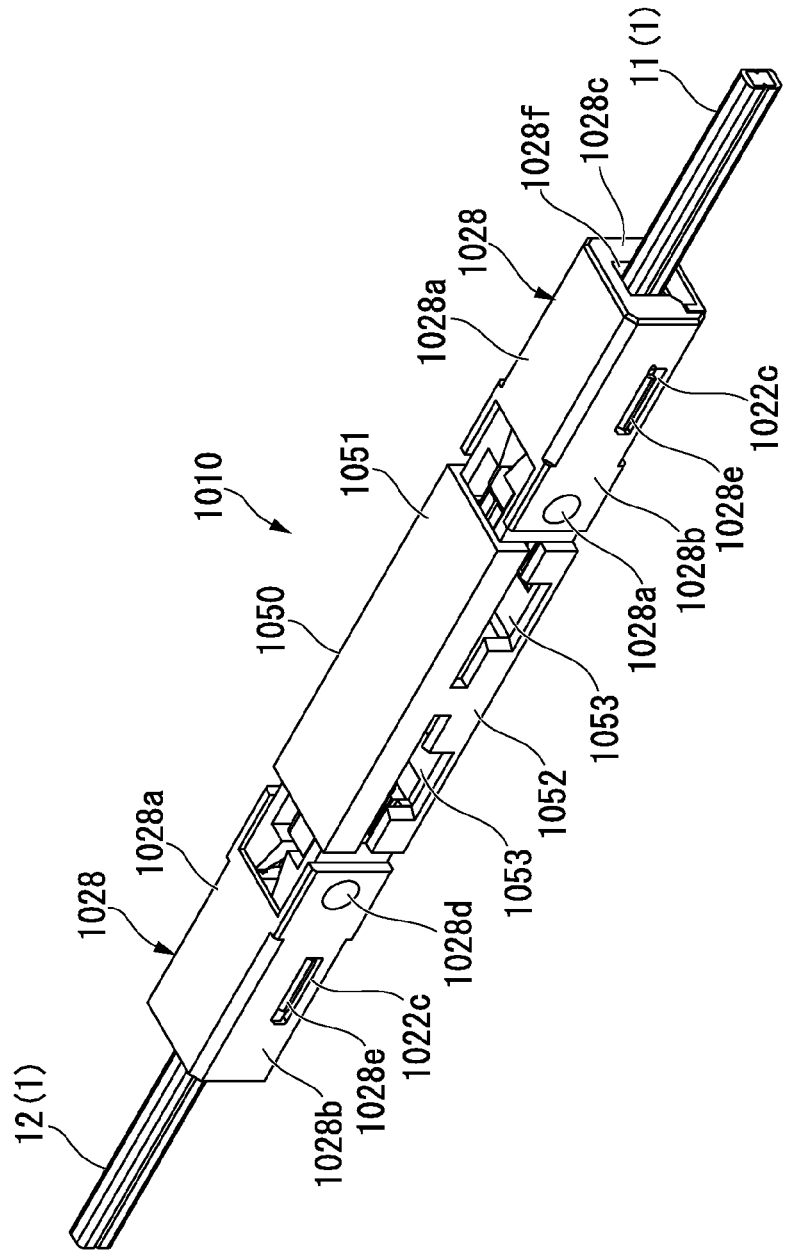
FIG. 37 is a perspective view showing the optical fiber splicing unit in a state where an anchor cover is closed.

As shown in FIG. 37, if each of the anchor covers 1028 is rotated with the shaft portion 1028d as a fulcrum to cover the main body portion 1027, displacement of the anchoring fixation member 120 in the direction separating from the splice 30 can be restricted by the end plate 1028c.

Although it is not shown in FIGS. 22 to 36, a protective cover 1050 covering the splice 30 may be mounted on the splice holder portion 1021.

The protective cover 1050 includes a top plate 1051, and side plates 1052 which vertically descends from both side edges of the top plate, insertion opening portions 1053 through which the protruding plate portions 1044 and 1047 of the splice tools 1041 and 1042 can be inserted are provided on the side plates 1052, and thus, in a state where the protective cover is mounted on the splice holder portion 1021, the above-described optical fiber splice operation may be performed.

According to the optical fiber splicing method, by sequentially extracting the third and fourth splice tools, after the bent portion is formed in the second optical fiber 122, the first optical fiber 11a is temporarily retracted, and only the second optical fiber 12a is gripped and fixed in the state where the bent portion of the second optical fiber 12a is set to the appropriate size (bent portion 5S2). Subsequently, the first optical fiber 11a is gripped and fixed in the state where the bent portion 5S1 having the appropriate size is also formed in the first optical fiber 11a.

Therefore, it is possible to prevent the first optical fiber 11a or the second optical fiber 12a from being spliced to each other in a state where the bent portion is biased to either the first optical fiber or the second optical fiber, and bent portions having appropriate sizes can be formed in both of the first optical fiber 11a and the second optical fiber 12a.

Third Embodiment

Hereinafter, a third embodiment of the present invention will be described with reference to the drawings.

Moreover, in the present embodiment, the same reference numerals are assigned to the same components as the first embodiment.

Figure 40:
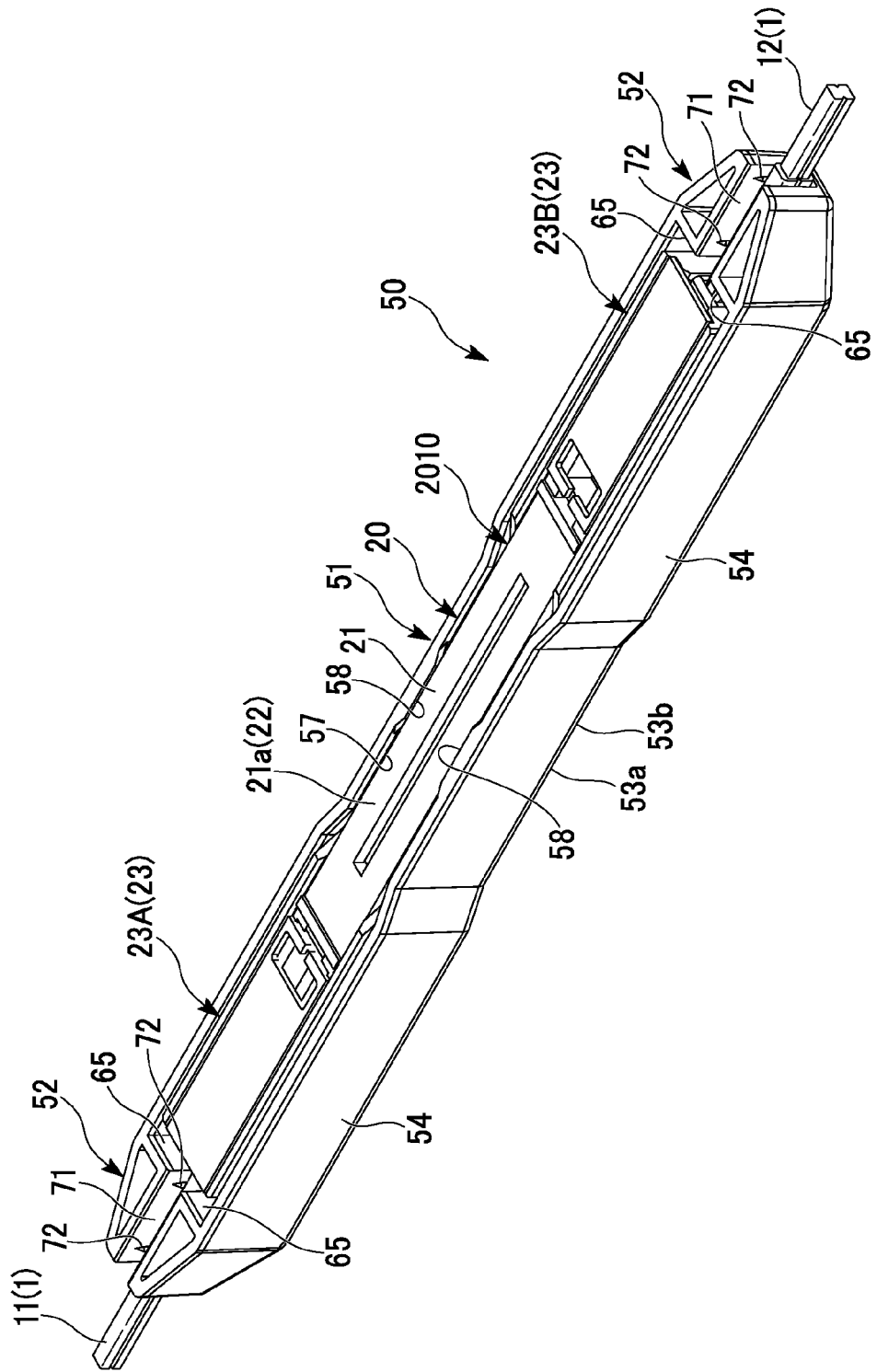
FIG. 40 is a perspective view showing a holding member for an optical fiber splicing unit which is an embodiment of the present invention and the optical fiber splicing unit accommodated in the holding member.

As shown in FIG. 40, a holding member 50 for an optical fiber splicing unit holds an optical fiber splicing unit 2010 which can be applied to the splice (optical splice) between the pair of optical fiber cables 1.

The reference numeral 11 is assigned to one of the optical fiber cables 1 spliced to each other by the optical fiber splicing unit 2010, and the reference numeral 12 is assigned to the other.

As shown in FIG. 20, the optical fiber cable 1 (optical fiber cables 11 and 12) is configured by collectively coating the sheath 4 made of a synthetic resin so that the optical fiber 2 and the linear tensile strength bodies 3 having flexibility are in parallel with one another.

As the tensile strength bodies 3, for example, a body formed of tensile strength fibers such as aramid fibers, a steel wire, or the like may be used.

The optical fiber 2 is a coated optical fiber which is configured by covering the outer circumference surface (side surface) of the bare optical fiber 2a with the coating 2b, and for example, as the optical fiber, an optical fiber core wire, an optical fiber element wire, or the like may be used.

For example, the bare optical fiber 2a is a quartz optical fiber.

Moreover, for example, the coating 2b is a resin coating in which a single layer or a plurality of layers formed of an ultraviolet curing resin, a polyamide resin, or the like are substantially concentrically coated.

As the optical fiber cable 1, an indoor cable, a drop cable, or the like may be used.

In addition, in the drawings, the reference numeral 11a is assigned to the optical fiber 2 of the optical fiber cable which is indicated by the reference numeral 11, and the reference numeral 12a is assigned to the optical fiber 2 of the optical fiber cable which is indicated by the reference numeral 12.

As shown in FIGS. 40 to 47, the holding member 50 for an optical fiber splicing unit includes a unit holding portion 51 which holds the optical fiber splicing unit 10, and holding member side cable fixing portions 52 which are each formed on both ends in the longitudinal direction of the unit holding portion 51.

The unit holding portion 51 includes an elongated plate-shaped bottom plate portion 53, and side plate protrusions 54 which are each erected on both edges 53a and 53a of the bottom plate portion 53.

In the descriptions below, a width direction indicates a short direction of the bottom plate portion 53.

Moreover, the erection direction (the direction perpendicular to the bottom plate portion 53) of each of the side plate portions 54 may be referred to as a height direction.

Figure 41:
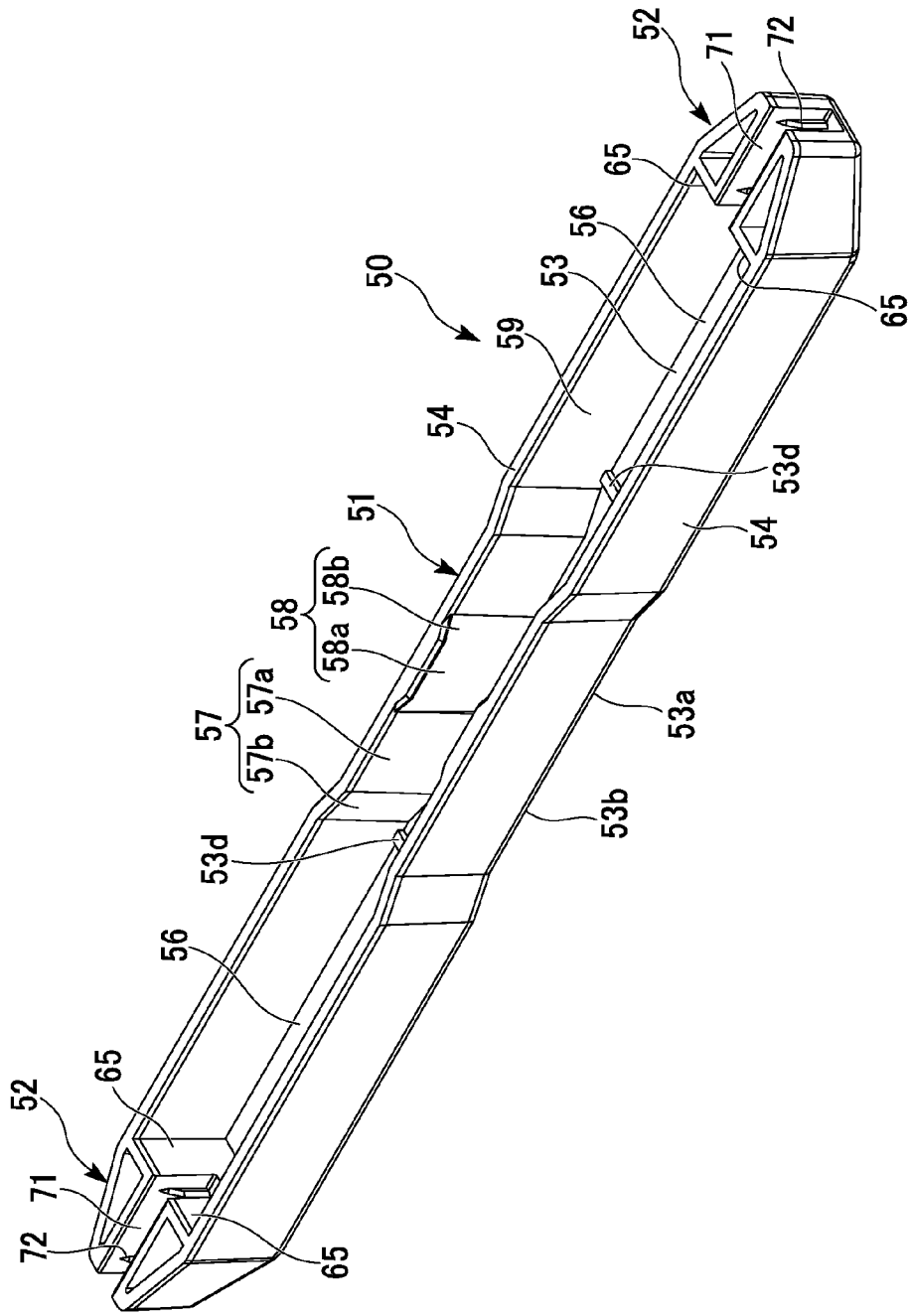
FIG. 41 is a perspective view of the holding member for an optical fiber splicing unit of FIG. 40.
Figure 43:
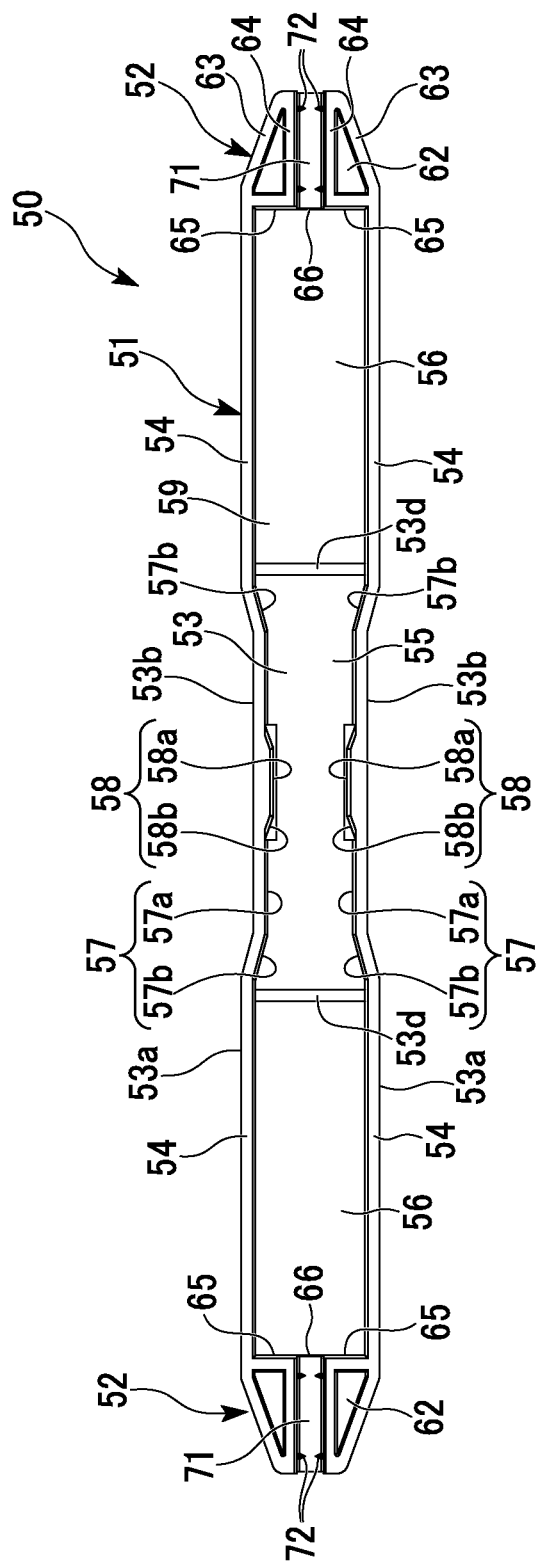
FIG. 43 is a plan view of the holding member for an optical fiber splicing unit of FIG. 40.
Figure 45:
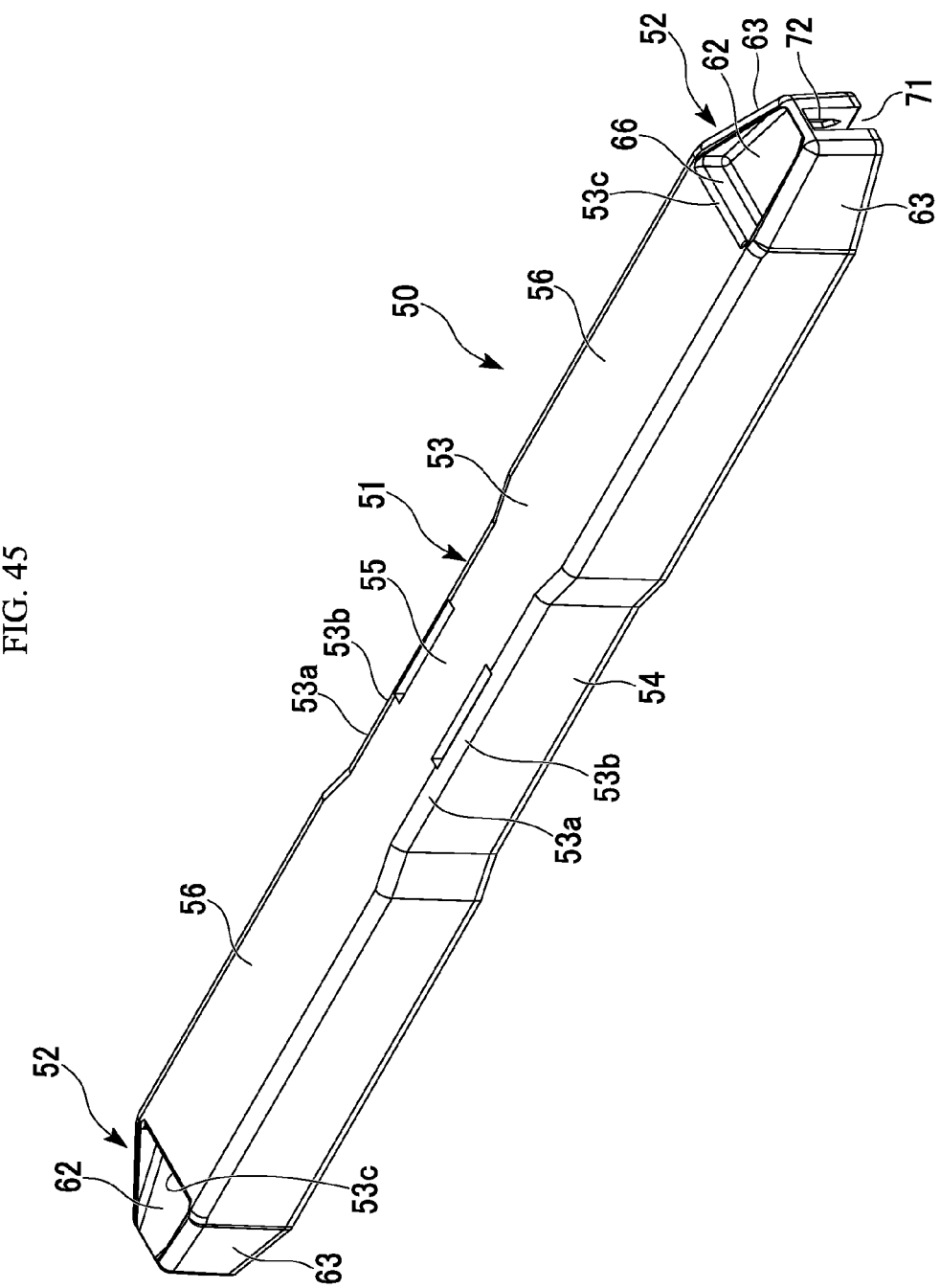
FIG. 45 is a perspective view when the holding member for an optical fiber splicing unit of FIG. 40 is viewed from the rear surface side.
Figure 46:
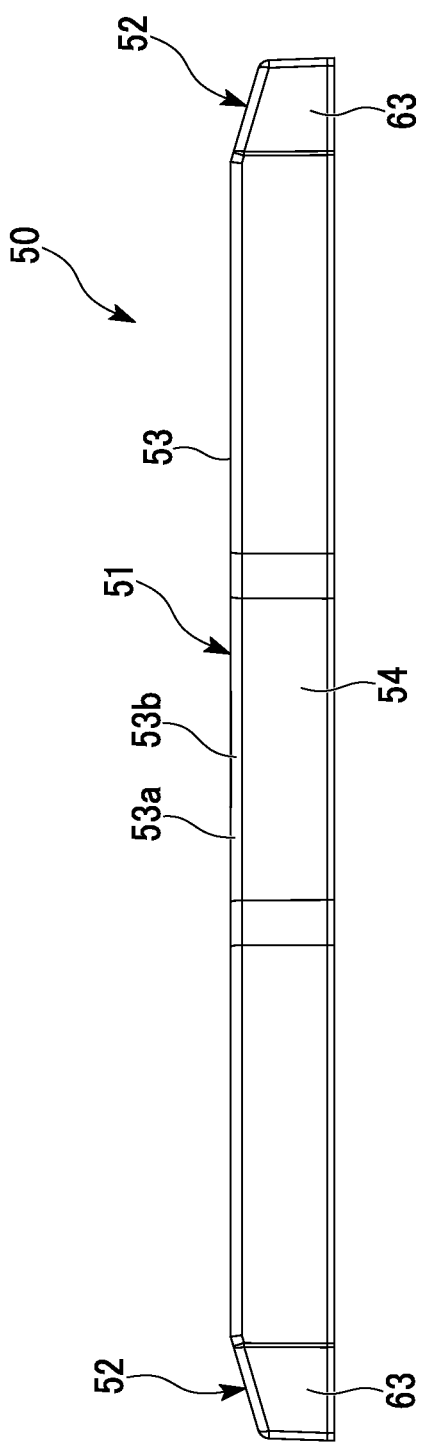
FIG. 46 is a side view of the holding member for an optical fiber splicing unit of FIG. 40.
Figure 47:
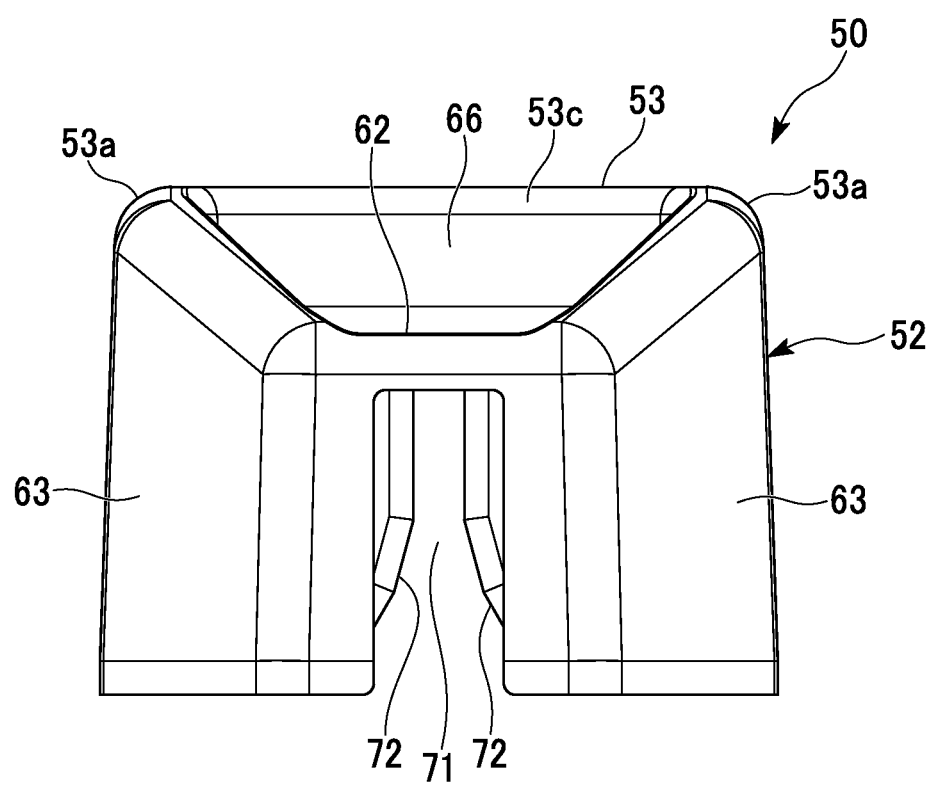
FIG. 47 is a front view of the holding member for an optical fiber splicing unit of FIG. 40.

As shown in FIGS. 41, 43, and 45, concave portions 53b and 53b are formed in the center portion in the longitudinal direction of each of both edges 53a and 53a of the bottom plate portion 53, and the center portion in the longitudinal direction of the bottom plate portion 53 becomes a narrow width portion 55 having a narrower width than other portions by the concave portions 53b and 53b.

The portions other than the narrow width portion 55 is referred to as a wide width portion 56.

Abutment convex portions 53d, which are protrusions along the width direction of the bottom plate portion 53, are formed on inner surfaces of the wide width portion 56 of the bottom plate portion 53.

The optical fiber splicing unit 10 is positioned to abut the abutment convex portions 53d.

A space between the side plate portions 54 and 54 becomes a unit accommodation space 59 which accommodates the optical fiber splicing unit 10.

Preferably, the height dimension of each of the side plate portions 54 is greater than the height dimension of the optical fiber splicing unit 10 in order to accommodate the entire optical fiber splicing unit 10.

Since the side plate portions 54 are formed along the side edges 53a of the bottom plate portion 53, inward swelling portions 57 formed to be swelled inward (that is, a direction approaching the other side plate portion 54) are formed on inner surfaces of the side plate portions 54 corresponding to the concave portions 53b.

In the shown example, the inward swelling portions 57 are each formed on both side plate portions 54 and 54.

Moreover, the inward swelling portion 57 may be formed on only one of the side plate portions 54 and 54.

The inward swelling portions 57 of the shown example are formed in an approximate trapezoid cross-section, which includes swelling main bodies 57a extending along the longitudinal directions of the side plate portions 54, and swelling inclination portions 57b in which swelling heights are gradually decreased from both ends of each of the swelling main bodies 57a to the end portions of the side plate portions 54.

The inward swelling portions 57 are formed at intermediate positions in the longitudinal directions of the side plate portions 54.

The inward swelling portions 57 of the shown example are formed at the position corresponding to the splice holder portion 21 of the optical fiber splicing unit 10 which held in the unit holding portion 51.

The inward swelling portions 57 may be formed over the entire height range of the side plate portions 54.

In the swelling main bodies 57a of the inward swelling portions 57, restricting convex portions 58 protruding inward (the direction approaching the other side plate portion 54) are formed.

The restricting convex portions 58 of the shown example are formed in an approximate trapezoid cross-section, which includes convex portion main bodies 58a extending along the longitudinal directions of the side plate portions 54, and convex portion inclination portions 58b in which swelling heights are gradually decreased from both ends of each of the convex portion main bodies 58a to the end portions of the side plate portions 54.

The restricting convex portions 58 are formed at intermediate positions in the longitudinal directions of the swelling main bodies 57a.

Each of the restricting convex portions 58 of the shown example is formed at the position corresponding to the splice holder portion 21 of the optical fiber splicing unit 10, specifically, at the position corresponding to the center portion in the longitudinal direction of the splice holder portion 21.

The restricting convex portions 58 may be formed over the entire height range of the side plate portions 54.

In the shown example, the restricting convex portions 58 are each formed on both side plate portions 54.

Moreover, the restricting convex portion 58 may be formed on only one of the side plate portions 54 and 54.

As shown in FIG. 40, a gap between the restricting convex portions 58 and 58 of both side plate portions 54 and 54 is approximately the same as or is slightly larger than the width (specifically, the width of the splice holder portion 21 of the unit base 20) of the optical fiber splicing unit 2010.

Accordingly, when the restricting convex portions 58 can restrict the width direction movement of the optical fiber splicing unit 2010 which is accommodated in the unit holding portion 51, and can stably hold the optical fiber splicing unit 2010 in the unit holding portion 51.

In addition, when the restricting convex portion 58 is formed on only one of the side plate portions 54 and 54, preferably, a gap between the restricting convex portion 58 and the inner surface of the other side plate portion 54 is approximately the same as or is slightly larger than the width of the optical fiber splicing unit 10.

As shown in FIGS. 40 to 44, the holding member side cable fixing portions 52 are integrally formed with the unit holding portion 51 at both ends in the longitudinal direction of the unit holding portion 51.

Each of the holding member side cable fixing portions 52 includes a bottom plate portion 62, side plate portions 63 and 63 which are each erected on both edges 62a and 62a of the bottom plate portion 62, inner plate portions 64 and 64 which are formed on the inner surface sides of the side plate portions 63, and side end plate portions 65 (stopper wall portions) which are formed from edges 64a of the unit holding portion 51 sides of the inner plate portions 64 toward the inner side.

The bottom plate portion 62 is formed so that the width of the bottom plate portion is gradually narrowed toward the end portion of the unit holding portion 51.

The bottom plate portion 62 is formed to extend to be parallel to the bottom plate portion 53 from the upper edge of a lower end plate portion 66 (stopper wall portion), which is erected on the end portion 53c of the bottom plate portion 53 of the unit holding portion 51, toward the end portion.

The side edges 62a of the bottom plate portion 62 are formed to be inclined with respect to the longitudinal direction of the unit holding portion 51.

In the shown example, the inclined angles (inclined angles with respect to the longitudinal direction of the unit holding portion 51) of both edges 62a and 62a are the same as each other.

Since the side plate portion 63 is formed along the side edge 62a, the side plate portions 63 and 63 are formed to gradually approach each other toward the end portion of the unit holding portion 51.

The inner plate portions 64 and 64 are formed to be parallel to each other along the longitudinal direction of the unit holding portion 51 (the longitudinal direction of the bottom plate portion 53) at an interval in the width direction.

A cable fitting groove 71, in which the optical fiber cable 1 (optical fiber cables 11 and 12) extending from the optical fiber splicing unit 10 is fitted, are formed between inner surfaces 64*b* and 64*b* facing each other of the inner plate portions 64 and 64.

The optical fiber cable 1 (11 and 12) is gripped and fixed by the cable fitting groove 71, and one or a plurality of gripping protrusions 72, which press the optical fiber cables 1 and grip and fix the optical fiber cable 1, are each formed on the inner surfaces 64*b* and 64*b*.

Figure 42:
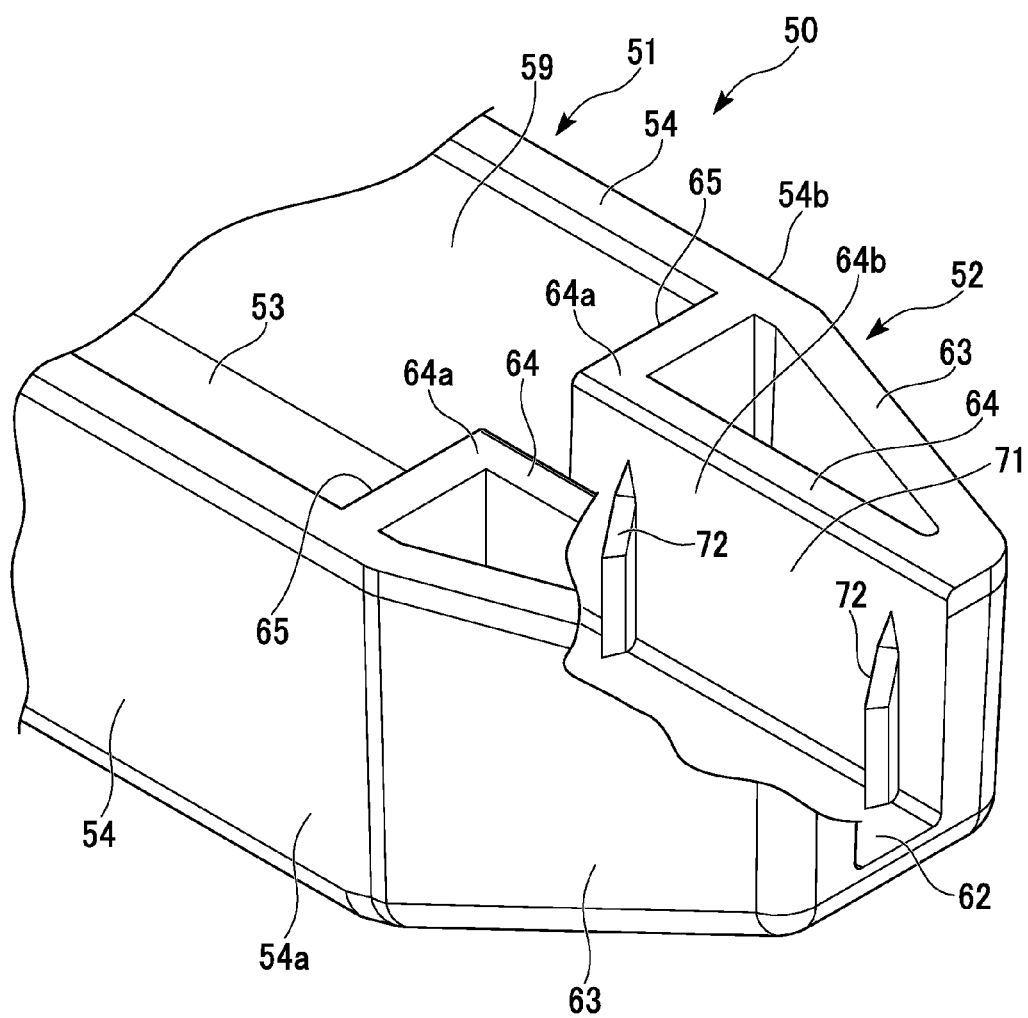
FIG. 42 is a perspective view in which the holding member for an optical fiber splicing unit of FIG. 40 is enlarged.
Figure 44:
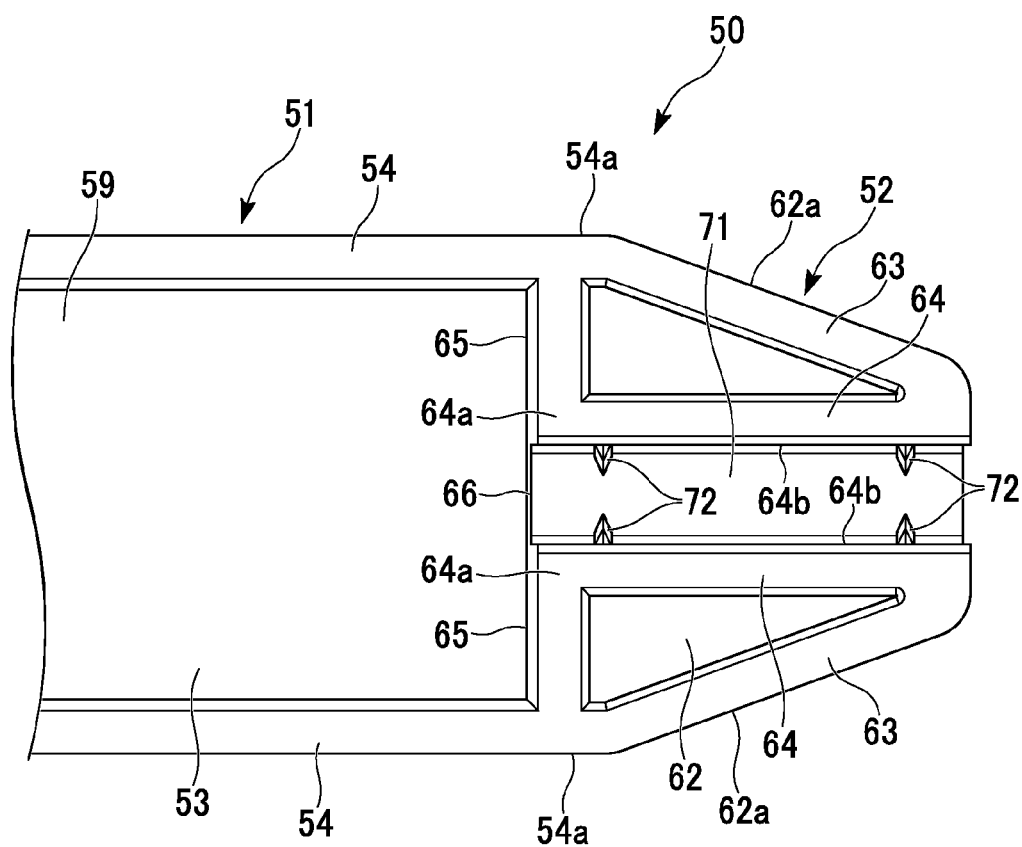
FIG. 44 is a plan view in which the holding member for an optical fiber splicing unit of FIG. 40 is enlarged.

As shown in FIGS. 42 and 44, preferably, the gripping protrusion 72 has a cross-sectional shape in which the width is gradually narrowed toward the protrusion direction.

The gripping protrusion 72 may be formed to protrude in a direction intersecting the insertion direction (the longitudinal direction of the bottom plate portion 53) of the optical fiber cable 1 (11 and 12) fitted to the cable fitting groove 71.

The gripping protrusion 72 may be formed to be perpendicular with respect to the insertion direction, and may be formed in a direction which is inclined by an angle equal to or more than 0° and less than 90° with respect to the insertion direction.

The gripping protrusion 72 of the shown example is formed to be perpendicular with respect to the insertion direction (the longitudinal direction of the bottom plate portion 53) of the optical fiber cable 1 (11 and 12).

The number of the gripping protrusions 72 of the inner surfaces 64*b* are not particularly limited.

In the shown example, two gripping protrusions 72 are formed on each of the inner surfaces 64*b* and 64*b*.

Two gripping protrusions 72 and 72, which are formed on one inner surface 64*b*, are formed at an interval in the insertion direction of the optical fiber cable 1 (11 and 12).

One gripping protrusion 72 may be formed on each of the inner surfaces 64*b* and 64*b*, and three or more gripping protrusions may be formed.

When two or more gripping protrusions 72 are formed, preferably, the gripping protrusions 72 are formed at an interval in the insertion direction.

Accordingly, stronger fixation can be achieved.

The side end plate portion 65 extends from the edge 64*a* of the inner plate portion 64 toward the side, and is formed to reach the end portion 54*a* of the side plate portion 54.

The side end plate portion 65 is formed to be perpendicular with respect to the longitudinal direction of the bottom plate portion 53.

Each of the side end plate portions 65 functions as the stopper wall portion which restricts the longitudinal direction movement of the optical fiber splicing unit 10 in the unit holding portion 51.

Preferably, the lower end plate portion 66 is formed so that the position in the longitudinal direction of the bottom plate portion 53 coincides with the position in the longitudinal direction of each of the side end plate portions 65.

The lower end plate portion 66 also functions as the stopper wall portion which restricts the longitudinal direction movement of the optical fiber splicing unit 10.

For example, the holding member 50 for an optical fiber splicing unit may be formed of a resin material such as polycarbonate, polyethylene, or polypropylene.

Figure 48:
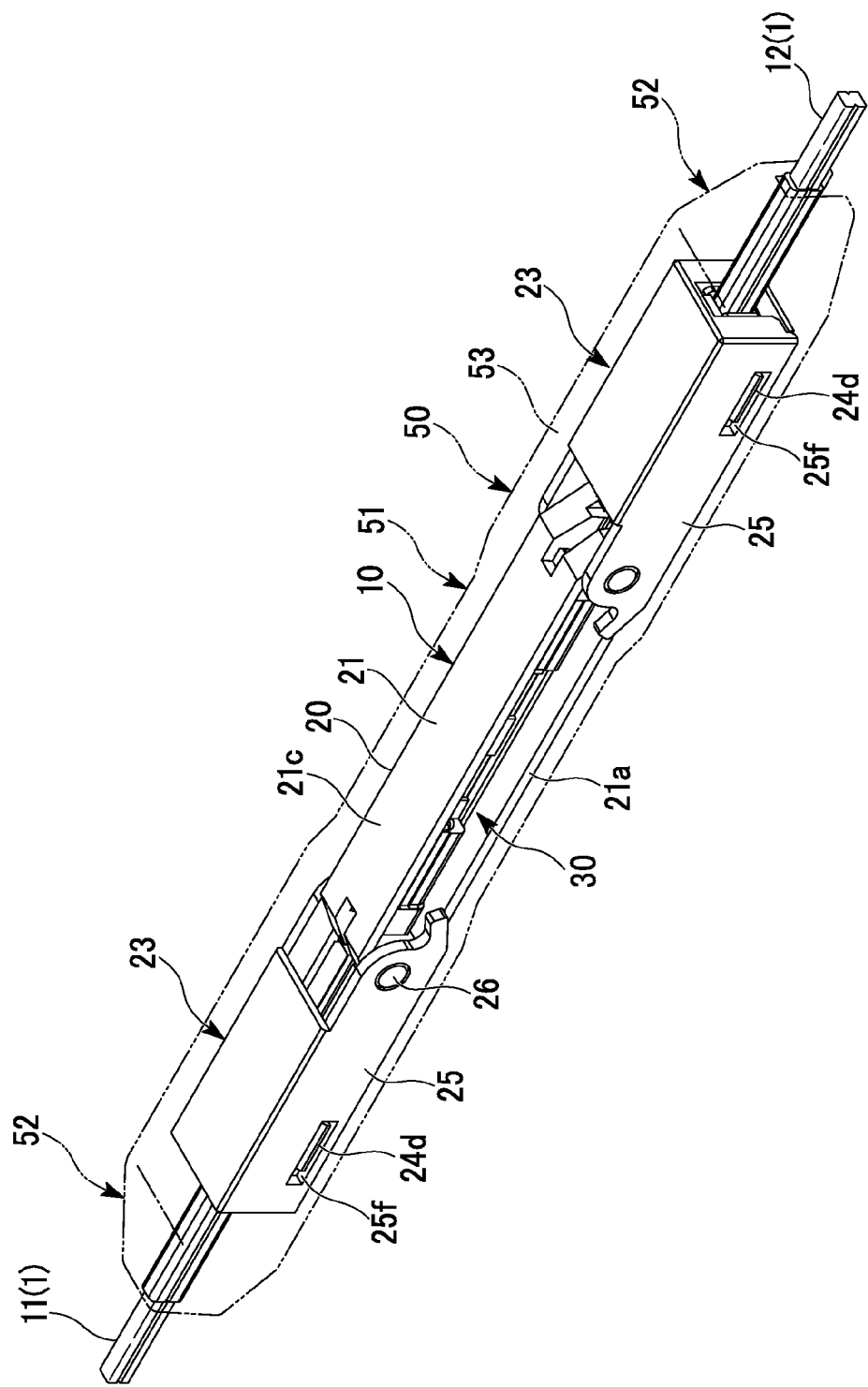
FIG. 48 is a perspective view of a use example of the holding member for an optical fiber splicing unit of the present invention.

FIG. 48 is a perspective view showing a use example of the holding member 50 for an optical fiber splicing unit.

As shown in FIG. 48, the holding member 50 for an optical fiber splicing unit can be installed to cover the optical fiber splicing unit 2010 which installed by wall surfaces or the like.

Next, the optical fiber splicing unit 2010 will be described using the optical fiber splicing unit 10 of the first embodiment of the present invention.

In addition, the optical fiber splicing unit is also referred to as a unit used to create an optical fiber splice.

Moreover, the optical fiber splicing unit used in the present embodiment is not limited to the optical fiber splicing unit 10 of the first embodiment.

FIG. 1 is a front view of an overall optical fiber splicing unit 10.

The optical fiber splicing unit 10 includes the mechanical splice 30 (hereinafter, also referred to as the splice), an elongated unit base 20 having a splice holder portion 21 which holds the splice 30, lever members 25 which are attached to both ends in a longitudinal direction of the unit base 20, and a splice tool 40 which is attached to the splice 30.

The optical fiber splicing unit 10 is used for splicing the optical fiber cables 11 and 12 to each other by but-jointing optical fibers 11*a* and 12*a* which are drawn and exposed (protruded) from terminals of the optical fiber cables 11 and 12.

The optical fiber splicing unit 10 includes cable anchors 23, which accommodate and anchor anchoring fixation members 120 (unit side cable fixing portion) fixed to the terminals of the optical fiber cable 1, on both end portions in the longitudinal direction (coincides with the longitudinal direction of the unit base 20) of the optical fiber splicing unit.

In the optical fiber splicing unit 10, the splice 30 is accommodated in the splice holder portion 21 which is provided at a center portion in the longitudinal direction of the unit base 20.

The but-joint of the optical fibers 11*a* and 12*a* of the optical fiber cables 11 and 12 are realized by the splice 30 positioned in the splice holder portion 21 (refer to FIG. 16 or the like).

Hereinafter, the terminal of the optical fiber cable 1 to which the anchoring fixation member 120 is fixed is referred to as the fixing member attached cable terminal 1*a*.

The unit base 20 includes fixing member guide portions 24, into which the fixing member attached cable terminals 1*a* are inserted, at both ends in the longitudinal direction.

The cable anchors 23 include the fixing member guide portions 24, and lever portions 25 which are rotatably attached to the unit base 20 around axes in the width direction of the lever portions.

Each of the fixing member guide portions 24 of the unit base 20 of the shown example is a wall portion having a U-shaped cross-section which can accommodate the fixing member attached cable terminal 1*a* inside the wall portion.

In each of the fixing member guide portions 24, the fixing member attached cable terminal 1*a* is inserted from the side opposite to the splice holder portion 21 of the center portion in the longitudinal direction of the unit base 20.

Moreover, each of the fixing member guide portions 24 has a function which advances and retracts the fixing member attached cable terminals 1*a* inserted into the guide portion with respect to the splice 30, that is, guides the movement in the longitudinal direction of the anchoring fixation member 120 with respect to the unit base 20.

Each of the lever portions 25 engage with the fixing member attached cable terminal 1*a* inserted into the fixing member guide portion 24, and thus, restricts the retraction (movement in a direction separated from the splice 30) of the fixing member attached cable terminal 1*a* with respect to the splice 30 accommodated in the splice holder portion 21.

The lever portions 25 restrict the retraction of the fixing member attached cable terminals 1a, and thus, function as an anchoring means which anchor the optical fiber cable 1 to the unit base 20.

As shown in FIG. 14, the splice 30 has a structure which collectively holds half-split elements (the base member 31 and the pressing cover 32 described below) inside the elongated clamp spring 33 which extends to have a U-shaped cross-section or a C-shaped cross-section (U-shaped cross-section in the shown example).

The entire splice 30 is formed in an elongated shape (an elongated bar shape in an appearance).

The splice 30 can put the optical fiber between the half-split elements 31 and 32 by the elasticity of the clamp spring 33.

As shown in FIGS. 1 and 17, the optical fiber splicing unit 10 includes the splice tool 40 on which the insertion piece 41 inserted between the half-split elements 31 and 32 of the splice 30 protrudes.

Hereinafter, the splice 30, in which the insertion piece is inserted between the half-split elements 31 and 32, is also referred to as the insertion piece attached splice (the insertion piece attached mechanical splice).

Since an insertion piece attached splice 30A of the shown example has a configuration in which the insertion piece 41 of the splice tool 40 is inserted between the half-split elements 31 and 32 of the splice 30, hereinafter, the insertion piece attached splice may be referred to as the tool attached splice (the tool attached mechanical splice).

In addition, since the splice principle between the optical fibers according to the third embodiment of the present invention is similar to the first and the second embodiments, a detailed descriptions thereof are omitted here.

As shown in FIGS. 1 to 3, and 13, in the present embodiment, the unit base 20 of the optical fiber splicing unit 10 is an integrally molded plastic part.

The unit base 20 includes an elongated plate-shaped base plate portion 22.

The splice holder portion 21 includes a frame-shaped portion configured of the elongated plate-shaped holder lower plate portion 21a which is the center portion in the longitudinal direction of the base plate portion 22, the pair of holder end plate portions 21b which are erected from both ends in the longitudinal direction of the holder lower plate portion 21a, and the holder upper plate portion 21c which is formed to extend in parallel with the holder lower plate portion 21a on the holder lower plate portion 21a.

The frame-shaped portion is formed in an elongated shape along the longitudinal direction of the unit base 20.

The holder upper plate portion 21c is bridged between upper ends of the pair of holder end plate portion 21b.

With respect to the optical fiber splicing unit 10, a direction orthogonal to the longitudinal direction on the upper surface 22a of the base plate portion 22 of the unit base 20 is defined as the width direction.

The splice holder portion 21 of the unit base 20 includes the side plate portion 21d (hereinafter, referred to as the holder side plate portion) at one side in the width direction.

The holder side plate portion 21d is provided inside one end in the width direction of the frame-shaped portion of the splice holder portion 21.

The holder side plate portion 21d is provided at only one side in the width direction of the splice holder portion 21, the holder side plate portion 21d does not exist at the other side in the width direction of the splice holder 21, and the other side is formed in an opening portion having a size corresponding to an inner circumference of the frame-shaped portion.

The splice 30 can be inserted into and detached from the splice holder portion 21 through the other side in the width direction of the splice holder portion 21.

The unit main body 10A includes the splice 30, the unit base 20, and the lever members 25.

The splice 30 is accommodated inside the frame-shaped portion so that the longitudinal direction of the splice 30 is arranged (coincides with the longitudinal direction of the unit base 20) in the longitudinal direction of the base plate portion 22.

Moreover, the width direction of the splice 30 coincides with the width direction of the unit base 20, and the splice 30 is accommodated in the splice holder portion 21 via the half-split grip member 34 so that the side (open side) opposite to the back plate portion 33a of the clamp spring 33 is positioned toward the lower side, that is, is accommodated in the direction facing the holder lower plate portion 21a.

As shown in FIG. 18, the anchoring fixation member 120 is provided to enclose the outer circumference of the terminal of the optical fiber cable 1, and is fixed to be integrated with the terminal.

The sheath grip member 120 includes a cable fixing portion 129 used to grip and fix the optical fiber cable 1 behind the elongated plate-shaped front plate portion 128.

The cable fixing portion 129 includes the grip base 121 having a U-shaped cross-section in which a cable fitting groove 122, to which the optical fiber cable 1 is fitted, is formed, and the pressing cover 123 which is pivoted at one of both side wall portions 125 in the groove width direction of the cable fitting groove 122 of the grip base 121.

In the sheath grip member 120, the plurality of gripping protrusions 125c, which protrude from mutually facing surfaces of the pair of side wall portions 125 of the grip base 121, are bitten into the sheath 3 of the optical fiber cable 1 fitted to the cable fitting groove 122, and thus, the optical fiber cable 1 can be gripped and fixed between the pair of side wall portions 125.

The grip base 121 is a member having a U-shaped cross-section in which the cable fitting groove 122 is secured between the pair of side wall portions 125 protruding from one surface side of the bottom wall portion 124.

The groove width direction of the cable fitting groove 122 indicates the interval direction of both side wall portions 125 via the cable fitting groove 122.

Moreover, the gripping protrusions 125c of the sheath grip member 120 of the shown example are formed in protrusions having triangular cross-sections extending in the depth direction of the cable fitting groove 122.

Moreover, after the grip base 121 is externally fitted and fixed to the terminal of the optical fiber cable 1 in an open state in which the pressing cover 123 is separated from the other side wall portion 125, the pressing cover 123 is rotated to a closed position in which the opening portion of the cable fitting groove 122, which is disposed between ends portions opposite to the bottom wall portion 124 of the pair of side wall portions 125 of the grip base 121, is closed, the pressing cover 123 is locked to the other side wall portion 125, and thus, the sheath grip member 120 is attached to the terminal of the optical fiber cable 1.

The pressing cover 123 is rotatably connected to a protruding end of one (assigned by a reference numeral 125a) of the pair of side wall portions 125, via the thin portion 126 which functions as a hinge portion.

Moreover, hereinafter, the other of the pair of side wall portions 125 of the grip base 121 is also referred to as the second side wall portion 125b.

The pressing cover 123 is formed in an L-shaped plate.

The pressing cover 123 includes the top plate portion 123a which is pivoted to the first side wall portion 125a of the grip base 121 via the thin portion 126, and a locking plate portion 123b which is formed to be perpendicular to the top plate portion 123a from the end portion opposite to the thin portion 126 of the top plate portion 123a.

By inserting the locking claw 125d protruding from the outer surface of the second side wall portion 125b of the grip base 121 into the locking window hole 123c formed on the locking plate portion 123b, the pressing cover 123 is locked to the grip base 121, and thus, the closed state with respect to the grip base 121 can be stably maintained.

The fiber groove 128b, which supports the optical fiber 2 protruding from the terminal of the optical fiber cable 1, is formed to extend in the front-rear direction on the upper surface 128a of the front plate portion 128.

In order to splice the optical fiber cables 11 and 12 using the optical fiber splicing unit 10, after a first fiber inserting and anchoring process is performed in which one optical fiber 2 of the optical fiber cables 11 and 12 to be spliced to each other is inserted into the splice 30 and the fixing member attached cable terminal 1a assembled to the optical fiber cable terminal is fixed to the unit main body 10A, a second fiber inserting and anchoring process is performed in which the optical fiber of the other optical fiber cable is inserted into the splice, and the fixing member attached cable terminal 1a assembled to the optical fiber cable terminal is fixed to the unit main body 10A.

In the first fiber inserting and anchoring process, the tip portion of the optical fiber 11a of the optical fiber cable 11 (hereinafter, also referred to as the first optical fiber cable 11) is inserted into and fixed to the splice 30.

FIGS. 2 and 3 show the state where the first fiber inserting and anchoring process is completed.

In the second fiber inserting and anchoring process, the tip portion of the optical fiber 12a of the other optical fiber cable 12 (hereinafter, also referred to as the second optical fiber cable) is inserted into the splice 30, and is fixed to the splice 30 in a state where the tip portion abuts the optical fiber 11a (hereinafter, also referred to as the first optical fiber) of the first optical fiber cable 11.

In the first fiber inserting and anchoring process, first, the fixing member attached cable terminal 1a of the fiber optical fiber cable 11 is inserted into the fixing member guide portion 24 of one (hereinafter, also referred to as the first cable anchor 23A) of both cable anchors 23 of the optical fiber splicing unit 10, and abuts the spacer protrusion 48 of the first splice tool 40A.

Moreover, hereinafter, the cable anchor 23 close to the second splice tool 40B is referred to as the second cable anchor 23B.

The insertion piece 41 of the first splice tool 40 is pulled out from the splice 30, and the splice tool 40 is removed from the unit main body 10A.

Subsequently, the lever member 25 engages with the anchoring fixation member 120, and retraction of the fixing member attached cable terminal 1a with respect to the splice 30 is restricted (anchored).

As shown in FIGS. 2 and 3, the lever member 25 includes the flat plate-shaped top plate portion 25a, the pair of lever side plate portions 25b which are perpendicularly erected on both sides of the top plate portion 25a and are provided to be parallel to each other, and engagement piece portions 25c.

The lever member 25 is rotatably attached in relation to the unit base 20 around the rotary shafts 26.

When the anchoring fixation member 120 is inserted into the fixing member guide portion 24, the lever member 25 is disposed at the waiting position where the lever member is prevented from contacting with the anchoring fixation member 120.

In the lever member 25, according to the rotation with respect to the unit base 20, from the waiting position, the engagement piece portions 25c, which are provided on the other end sides in the longitudinal direction of the pair of lever side plate portions 25b, are positioned on the rear side of the anchoring fixation member 120 accommodated in the fixing member guide portion 24 and engage with the anchoring fixation member 120, and thus, the retraction of the anchoring fixation member 120 can be restricted.

As shown in FIG. 13, the other end portion in the longitudinal direction of the pair of lever side plate portions 25b is integrated with the top plate portion 25a.

The engagement piece portions 25c of the lever member 25 protrude in a direction which faces with each other from the other end portions of the pair of lever side plate portions 25b in the longitudinal direction the lever side plate portions 25b, and are formed in a protruding wall shape extending in the perpendicular direction with respect to the top plate portion 25a.

In the end portions of the engagement piece portion 25c opposite to the top plate portion 25a, inclined surfaces 25d are formed to be inclined with respect to the top plate portion 25a so that the distance from one end portion in the longitudinal direction of the lever side plate portion 25b is increased with distance from the top plate portion 25a.

When the lever member 25 is rotated from the waiting position and is positioned at the retraction restriction position, the inclined surfaces 25d abut the upper end of the rear end surface (the upper end of the left rear end surface of the anchoring fixation member 120 in FIG. 13) of the anchoring fixation member 120 which is positioned at the fiber insertion completion position.

When the anchoring fixation member 120 is positioned at the fiber insertion completion position, the rear end portion of the anchoring fixation member protrudes from both guide side plate portions 24b of the fixing member guide portion 24 to the side opposite to the splice 30.

Each of the inclined surfaces 25d function as the fixing member pressing and advancing portion which presses and advances the anchoring fixation member 120 toward the splice 30 according to the rotation of the lever member 25 from the waiting position to the retraction restriction position.

Accordingly, the anchoring fixation member 120 abuts the holder end plate portion 21b and can be fixed at the advancement limit position, and the bending 2c of the optical fiber 2 is formed to be secured between the terminal of the optical fiber cable 11 fixed to the cable fixing portion 129 of the anchoring fixation member 120 and the splice 30.

The formation of the bending 2c prevents an excessive tensile force due to influences of handling or a temperature cycle of the first optical fiber cable 11 or the like, for example, from applying to the first optical fiber 11a fixed to the splice 30 due to the removal of the first splice tool 40A.

Accordingly, the formation of the bending 2c is advantageous to avoid disconnection of the first optical fiber 11a due to the excessive tensile force, deviation of the fixation position with respect to the splice 30, or the like.

In the lever member 25 which is rotated from the waiting position to the retraction restriction position, locking claws 24d protruding from both guide side plate portions 24b of the fixing member guide portion 24 can be inserted to engage with locking window holes 25f formed at center portions of both lever side plate portions 25b.

In the second fiber inserting and anchoring process, first, the fixing member attached cable terminal 1a assembled to the second optical fiber cable 12 is inserted into the fixing member guide portion 24 of the second cable anchor 23B, and the second optical fiber 12a protruding from the terminal of the optical fiber cable 12 is inserted into the fiber storage region FS of the splice 30 via the fiber introduction hole 21h of the holder end plate portion 21b of the splice holder portion 21.

Accordingly, the bare optical fiber 2a which is led-out in advance from the second optical fiber 12a is inserted into the bare optical fiber storage region FS2 via the fiber storage region FS of the splice 30.

The fixing member attached cable terminal 1a inserted into the fixing member guide portion 24 of the second cable anchor 23B advances to decrease the distance from the splice 30, and thus, the front end of the anchoring fixation member 120 (second anchoring fixation member) abut the spacer protrusion 48 (the second spacer) of the second splice tool 40B.

If the front end of the anchoring fixation member 120 abuts the spacer protrusion 48, in the bare optical fiber storage region FS2, the tip of the second optical fiber 12a protruding to the front side from the front end of the anchoring fixation member 120 abuts (butts) the tip of first optical fiber 11a fixed to the splice 30.

Specifically, the abutment between tips of the first and second optical fibers 11a and 12a is performed by butting the tip of the bare optical fiber 2a led-out to the tip portion of the second optical fiber 12a and the tip of the bare optical fiber 2a led-out to the tip portion of the first optical fiber 11a.

Subsequently, the insertion pieces 41 is pulled out from the splice 30 by applying the pressing force, which cause the pair of elastic operation pieces 44 to approach each other, to the second splice tool 40B, and thus, the second splice tool is removed from the unit main body 10A.

Subsequently, the lever member 25 is rotated from the waiting position to the retraction restriction position, the anchoring fixation member 120 engages with the lever member 25, and the retraction of the fixing member attached cable terminal 1a with respect to the splice 30 is restricted (anchored).

Accordingly, the fixing member attached cable terminal 1a of the second optical fiber cable 12 is anchored to the unit main body 10A, and the second fiber inserting and anchoring process is completed.

The pulling-out of the insertion pieces 41 of the second splice tool 40B from the splice 30 is performed in the state where the abutment of the second optical fiber 12a with respect to the first optical fiber 11a is maintained.

Since the holding member 50 for an optical fiber splicing unit includes the unit holding portion 51 which holds the optical fiber splicing unit 10 and the holding member side cable fixing portion 52 which grips and fixes the optical fiber cable 1, the optical fiber cable 1 can be gripped and fixed at two locations including the optical fiber splicing unit 10 (anchoring fixation member 120 (unit side cable fixing portion)) and the holding member side cable fixing portion 52.

Accordingly, the gripping force of the optical fiber cable 1 can be increased.

Moreover, in the holding member 50 for optical fiber splicing unit, since the unit holding portion 51 and the holding member side cable fixing portion 52 are integrally formed to each other, and the holding member side cable fixing portion 52 has a simple structure which grips and fixes the optical fiber cable 1 by fitting the optical fiber cable 1 to the cable fitting groove 71, an installation space of the holding member 50 for an optical fiber splicing unit is decreased, and the manufacturing cost thereof can also be decreased.

In addition, since the holding member 50 used to hold an optical fiber splicing unit can cover the optical fiber 2 (particularly, the bending 2c), it is possible to prevent a user from erroneously touching the optical fiber 2, and thus, an influence with respect to communication of the optical fiber 2 in an active state can be prevented.

Fourth Embodiment

Hereinafter, a mechanical splice tool according to a fourth embodiment of the present invention will be described with reference to the drawings.

Moreover, in the present embodiment, the same reference numerals are assigned to the same components as those of the first embodiment.

Figure 49:
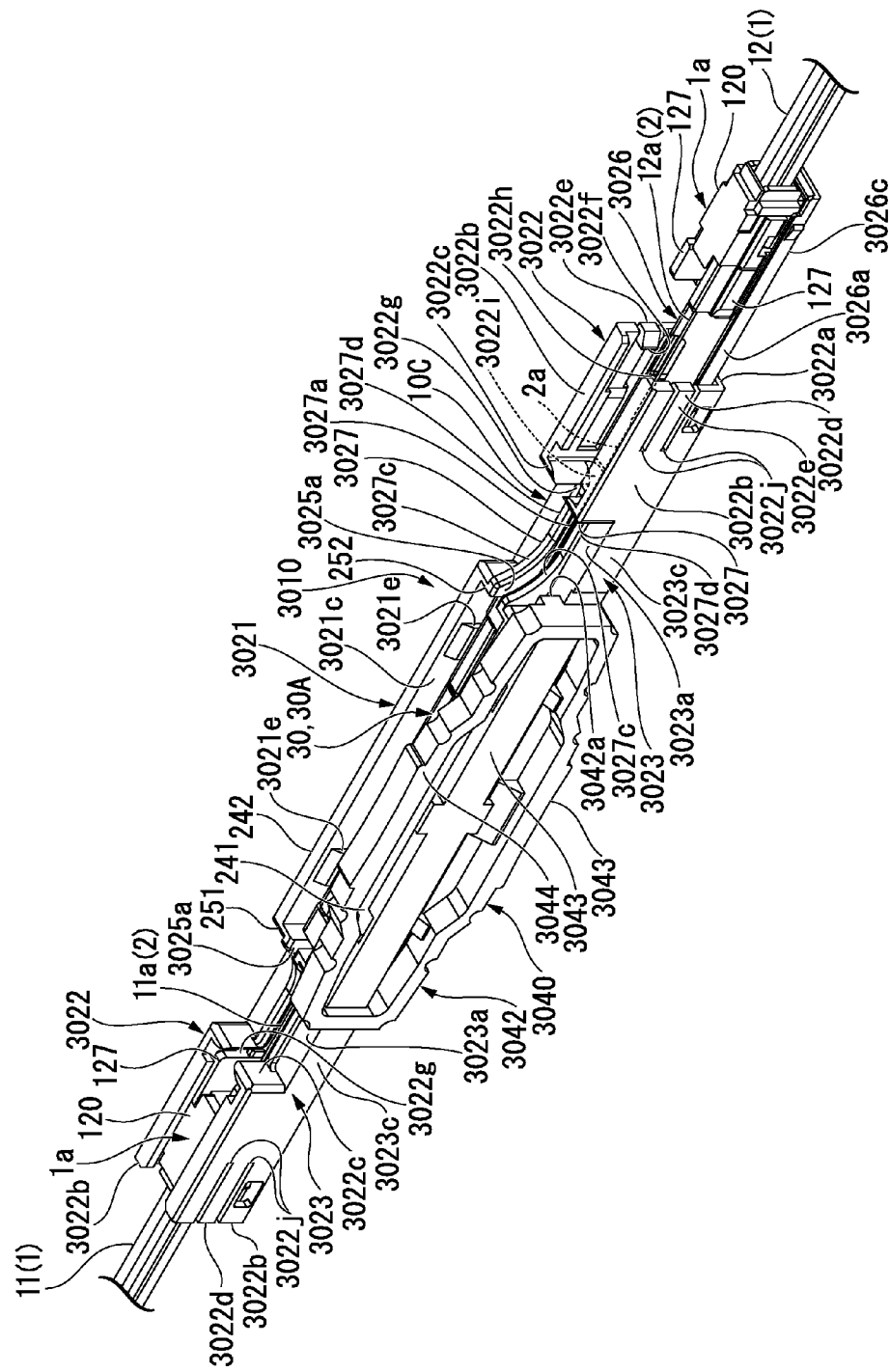
FIG. 49 is a perspective view showing an overall structure of an optical splicing unit which is assembled using a mechanical splice tool of an embodiment according to the present invention.
Figure 50:
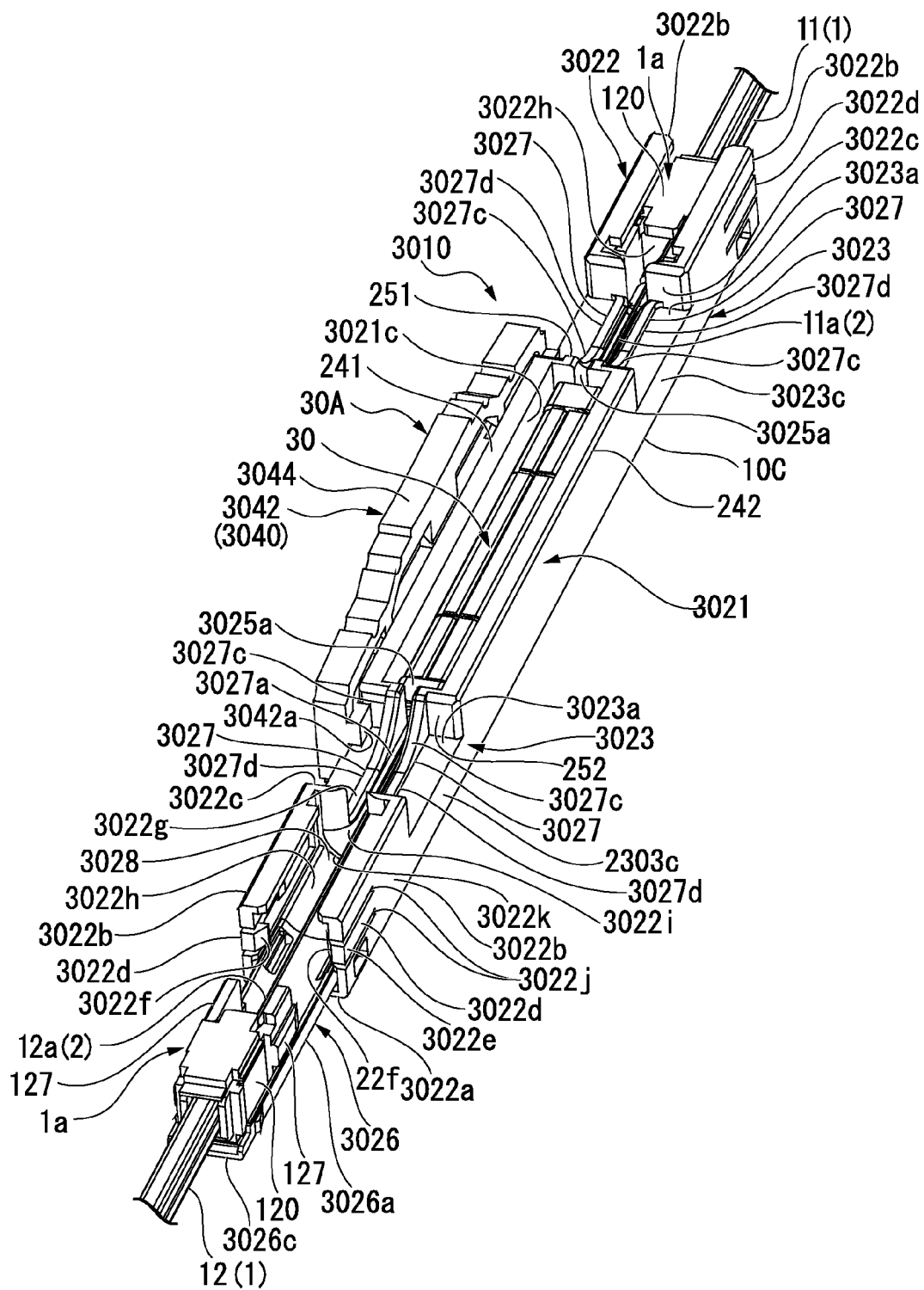
FIG. 50 is a perspective view showing the structure when the optical splicing unit of FIG. 49 is viewed from a direction different from the FIG. 1.
Figure 51:
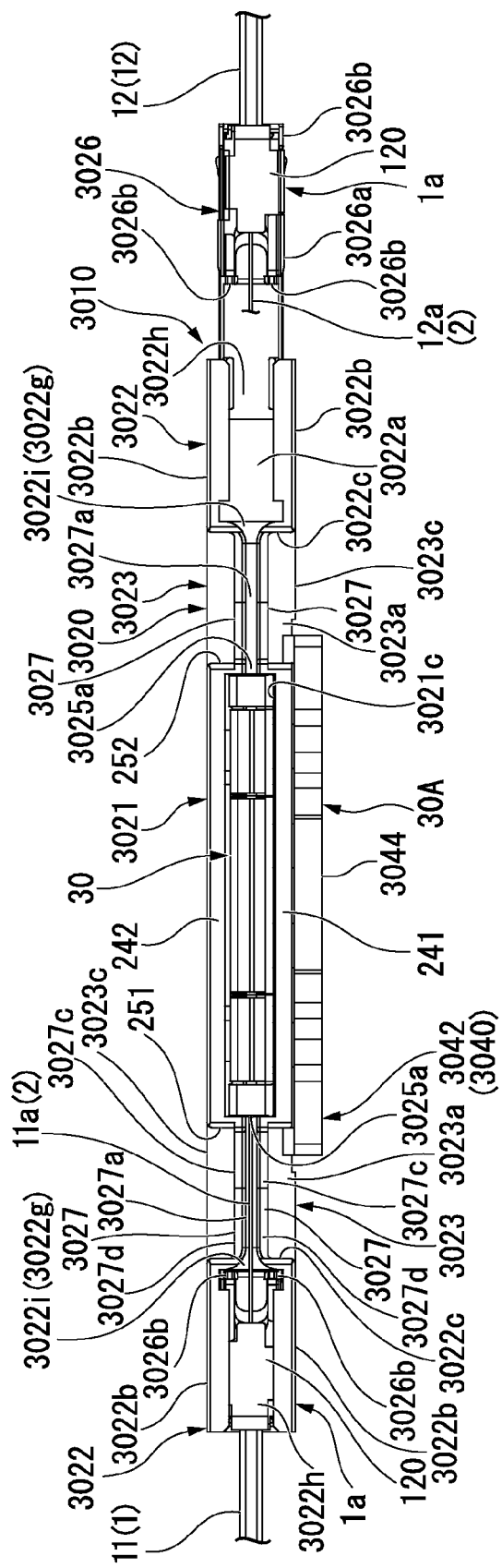
FIG. 51 is a plan view showing the structure of the optical splicing unit of FIG. 49.

FIGS. 49 to 51 show an optical splicing unit 3010 which is assembled using a mechanical splice tool 3040 (hereinafter, simply referred to as a splice tool) according to an embodiment of the present invention.

The optical splicing unit 3010 described herein can be applied to the splice (optical splice) between optical fiber cables.

The reference numeral 11 is assigned to one of the optical fiber cables 1 spliced to each other by the optical splicing unit 3010, and the reference numeral 12 is assigned to the other one.

As shown in FIG. 20, the optical fiber cable 1 (optical fiber cables 11 and 12) is configured by collectively coating the sheath 4 made of a synthetic resin so that the optical fiber 2 and the linear tensile strength bodies 3 having flexibility are in parallel with one another.

As the tensile strength bodies 3, for example, a body formed of tensile strength fibers such as aramid fibers, a steel wire, or the like may be used.

The optical fiber 2 is a coated optical fiber which is configured by covering the outer circumference surface (side surface) of the bare optical fiber 2a with the coating 2b. As the optical fiber, for example, an optical fiber core wire, an optical fiber element wire, or the like may be used.

For example, the bare optical fiber 2a is a quartz optical fiber.

Moreover, the coating 2b is a resin coating in which a single layer or a plurality of layers formed of an ultraviolet curing resin, a polyamide resin, or the like are substantially concentrically coated.

As the optical fiber cable 1, an indoor cable, a drop cable, or the like may be used.

In addition, in the drawings, the reference numeral 11a is assigned to the optical fiber 2 of the optical fiber cable indicated by the reference numeral 11, and the reference numeral 12a is assigned to the optical fiber 2 of the optical fiber cable indicated by the reference numeral 12.

The optical splicing unit 3010 is used to splice the optical fiber cables 11 and 12 to each other by but-jointing optical fibers 11a and 12a which are exposed (protruded) from terminals of the optical fiber cables 11 and 12.

The optical splicing unit 3010 is schematically configured to hold the mechanical splice 30 (hereinafter, simply referred to as the splice), in which the optical fibers are put between the half-split elements 31 and 32, in the splice holder portion 3021 at the center portion in the longitudinal direction of an elongated unit main body 10C.

Moreover, in the present specification, in the optical splicing unit 3010, upper sides of FIGS. 49 and 50 and a front side in a paper surface of FIG. 51 are defined as a upper portion, and lower sides of FIGS. 49 and 50 and a rear side in the paper surface of FIG. 51 are defined as a lower portion.

The unit main body 10C of the optical splicing unit 3010 includes cable anchors 3022 which accommodate and anchor the anchoring fixation members 120 fixed to terminals of the optical fiber cables 11 and 12 on both ends of the unit main body in the longitudinal direction.

In addition, the unit main body 10C includes the splice holder portion 3021 at the center portion in the longitudinal direction, and fiber guide frame portions 3023 in which fiber guide walls 3027 and fiber guide grooves 3027a used to guide the optical fibers 2 inserted between the half-split elements 31 and 32 of the splice 30 from the cable anchor 3022 sides are provided on a connection base portion 3023c connected between the cable anchors 3022 at both ends in the longitudinal direction.

Each of the fiber guide frame portions 3023 is provided between the splice holder portion 3021 and each of the cable anchors 3022 positioned on both ends of the unit main body 10C in the longitudinal direction.

The specific configuration of the fiber guide frame portion 3023 will be described below.

The splice 30 has a structure which collectively holds the half-split elements (the base member 31 and the pressing cover 32 described below) inside the elongated clamp spring 33 which extends to have a U-shaped cross-section or a C-shaped cross-section (U-shaped cross-section in the shown example).

The splice 30 can put the optical fiber between the half-split elements 31 and 32 using elasticity of the clamp spring 33.

Moreover, the optical fiber splicing unit 3010 includes the splice tool 3040 on which an insertion piece 3041 (insertion member) inserted between the half-split elements 31 and 32 of the splice 30 protrudes.

Hereinafter, the splice 30, in which the insertion piece is inserted between the half-split elements 31 and 32, is also referred to as the tool attached splice (the tool attached mechanical splice).

The tool attached splice 30A of the shown example has a configuration in which the insertion piece 41 of the splice tool 40 is inserted between the half-split elements 31 and 32 of the splice 30.

In addition, since the splice principle between the optical fibers according to the fourth embodiment of the present invention is similar to the first to the third embodiments, a detailed description thereof is omitted here.

As shown in FIGS. 49 to 53, in the present embodiment, the unit main body 10C of the optical splicing unit 3010 of the shown example may be an integrally molded plastic part.

The splice holder portion 3021 of the unit main body 10C includes an elongated holder bottom wall portion 3021a extending along the longitudinal direction of the unit main body 10C in the center portion in the longitudinal direction of the unit main body 10C, and two holder side wall portions 241 and 242 which are erected on the holder bottom wall portions 3021a.

Two holder side wall portions 241 and 242 are erected on both sides in the width direction of the holder bottom wall portion 3021a and are formed to extend in the longitudinal direction of the unit main body 10C.

Moreover, the splice holder portion 3021 includes stopper wall portions 251 and 252 which are erected on both ends of the holder bottom wall portion 3021a in the longitudinal direction.

In the splice holder portion 3021, the splice 30 is accommodated in a groove-shaped space (splice accommodation space 3021c) which is surrounded on three sides by the holder bottom wall portion 3021a and two holder side wall portions 241 and 242.

Moreover, both end surfaces in the longitudinal direction of the splice 30 abut the stopper wall portions 251 and 252, and thus, the splice is positioned in the longitudinal direction with respect to the unit main body 10C.

Two holder side wall portions 241 and 242 are erected on both sides in the width direction which is the direction perpendicular to the longitudinal direction of the unit main body 10C.

The stopper wall portions 251 and 252 are erected in the direction orthogonal to the longitudinal direction of the unit main body 10C.

In addition, the splice holder portion 3021 positions and stores the splice 30 inside holder outer peripheral walls having a rectangular frame shape in a plan view which includes two holder side wall portions 241 and 242 and the stopper wall portions 251 and 252.

The insertion pieces 3041 of the splice tool 3040 inserted between the elements 31 and 32 of the splice 30 pass through insertion pieces through holes 3024a (refer to FIGS. 4 to 6C) formed on one (the holder side wall portion indicated by the reference numeral 241) of two holder side wall portions 241 and 242.

Hereinafter, in two holder side wall portions 241 and 242, the holder side wall portion 241 on which the insertion piece through holes 3024a are formed is referred to as a first holder side wall portion, and the other holder side wall portion 242 is also referred to as a second holder side wall portion.

The insertion piece through holes 3024a penetrate the thickness of the first holder side wall portion 241, and open the inner surface of the first holder side wall portion 241 facing the second holder side wall portion 242 and the outer surface opposite to the inner surface.

In the splice 30, the back plate portion 33a of the clamp spring 33 faces the second holder side wall portion 242, one of the pair of side plate portions 33b of the clamp spring 33 abuts the holder bottom wall portion 3021a, and thus, the splice is accommodated in the splice holder portion 3021.

That is, the splice 30 is accommodated in the splice holder portion 3021 while the side (open side) opposite to the back plate portion 33a of the clamp spring 33 via the half-split grip member 34 faces the first holder side wall portion 241.

Figure 52:
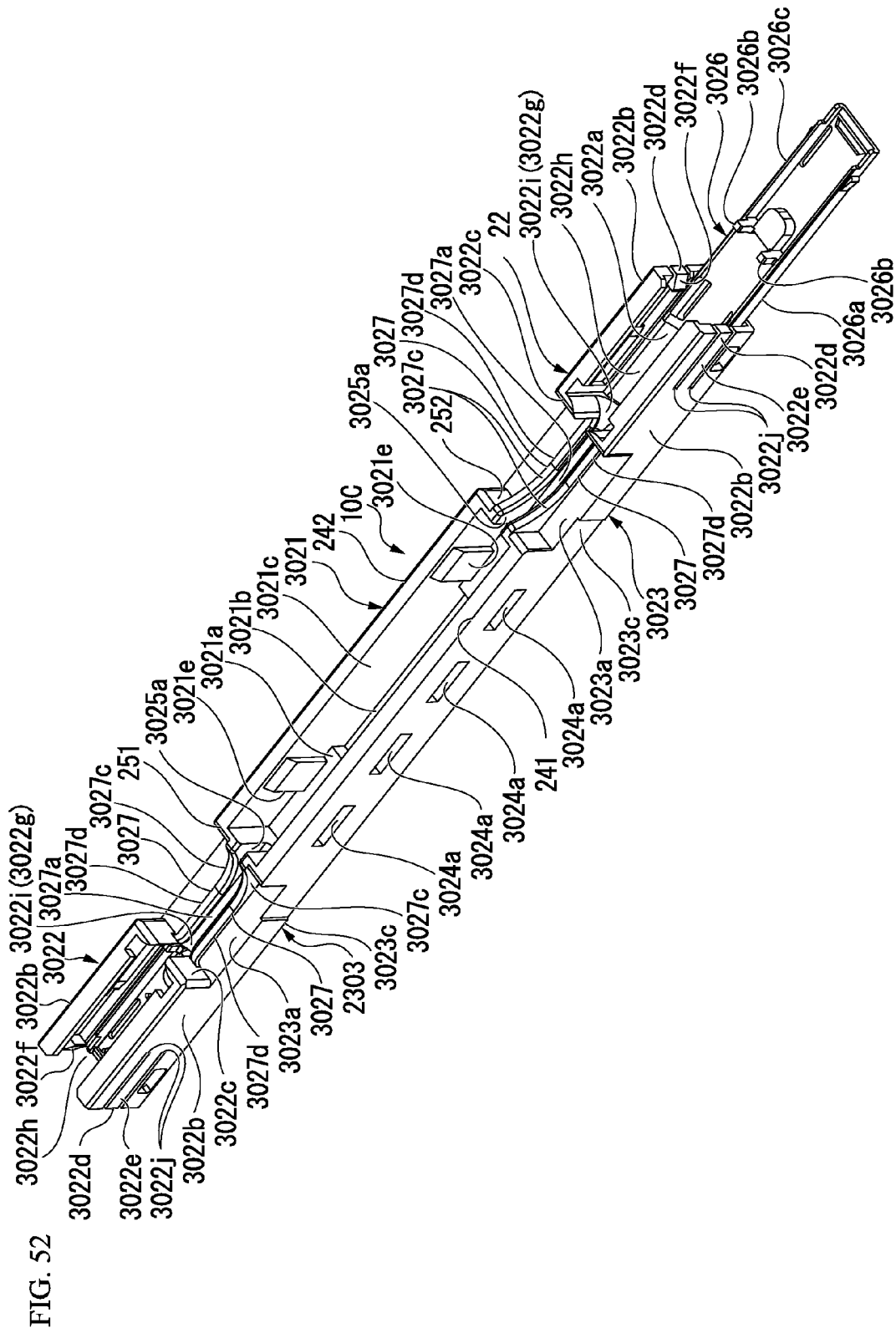
FIG. 52 is a perspective view showing a structure of a unit main body of the optical splicing unit of FIG. 49.
Figure 53:
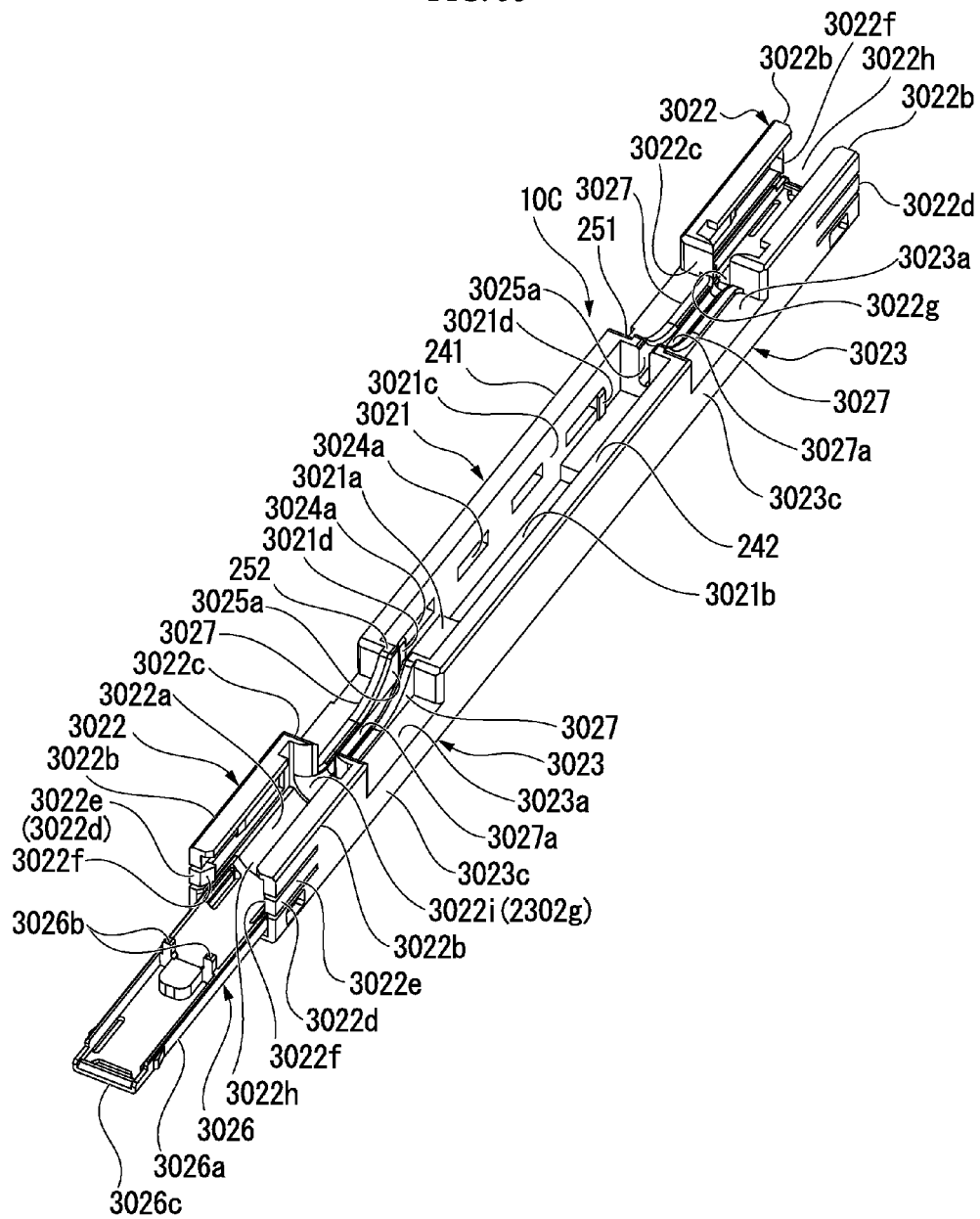
FIG. 53 is a perspective view showing the structure when the unit main body of FIG. 52 is viewed from a direction different from FIG. 52.
Figure 54:
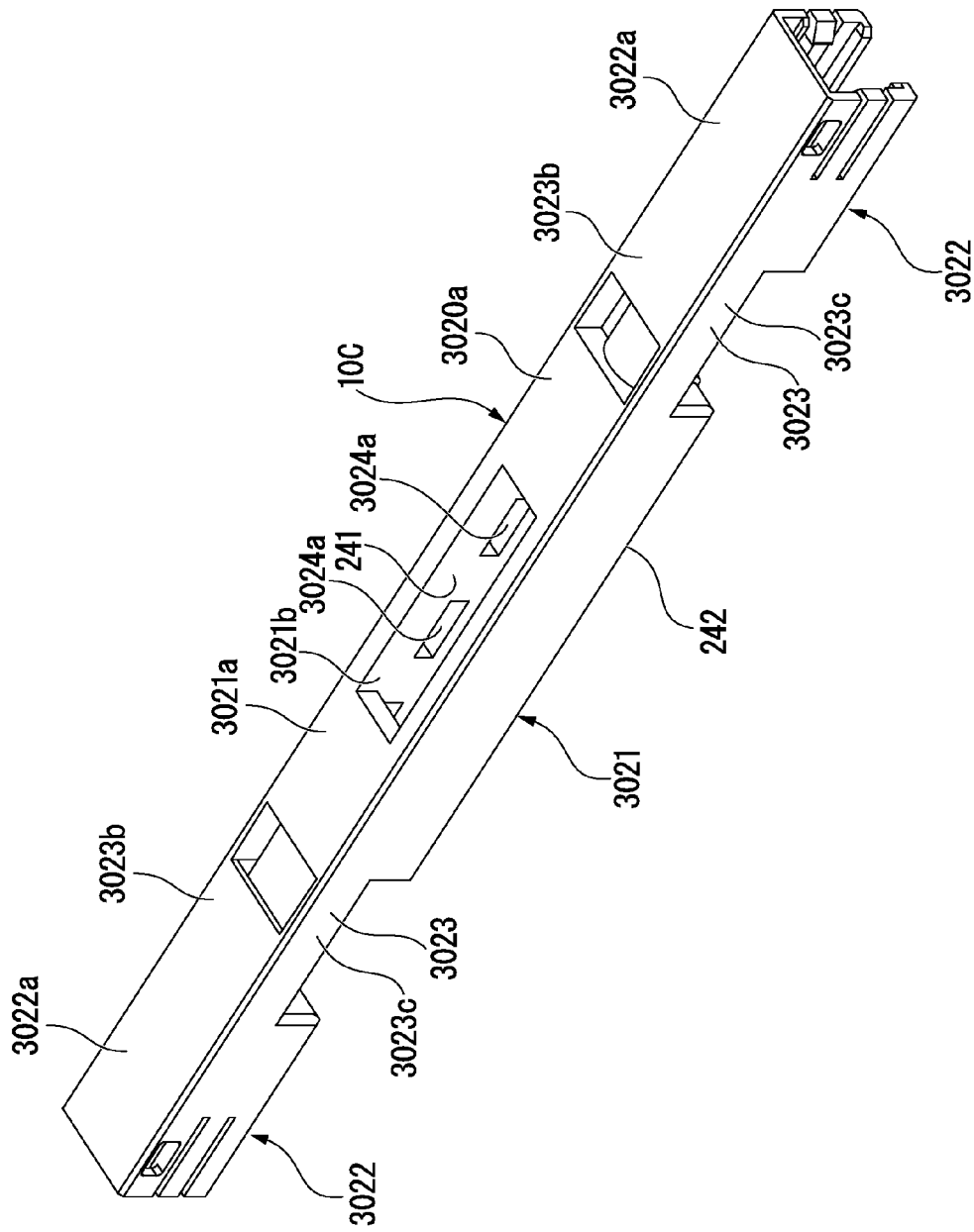
FIG. 54 is a perspective view showing the structure when the unit main body of FIG. 52 is viewed from the lower surface side.

In addition, as shown in FIGS. 52 to 54, in the shown example, the holder bottom wall portion 3021a of the splice holder portion 3021 of the unit main body 10C is formed in a rectangular frame shape in which a window hole 3021b is formed at the center portion.

The window hole 3021b of the shown example is formed in an angled hole shape.

Figure 63:
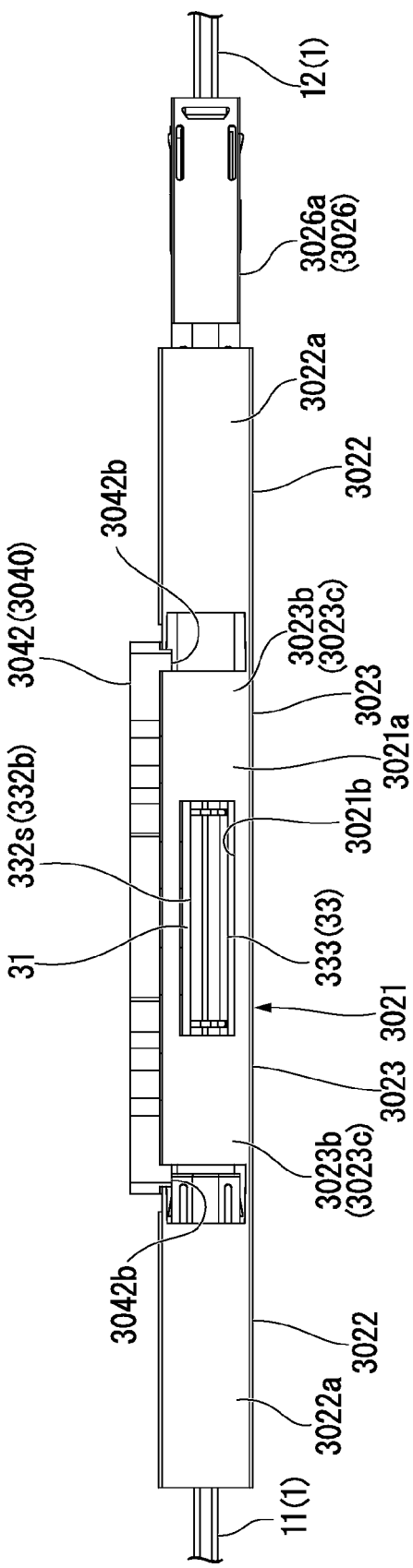
FIG. 63 is a bottom view showing a relationship between a window hole of a holder bottom wall portion of the splice holder portion in the optical splicing unit of FIG. 49 and a second clamping portion of the mechanical splice.

Moreover, as shown in FIG. 63, the window hole 3021b is formed at a position corresponding to the side plate portion 332b disposed on the groove bottom side of the groove-shaped splice accommodation space 3021c between the pair of holder side wall portions 241 and 242 of the splice holder portion 3021, in the pair of side plate portions 332b of the second clamp spring portion 332 of the splice 30.

Hereinafter, the side plate portion 332b positioned at the groove bottom side of the splice accommodation space 3021c of the second clamp spring portion 332 of the splice 30 is also referred to as a lower side plate portion.

Moreover, the lower side plate portion is assigned by a reference numeral 322s.

In the shown example, in the optical splicing unit 3010 in a plan view (or in a bottom view as shown in FIG. 19), the entire lower side plate portion 332s of the second clamp spring portion 332 of the splice 30 is positioned inside the window hole 3021b.

The lower side plate portion 332s of the second clamp spring portion 332 of the splice 30 does not contact the holder bottom wall portion 21a of the splice holder portion 3021.

Moreover, in the optical splicing unit 3010 of the shown example, the entire lower side plate portion 332s of the second clamp spring portion 332 of the splice 30 is made visible from a lower surface 3020a of the unit main body 10C via the window hole 3021b of the splice holder portion 3021 of the unit main body 10C.

Figure 61:
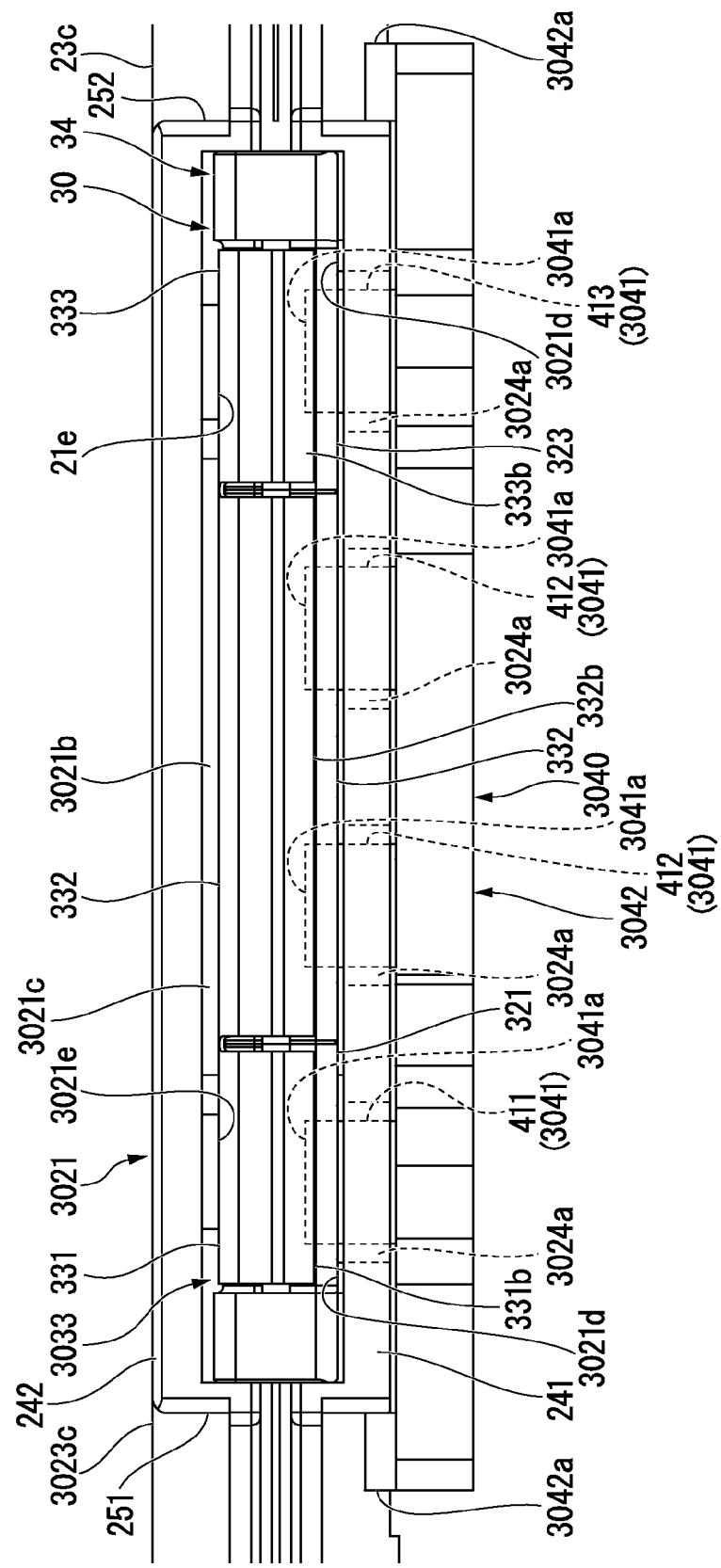
FIG. 61 is a view for illustrating a relationship between the insertion member (insertion piece) of the mechanical splice tool of FIG. 56 and three cover members of the mechanical splice.

Moreover, as shown in FIGS. 49 and 61, or the like, in the shown example, abutment protrusions 3021e (refer to FIG. 52; second abutment protrusions) protrude from the inner surface of the holder side wall portion 242 of the splice holder portion 3021 of the unit main body 10C facing the splice accommodation space 3021c, and the abut the portions positioned at the first and third clamp spring portions 331 and 333 in the back plate portion 33a of the clamp spring 33 of the splice 30.

The abutment protrusions 3021e protrude at two locations which are separated from each other in the extension direction (longitudinal direction) of the splice accommodation space 3021c extending along the longitudinal direction of the unit main body 10C, in the inner surface of the holder side wall portion 242.

The half-split grip member 34 of the splice 30 includes portions (open side extension portions) which extend from the open side end portions of the pair of side plate portions 33b of the clamp spring 33 to the sides opposite to the back plate portion 33a of the clamp spring 33.

Abutment protrusions 3021d (refer to FIG. 53; first abutment protrusions) protrude from the inner surface side of the holder side wall portion 241 of the splice holder portion 3021 facing the splice accommodation space 3021c, and the abutment protrusions abut the open side extension portions of the half-split grip member 34 in the first and third clamping portions 331 and 333 of the splice 30.

The abutment protrusions 3021d protrude at two locations which are separated from each other in the extension direction (longitudinal direction) of the splice accommodation space 3021c, in the inner surface of the holder side wall portion 241.

In addition, the abutment protrusions 3021d are formed at positions avoiding the insertion piece through holes 3024a in the holder side wall portion 241.

The splice 30 is accommodated in the splice holder portion 3021, in which the portions positioned at the first and third clamp spring portions 331 and 333 in the back plate portion 33a of the clamp spring 33 abut the abutment protrusions 3021e of the inner surface side of the holder side wall portion 242, and the open side extension portions of the half-split grip member 34 in the first and third clamping portions 331 and 333 abut the abutment protrusions 3021d of the inner surface side of the holder side wall portion 241.

Accordingly, the position, which is positioned at the second clamp spring portion 332 in the clamp spring 33 of the splice 30 accommodated in the splice holder portion 3021, does not contact the holder side wall portion 242 of the splice holder portion 3021.

That is, in the optical splicing unit 10 of the shown example, the second clamping portion including the second clamp spring portion 332 of the splice 30 does not contact the holder side wall portions 241 and 242 and the holder bottom wall portion 3021a of the splice holder portion 3021.

In the optical splicing unit 3010 of the shown example, in the second clamping portion of the splice 30, when the insertion pieces 3041 are pulled out, the gripping and fixing of the bare optical fiber 2a of the optical fiber 2 of the optical fiber cable 1 are realized without any influence from the contact with the holder side wall portions 241 and 242 and the holder bottom wall portion 3021a of the splice holder portion 3021.

Accordingly, the optical splicing unit 10 is advantageous to secure alignment accuracy of the bare optical fiber 2a in the second clamping portion of the splice 30.

This effectively contributes to the but-joint in lows loss of the bare optical fibers 2a.

Figure 56:
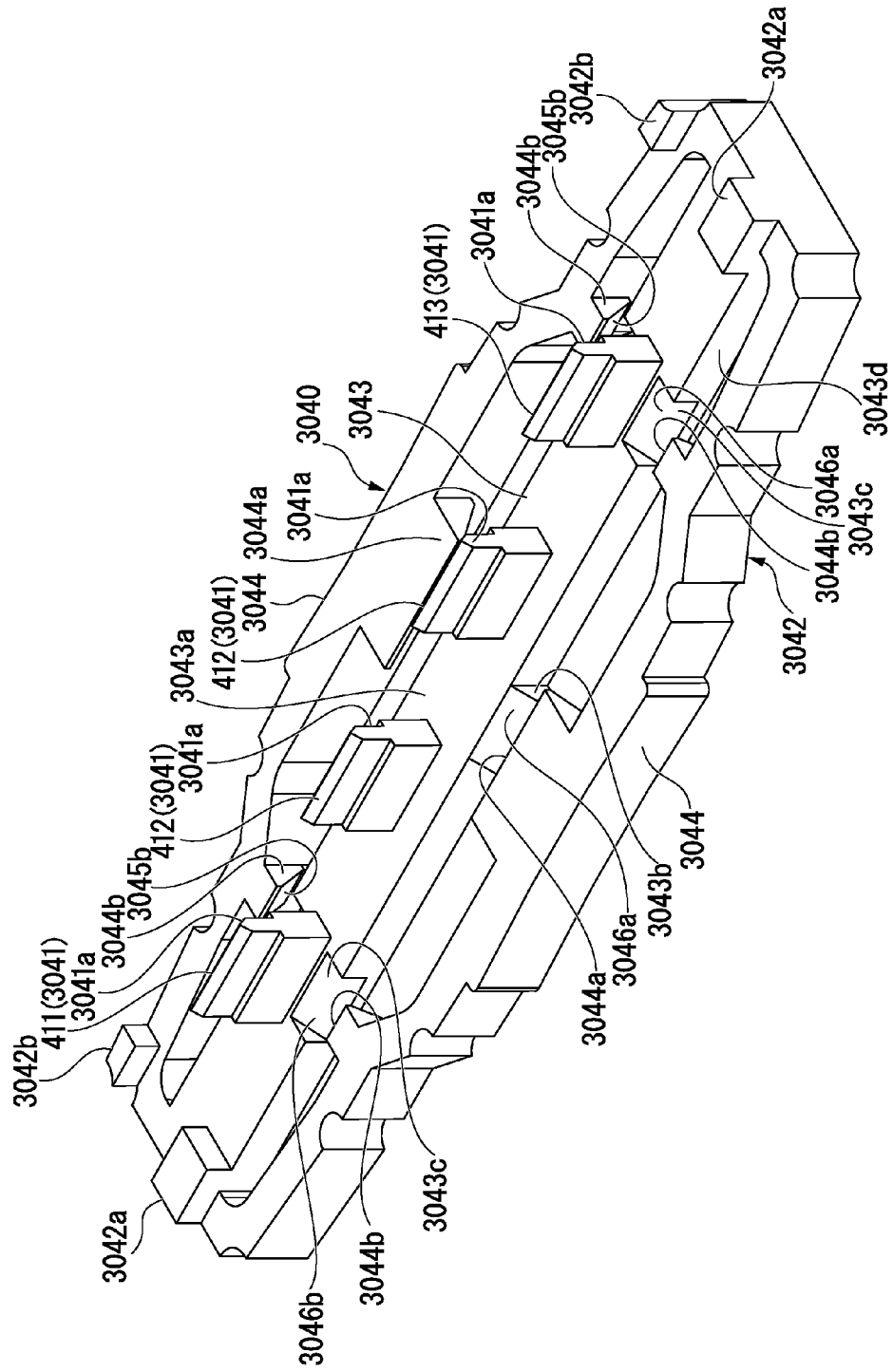
FIG. 56 is a perspective view showing the mechanical splice tool of the optical splicing unit of FIG. 49.
Figure 57:
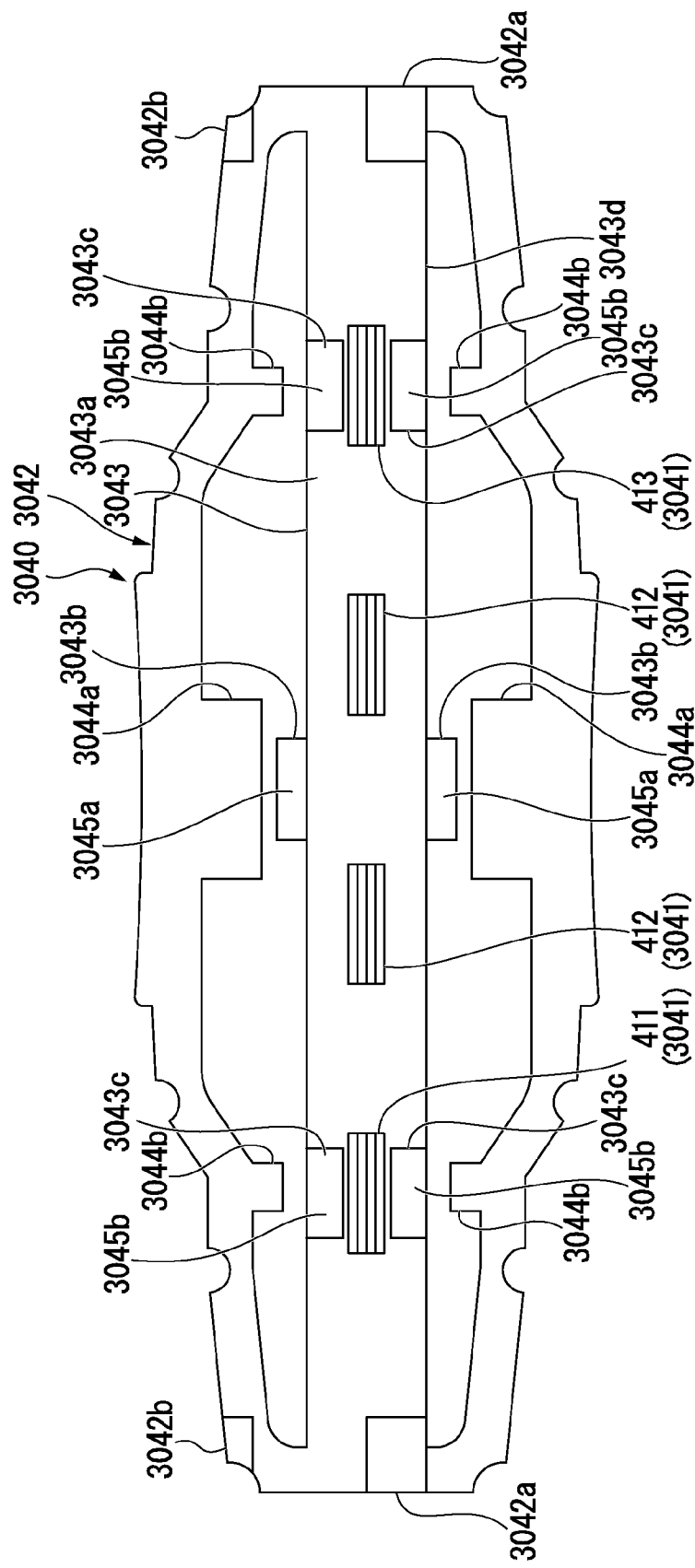
FIG. 57 is a view showing the structure when the mechanical splice tool of FIG. 56 is viewed from an insertion piece protrusion side to which the insertion member protrudes.

As shown in FIGS. 56 and 57, in the splice tool 3040 of the optical splicing unit 3010 of the present embodiment, the insertion pieces 3041 inserted between the half-split elements 31 and 32 of the splice 30 protrude from a pull-out operating portion 1042 which performs the pull-out operation of the insertion pieces 3041 from the splice 30.

The splice tool 3040 of the shown example is an integrally molded plastic part.

However, the splice tool is not limited to the integrally molded plastic part, and may be configured by assembling a plurality of members.

The pull-out operating portion 3042 of the splice tool 3040 includes an insertion piece support plate portion 3043 in which the insertion pieces 3041 protrude from the one surface, and a pair of elastic operation pieces 3044 which are formed to extend along the longitudinal direction on both sides of the insertion piece support plate portion 3043.

The pair of elastic operation pieces 3044 are provided on both sides in the width direction perpendicular to the longitudinal direction of the surface (insertion piece protrusion surface 3043a) of the side from which the insertion pieces 3041 of the insertion piece support plate portion 3043 protrude.

Moreover, both ends in the extension directions (longitudinal directions) of the pair of elastic operation pieces 3044 are connected to both ends in the longitudinal direction of the insertion piece support plate portion 3043.

Both ends in the longitudinal directions of the elastic operation pieces 3044 are formed to integrate with both ends in the longitudinal direction of the insertion piece support plate portion 3043.

Both ends in the longitudinal directions of elastic operation pieces 3044 are formed to extend in the width direction from both ends in the longitudinal direction of the insertion piece support plate portion 3043.

The portion between both end portions in the extension directions of elastic operation pieces 3044 is disposed to extend along the longitudinal direction of the insertion piece support plate portion 3043 via a slight gap from the insertion piece support plate portion 3043.

The pull-out operating portion 3042 is formed in an elongated shape in which the dimension in the direction along the longitudinal direction of the insertion piece support plate portion 3043 is larger than the dimension in the interval direction of the pair of elastic operation pieces 3044.

Moreover, the pull-out operating portion 3042 includes upper surface abutment protrusions 3042*a* abutting upper surfaces 3023*a* of the connection base portions 3023*c* (refer to FIGS. 49 to 51 or the like) between the splice holder portion 3021 of the unit main body 10C and the cable anchors 3022, and lower surface abutment protrusions 3042*b* abutting lower surfaces 3023*b* (refer to FIGS. 54 and 60) opposite to the upper surfaces 3023*a* of the connection base portions 3023*c*, in both ends in the longitudinal direction.

The upper surface abutment protrusions 3042*a* and the lower surface abutment protrusions 3042*b* are each provided to be separated from each other in the width direction (operation portion width direction) which is the interval direction of the pair of elastic operation pieces 3044 of the pull-out operating portion 3042.

The pull-out operating portion 3042 of the splice tool 3040 can be assembled to the unit main body 10C so that both connection base portions 3023*c* of the splice holder portion 3021 in the longitudinal direction of the unit main body 10C are put between the upper surface abutment protrusions 3042*a* and the lower surface abutment protrusion 3042*b* in both ends in the longitudinal directions of both connection base portions.

Moreover, each of the upper surface abutment protrusions 3042*a* abuts one end portion in the width direction of the upper surface 3023*a* of the connection base portion 3023*c* of the fiber guide frame portion 3023.

Accordingly, the upper surface abutment protrusions 3042*a* do not contact the pair of fiber guide walls 3027 extending along the longitudinal direction of the unit main body 10C at the center portion of the upper surface 3023*a* of the connection base portion 3023*c*.

The entire pull-out operating portion 3042 is formed in a flat-shaped portion which has the direction perpendicular to the insertion piece protrusion surface 3043*a* of the insertion piece support plate portion 3043 as the thickness direction.

The insertion pieces 3041 protrude to one surface side in the thickness direction from the pull-out operating portion 3042.

Hereinafter, in both sides in the thickness direction of the pull-out operating portion 3042, the side from which the insertion pieces 3041 protrude is also referred to as an insertion piece protrusion side, the side opposite to the insertion piece protrusion side is also referred to as a rear surface side.

The upper surface abutment protrusion 3042*a* and the lower surface abutment protrusions 3042*b* protrude from the insertion piece protrusion side of the pull-out operating portion 3042.

The approximate entirety (except for the lower surface abutment protrusions 3042*b*) of the insertion piece protrusion side in the pair of elastic operation pieces 3044 of the pull-out operating portion 3042 of the splice tool 3040 in the shown example is positioned on the same virtual plane to overlap with the insertion piece protrusion surface 3043*a* of the insertion piece support plate portion 3043.

The insertion piece protrusion sides of the pair of elastic operation piece 3044 and the insertion piece support plate portion 3043 of the pull-out operating portion 3042 abut the holder side wall portion 241 of the splice holder portion 3021, and the splice tool 3040 is provided on the unit main body 10C.

Hereinafter, a virtual plane on which the insertion piece protrusion sides of the pair of elastic operation pieces 3044 are positioned is referred to as a virtual abutment plane 3042*c* (refer to FIGS. 59A, 59B, and 60).

The portions, in which the pair of elastic operation pieces 3044 and the insertion piece support plate portion 3043 of the pull-out operating portion 3042 are positioned on the virtual abutment plane 3042*c*, abut the holder side wall portion 241 of the splice holder portion 3021, and the splice tool 3040 is provided on the unit main body 10C.

In addition, the splice tool is not limited to the configuration in which the insertion piece protrusion surface 3043*a* of the insertion piece support plate portion 3043 is positioned to overlap with the virtual plane on which the insertion piece protrusion sides of the pair of elastic operation pieces 3044 are positioned.

The splice tool may also adopt a configuration in which the insertion piece support plate portion 3043 is provided at a position which is slightly deviated from the virtual plane, on which the insertion piece protrusion sides of the pair of elastic operation pieces 3044 are positioned, to the rear surface side of the pull-out operating portion 3042.

The insertion pieces 3041 protrude at four locations in the longitudinal direction of the insertion piece support plate portion 3043.

As shown in FIG. 14, in the half-split grip member 34 of the splice 30, the insertion piece through holes 35 for inserting the insertion pieces 3041 are opened to the side surface exposed to the side (hereinafter, open side) opposite to the back plate portion 33*a* of the clamp spring 33.

As shown in FIG. 15, the insertion piece through holes 35 are secured between the base member 31 and the cover members 321, 322, and 323 by insertion piece through grooves 31*g*, 321*c*, 322*c*, and 323*c* which are formed at mutually corresponding positions of the facing surfaces 31*a*, 321*a*, 322*a*, and 323*a* of the base member 31 and three cover members 321, 322, and 323.

Moreover, the insertion piece through holes 35 are formed by depths which do not reach the aligning groove 31*b* and the coating portion insertion grooves 31*c*, 31*d*, 321*b*, and 323*b* from the open side surface of the half-split grip member 34.

Moreover, as the insertion piece through holes 35, a configuration may be adopted in which the insertion piece through holes 35 are secured by the insertion piece through grooves formed on only one side of the base member 31 and the cover members 321, 322, and 323.

As shown in FIG. 14, in the splice 30 of the shown example, the insertion piece through holes 35 are formed at a total of four locations, which includes two locations corresponding to the two ends in the longitudinal direction of the base member 31 in the center cover 322, and two locations corresponding to the center portions in the direction along the longitudinal direction of the base member 31 of the first side cover 321 and the second side cover 323.

The protrusion positions of four insertion pieces 3041 of the splice tool 3040 on the insertion piece support plate portion 3043 correspond to four insertion piece thorough holes 35 of the splice 30.

In addition, the insertion piece through holes 3024*a* of the first holder side wall portion 241 of the unit main body 10C are formed at four locations in the longitudinal direction of the unit main body 10C to correspond four insertion pieces 3041 of the splice tool 3040 and four insertion piece through holes 35 of the splice 30.

Moreover, the insertion pieces 3041 of the splice tool 3040 protrude from the insertion piece support plate portion 3043 in the direction in which the plate thickness of each of the insertion pieces coincides with the operating portion width direction.

As shown in FIG. 61, in each of the insertion pieces 3041 of the splice tool 3040 of the optical fiber splicing unit 3010, the tip portion 3041a (hereinafter, also referred to as the tip insertion portion) formed in a plate shape is inserted between the base member 31 and the pressing cover 32 of the splice 30.

However, each of the insertion pieces 3041 may be any insertion piece as long as it can be pushed to open the portion between the half-split elements 31 and 32 to the extent, in which the optical fiber 2 can be inserted, against the elasticity of the clamp spring 33 and it can be pulled out the portion between the elements 31 and 32, and the insertion piece is not limited to the plate shape.

For example, each of the insertion pieces may adopt a soft sheet shape, a rod shape, or the like.

Moreover, as the splice 30, a configuration may be adopted in which the insertion piece through holes 35 are not formed in the half-split grip member 34.

As shown in FIG. 56, in the tip insertion portions 3041a of the plate-shaped insertion pieces 3041 of the splice tool 3040, the tips are formed in tapered shapes.

After the insertion pieces 3041 are pulled out from the half-split grip member 34 of the splice 30, the tip insertion portions 3041a can be pushed to be inserted between the base member 31 and the pressing cover 32 (can assemble the insertion piece attached splice).

In addition, the optical fiber splicing unit 3010 in a state where the splice tool 3040 is removed from the splice 30 is supplied to the field, and in the field, the insertion pieces 3041 of the splice tool 3040 may be inserted between the elements 31 and 32 of the splice 30 to assemble the tool attached splice.

As shown in FIGS. 49 to 51, each of the cable anchors 3022 of the unit main body 10C of the optical splicing unit 3010 includes an anchoring portion bottom wall portion 3022a, and two anchoring portion side wall portions 3022b which are erected on both sides in the width direction of the anchoring portion bottom wall portion 3022a.

Moreover, in each of the cable anchors 3022, the anchoring fixation member 120 fixed to the terminal of the optical fiber cable 1 is accommodated in the groove-shaped space (hereinafter, also referred to as a fixing member accommodation space 3022h) which is surrounded on three sides by the anchoring portion bottom wall portion 3022a and two anchoring portion side wall portions 3022b.

Moreover, each of the cable anchors 3022 includes fixing member stopper wall portions 3022c for restricting the advancement by which the distance from the splice holder portion 3021 of the anchoring fixation member 120 accommodated in the space is decreased, and elastic locking pieces 3022d in which the rear sides engage with the rear end portion of the anchoring fixation member 120.

The elastic locking piece 3022d is formed on each of two anchoring portion side wall portions 3022b of the cable anchor 3022.

Figure 55:
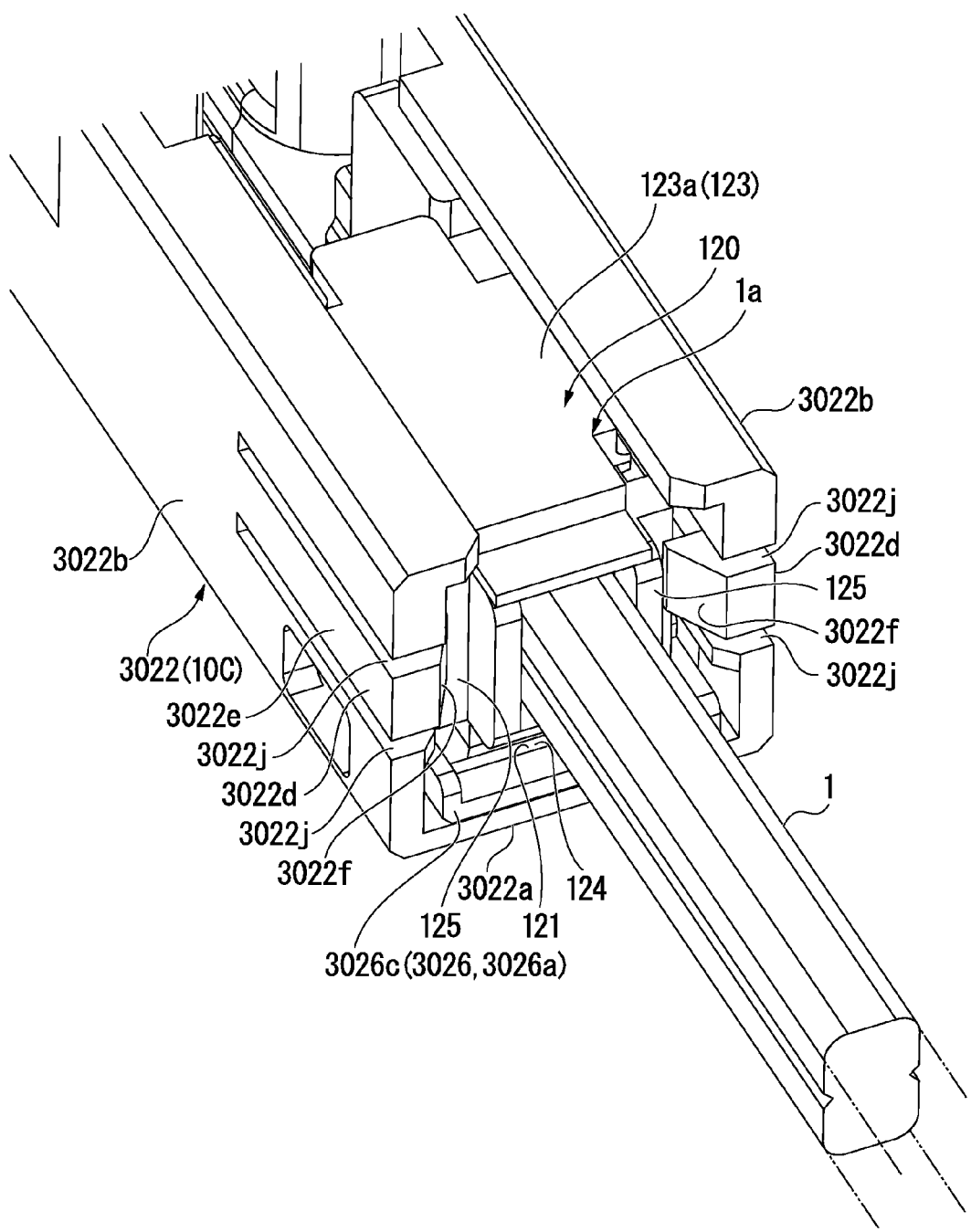
FIG. 55 is a perspective view for illustrating a structure of a cable anchor of the optical splicing unit of FIG. 49.

As shown in FIG. 55, in each of the elastic locking pieces 3022d of the unit main body 10C of the optical splicing unit 3010 in the shown example, an engagement claw 3022f protrudes from the anchoring portion side wall portion 3022b of the cable anchor 3022, and the engagement claw causes the anchoring fixation member 120 to engage with the rear end of the elastic piece 3022e which is a portion positioned between a pair of upper and lower slits 3022j extending from the rear end of the side wall portion 3022b (the side opposite to the splice holder portion 3021) to the front side thereof (the splice holder portion 3021 side).

The engagement claws 3022f protrude from the rear ends of the elastic pieces 3022e toward the opposite anchoring portion side wall portion 3022b of two anchoring portion side wall portions 3022b of the cable anchor 3022.

Moreover, the slits 3022j do not reach the front ends of the anchoring portion side wall portion 3022b.

The elastic locking pieces 3022d causes engagement claws 3022f to engage with the terminal of the optical fiber cable 1 and the rear end portion of the anchoring fixation member 120 inserted into the cable anchor 3022 from the rear side of the cable anchor, from the rear sides of the elastic locking pieces, and thus, the elastic locking pieces function as anchoring means which restrict displacement in the direction separated from the splice 3040 of the anchoring fixation member 120.

In addition, in the anchoring means which restrict the displacement (the retraction from the splice 3040) in the direction separated from the splice 3040 of the anchoring fixation member 120 which is accommodated in the cable anchor 3022 by the insertion from the rear side of the cable anchor 3022, the anchoring means is not limited to the elastic locking pieces 3022d.

For example, as the anchoring means, an engagement piece which is pivoted to the cable anchor 3022 may be adopted.

The anchoring fixation member 120 is provided to enclose the outer circumference of the terminal of the optical fiber cable 1, and is fixed to be integrated with the terminal.

Figure 65A:
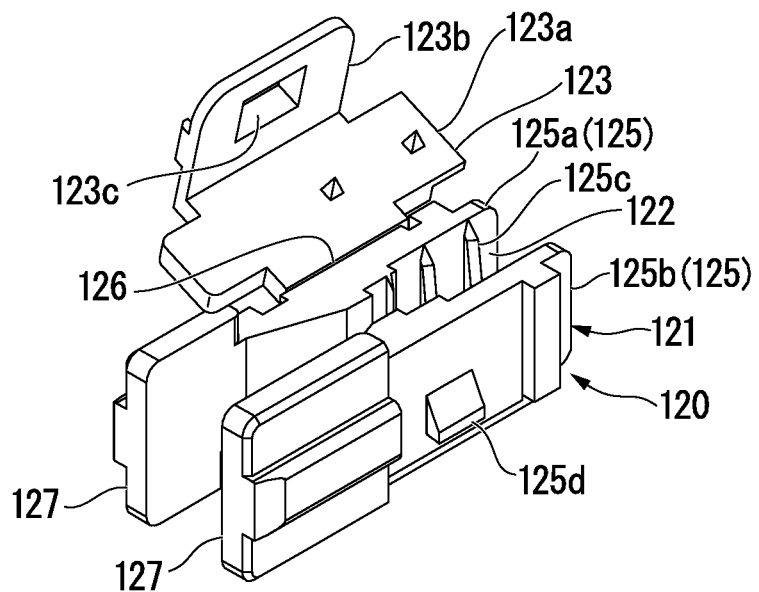
FIG. 65A is a perspective view showing an example of the anchoring fixation member which is inserted into the cable anchor of the optical splicing unit of FIG. 49 in a state where the member is fixed to the optical fiber cable terminal.
Figure 65B:
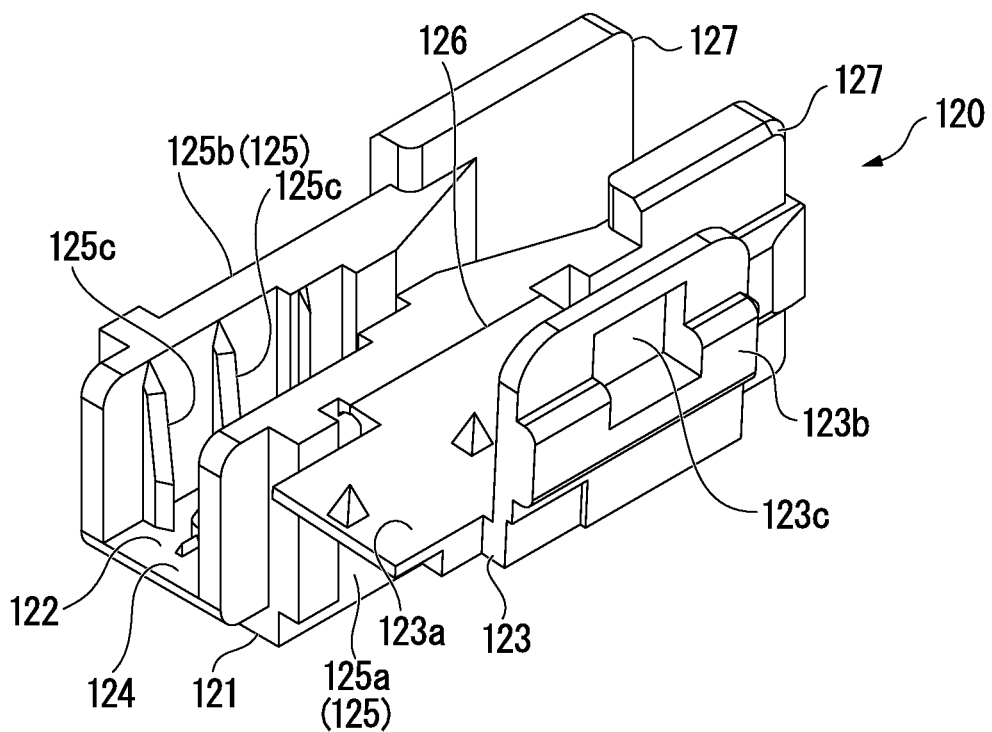
FIG. 65B is a perspective view for illustrating an example of the anchoring fixation member which is inserted into the cable anchor of the optical splicing unit of FIG. 49 in a state where the member is fixed to the optical fiber cable terminal.
Figure 65C:
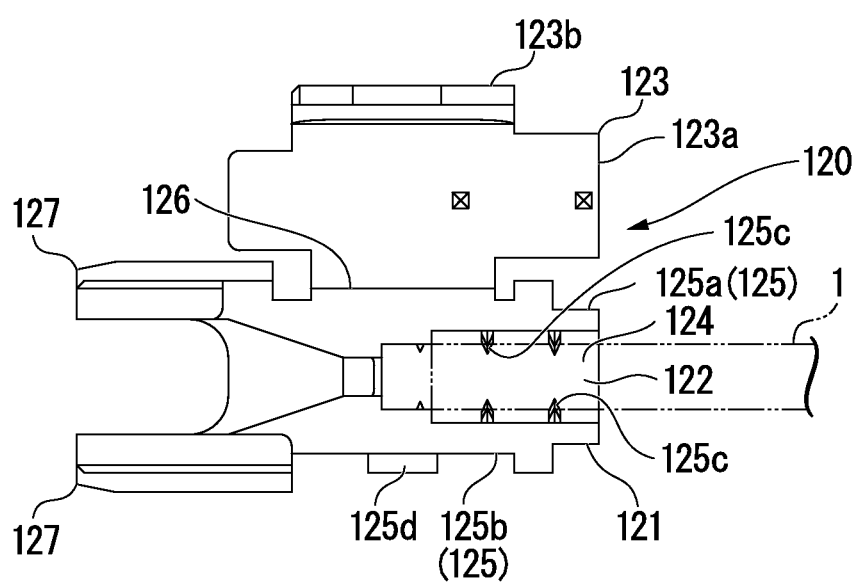
FIG. 65C is a perspective view for illustrating an example of the anchoring fixation member which is inserted into the cable anchor of the optical splicing unit of FIG. 49 in a state where the member is fixed to the optical fiber cable terminal.

FIGS. 65A to 65C show a specific example of the anchoring fixation member 120.

Here, as the anchoring fixation member 120, the sheath grip member is used which grips the terminal of the optical fiber cable 1 from both sides and is attached to be fixed to the terminal of the optical fiber cable 1.

Hereinafter, when the anchoring fixation member 120 indicates the sheath grip member, the anchoring fixation member 120 is also referred to as the sheath grip member.

The sheath grip member 120 includes the grip base 121 having a U-shaped cross-section in which the cable fitting groove 122, to which the optical fiber cable 1 is fitted, is formed, and the pressing cover 123 which is pivoted at one of two side wall portions 125 in the groove width direction of the cable fitting groove 12a of the grip base 121.

In the sheath grip member 120, the plurality of gripping protrusions 125c, which protrude from mutually facing surfaces of the pair of side wall portions 125 of the grip base 121, are bitten into the sheath 3 of the optical fiber cable 1 fitted to the cable fitting groove 12a, and thus, the optical fiber cable 1 can be gripped and fixed between the pair of side wall portions 125.

The grip base 121 is a member having a U-shaped cross-section in which the cable fitting groove 122 is secured between the pair of side wall portions 125 protruding from one surface side of the bottom wall portion 124.

The groove width direction of the cable fitting groove 122 indicates the interval direction of both side wall portions 125 via the cable fitting groove 12a.

Moreover, the gripping protrusions 125c of the sheath grip member 120 of the shown example are formed in protrusions having triangular cross-sections extending in the depth direction of the cable fitting groove 122.

Moreover, after the grip base 121 is externally fitted and fixed to the terminal of the optical fiber cable 1 in an open state in which the pressing cover 123 is separated from the other side wall portion 125, the pressing cover 123 is rotated to a closed position in which the opening portion of the cable fitting groove 122 is closed between ends portions opposite to the bottom wall portion 124 of the pair of side wall portions 125 of the grip base 121, the pressing cover 123 is locked to the other side wall portion 125, and thus, the sheath grip member 120 is attached to the terminal of the optical fiber cable 1.

The sheath grip member 120 of the shown example is an integrally molded plastic part.

The pressing cover 123 is connected to the protruding end of one (hereinafter, also referred to as the first side wall portion and assigned by the reference numeral 125a) of the pair of side wall portions 125, via the thin portion 126 which functions as a hinge portion.

The pressing cover 123 is rotatably pivoted to the first side wall portion 125a of the grip base 121 by the thin portion 126 around the axis along the extension direction of the cable fitting groove 122.

Moreover, hereinafter, the other of the pair of side wall portions 125 of the grip base 121 is also referred to as the second side wall portion 125b.

The pressing cover 123 of the sheath grip member 120 of the shown example is formed in a L-shaped plate.

The pressing cover 123 includes the top plate portion 123a which is pivoted to the first side wall portion 125a of the grip base 121 via the thin portion 126, and the locking plate portion 123b which is formed to be perpendicular to the top plate portion 123a from an end portion opposite to the thin portion 126 of the top plate portion 123a.

When the pressing cover 123 is positioned at the closed position in which the top plate portion 123a abuts the protruding ends of the pair of side wall portions 125 of the grip base 121 and the opening portion of the cable fitting groove 122 is closed, the locking plate portion 123b can overlap with the outer surface of the second side wall portion 125b of the grip base 121 opposite to the cable fitting groove 12a.

Moreover, by inserting the locking claw 125d protruding from the outer surface of the second side wall portion 125b of the grip base 121 into the locking window hole 123c formed on the locking plate portion 123b, the pressing cover 123 is locked to the grip base 121, and thus, the closed state with respect to the grip base 121 can be stably maintained.

The sheath grip member 120 (anchoring fixation member) of the shown example includes the pair of front protruding wall portions 127 protruding from one end in the front-rear direction along the extension direction of the cable fitting groove 122 of the grip base 121.

The pair of front protruding wall portions 127 is formed in a plate piece shape which protrudes to extend the side wall portions 125a and 125b along the front-rear direction of the grip base 121 from the both side wall portions 125a and 125b of the grip base 121.

In addition, the sheath grip member is not limited to the configuration of the shown example.

For example, the sheath grip member may adopt the configuration in which the pressing cover is changed to the pressing cover having a structure in which the locking plate portion 123b is omitted and the engagement portion engaging with the protruding end of the second side wall portion 125b of the grip base 121 is provided on the top plate portion 123a.

In addition, the sheath grip member may adopt the configuration in which only the grip base is provided.

Moreover, the sheath grip member is not limited to an integrally molded plastic part, and may also adopt a configuration in which a plurality of members are assembled.

The anchoring fixation member is not limited to the sheath grip member, and for example, may be a member which is fixed to adhere the outer circumference of the terminal of the optical fiber cable 1 by an adhesive agent, a member which is fixed to the outer circumference of the terminal by thermal welding, or the like.

As shown in FIG. 52, in the cable anchors 3022 of the shown example, an insertion assistance slider 3026 is provided, which smoothly inserts the terminal (hereinafter, referred to as the fixing member attached cable terminal 1a) of the optical fiber cable 1, to which the anchoring fixation member 120 is fixed, from the rear side of the cable anchor 3022.

The insertion assistance slider 3026 has a structure in which pressing force receiving protrusions 3026b protrude on an elongated plate-shaped slider main body 3026a which is provided to slidably move on the anchoring portion bottom wall portion 3022a in the front-rear direction of the cable anchor 3022.

In the insertion assistance slider 3026, the fixing member attached cable terminal 1a can be placed on the fixing member placement portions 3026c which are portions extending from the pressing force receiving protrusions 3026b of the slider main body 3026a to the rear side.

Figure 64:
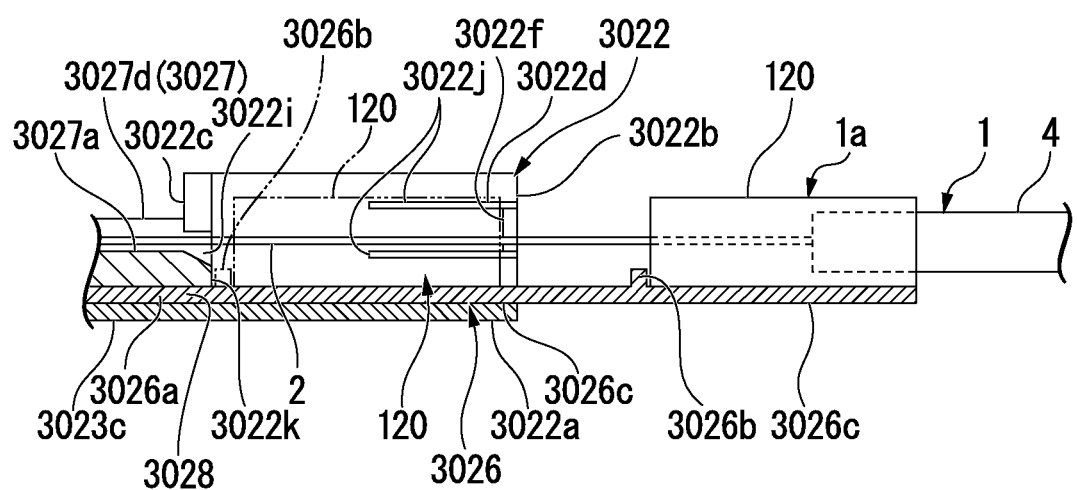
FIG. 64 is a cross-sectional view (model diagram) showing the structure of the cable anchor of the optical splicing unit of FIG. 49.

As shown in FIG. 64, the insertion assistance slider 3026 moves on the anchoring portion bottom wall portion 3022a of the cable anchor 3022 in a sliding manner, and the front portion from the pressing force receiving protrusion 3026b of the slider main body 3026a can be inserted into a slider insertion hole 3028 which is formed below the fixing member stopper wall portion 3022c and below the connection base portion 3023c integrated with the fixing member stopper wall portion 3022c.

The slider insertion hole 3028 is formed to extend from a slider entrance, which is opened to the rear surface facing the fixing member accommodation space 3022h of the fixing member stopper wall portions 3022c, to the splice holder portion 3021 along the longitudinal direction of the unit main body 10C.

Moreover, the slider entrance of the slider insertion hole 3028 is positioned below a second fiber insertion portion 3022g which is formed on the fixing member stopper wall portion 3022c of the cable anchor 3022 to be a notch shape recessed from the upper end.

In addition, as shown in FIG. 54, the unit main body 10C of the shown example includes the lower surface 3020a on which the lower surface of the holder bottom wall portion 3021a of the splice holder portion 3021, the lower surfaces of the anchoring portion bottom wall portions 3022a of respective cable anchors 3022, and the lower surfaces 3023b of the connection base portions 3023c of respective fiber guide frame portions 3023 are continuous to be flush with each other.

However, the unit main body is not limited to configure the lower surface 3020a on which the lower surface of the holder bottom wall portion 3021a, the lower surfaces of two anchoring portion bottom wall portions 3022a, and the lower surfaces 3023b of two connection base portion are continuous to be flush with one another.

For example, as the unit main body, a configuration in which the lower surface 3023b of the connection base portion is positioned above the lower surface of the anchoring portion bottom wall portion 3022a, or the like may be also adopted.

The insertion assistance slider 3026 moves on the anchoring portion bottom wall portion 3022a of the cable anchor 3022 in a sliding manner, and thus, the front portion from the pressing force receiving protrusions 3026b of the slider main body 3026a is inserted into the slider insertion hole 3028, and the pressing force receiving protrusions 3026 can abut the fixing member stopper wall portions 3022c of the cable anchor 3022.

The pressing force receiving protrusions 3026 can abut receiving protrusion abutment portions 3022k which are portions positioned between the slider entrance of the slider insertion hole 3028 and the second fiber insertion portion 3022g in the fixing member stopper wall portions 3022c.

In the insertion assistance slider 3026, the position, at which the pressing force receiving protrusion 3026b abuts the fixing member stopper wall portion 3022c (more specifically, receiving protrusion abutment portion 3022k) of the front end of the cable anchor 3022, becomes the advancement limit position with respect to the cable anchor 3022.

The first fiber insertion portion 3025a having a notch shape, through which the optical fiber 2 exposed from the optical fiber cable terminal is inserted, are formed on each of the stopper wall portions 251 and 252 of the splice holder portion 3021.

In addition, the second fiber insertion portion 3022g having a notch shape, through the optical fiber 2 exposed from the optical fiber cable terminal is inserted, are formed on each of the fixing member stopper wall portions 3022c of the front end of the cable anchor 3022.

The pair of fiber guide walls 3027, which guide the insertion of the optical fiber 2 of the optical fiber cable 1 from the cable anchor 3022 between the elements 31 and 32 of the splice 30, protrude from the splicing base portion 3023c of the unit main body 10C.

The pair of fiber guide walls 3027 protrude on the connection base portion 3023c at an interval in the width direction of the unit main body 10C, and are formed to extend in the longitudinal direction of the unit main body 10C.

In the unit main body 10C, the gap secured between the pair of fiber guide walls 3027 can be used as the fiber guide groove 3027a which guides the optical fiber 2.

The fiber guide groove 3027a between the pair of fiber guide walls 3027 extends in the longitudinal direction of the unit main body 10C.

One end in the extension direction of the fiber guide groove 3027a communicates with the first fiber insertion portion 3025a which is formed in a notch shape on each of the stopper wall portions 251 and 252 of the splice holder portion 3021.

The other end in the extension direction of the fiber guide groove 3027a communicates with the second fiber insertion portion 3022g which is formed in a notch shape on the fixing member stopper wall portions 3022c of the cable anchor 3022.

As shown in FIGS. 52 and 53, the first fiber insertion portion 3025a is formed in a groove shape which is recessed below from the upper end of each of the stopper wall portions 251 and 252 and in which the bottom portion is continuous with the groove bottom of the fiber guide groove 3027a.

The second fiber insertion portion 3022g is formed in a notch shape which is recessed below from the upper ends of the fixing member stopper wall portions 3022c.

A tapered concave portion 3022i is formed on the bottom portion of the second fiber insertion portion 3022g, and in a range between the end portion of the fiber guide groove 3027a and the rear surfaces of the fixing member stopper wall portions 3022c facing the fixing member accommodation space 3022h, the end of the tapered concave portion 3022i is widened toward the rear surface side.

The second fiber insertion portion 3022g, the fiber guide groove 3027a, and the first fiber insertion portion 3025a function as a fiber guiding means used to smoothly insert the optical fiber 2 from the cable anchor 3022 into the coating portion insertion groove of the splice 30 accommodated in the splice holder portion 3021.

In the operation of splicing the optical fiber cables 11 and 12 to each other using the optical splicing unit 3010, first, the anchoring fixation members 120 are fixed to the terminals of the optical fiber cables 11 and 12 to assemble the fixing member attached cable terminals 1a, and the fixing member attached cable terminals 1a are placed on the fixing member placement portions 3026c of the insertion assistance sliders 3026 which move to positions deviated to the rear side from the advancement limit position with respect to the cable anchor 3022.

The sheath grip member 120 is placed on the fixing member placement portions 3026c in a posture that the front sides, to which the front protruding wall portions 127 protrude, are directed to the fixing member stopper wall portion 3022c.

In addition, the fixing member attached cable terminal 1a advances (moves to decrease the distance from the fixing member stopper wall portion 3022c) toward the fixing member stopper wall portions 3022c of the front end of the cable anchor 3022 in the state where the terminal is placed on the fixing member placement portions 3026c of the insertion assistance slider 3026.

Moreover, in the optical fiber cable terminal of the fixing member attached cable terminal 1a loaded on the insertion assistance slider 3026, the optical fiber 2 protrudes in advance to be exposed.

The upper surface (the surface on which the insertion assistance slider 3026 moves in a sliding manner) of the anchoring portion bottom wall portion 3022a of the cable anchor 3022 is positioned below the upper surface 3023a of the connection base portion 3023c.

When the fixing member attached cable terminal 1a is placed on the fixing member placement portions 3026c of the insertion assistance slider 3026, the optical fiber 2 protruding from the terminal of the optical fiber cable 1 is disposed on the extension of the groove bottom portion of the fiber guide groove 3027a.

Therefore, according to the advancement of the fixing member attached cable terminal 1a, the optical fiber 2 can be smoothly inserted into the fiber guide groove 3027a.

According to the advancement of the fixing member attached cable terminal 1a with respect to the cable anchor 3022, the optical fiber 2 advances the groove bottom of the fiber guide groove 3027a and the bottom portion of the first fiber insertion portion 3025a.

The fixing member attached cable terminal 1a advances while pressing the pressing force receiving protrusions 3026b of the insertion assistance slider 3026.

Therefore, according to the advancement of the fixing member attached cable terminal 1a, the insertion assistance slider 3026 integrally advances.

The fixing member attached cable terminal 1a, which is assembled using the above-described sheath grip member 120, advances while pressing the fixing member stopper wall portions 3022c with the front ends of the front protruding wall portions 127 of the sheath grip member 120.

The position of the fixing member attached cable terminal 1a when the insertion assistance slider 3026 reaching the advancement limit position is put between the anchoring fixation member 120 and the fixing member stopper wall portions 3022c is the advancement limit position with respect to the cable anchor 3022.

The fixing member attached cable terminal 1a advances to the advancement limit position with respect to the cable anchor 3022.

The fixing member attached cable terminal 1a advances to the advancement limit position, and thus, the terminal 1a engages with the elastic locking pieces 3022d of the cable anchor 3022 and is held at the advancement limit position.

The bare optical fibers 2a are led-out in advance from the tips of the optical fibers 2 of the optical fiber cables which are inserted between the elements 31 and 32 of the splice 30.

In addition, the protrusion lengths from the anchoring fixation members 120 of the optical fibers 2 of the optical fiber cables 11 and 12 spliced to each other are set to lengths by which slight bending portions (bending portions 5 in FIG. 62) are formed in the optical fiber 2, when the optical fibers 2 abut at the center portion in the longitudinal direction of the aligning groove 31b of the splice 30 and the fixing member attached cable terminals 1a of the optical fiber cables 11 and 12 reach the advancement limit positions with respect to the cable anchor 3022.

The opening amount between the base member 31 and each of the cover members 321, 322, and 323 in the tool attached splice 30A can be set according to the thickness of the plate-shaped tip portion 3041a of the insertion piece 3041 of the splice tool 3040.

For example, as shown in FIG. 17, the opening amount according to the insertion of the insertion piece 3041 (41) between the base member 31 and the side cover (the second side cover 323 in the shown example) is set to the range in which the optical fiber 2 does not come off from the region (the fiber storage region; refer to the reference numeral FS in FIG. 16) between the coating portion insertion groove 31d and the facing surface 323a of the side cover 323 and the insertion state of the optical fiber into the fiber storage region is maintained.

The fiber storage region FS (refer to FIG. 16) is the region between the coating portion insertion groove, and the portion which faces the coating portion insertion groove of the element facing the coating portion insertion groove in the direction perpendicular to the facing surface of the element (the base member 31 in the shown example) on which the coating portion insertion groove is formed.

In addition, in FIG. 16, the clearance (refer to FIG. 17), which is secure in the vicinity of the bottom of the coating portion insertion groove into which the coating portion of the optical fiber 2 is inserted, is not shown.

The opening amount according to the insertion of the insertion piece 3041 between the center cover 322 and the base member 31 is set to the range in which the bare optical fiber 2a led out from the tip of the optical fiber 2 does not come off from the region (the bare optical fiber storage region FS2) between the aligning groove 31b and the facing surface 322a of the center cover 322.

The bare optical fiber storage region FS2 (refer to FIG. 16) is the region between the aligning groove 31b, and a portion of the facing surface 322a of the center cover 322 which faces the aligning groove 31b in the direction perpendicular to the facing surface 31a of the element (the base member 31 in the shown example) on which the aligning groove 31b is formed.

According to the advancement of the fixing member attached cable terminal 1a with respect to the cable anchor 3022, the bare optical fiber 2a led out from the tip of the optical fiber 2 can be inserted into the bare optical fiber storage region via the fiber storage region FS (refer to FIG. 16) of the splice 30 from the fiber guide groove 3027a.

The tapered concave portion 34a, which is recessed in a tapered shape from both end surfaces in the longitudinal direction, is opened to the half-split grip member 34 of the splice 30.

As shown in FIG. 16, the inner end of the tapered concave portion 34a communicates with the fiber storage region FS.

Moreover, as shown in FIGS. 49 to 51, as described above, in the splice 30 which is accommodated to be positioned in the splice holder portion 3021, both end surfaces in the longitudinal direction of the half-split grip member 34 abut the stopper wall portions 251 and 252 of the splice holder portion 3021.

In addition, in the splice 30, the center portion of the opening portion of the tapered concave portion 34a in the end surface of the half-split grip member 34 is positioned at the bottom portion of the fiber guide groove 3027a and the bottom portion of the first fiber insertion portion 3025a.

Accordingly, the insertion of the optical fiber 2 from the fiber guide groove 3027a into the fiber storage region FS of the splice 30 can be smoothly performed.

Figure 62:
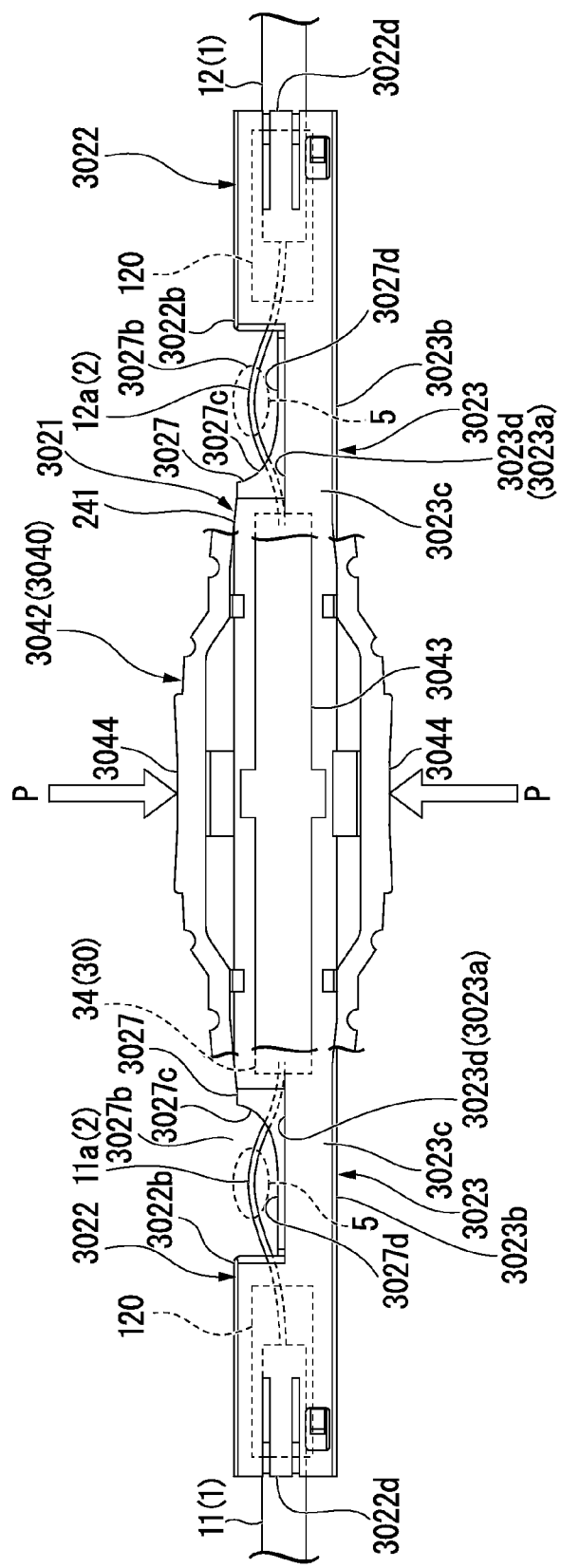
FIG. 62 is a view showing a state where a bending portion of the optical fiber protrudes upward from a fiber guide wall of the optical splicing unit of FIG. 49.

In addition, as shown in FIG. 62, a notch portion 3027b is formed on the fiber guide walls 3027 of the optical splicing unit 3010.

As shown in FIGS. 52, 53, and 62, each of the fiber guide walls 3027 includes a bending support wall portion 3027c which is formed in a tapered shape in which the protrusion dimension above the connection base portion 3023c is gradually decreased from the splice holder portion 3021 toward the cable anchor 3022 side, and a lower extension wall portion 3027d in which the protrusion dimension above the connection base portion 3023c is constant from the end portion of the cable anchor 3022 side of the bending support wall portion 3027c to the cable anchor 3022 and which extends in the longitudinal direction of the unit main body 10C.

The fiber guide walls 3027 become the notch portion 3027b in which the cable anchor 3022 side is recessed below from the upper end portions of the bending support wall portion 3027c.

In the operation for splicing the optical fiber cables 11 and 12 using the optical splicing unit 3010, each of the optical fibers 2 protruding to be exposed from the terminals of the optical fiber cables 11 and 12 is inserted into the fiber storage region FS (FIG. 16) of the splice 30 via the fiber guide groove 3027a from each of both cable anchors 3022 in the longitudinal direction of the unit main body 10C, and the bare optical fibers 2a of the tips of the optical fibers 2 butt each other at the center portion in the extension direction (longitudinal direction) of the bare optical fiber storage region FS2 along the aligning groove 31b.

In the optical splicing unit 3010, when the fixing member attached cable terminals 1a of the optical fiber cables 11 and 12 spliced to each other reach at the advancement limit positions with respect to the cable anchors 3022, the optical fibers 2 are but-jointed between the elements of the splice 30, and as shown in FIG. 62, the bending portions 5 of the optical fibers 2 are formed to rise upward from the connection base portion 3023c.

In the optical splicing unit 3010, since the notch portions 3027b are formed on the fiber guide walls 3027, the bending portions 5 of the optical fibers 2 can be easily confirmed by visual observation or the like.

The portion of the optical fiber 2, which is positioned in the fiber guide groove 3027a, is disposed on the groove bottom of the fiber guide groove 3027a before the bending portion 5 is formed.

Since the optical fiber 2, which is positioned on the groove bottom of the fiber guide groove 3027a, is surrounded in three sides by the connection base portion 3023c and the pair of fiber guide walls 3027, the bending portion 5 formed in the optical fiber 2 is formed only in the direction rising from the groove bottom of the fiber guide groove 3027a.

For example, the protrusion lengths (or the protrusion lengths from the anchoring fixation members 120) from the optical fiber cable terminals of the optical fibers 11a and 12a protruding from the terminals of the optical fiber cables 11 and 12 spliced to each other are set to lengths by which the bending portion 5 protruding upward (to the notch portion 27b) from the lower extension wall portion 3027d can be formed in one or both of the optical fibers 11a and 12a when the tips (specifically, tips of the bare optical fibers 2a) of the optical fibers 2 are butted in the bare optical fiber storage region FS2 of the splice 30.

In this case, the bending portion 5 formed in the optical fiber 2 protruding upward (to the notch portion 27b) from the lower extension wall portion 3027d can be simply confirmed by visual observation or the like.

Accordingly, it is possible to simply confirm that the butt between the optical fibers 2 (specifically, bare optical fibers) in the splice 30 is achieved.

In addition, in the optical splicing unit 3010, for example, the operator presses the bending portion 5, which is formed to be positioned above the lower extension wall portion 3027d of one of both fiber guide frame portions 3023 of the splice holder portion 3021, toward the groove bottom of the fiber guide groove 3027a using a finger or the like, and thus, the butt confirmation of the optical fibers 2 can be more reliably performed.

That is, for example, when the operator presses the bending portion 5, which is formed to be positioned above the lower extension wall portion 3027d of one of both fiber guide frame portions 3023 of the splice holder portion 3021, toward the groove bottom of the fiber guide groove 3027a using a finger or the like, from the fact that the size of the bending portion 5 of the optical fiber 2 on the connection base portion 3023c of the other fiber guide frame portion 3023 is increased, or the bending portion 5 is formed in the optical fiber 2 in which the bending portion 5 has not been formed on the connection base portion 3023c of the other fiber guide frame portion 3023, the butt confirmation of the optical fibers 2 can be more reliably performed.

Moreover, as shown in FIG. 62, a separation distance, by which a finger of the operator can be inserted, is secured between the bending support wall portion 3027c of the fiber guide wall 3027 and the fixing member stopper wall portion 3022c of the cable anchor 3022 facing the bending support wall portion 3027c via the notch portion 3027b.

Accordingly, the operator can easily press the bending portion 5 of the optical fiber 2, which is formed to rise upward from the lower extension wall portion 3027d, downward using a finger.

Moreover, in the pair of fiber guide walls 3027 on the connection base portion 3023c of the fiber guide frame portion 3023, the center portion in the extension direction of the lower extension wall portion 3027d is formed to position at the center portion in the separate direction between the optical fiber cable terminal of the fixing member attached cable terminal 1a which is inserted to be fixed to the cable anchor 3022 and the end portion in the longitudinal direction of the splice 30 in the splice holder portion 3021.

The bending portion 5 of the optical fiber 2 is formed to be bent to have an upward convex arch between the optical fiber cable terminal of the fixing member attached cable terminal 1a which is inserted to be fixed to the cable anchor 3022 and the end portion in the longitudinal direction of the splice 30 in the splice holder portion 3021.

The top of the bending portion 5 of the optical fiber 2, which is formed to rise from the groove bottom of the fiber guide groove 3027a toward the upper portion of the lower extension wall portion 3027d of the pair of fiber guide walls 3027 of the fiber guide groove 3027a, is positioned above the center portion in the extension direction of the lower extension wall portion 3027d.

Accordingly, the operator can easily press the top of the bending portion 5 of the optical fiber 2, which is formed to rise upward from the lower extension wall portion 3027d, downward using a finger.

The bending support wall portions 3027c of the pair of fiber guide walls 3027 support the splice 30 side end portion of the bending portion 5 which effectively contributes to secure the shape rising upward from the connection base portion 3023c in the bending portion 5.

In the pair of fiber guide walls 3027, even when the size of the bending portion 5 of the optical fiber 2 is relatively large, the state in which the bending portion 5 rises upward from the connection base portion 3023c can be maintained by the bending support wall portion 3027c, and it is possible to prevent the bending portion 5 from falling down.

Moreover, each of the bending support wall portions 3027c is not limited to the tapered shape in which the protrusion dimension above the connection base portion 3023c is decreased from the splice holder portion 3021 toward the cable anchor 3022 side, and for example, may adopt a shape in which the protrusion dimension above the connection base portion 3023c is constant over the entire extension direction in the longitudinal direction of the unit main body 10C.

Moreover, the pair of fiber guide walls 3027 of the fiber guide frame portion 3023 are not limited to the configuration which includes the bending support wall portions 3027c extending from the stopper wall portions of the splice holder portion 3021 to the cable anchor 3022 side.

The pair of fiber guide walls 3027 may adopt a configuration which includes the bending support wall portion extending from the fixing member stopper wall portions 3022c of the cable anchor 3022 to the splice holder portion 3021 side, and the lower extension wall portions extending from the bending support wall portions to the splice holder portion 3021.

Moreover, the pair of fiber guide walls 3027 of the fiber guide frame portion 3023 may adopt a configuration which includes the lower extension wall portions between the bending support wall portions extending from the stopper wall portions of the splice holder portion 3021 to the cable anchor 3022 side and the bending support wall portions extending from the fixing member stopper wall portions 3022c of the cable anchor 3022 to the splice holder portion 3021 side.

If the abutment between the optical fibers 2 can be confirmed, subsequently, the insertion pieces 3041 of the splice tool 3040 is pulled out from the portion between the elements 31 and 32 of the splice 30.

Accordingly, the optical fibers 11a and 12a are gripped and fixed between the elements 31 and 32 of the splice 30 in the state where the but-joint between the optical fibers is maintained, and the splice between the optical fiber cables 11 and 12 is completed.

By grasping the splice tool 3040 with fingers of one hand, or the like, and by only moving the pair of elastic operation pieces 3044 of the pull-out operating portion 3042 to be close to insertion piece support plate portion 3043, the pulling-out of the insertion pieces 41, which are inserted between the elements 31 and 32 of the splice 30, from the splice 30 can be simply performed.

In the splice tool 3040, the pair of elastic operation pieces 3044 are elastically deformed to decrease the mutual separation distance (to approach the insertion piece support plate portion 3043), and thus, an operation piece side inclined surface 3046 formed on each elastic operation piece 3044 can slide on a support plate side inclined surface 3045 formed on both sides in the width direction of the insertion piece support plate portion 3043.

For example, as shown in FIG. 62, the operation, which elastically deforms the pair of elastic operation pieces 3044 of the splice tool 3040 to decrease the mutual separation distance, can be realized by operating the pressing force P in the direction, in which the mutual separation distance is decreased from both sides in the operation portion width direction, to the pair of elastic operation pieces 3044 of the pull-out operating portion 3042.

Figure 58:
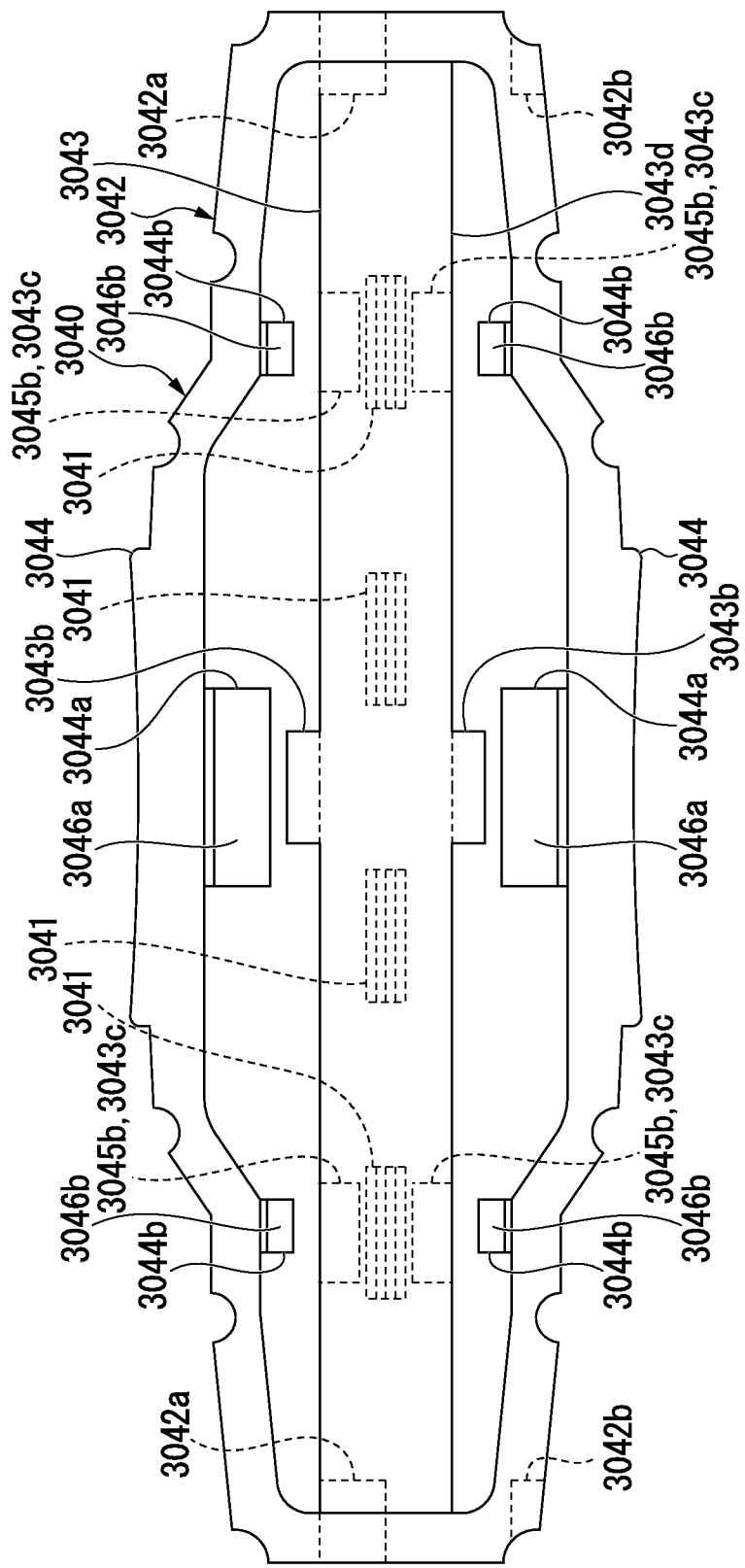
FIG. 58 is a view showing the structure when the mechanical splice tool of FIG. 56 is viewed from the rear surface side which is the side opposite to the insertion piece protrusion side to which the insertion member protrudes.
Figure 59A:
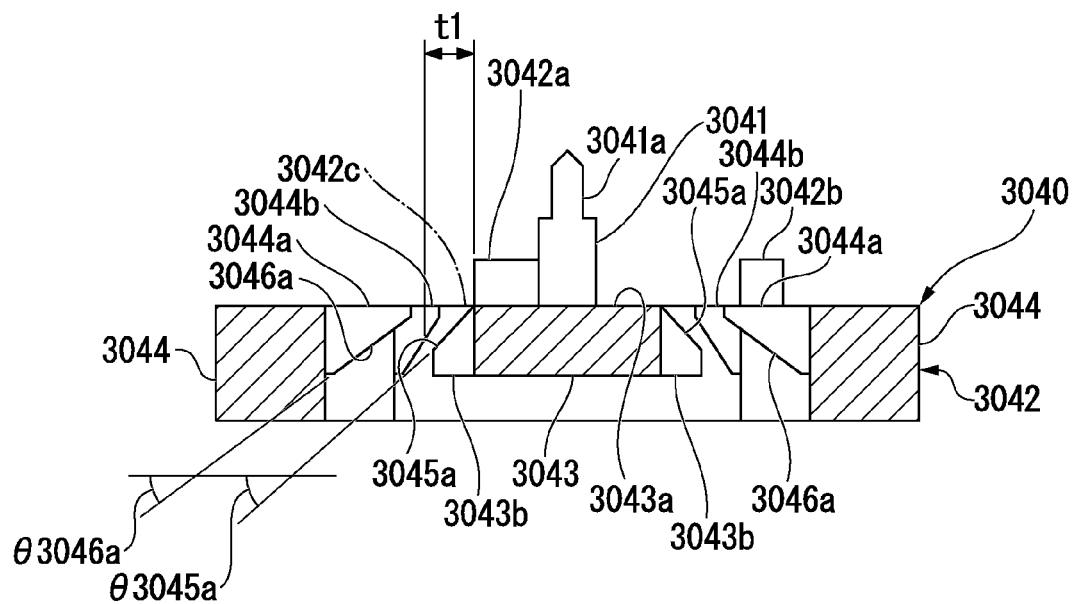
FIG. 59A is a cross-sectional view showing a relationship between a support plate central inclination surface and an operation piece central inclination surface of the mechanical splice tool of FIG. 56.
Figure 59B:
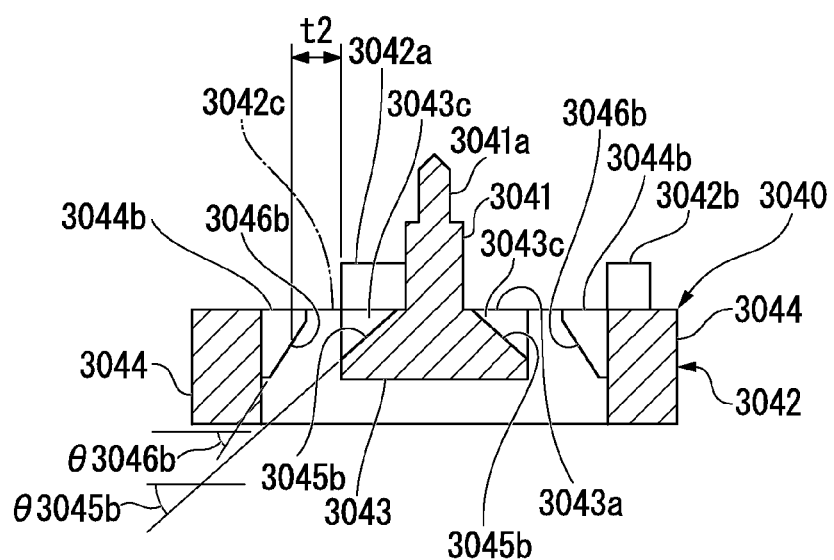
FIG. 59B is a cross-sectional view showing a relationship between a support plate end inclination surface and an operation piece end inclination surface.
Figure 60:
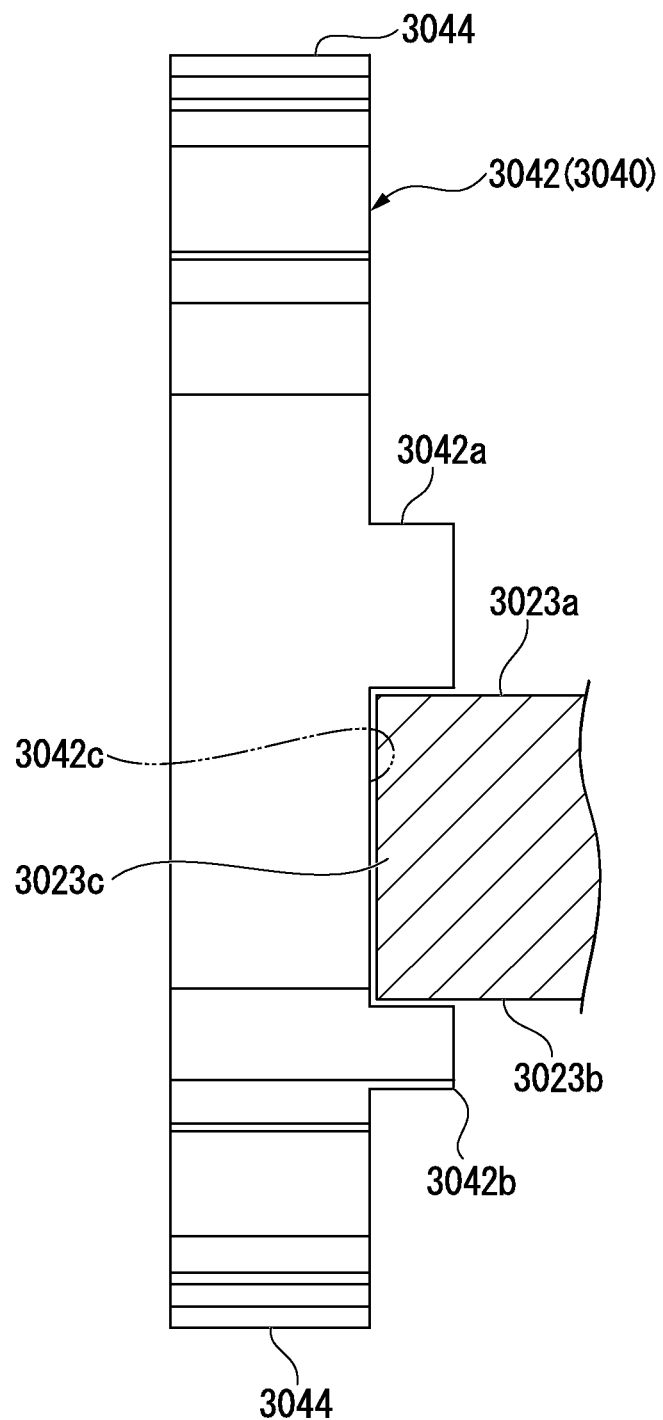
FIG. 60 is an enlarged view for illustrating a relationship between the mechanical splice tool of FIG. 56 and a fiber guide frame portion of the unit main body.

Moreover, the operating portion width direction indicates the up-down direction in FIGS. 57, 58, and 62, and indicates the right-left direction in FIGS. 59A and 59B.

In the end portion in the width direction of the insertion piece support plate portion 3043 facing the elastic operation piece 3044, each of the support plate side inclined surface 3045 approaches the elastic operation piece 3044 separated from the insertion piece support plate portion 3043, in the operation portion width direction from the insertion piece protrusion side toward the rear surface side opposite to the insertion piece protrusion side.

Each of the support plate side inclined surface 3045 is formed to be inclined with respect to the insertion piece protrusion surface 3043a of the insertion piece support plate portion 3043 and the virtual abutment plane 3042c of the pull-out operating portion 3042.

As shown in FIGS. 59A and 59B, the operation piece side inclined surfaces 3046 are formed at positions corresponding to the support plate side inclined surfaces 3045 in the sides of the elastic operation pieces 3044 facing the insertion piece support plate portion 3043.

Each of the operation piece side inclined surfaces 3046 is separated from the insertion piece support plate portion 3043 in the operating portion width direction from the insertion piece protrusion side of the pull-out operating portion 3042 toward the rear surface side.

Each of the operation piece side inclined surface 3046 is formed to be inclined with respect to the insertion piece protrusion surface 3043a of the insertion piece support plate portion 3043 and the virtual abutment plane 3042c of the pull-out operating portion 3042.

As shown in FIGS. 56 to 58, in the splice tool 3040 of the shown example, the support plate side inclined surfaces 3045 are formed at three locations in each of both sides in the width direction of the insertion piece support plate portion 3043, that is, at total six locations on both sides, at an approximately equal interval in the longitudinal direction of the insertion piece support plate portion 3043.

More specifically, the support plate side inclined surfaces 3045 are formed at the center portions in the longitudinal direction and at both ends in the longitudinal direction of the insertion piece support plate portion 3043, on both sides in the width direction of the insertion piece support plate portion 3043.

The support plate side inclined surfaces 3045 (assigned by a reference numeral 3045a and hereinafter, also referred to as support plate central inclination surfaces), which are positioned at the center portions in the longitudinal direction of the insertion piece support plate portion 3043, are formed in protrusions 3043b protruding at both sides in the width direction of the insertion piece support plate portion 3043.

The insertion piece support plate portion 3043 includes an elongated plate-shaped support plate main body portion 3043d.

The protrusions 3043b are formed on both sides in the width direction at the center portion in the longitudinal direction of the support plate main body portion 3043d.

The support plate side inclined surfaces 3045 (assigned by a reference numeral 3046b and hereinafter, also referred to as support plate end inclination surfaces), which are positioned at both ends in the longitudinal direction of the insertion piece support plate portion 3043, configure groove bottom surfaces of groove-shaped recesses 3043c which are formed in notch shapes on both sides in the width direction of the support plate main body portion 3043d.

In the support plate end inclination surfaces 3045b on both ends in the longitudinal direction of the insertion piece support plate portion 3043, the formation positions in the longitudinal direction of the insertion piece support plate portion 3043 correspond to the insertion piece 3041 (assigned by a reference numeral 411 in FIGS. 56 to 58) which is inserted between the base member 31 of the splice 30 and the first side cover 321, and the insertion piece 3041 (assigned by a reference numeral 413 in FIGS. 56 to 58) which is inserted between the base member 31 and the third side cover 323.

The support plate end inclination surfaces 3045b are formed on both sides in the width direction of portions in which the insertion pieces 411 and 413 protrude in the longitudinal direction of the insertion piece support plate portion 3043.

Meanwhile, the support plate central inclination surface 3045a are formed in the width direction of the portions which are positioned between two insertion pieces 3041 (assigned by a reference numeral 412 in FIGS. 56 to 58) inserted between the base member 31 and the center cover 322 of the splice 30 in the longitudinal direction of the insertion piece support plate portion 3043.

The operation piece side inclined surfaces 3046 are formed at the center portions and both end portions in the longitudinal direction of the elastic operation pieces 3044 corresponding to the support plate central inclination surfaces 3045a of the insertion piece support plate portion 3043, and the support plate end inclination surface 3045a and 3045b on both ends in the longitudinal direction of the insertion piece support plate portion 3043.

The operation piece side inclined surfaces 3046 (assigned by a reference numeral 3046a and hereinafter, also referred to as operation piece central inclination surfaces) at the center portions in the longitudinal direction of the elastic operation pieces 3044 are formed to face the support plate central inclination surfaces 3045a in the operating portion width direction.

In addition, each of the operation piece central inclination surfaces 3046a is formed in a protrusion 3044a (central protrusion) protruding from the center portion in the longitudinal direction of the elastic operation piece 3044 to the insertion piece support plate portion 3043 side.

The operation piece side inclined surfaces 3046 (assigned by a reference numeral 3046b and hereinafter, also referred to as operation piece end inclination surfaces) at both ends in the longitudinal direction of the elastic operation pieces 3044 are formed to face the support plate end inclination surfaces 3045b in the operating portion width direction.

Moreover, each of the operation piece end inclination surfaces 3046b is formed in a protrusion 3044b (central protrusion) protruding from both ends in the longitudinal direction of the elastic operation piece 3044 to the insertion piece support plate portion 3043 side.

As shown in FIG. 59A, an inclined angle θ3046a of each of the operation piece central inclination surface 3046a with respect to the virtual abutment plane 3042c of the pull-out operating portion 3042 is slightly smaller than an inclined angle θ3045a of each of the support plate central inclination surfaces 3045a with respect to the virtual abutment plane 3042c.

In addition, as shown in FIG. 59B, an inclined angle θ3046b of each of the operation piece end inclination surface 3046b with respect to the virtual abutment plane 3042c of the pull-out operating portion 3042 is slightly smaller than an inclined angle θ3045b of each of the support plate end inclination surfaces 3045b with respect to the virtual abutment plane 3042c.

Moreover, the inclined angle θ3045a of the support plate central inclination surface 3045a is larger than the inclined angle θ3045b of the support plate end inclination surface 3045b, and the inclined angle θ3046a of the operation piece central inclination surface 3046a is smaller than the inclined angle θ3046b of the operation piece end inclination surface 3046b.

A minimum separation distance t1 in the operating portion width direction between the operation piece central inclination surface 3046a and the support plate central inclination surface 3045a is smaller than a minimum separation distance t2 in the operating portion width direction between the operation piece end inclination surface 3046b and the support plate end inclination surface 3045b.

In the splice tool 3040, when the pair of elastic operation pieces 3044 are elastically deformed to decrease the mutual separation distance (approach the insertion piece support plate portion 3043), by the sliding of the operation piece side inclined surfaces 3046 with respect to the support plate side inclined surfaces 3045, the insertion piece support plate portion 3043 can be elastically deformed so that the portion positioned between both ends in the longitudinal direction is relatively displaced to the rear surface side of the pull-out operating portion 3042 with respect to the pair of elastic operation pieces 3044.

In addition, in the splice tool 3040, the portion positioned between both ends in the longitudinal direction of the insertion piece support plate portion 3043 is relatively displaced to the rear surface side of the pull-out operating portion 3042 with respect to the pair of elastic operation pieces 3044, and as a result, the pulling-out of the insertion pieces 3041, which are inserted between the elements of the splice 30, from the splice 30 can be realized.

The pulling-out of the insertion pieces 3041, which are inserted between elements of the splice 30, from the portion between the elements is realized by displacing the portion positioned between both ends in the longitudinal direction of the insertion piece support plate portion 3043 to the rear surface side of the pull-out operating portion 3042 with respect to the pair of elastic operation pieces 3044, in the state where the portion positioned on the virtual abutment plane 3042c of the pair of elastic operation pieces 3044 abuts the holder side wall portion 241 of the splice holder portion 3021.

Moreover, in the splice tool 3040, when the pair of elastic operation pieces 3044 are elastically deformed to decrease the mutual separation distance (approach the insertion piece support plate portion 3043), after the sliding of the operation piece central inclination surfaces 3046a with respect to the support plate central inclination surface 3045a starts, the abutment and sliding of the operation piece end inclination surface 3046b with respect to the support plate end inclination surfaces 3045b start.

As a result, in the splice 3040, after the pulling-out of the insertion piece 412 from the second clamping portion of the splice 30 is completed, the pulling-out of the insertion pieces 411 and 413 from the first and third clamping portions is completed, and thus, time differential pulling-out can be realized.

In the splice 30, according to the time differential pulling-out of the insertion pieces 411, 412, and 413 inserted between the elements, first, the mutually butted bare optical fibers 2a and 2a of the optical fibers 11a and 12a are gripped and fixed between the half-split elements (base member 31 and center cover 322) of the second clamping portion.

Moreover, in the splice 30, after the gripping and fixing of the mutually butted bare optical fibers 2a and 2a in the second clamping portion are completed, the gripping and fixing of the coating portions of the optical fibers 11a and 12a between the half-split elements of the first and third clamping portions are completed.

In addition, the half-split elements of the first clamping portion are the base member 31 and the first side cover 311, and the half-split elements of the third clamping portion are the base member 31 and the second side cover 313.

Moreover, the splice tool 3040, in which the pulling-out of the insertion pieces 3041 from the portion between the elements 31 and 32 of the splice 30 has been completed, can be simply detached from the unit main body 10C.

In the splice tool 3040, by only elastically deforming the pair of elastic operation pieces 3044 to decrease the mutual separation distance, the pulling-out of the insertion pieces 3041, which are inserted between the half-split elements of the splice 30, from the splice 30 can be simply performed.

In addition, in the splice tool 3040, the pull-out operating portion 3042, which is a pulling-out mechanism for pulling out the insertion pieces 3041 inserted between the elements of the splice 30 from the portion between the elements, is formed in a flat shape.

Compared to the optical fiber splicing tool described Japanese Unexamined Patent Application, First Publication No. 2010-26166, in the splice tool 3040, a decrease in the protrusion dimension from the splice 30 in the pulling-out direction from between elements of the insertion pieces inserted between elements can be easily realized.

Accordingly, decreases in the sizes of the splice tool and the tool attached mechanical splice can be easily realized.

The decreases in the sizes of the splice tool and the tool attached mechanical splice are advantageous to perform the splicing operation between the optical fibers 2 using the splice in a narrow operation space.

The present invention is described based on preferred aspects above. However, the present invention is not limited to the preferred aspects, and various modifications can be performed within the scope as long as there is no departure from the gist of the present invention.

For example, in the optical splicing unit 3010, the splice tool 3040 may be provided on the unit main body 10C in a state where the pull-out operating portion 3042 is provided along the holder side wall portion 241 via a slight clearance between the pull-out operating portion 3042 and the holder side wall portion 241 of the splice holder portion 3021 of the unit main body 10C.

However, the clearance between the pull-out operating portion 3042 and the holder side wall portion 241 of the splice holder portion 3021 is set to a size by which the insertion piece support plate portion 3043 can be relatively displaced to the rear surface side of the pull-out operating portion 3042 with respect to the pair of elastic operation pieces 3044 abutting the holder side wall portion 241 of the splice holder portion 3021.

The application target of the splice tool is not limited to the splice in the splice holder portion of the optical splicing unit 10.

The splice tool of embodiments according to the present invention can be widely applied to a splice having a configuration in which the insertion piece can be inserted between the elements.

In this point, as the tool attached splice in which the insertion piece is inserted between elements of the splice and the splice tool is provided on the splice, for example, a configuration may be also adopted in which the pair of elastic operation pieces 3044, which are elastically deformed to decrease the mutual separation distance, directly abut the splice.

What is claimed is:

1. An optical fiber splicing unit, comprising:
   a mechanical splice which aligns optical fibers and puts the optical fibers between half-split elements to splice the optical fibers to each other;
   a splice holder portion which holds the mechanical splice;
   anchoring fixation members that are respectively fixed to the optical fibers;
   fixing member guide portions which are configured to respectively guide the anchoring fixation members at two sides of the held mechanical splice and to respectively allow the anchoring fixation members to advance toward the mechanical splice when splicing the optical fibers; and
   a first spacer which is configured to restrict the advancement of a first anchoring fixation member by abutting the first anchoring fixation member and is disposed to be configured to retract from a position in which the first spacer abuts the first anchoring fixation member, wherein
   a first optical fiber is fixed to the first anchoring fixation member,
   when gripping and fixing a tip of the first optical fiber to the mechanical splice in a state in which a first anchoring fixation member abuts a first spacer which restricts advancement of the first anchoring fixation member, the first anchoring fixation member is configured to advance toward the mechanical splice by retracting the first spacer, and
   a bend is configured to be formed in the first optical fiber between the mechanical splice and the first anchoring fixation member by the advancement of the first anchoring fixation member.

2. The optical fiber splicing unit according to claim 1, further comprising:
   a first splice tool which comprises an insertion piece inserted between the half-split elements at a side in which the first optical fiber is put; and
   a second splice tool which comprises an insertion piece inserted between the half-split elements at a side in which a second optical fiber is put,
   wherein the first splice tool further comprises the first spacer as a protrusion which protrudes from the first splice tool.

3. The optical fiber splicing unit according to claim 2,
   wherein the first spacer is capable of being inserted into a window hole which is opened to a wall portion and the first spacer abuts the first anchoring fixation member and restricts the advancement of the first anchoring fixation member, the wall portion including a first fixing member guide portion and accommodating and guiding the first anchoring fixation member, the first spacer being inserted from the window hole and protruding inside the wall portion.

4. The optical fiber splicing unit according to claim 3,
   wherein the first fixing member guide portion comprises a pressing portion which presses the spacer toward an inner wall of the mechanical splice side of the window hole, the spacer being inserted into the window hole.

5. The optical fiber splicing unit according to claim 1, further comprising:
   a second spacer which abuts a second anchoring fixation member and is disposed to be retracted to restrict the advancement of the second anchoring fixation member, the second anchoring fixation member being configured to be guided by a second fixing member guide portion and to advance toward the mechanical splice when splicing the optical fibers.

6. The optical fiber splicing unit according to claim 1, further comprising an unit base comprising the splice holder portion;
   a first anchoring portion that is a lever member which is rotatably provided around an axis along a width direction of the unit base, and is capable of being switched between a retraction restriction position at which the lever member engages with the first anchoring fixation member, which is provided in the first fixing member guide portion, from the rear side of the first anchoring fixation member and at which retraction of the first anchoring fixation member is restricted, wherein
   a waiting position at which contact between the lever member and the first anchoring fixation member is prevented, by rotation of the lever member, and the lever member comprises a fixing member pressing and advancing portion which abuts a rear end of the first anchoring fixation member and advances the first anchoring fixation member toward the mechanical splice when the lever member moves from the waiting position to the retraction restriction position by the rotation of the lever member.

7. The optical fiber splicing unit according to claim 2, further comprising a unit base having a splice holder portion; and
   a first anchoring portion that is a lever member which is rotatably provided around an axis along a width direction of the unit base, and is capable of being switched between a retraction restriction position at which the lever member engages with the first anchoring fixation member, which is provided in the first fixing member guide portion, from the rear side of the first anchoring fixation member and at which retraction of the first anchoring fixation member is restricted, wherein
   a waiting position at which a contact between the lever member and the first anchoring fixation member is prevented, by rotation of the lever member, and a rotation restricting abutment portion, which abuts the first splice tool and maintains the lever member at the waiting position, is provided on the lever member of one end portion in a longitudinal direction of the unit base.

8. An optical fiber splicing method, comprising:
opening a portion between half-split elements of a mechanical splice, which aligns optical fibers and puts the optical fibers between the half-split elements to splice the optical fibers to each other, inserting a first optical fiber between the half-split elements from one end side of the mechanical splice in a state in which a first anchoring fixation member, which is fixed to the first optical fiber, abuts a first spacer which restricts advancement of the first anchoring fixation member, and gripping and fixing the first optical fiber between the half-split elements;

retracting the first spacer from the position, at which the first spacer is capable of abutting the first anchoring fixation member, concurrently with or after the gripping and fixing of the first optical fiber, thereafter, advancing the first anchoring fixation member toward the mechanical splice, and restricting retraction of the first anchoring fixation member with respect to the mechanical splice using an anchoring portion, in a state where a bending is formed in the first optical fiber between the mechanical splice and the first anchoring fixation member; and subsequently, inserting a second optical fiber between the half-split elements from an other end side of the mechanical splice and butting a tip of the second optical fiber to a tip of the first optical fiber in a state in which the butting is maintained, and gripping and fixing the second optical fiber between the half-split elements.

9. The optical fiber splicing method according to claim 8, further comprising:
in the process of inserting the second optical fiber between the half-split elements of the mechanical splice and butting the tip of the second optical fiber to the tip of the first optical fiber, abutting the second anchoring fixation member, which is fixed to the second optical fiber, to a second spacer restricting advancement of the second anchoring fixation member, stopping the advancement of the second anchoring fixation member with respect to the mechanical splice at a position at which the second optical fiber is to butt to the tip of the first optical fiber, subsequently, gripping and fixing the second optical fiber between the half-split elements by pulling-out the insertion piece from the portion between the half-split elements of the other end portion of the mechanical splice in a state where the butting between the first and second optical fibers is maintained, retracting the second spacer from a position at which the second spacer is capable of abutting the second anchoring fixation member, concurrently with or after the gripping and fixing of the second optical fiber, thereafter, advancing the second anchoring fixation member toward the mechanical splice, and restricting retraction of the second anchoring fixation member with respect to the mechanical splice using an anchoring portion, in a state where a bending is formed in the second optical fiber between the mechanical splice and the second anchoring fixation member.

10. A holding member for optical fiber splicing unit, comprising:
holding portion which holds the optical fiber splicing unit according to claim 1 which butt-joints optical fibers which are drawn from terminals of a pair of optical fiber cables; and a holding member side cable fixing portion which is integrally formed with the unit holding portion on each of two ends in a longitudinal direction of the unit holding portion, wherein the optical fiber splicing unit comprises a splice holder portion which holds a mechanical splice in which the optical fibers are put in a state in which the optical fibers are butt-jointed, and a unit side cable fixing portion which is fixed to each of terminals of the pair of optical fiber cables, and wherein the holding member side cable fixing portion comprises a cable fitting groove which fits the optical fiber cable extending from the optical fiber splicing unit, and grips and fixes the optical fiber cable in the cable fitting groove.

11. The holding member for optical fiber splicing unit according to claim 10,
wherein the holding member side cable fixing portion comprises one or a plurality of gripping protrusions which are formed on mutually facing inner surfaces of the cable fitting groove to press the optical fiber cable, and to grip and fix the optical fiber cable.

12. The holding member for optical fiber splicing unit according to claim 11,
wherein the plurality of gripping protrusion are formed at an interval in an insertion direction of the optical fiber cable.

13. The holding member for optical fiber splicing unit according to claim 10,
wherein the unit holding portion comprises an elongated plate-shaped bottom plate portion and side plate portions erected on both edges of the bottom plate portion, and a unit accommodation space, which accommodates the optical fiber splicing unit, is formed between the side plate portions, and
wherein a restricting convex portion, which restricts a width direction movement of the optical fiber splicing unit, is formed on at least one of the side plate portions.

14. The holding member for optical fiber splicing unit according to claim 10,
wherein the holding member side cable fixing portion comprises a stopper wall portion which restricts a longitudinal direction movement of the optical fiber splicing unit held in the unit holding portion.

* * * * *